United States Patent
Kim et al.

(10) Patent No.: US 12,382,465 B2
(45) Date of Patent: Aug. 5, 2025

(54) METHOD AND APPARATUS FOR PROVIDING SERVICE IN WIRELESS COMMUNICATION SYSTEM

(71) Applicant: Samsung Electronics Co., Ltd., Suwon-si (KR)

(72) Inventors: Donggun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 696 days.

(21) Appl. No.: 17/707,240

(22) Filed: Mar. 29, 2022

(65) Prior Publication Data

US 2022/0322418 A1 Oct. 6, 2022

(30) Foreign Application Priority Data

Mar. 30, 2021 (KR) .................. 10-2021-0041496

(51) Int. Cl.
*H04W 72/23* (2023.01)
*H04L 1/00* (2006.01)
(Continued)

(52) U.S. Cl.
CPC .......... *H04W 72/23* (2023.01); *H04L 1/0008* (2013.01); *H04W 28/0278* (2013.01); *H04W 72/1268* (2013.01)

(58) Field of Classification Search
CPC .................................................. H04W 72/23
See application file for complete search history.

(56) References Cited

U.S. PATENT DOCUMENTS

| 2016/0128093 A1 | 5/2016 | Lee et al. |
| 2019/0297529 A1 | 9/2019 | Hampel et al. |

(Continued)

FOREIGN PATENT DOCUMENTS

| WO | 2020/114058 A1 | 6/2020 | |
| WO | 2020/116820 A1 | 6/2020 | |
| WO | WO-2023204407 A1 * | 10/2023 | .......... H04W 72/566 |

OTHER PUBLICATIONS

3GPP TS 38.321 V16.4.0; TSG RAN; NR; Medium Access Control (MAC) protocol specification (Release 16), Mar. 29, 2021.

(Continued)

*Primary Examiner* — Abdeltif Ajid
(74) *Attorney, Agent, or Firm* — Jefferson IP Law, LLP

(57) ABSTRACT

A method performed by an integrated access backhaul (IAB) node in a wireless communication system is provided. The method comprises: receiving, from a base station, configuration information regarding an uplink (UL) grant, receiving, from the base station, configuration information regarding backhaul (BH) radio link control (RLC) channel via higher layer signaling, identifying, based on the configuration information regarding BH RLC channel, whether an extended logical channel identifier (eLCID) is used, in case that the eLCID is not used and a UL grant size is equal to or larger than a first size, not transmitting only a padding buffer status report (BSR) or not transmitting only padding or not transmitting only the padding BSR and the padding, and in case that the eLCID is used and the UL grant size is equal to or larger than a second size, not transmitting only the padding BSR or not transmitting only the padding or not transmitting only the padding BSR and the padding.

17 Claims, 29 Drawing Sheets

(51) Int. Cl.
*H04W 28/02* (2009.01)
*H04W 72/1268* (2023.01)

(56) References Cited

U.S. PATENT DOCUMENTS

2020/0106705 A1   4/2020  Lee et al.
2022/0240094 A1*  7/2022  Kim .................... H04W 12/106
2023/0354092 A1* 11/2023  Li ..................... H04W 28/0278

OTHER PUBLICATIONS

International Search Report dated Jun. 22, 2022, issued in International Application No. PCT/KR2022/004395.
Samsung; Running CR to 38.321 on Integrated Access and Backhaul for NR; 3GPP TSG-RAN WG2 Meeting #109-e; R2-2002225; XP 51864758A; E-meeting; Feb. 2000.
Apple Inc; Dynamic Reporting of Tx DC Location for UL CA; 3GPP TSG-RAN WG2 Meeting #112e; R2-2009518; XP 51942471A; Online; Nov. 2-13, 2020.
Extended European Search Report dated May 16, 2024; European Appln. No. 22781563.6-1215 / 4275437 PCT/KR2022004395.

\* cited by examiner

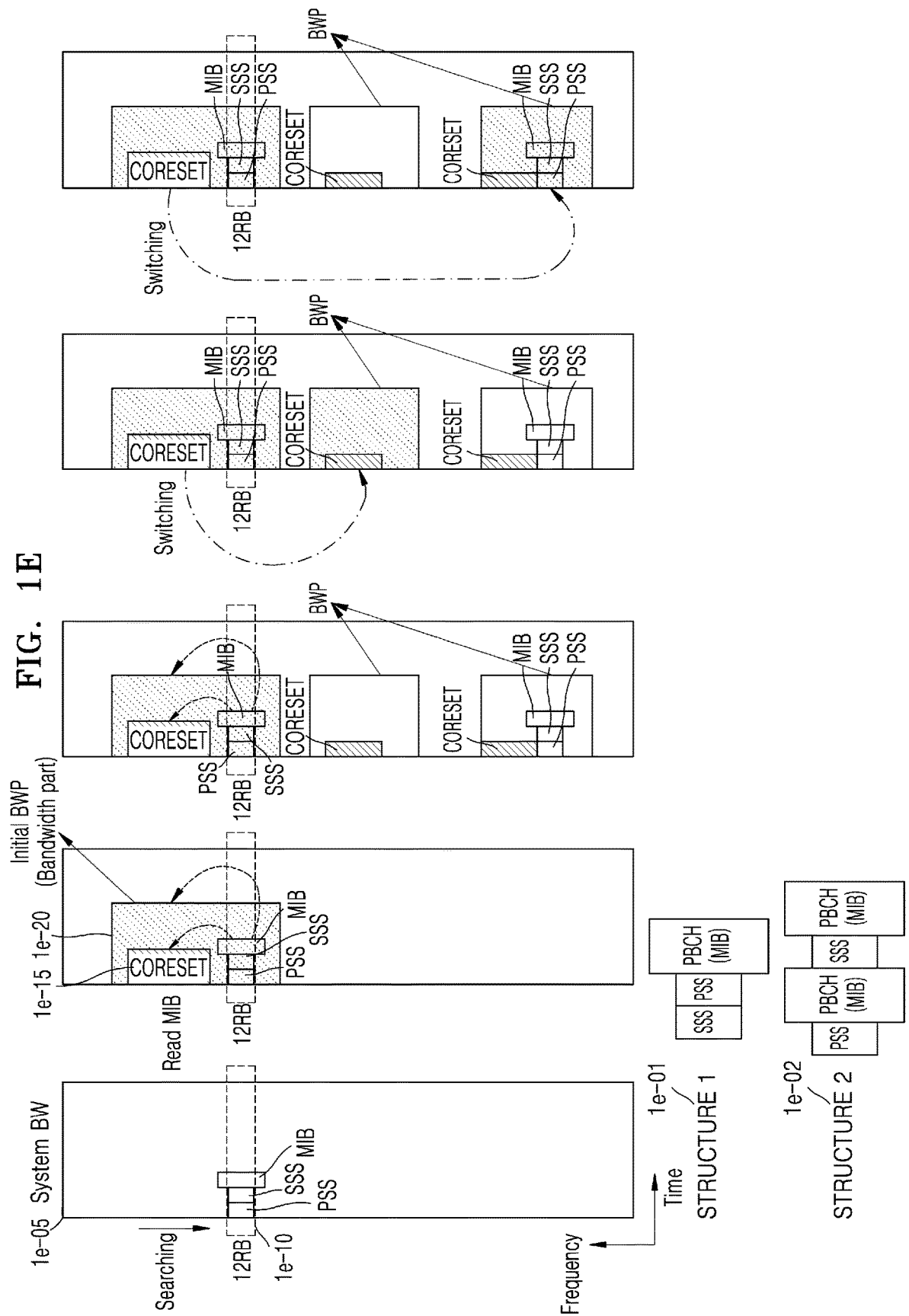

FIG. 1H

| $C_7$ | $C_6$ | $C_5$ | $C_4$ | $C_3$ | $C_2$ | $C_1$ | R | Oct 1 |

1h-05

| $C_7$ | $C_6$ | $C_5$ | $C_4$ | $C_3$ | $C_2$ | $C_1$ | R | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

Table 6.2.1-2 Values of LCID for UL-SCH

| Codepoint/Index | LCID values |
|---|---|
| 0 | CCCH of size 64 bits (referred to as"CCCH1" in TS 38 331 [5]) |
| 1-32 | Identity of the logical channel |
| 33 | Extended logical channel ID field (tow-octet eLCID field) |
| 34 | Extended logical channel ID field (tow-octet eLCID field) |
| 35-44 | Reserved |
| 45 | Truncated Sidelink BSR |
| 46 | Sidelink BSR |
| 47 | Reserved |
| 48 | LBT failure (four octets) |
| 49 | LBT failure (one octet) |
| 50 | BFR (one octet $C_i$) |
| 51 | Truncated BFR (one octet $C_i$) |
| 52 | CCCH of size 48 bit (referred to as "CCCH" in TS 38.331 [5] |
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entyy PHR (one octet $C_i$) |
| 58 | C-RNTI |
| 59 | Chort Truncated BSR |
| 60 | Long Truncated BSR |
| 61 | Short BSR |
| 62 | Long BSR |
| 63 | Padding |

2i-10

Table 6.2.1-2a Values of one-octet eLCID for UL-SCH

| Codepoint | Index | LCID values |
|---|---|---|
| 0 to $(2^{16}-1)$ | 320 to $(2^{16}+319)$ | Identity of the logical channel |

2i-15

Table 6.2.1-2b Values of eLCID for UL-SCH

| Codepoint | Index | LCID values |
|---|---|---|
| 0 to 249 | 64 to 313 | Reserved |
| 250 | 314 | BFR (four octets $C_i$) |
| 251 | 315 | Truncated BFR (four octets $C_i$) |
| 252 | 316 | Multiple Entry Confiqured Grant Confirmation |
| 253 | 317 | Sidelink Configured Frant Confirmation |
| 254 | 318 | Desired Guard Symbols |
| 255 | 319 | Pre-emptive BSR |

METHOD AND APPARATUS FOR PROVIDING SERVICE IN WIRELESS COMMUNICATION SYSTEM

CROSS-REFERENCE TO RELATED APPLICATION(S)

This application is based on and claims priority under 35 U.S.C. § -119(a) of a Korean patent application number 10-2021-0041496, filed on Mar. 30, 2021, in the Korean Intellectual Property Office, the disclosure of which is incorporated by reference herein in its entirety.

BACKGROUND

1. Field

The disclosure relates to a method and apparatus for efficiently providing a service in a wireless communication system.

2. Description of Related Art

In order to meet increasing demand with respect wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. In order to achieve high data rates, implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. In order to improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 5G communication technology and IoT technology.

Because various services may be provided due to the aforementioned technical features and the development of wireless communication systems, methods for seamlessly providing these services are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for efficiently providing a service in a mobile communication system.

Additional aspects will be set forth in part in the description which follows and, in part, will be apparent from the description, or may be learned by practice of the presented embodiments.

In accordance with an aspect of the disclosure, a method performed by an integrated access backhaul (IAB) node in a wireless communication system is provided. The method includes receiving, from a base station, configuration information regarding an uplink (UL) grant, receiving, from the base station, configuration information regarding backhaul (BH) radio link control (RLC) channel via higher layer signaling, identifying, based on the configuration information regarding BH RLC channel, whether an extended logical channel identifier (eLCID) is used, in case that the eLCID is not used and a UL grant size is equal to or larger than a first size, not transmitting only a padding buffer status report (BSR) or not transmitting only padding or not transmitting only the padding BSR and the padding, and in case that the eLCID is used and the UL grant size is equal to or larger than a second size, not transmitting only the padding BSR or not transmitting only the padding or not transmitting only the padding BSR and the padding.

In accordance with another aspect of the disclosure, an integrated access backhaul (IAB) node in a wireless communication system is provided. The IAB node includes a transceiver, and at least one processor coupled to the transceiver and configured to receive, from a base station, configuration information regarding an uplink (UL) grant, receive, from the base station, configuration information regarding backhaul (BH) radio link control (RLC) channel via higher layer signaling, identify, based on the configuration information regarding BH RLC channel, whether an extended logical channel identifier (eLCID) is used, in case that the eLCID is not used and a UL grant size is equal to or larger than a first size, not transmit only a padding buffer status report (BSR) or not transmit only padding or not transmit only the padding BSR and the padding, and in case that the eLCID is used and the UL grant size is equal to or larger than a second size, not transmit only the padding BSR or not transmit only the padding or not transmit only the padding BSR and the padding In accordance with another aspect of the disclosure, a method performed by a base station in a wireless communication system is provided. The method includes transmitting, to an integrated access backhaul (IAB) node, configuration information regarding an uplink (UL) grant, identifying one information from among a logical channel identifier (LCID) and an extended LCID (eLCID), and transmitting, to the IAB node, configuration information regarding backhaul (BH) radio link control (RLC) channel via higher layer signaling, the configuration information regarding BH RLC channel including the identified information, wherein, in case that the eLCID is not used and a UL grant size is equal to or larger than a first size, only a padding buffer status report (BSR) is not transmitted or only padding is not transmitted or only the padding BSR and the padding is not transmitted, and wherein, in case that the eLCID is used and the UL grant size is equal to or larger than a second size, only the padding BSR is not transmitted or only the padding is not transmitted or only the padding BSR and the padding are not transmitted.

In accordance with another aspect of the disclosure, a base station in a wireless communication system is provided. The base station includes a transceiver, and at least one processor coupled to the transceiver and configured to transmit, to an integrated access backhaul (IAB) node, configuration information regarding an uplink (UL) grant, identify one information from among a logical channel identifier (LCID) and an extended LCID (eLCID), and transmit, to the IAB node, configuration information regarding backhaul (BH) radio link control (RLC) channel via higher layer signaling, the configuration information regarding BH RLC channel including the identified information wherein, in case that the eLCID is not used and a UL grant size is equal to or larger than a first size, only a padding buffer status report (BSR) is not transmitted or only padding is not transmitted or only the padding BSR and the padding is not transmitted, and wherein, in case that the eLCID is used and the UL grant size is equal to or larger than a second size, only the padding BSR is not transmitted or only the padding is not transmitted or only the padding BSR and the padding are not transmitted.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1E is a diagram illustrating a procedure of providing a service to a user equipment (UE) by efficiently using a very wide frequency bandwidth in a mobile communication system, according to an embodiment of the disclosure;

FIG. 1H is a diagram illustrating Medium Access Control (MAC) control information indicating state transition to an active state (or resumed state) or a dormant state (or suspended state) or an inactive state for a cell or a cell of a cell group, according to an embodiment of the disclosure;

FIG. 2HB is a diagram illustrating protocol layers of a UE or an IAB node which process and receive data or process and transmit data or route data or configure bandwidth allocation protocol (BAP) configuration information by an RRC message or configure BAP configuration information by a F1 Application Protocol (F1AP) message according to an embodiment of the disclosure;

FIG. 2I illustrates Table showing mapping information of a logical channel identifier for each data (e.g., data (MAC Service Data Unit (MAC SDU) or Radio Link Control Protocol Data Unit (RLC PDU)) of uplink shared channel (UL-SCH) or MAC control element (MAC CE)) when a first logical channel Identity (LCID) or a second extended logical channel identity (eLCID) of a MAC subheader which is available for application of a data transmission method of a MAC layer is used, according to an embodiment of the disclosure;

Throughout the drawings, it should be noted that like reference numbers are used to depict the same or similar elements, features, and structures.

DETAILED DESCRIPTION

Figure 1A:
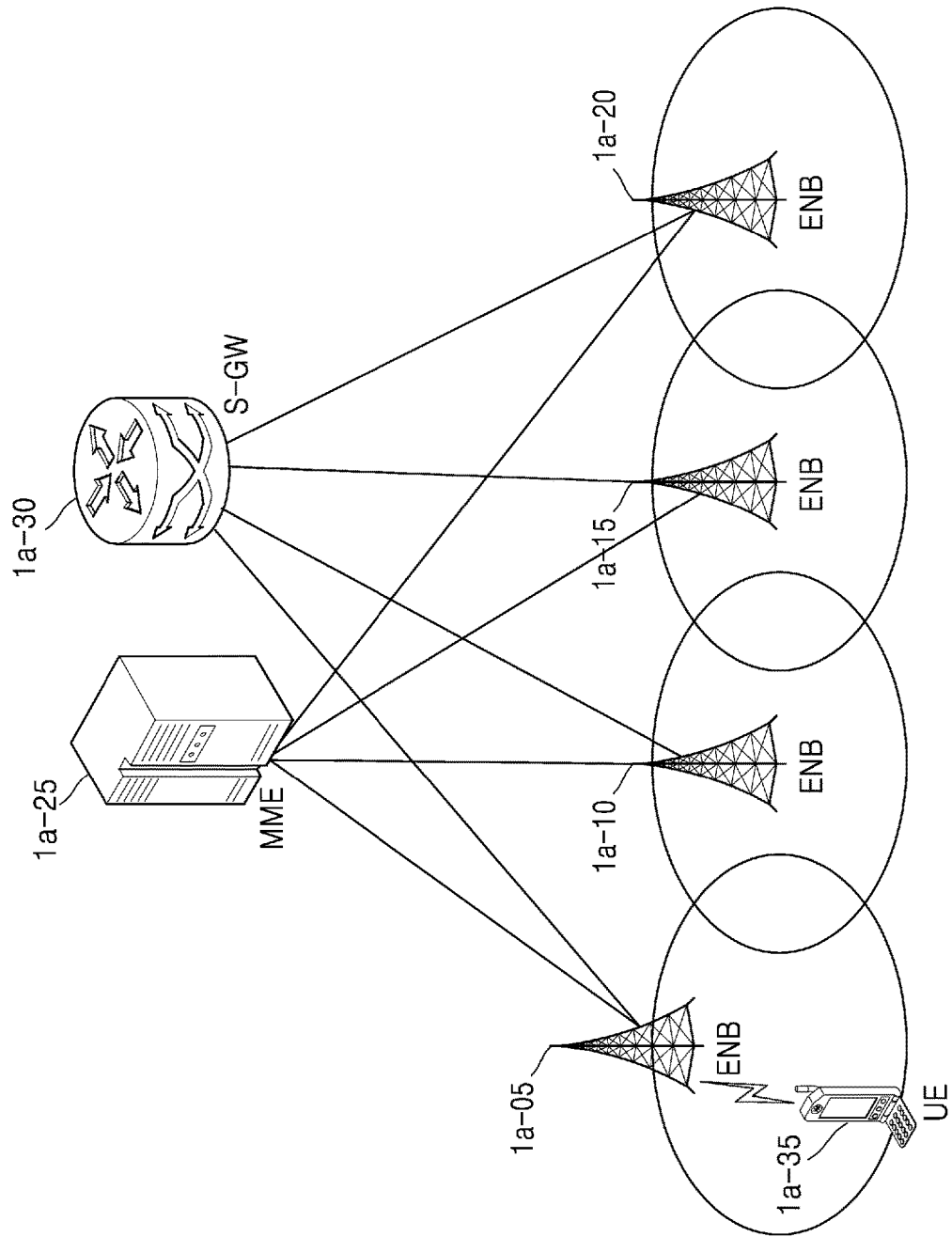
FIG. 1A is a diagram illustrating an architecture of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Hereinafter, embodiments of the disclosure will be described in detail with reference to accompanying drawings. In the descriptions of the disclosure, detailed explanations of the related art are omitted when it is deemed that they may unnecessarily obscure the essence of the disclosure. By omitting descriptions of unnecessary details, the concept of the disclosure can be clearly described.

For the same reasons, in the drawings, some elements may be exaggerated, omitted, or roughly illustrated. Also, size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer usable or computer-readable memory that may direct the computer or other programmable data processing apparatus to function in a particular manner, such that the instructions stored in the computer usable or computer-readable memory may produce an article of manufacture including instruction means that perform the functions specified in the flowchart block(s). The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that, in some alternative implementations, the functions noted in the blocks may occur out of the order. For example, two blocks shown in succession may in fact be executed substantially concurrently or the blocks may sometimes be executed in the reverse order, depending upon the functionality involved.

The term " . . . unit", as used in the present embodiment of the disclosure refers to a software or hardware component, such as field-programmable gate array (FPGA) or application-specific integrated circuit (ASIC), which performs certain tasks. However, the term " . . . unit" does not mean to be limited to software or hardware. A " . . . unit" may be configured to be in an addressable storage medium or configured to operate one or more processors. Thus, a " . . . unit" may include, by way of example, components such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and " . . . units" may be combined into fewer components and " . . . units" or further separated into additional components and " . . . units". Further, the components and " . . . units" may be implemented to operate one or more central processing units (CPUs) in a device or a secure multimedia card. Also, a " . . . unit" may include one or more processors in embodiments of the disclosure.

In the following descriptions of the disclosure, well-known functions or configurations are not described in detail when it is deemed that they may unnecessarily obscure the essence of the disclosure. Hereinafter, embodiments of the disclosure will be described with reference to accompanying drawings.

Hereinafter, terms identifying an access node, terms indicating network entities, terms indicating messages, terms indicating an interface between network entities, and terms indicating various pieces of identification information, as used in the following description, are exemplified for convenience of descriptions. Accordingly, the disclosure is not limited to terms to be described below, and other terms indicating objects having equal technical meanings may be used.

For convenience of descriptions, the disclosure uses terms and names defined in the 3$^{rd}$ Generation Partnership Project (3GPP) long term evolution (LTE) standards. However, the disclosure is not limited to these terms and names, and may be equally applied to communication systems conforming to other standards. In the disclosure, an evolved node B (eNB) may be interchangeably used with a next-generation node B (gNB) for convenience of descriptions. That is, a base station described by an eNB may represent a gNB. Also, the term "terminals or UEs" may refer to not only mobile phones, narrowband (NB)-Internet of things (IoT) (NB-IoT) devices, and sensors but also refer to other wireless communication devices.

Hereinafter, a base station is an entity that allocates resources to a terminal, and may be at least one of a gNB, an eNB, a Node B, a base station (BS), a radio access unit, a BS controller, or a node on a network. A terminal may include a user equipment (UE), a mobile station (MS), a cellular phone, a smartphone, a computer, or a multimedia system capable of performing a communication function. However, the disclosure is not limited to the above example.

In particular, the disclosure may be applied to 3GPP New Radio (3GPP NR) (5$^{th}$ generation mobile communication standards). Also, the disclosure may be applied to intelligent services (e.g., smart home, smart building, smart city, smart car or connected car, health care, digital education, retail, security, and safety services) based on 5G communication technology and Internet of things (IoT) technology. In the disclosure, an eNB may be interchangeably used with a gNB for convenience of descriptions. That is, a BS described by an eNB may represent a gNB. Also, the term "terminals or UEs" may refer to not only mobile phones, NB-IoT devices, and sensors but also refer to other wireless communication devices.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), and LTE-Advanced (LTE-A) of the 3GPP, high rate packet data (HRPD) and ultra mobile broadband (UMB) of 3GPP2, 802.16e of the Institute of Electrical and Electronic Engineers (IEEE), or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link of data or a control signal transmitted from a UE (or an MS) to a BS (e.g., eNB), and the DL refers to a radio link of data or a control signal transmitted from a BS to a UE.

Although LTE, LTE-Advanced (LTE-A), LTE Pro, or 5G (or NR) systems are mentioned as examples in the following description, embodiments of the disclosure may also be applied to other communication systems having similar technical backgrounds or channel types. Furthermore, the embodiments of the disclosure may also be applied to other communication systems through partial modification without greatly departing from the scope of the disclosure based on determination by one of ordinary skill in the art.

Hereinafter, terms identifying an access node, terms indicating network entities, terms indicating messages, terms indicating an interface between network entities, and terms indicating various pieces of identification information, as used in the following description, are exemplified for convenience of descriptions. Accordingly, the disclosure is not limited to terms to be described below, and other terms indicating objects having equal technical meanings may be used.

For convenience of descriptions, the disclosure uses terms and names defined in the 3GPP LTE standards. However, the disclosure is not limited to these terms and names, and may be equally applied to communication systems conforming to other standards. The disclosure may be applied to 3GPP NR (5$^{th}$ generation mobile communication standards). In the disclosure, an eNB may be interchangeably used with a gNB for convenience of descriptions. That is, a BS described by an eNB may represent a gNB. Also, the term "terminals or UEs" may refer to not only mobile phones, NB-IoT devices, and sensors but also refer to other wireless communication devices.

Hereinafter, a base station is an entity that allocates resources to a UE, and may be at least one of a gNB, an eNB, a Node B, a base station (BS), a radio access unit, a BS controller, or a node on a network. A terminal may include a UE, a MS, a cellular phone, a smartphone, a computer, or a multimedia system capable of performing a communication function. However, the disclosure is not limited to the above example.

An embodiment of the disclosure relates to a method and apparatus for controlling power according to a Secondary Cell Group (SCG) state of a UE for which dual connectivity is configured in a wireless communication system, and more particularly, to a method of efficiently controlling a state of a secondary node when dual connectivity is performed in a wireless mobile communication system.

A wireless communication system may use carrier aggregation or dual connectivity so as to provide a UE with a service with a high data rate and low latency. However, there is a demand for a method for preventing a processing delay that may occur when carrier aggregation or dual connectivity is configured and activated for a UE connected to a network or is deactivated after the carrier aggregation or the dual connectivity is used. In particular, if a plurality of cells maintain activated with respect to a UE so as to use carrier aggregation or dual connectivity, the UE has to perform Physical Dedicated Control Channel (PDCCH) monitoring on each of the cells, such that battery consumption of the UE may be significantly increased. On the other hand, if the plurality of cells maintain deactivated to decrease battery consumption of the UE, when carrier aggregation or dual connectivity is used, latency occurs when activating the plurality of cells, such that a delay may occur in data transmission and reception. In the disclosure, a cell may indicate a primary cell (PCell) or a secondary cell (SCell) (e.g., a SCell configured in a master cell group (MCG)), or a primary secondary cell (PSCell) (e.g., a PCell configured in a secondary cell group (SCG)) or a SCell (e.g., a SCell configured in an SCG).

An embodiment of the disclosure provides a new dormant mode or suspension mode or inactive mode in which a Radio Resource Control (RRC) connected UE connected to a network can rapidly activate or deactivate carrier aggregation or dual connectivity in a wireless communication system. An embodiment of the disclosure provides a method of operating a new dormant (hibernation or dormancy or suspension) mode in units of bandwidth part (BWP)-levels, in units of cells, or in units of cell groups (e.g., a cell group unit with respect to a SCG), to rapidly activate carrier aggregation or dual connectivity and reduce battery consumption of a UE.

FIG. 1A is a diagram illustrating a configuration of an LTE system according to an embodiment of the disclosure.

Referring to FIG. 1A, a radio access network (RAN) of the LTE system includes a plurality of eNBs (or nodes B or BS s) 1a-05, 1a-10, 1a-15, and 1a-20, a Mobility Management Entity (MME) 1a-25, and a Serving-Gateway (S-GW) 1a-30. A UE (or a terminal) 1a-35 accesses an external network via the eNB 1a-05, 1a-10, 1a-15, or 1a-20 and the S-GW 1a-30.

In FIG. 1A, the eNB 1a-05, 1a-10, 1a-15, or 1a-20 corresponds to a legacy node B of a universal mobile telecommunications system (UMTS). The eNB may be connected to the UE 1a-35 via wireless channels and may perform complex functions compared to the legacy node B. All user traffic data including real-time services such as voice over Internet protocol (VoIP) may be serviced through shared channels in the LTE system, and thus an entity for collating status information, e.g., buffer status information of UEs, available transmit power status information, and channel state information and performing scheduling may be required and the eNB 1a-05, 1a-10, 1a-15, or 1a-20 may operate as such an entity. One eNB generally controls a plurality of cells. For example, the LTE system may use radio access technology such as Orthogonal Frequency Division Multiplexing (OFDM) in a bandwidth of 20 MHz to achieve a data rate of 100 Mbps. Furthermore, the eNB may also use adaptive modulation & coding (AMC) to determine a modulation scheme and a channel coding rate in accordance with a channel state of the UE. The S-GW 1a-30 is an entity for providing data bearers and may establish and release the data bearers under the control of the MME 1a-25. The MME 1a-25 is an entity for performing a mobility management function and various control functions on the UE and is connected to the plurality of eNBs.

Figure 1B:
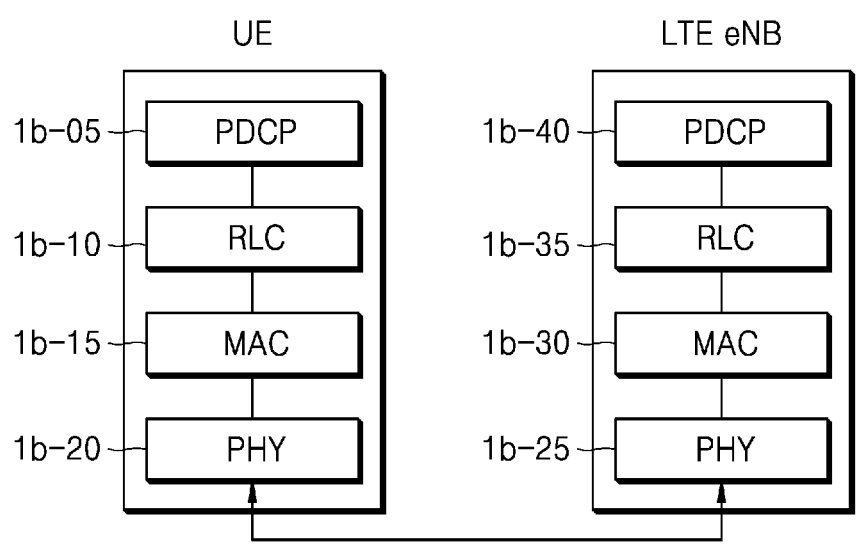
FIG. 1B is a diagram illustrating a radio protocol architecture of an LTE system according to an embodiment of the disclosure.

FIG. 1B is a diagram illustrating a radio protocol architecture of an LTE system according to an embodiment of the disclosure.

Referring to FIG. 1B, radio protocols of the LTE system may include Packet Data Convergence Protocol (PDCP) layers 1b-05 and 1b-40, Radio Link Control (RLC) layers 1b-10 and 1b-35, and Medium Access Control (MAC) layers 1b-15 and 1b-30 respectively in a UE and an eNB. The PDCP layer 1b-05 or 1b-40 may perform IP header compression/decompression or the like. Main functions of the PDCP layer 1b-05 or 1b-40 are summarized as shown below.

Header compression and decompression: robust header compression (ROHC) only

Transfer of user data

In-sequence delivery of upper layer Protocol Data Units (PDUs) at PDCP re-establishment procedure for RLC acknowledged mode (AM)

For split bearers in DC (only support for RLC AM): PDCP PDU routing for transmission and PDCP PDU reordering for reception Duplicate detection of lower layer Service Data Units (SDUs) at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink.

The RLC layer 1b-10 or 1b-35 may perform an automatic repeat request (ARQ) operation by reconfiguring a PDCP PDU or an RLC SDU to appropriate sizes. Main functions of the RLC layer 1b-10 or 1b-35 may be summarized as shown below.

Transfer of upper layer PDUs

Error correction through ARQ (only for AM data transfer)

Concatenation, segmentation and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer 1b-15 or 1b-30 may be connected to a plurality of RLC layers configured for one UE and may multiplex RLC PDUs into a MAC PDU and may demultiplex the RLC PDUs from the MAC PDU. Main functions of the MAC layer 1b-15 or 1b-30 may be summarized as shown below.

Mapping between logical channels and transport channels

Multiplexing/demultiplexing of MAC SDUs belonging to one or different logical channels into/from transport blocks (TBs) delivered to/from the physical layer on transport channels Scheduling information reporting Error correction through hybrid ARQ (HARQ)

Priority handling between logical channels of one UE

Priority handling between UEs by means of dynamic scheduling

Multimedia broadcast/multicast service (MBMS) service identification

Transport format selection

Padding

A physical (PHY) layer 1b-20 or 1b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer.

Although not illustrated in FIG. 1B, RRC layers are present respectively above PDCP layers of the UE and the LTE eNB, and the RRC layers may exchange configuration control messages related to an access and measurement so as to control radio resources.

Figure 1C:
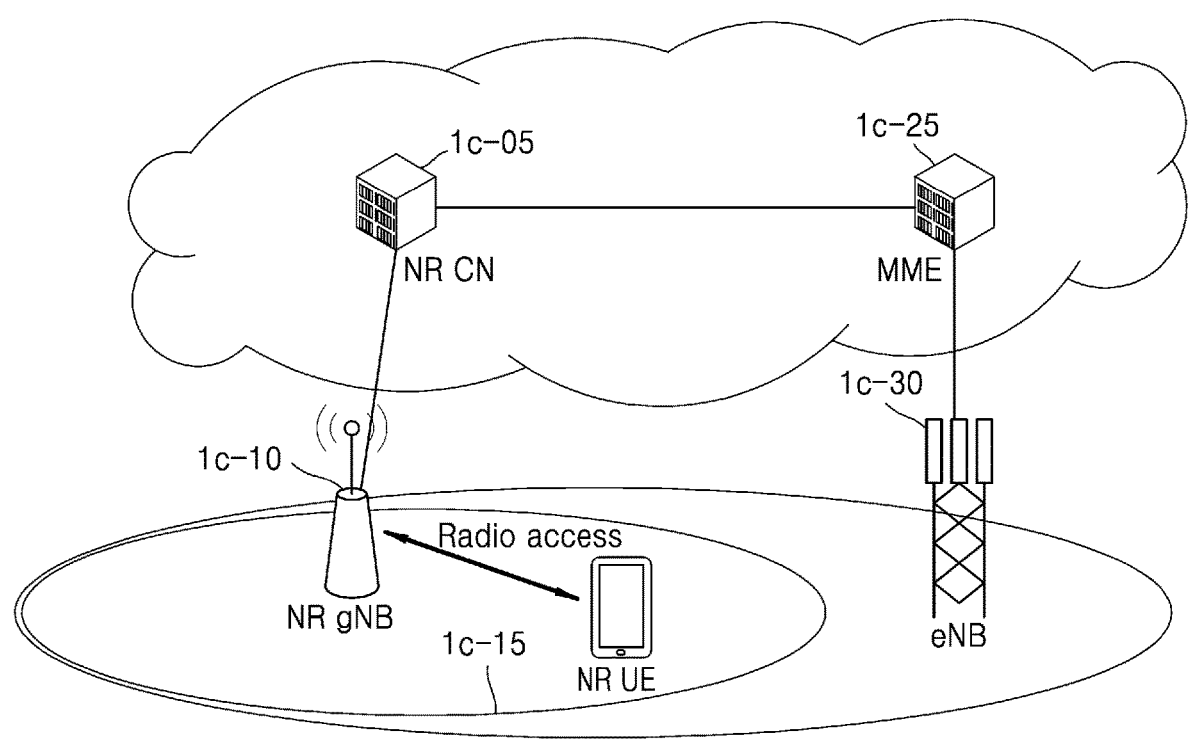
FIG. 1C is a diagram illustrating an architecture of a mobile communication system according to an embodiment of the disclosure.

FIG. 1C is a diagram illustrating an architecture of a mobile communication system according to an embodiment of the disclosure.

Referring to FIG. 1C, as illustrated, a radio access network of a next-generation mobile communication system (hereinafter, also referred to as the NR or 5G communication system) includes a new radio node B (NR gNB or NR BS) 1c-10 and a new radio core network (NR CN) 1c-05. A NR UE (or terminal) 1c-15 accesses an external network via the NR gNB 1c-10 and the NR CN 1c-05.

In FIG. 1C, the NR gNB 1c-10 corresponds to an eNB of the legacy LTE system. The NR gNB 1c-10 may be connected to the NR UE 1c-15 through radio channels and may provide superior services compared to a legacy eNB. All user traffic may be serviced through shared channels in the NR or 5G mobile communication system, and thus, an entity for collating buffer status information of UEs, available transmit power status information, and channel state information and performing scheduling may be required and the NR gNB 1c-10 may operate as such an entity. One NR gNB generally controls a plurality of cells. In the next-generation mobile communication system (the NR or 5G communication system), a bandwidth greater than the maximum bandwidth of the legacy LTE system may be used to achieve an ultra-high data rate, compared to the legacy LTE system, and OFDM may be used as a radio access technology by having a beamforming technology additionally applied thereto. Furthermore, AMC may be applied to determine a modulation scheme and a channel coding rate in accordance with a channel state of the UE. The NR CN 1c-05 performs functions such as mobility support, bearer configuration, quality of service (QoS) configuration, and the like. The NR CN 1c-05 is an entity for performing a mobility management function and various control functions on the NR UE 1c-15 and is connected to a plurality of BSs. Also, the next-generation mobile communication system may cooperate with the legacy LTE system, and the NR CN 1c-05 may be connected to an MME 1c-25 via a network interface. The MME 1c-25 is connected to an eNB 1c-30 that is a legacy BS.

Figure 1D:
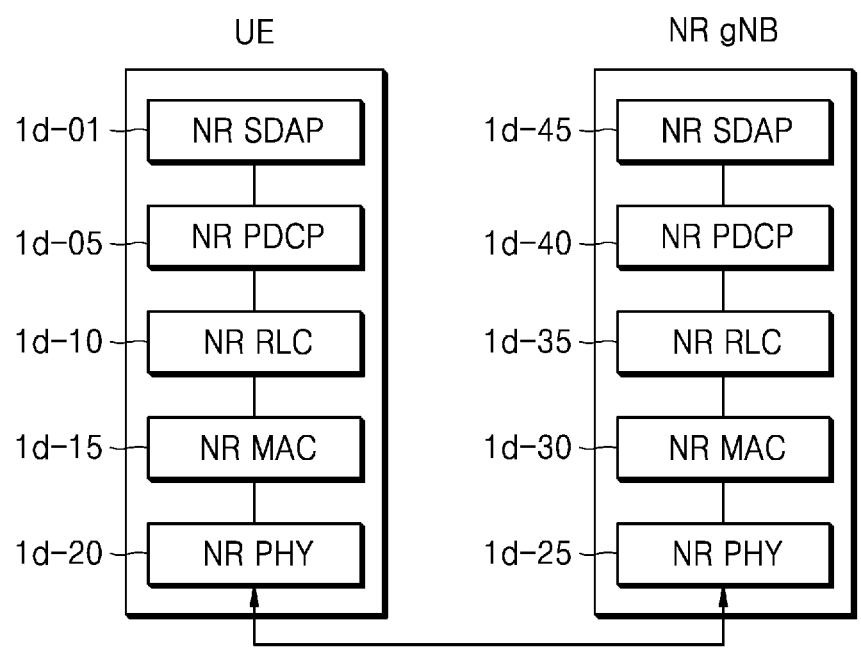
FIG. 1D is a diagram illustrating a radio protocol architecture of a mobile communication system according to an embodiment of the disclosure.

FIG. 1D is a diagram illustrating a radio protocol architecture of a mobile communication system according to an embodiment of the disclosure.

Referring to FIG. 1D, the radio protocol architecture of a next-generation mobile communication system may include NR Service Data Adaptation Protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB.

Main functions of the NR SDAP layer 1d-01 or 1d-45 may include some of the following functions.

Transfer of user plane data

Mapping between a QoS flow and a DRB for both DL and UL

Marking QoS flow identifier (ID) in both DL and UL packets

Reflective QoS flow to DRB mapping for the UL SDAP PDUs.

With regard to the NR SDAP layer 1d-01 or 1d-45, the UE may be configured with information about whether to use a header of the NR SDAP layer 1d-01 or 1d-45 or to use functions of the NR SDAP layer 1d-01 or 1d-45, through an RRC message per PDCP layer, per bearer, or per logical channel. Also, when the SDAP header of the NR SDAP layer 1d-01 or 1d-45 is configured, a 1-bit non access stratum (NAS) reflective QoS indicator and a 1-bit access stratum (AS) reflective QoS indicator of the SDAP header may indicate the UE to update or reconfigure UL and DL QoS flow and data bearer mapping information. The SDAP header may include QoS flow ID information indicating QoS. The QoS information may be used as data processing priority information or scheduling information for seamlessly supporting a service.

Main functions of the NR PDCP layer 1d-05 or 1d-40 may include some of the following functions.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink.

In the above descriptions, the reordering function of the NR PDCP layer 1d-05 or 1d-40 may include a function of reordering PDCP PDUs received from a lower layer, on a PDCP sequence number (SN) basis, and a function of delivering the reordered data to an upper layer in order. Alternatively, the reordering function of the NR PDCP layer 1d-05 or 1d-40 may include a function of delivering the reordered data to an upper layer out of order, a function of recording missing PDCP PDUs by reordering the received PDCP PDUs, a function of reporting status information of the missing PDCP PDUs to a transmitter, and a function of requesting to retransmit the missing PDCP PDUs.

Main functions of the NR RLC layer 1d-10 or 1d-35 may include some of the following functions.

Transfer of upper layer PDUs
In-sequence delivery of upper layer PDUs
Out-of-sequence delivery of upper layer PDUs
Error correction through ARQ—Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above description, the in-sequence delivery function of the NR RLC layer 1d-10 or 1d-35 may indicate a function of delivering RLC SDUs received from a lower layer to an upper layer in order, and may include a function of reassembling the RLC SDUs and delivering the reassembled RLC SDU when a plurality of RLC SDUs segmented from one RLC SDU are received, and include a function of reordering received RLC PDUs on an RLC SN or PDCP SN basis. Also, the in-sequence delivery function of the NR RLC layer 1d-10 or 1d-35 may include a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, a function of delivering all RLC SDUs received before a timer starts, to an upper layer in order although a missing RLC SDU exists when a certain timer expires, or a function of delivering all RLC SDUs received so far, to an upper layer in order although a missing RLC SDU exists when a certain timer expires. Furthermore, in the above description, the NR RLC layer 1d-10 or 1d-35 may process the RLC PDUs in order of reception (regardless of SNs, and in order of arrival) and may deliver the RLC PDUs to the NR PDCP layer 1d-05 or 1d-40 in a manner of out-of-sequence delivery, and when it is a segment, the NR RLC layer 1d-10 or 1d-35 may reassemble the segment with other segments stored in a buffer or subsequently received, into a whole RLC PDU and may transmit the RLC PDU to the NR PDCP layer 1d-05 or 1d-40. The NR RLC layer 1d-10 or 1d-35 may not have a concatenation function, and the concatenation function may be performed by the NR MAC layer 1d-15 or 1d-30 or be replaced with a multiplexing function of the NR MAC layer 1d-15 or 1d-30.

The out-of-sequence delivery function of the NR RLC layer 1d-10 or 1d-35 may include a function of directly delivering RLC SDUs received from a lower layer to an upper layer out of order, a function of reassembling a plurality of RLC SDUs segmented from one RLC SDU and delivering the reassembled RLC SDU when the segmented RLC SDUs are received, and a function of recording missing RLC PDUs by storing RLC SNs or PDCP SNs of received RLC PDUs and reordering the received RLC PDUs.

The NR MAC layer 1d-15 or 1d-30 may be connected to a plurality of NR RLC layers configured for one UE, and main functions of the NR MAC layer 1d-15 or 1d-30 may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 1d-20 or 1d-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer.

Because a next-generation mobile communication system can use very high band frequencies, frequency bandwidths may also be very wide. However, in UE implementation, supporting all of the very wide bandwidths requires high complexity of implementation and incurs high costs. Accordingly, the next-generation mobile communication system may introduce the concept of a BWP, and may configure a plurality of BWPs for one cell (e.g., a SpCell or a SCell), and data may be transmitted and received in one or more BWPs of the one cell according to an indication by a BS.

The disclosure provides a state transitioning method or a BWP switching method and a specific operation thereof, based on a state of a SCell and a plurality of BWPs configured for the SCell when a dormant BWP proposed in the disclosure is introduced. Also, the disclosure provides each of a method of managing a dormant mode in units of BWPs (BWP-level) and performing state transition and a BWP switching method. Also, the disclosure provides a specific operation of a BWP according to a state of each SCell, or a state or mode of each BWP (e.g., active, inactive mode, or dormant).

A communication system according to an embodiment of the disclosure may configure a plurality of BWPs for one cell (e.g., an SpCell or a PCell or a PSCell or an SCell) with respect to each DL or each UL, and may configure, through BWP switching, an active BWP (active DL or UL BWP) or a dormant BWP (dormant UL BWP or dormant DL BWP) or an inactive BWP (inactive or deactivated DL/UL BWP) and operate them. That is, the communication system according to an embodiment of the disclosure may increase a data rate in a way similar to a carrier aggregation technology by transitioning a DL or UL BWP for the one cell to an activate state. Also, the communication system according to an embodiment of the disclosure may reduce battery power consumption by allowing a UE not to perform PDCCH monitoring on the cell by transitioning or switching a DL BWP to a dormant BWP. Also, the communication system according to an embodiment of the disclosure may support fast activation of a cell or a BWP by allowing the UE to perform channel measurement on a DL BWP and report a result of the channel measurement. Also, the communication system according to an embodiment of the disclosure may reduce battery consumption of a UE by transitioning a DL (or UL) BWP on the one cell to an inactive state. BWP state transition or BWP switching for each cell may be configured and indicated by using an RRC message or a MAC control element (MAC CE) or downlink control information (DCI) of a PDCCH. The dormant BWP may be extended and applied to dual connectivity, for example, to a PSCell of an SCG. According to another embodiment of the disclosure, an embodiment of the disclosure may be extended to the concept of cell group suspension or cell group deactivation, and thus, the communication system according to an embodiment of the disclosure may indicate cell group suspension or deactivation to one cell group (e.g., an SCG) of a UE for which dual connectivity is configured. Therefore, the communication system according to an embodiment of the disclosure may suspend data transmission or reception or may suspend PDCCH monitoring or may intermittently perform PDCCH monitoring with a very long interval with respect to the indicated cell group, thereby reducing power consumption of the UE. Also, when the UE receives the indication of cell group suspension or deactivation, the UE may perform a channel measurement procedure in the cell group for which cell group suspension or deactivation is indicated, and may report a result of the channel measurement to a network (e.g., to a MCG or an SCG), thereby supporting fast activation of dual connectivity. The UE may perform the channel measurement procedure on the cell group for which cell group suspension or deactivation is indicated, may maintain and store cell group configuration information about the cell group without discarding or releasing the cell group configuration information, or may recover the cell group configuration information in response to a cell group activation or resumption indication by a network. For example, the UE may changelessly store or maintain a plurality of pieces of cell group configuration information (e.g., configuration information of each PDCP, RLC, or MAC layer, or bearer configuration information or configuration information of each cell), which are configured for the UE. If the UE receives a cell group resume or activation indication with respect to the cell group for which cell group suspension or deactivation is indicated, the UE may resume or recover or re-apply the cell group configuration information. Also, the UE may resume a bearer or may re-start data transmission or reception or may re-start PDCCH monitoring or may perform channel measurement reporting. Alternatively, the UE may periodically reactivate configured transmission resources.

The cell group configuration information or pre-configured cell group configuration information or a message (e.g., an RRC message or RRCReconfiguration) indicating cell group activation or resumption may be configured to include first channel measurement configuration information (e.g., configuration information about a channel state information reference signal (CSI-RS) or a synchronization signal block (SSB) or a radio resource/reference signal (RS)) for fast cell group activation. According to another method, a message (e.g., an RRC message or RRCReconfiguration) indicating cell group deactivation or suspension or release may be pre-configured to include first channel measurement configuration information (e.g., configuration information about a CSI-RS or an SSB or an RS) for fast cell group activation. In order for the BS to many or frequently transmit a channel measurement signal to allow channel measurement to be fast performed on a cell (e.g., a PCell or a PSCell or an SCell) of a cell group so as to fast activate the cell group, the first channel measurement configuration information may include configuration information about a period of a frequent channel measurement signal (e.g., a radio resource) or information about a transmission resource being transmitted (a frequency or time transmission resource on which the frequent channel measurement signal is transmitted) or a duration or a count (the number of times the frequent channel measurement signal is transmitted) or a timer value (a time in which the frequent channel measurement signal is transmitted) or time duration (duration (e.g., a time unit (a slot or a subframe or a symbol)) in which the frequent channel measurement signal is transmitted) or a transmission resource, a period, a duration or timing for reporting a measurement result of the UE. By using the first channel measurement configuration information, the BS may not only configure a short reporting period (or transmission resource) for the UE to report a channel measurement result but may also configure a transmission resource for channel measurement so that the BS can transmit many or frequently channel measurement signals (or transmission resources) to support fast channel measurement or many signal measurements by the UE.

Also, the cell group configuration information or pre-configured cell group configuration information or a message (e.g., an RRC message or RRCReconfiguration) indicating cell group activation or resumption may include second channel measurement configuration information (e.g., configuration information about a CSI-RS or an SSB or a RS) for measuring a signal of a cell (a PSCell or a PCell or an SCell) of a cell group. Alternatively, the cell group configuration information or the pre-configured cell group configuration information or a message (e.g., an RRC message or RRCReconfiguration) indicating cell group deactivation or suspension or release may previously include the second channel measurement configuration information (e.g., configuration information about a CSI-RS or an SSB or an RS) for measuring a signal of the cell (a PSCell or a PCell or an SCell) of the cell group. The second channel measurement configuration information may include general channel measurement configuration information such as a transmission resource or a period or time duration or a count for transmitting a channel measurement signal, or a transmission resource or a period or time duration for channel measurement reporting.

According to an embodiment of the disclosure, a UE may measure a channel by applying first channel measurement configuration information or second channel measurement configuration information according to the following conditions, and may report a result of the measurement to a BS.

1> If the UE receives a message (e.g., PDCCH indicator or MAC control information or RRC message) indicating to activate (or to resume) a cell (PCell or PSCell or SCell) or a cell group 2> if first channel measurement configuration information is configured for the UE 3> the UE may identify that the BS is to frequently transmit many channel measurement signals according to the first channel measurement configuration information. The UE may measure, according to the first channel measurement configuration information, many or frequent channel measurement signals temporarily (e.g., up to time duration (e.g., subframe or slot or symbol) configured for the first channel measurement configuration information or during predefined (or pre-determined) time duration or during a certain period of time (e.g., while a timer is running) or until a first condition is satisfied). Also, according to a period or a transmission resource configured in the first channel measurement configuration information, the UE may report, to the BS, a channel measurement result up to time duration configured in the first channel measurement configuration information (e.g., subframe or slot or symbol), or during predefined (or predetermined) time duration or during a certain period of time (e.g., while a timer is running) or until a first condition is satisfied. Accordingly, because the UE may rapidly measure a frequent channel measurement signal and may rapidly report a result, the UE may rapidly activate (or resume) the cell (PCell or SCell or PSCell) or may rapidly receive an indication of scheduling information. When second channel measurement configuration information is configured for the UE after time duration (e.g., subframe or slot or symbol) configured in the first channel measurement configuration information, or after predefined (or predetermined) time duration or after a certain period of time (e.g., after a timer expires) or after a first condition is satisfied, the UE may suspend or release application of the first channel measurement configuration information and may measure a channel measurement signal according to the second channel measurement configuration information. For example, the UE may fall back from the first channel measurement configuration information to the second channel measurement information, or may apply the second channel information instead of the first channel measurement configuration information. Also, the UE may report the channel measurement result according to a period or a transmission resource configured in the second channel measurement configuration information. If the second channel measurement configuration information is not configured, the UE may not perform channel measurement.

2> Otherwise (when the first channel measurement configuration information is not configured for the UE)

3> when the second channel measurement configuration information is configured for the UE, the UE may measure a channel measurement signal according to the second channel measurement configuration information. Also, the UE may report a channel measurement result according to a period or a transmission resource configured in the second channel measurement configuration information. If the second channel measurement configuration information is not configured, the UE may not perform channel measurement.

The first channel measurement configuration information according to an embodiment of the disclosure may be extended, configured, and used when the cell group (e.g., PSCell) is activated or is resumed or when the SCell is activated or when RRC connection is resumed in an RRC inactive mode.

According to an embodiment of the disclosure, the first condition may be one of the following conditions. According to an embodiment of the disclosure, when a cell is activated or when a cell group is activated or is resumed or when an RRC inactive mode_UE resumes connection in an RRC connection resume procedure, efficient conditions under which the BS does not need to transmit unnecessarily many transmission resources or frequently transmission resources are proposed as a first condition. For example, the UE may apply the first channel measurement configuration information, and may perform a channel measurement procedure or a channel measurement reporting procedure until one of the following conditions is satisfied.

In a case where the UE successfully completes a random access procedure on the cell (e.g., PCell or SCell or PSCell) or the cell (e.g., PSCell or SCell) of the cell group or a case where the UE successfully completes a random access procedure and is allocated a first UL transmission resource or a case where a UL transmission resource is first indicated to the UE, the UE may determine that the first condition is satisfied.

For example, in more detail, if the UE performs a contention-free random access (CFRA) procedure (e.g., if a pre-designated preamble or a UE cell identifier (e.g., cell radio network temporary identifier (C-RNTI)) is allocated)

In a case where the UE transmits the pre-designated preamble to the cell and receives a random access response (RAR) message or a case where the UE receives an indication of the PDCCH in response to the RAR, it may be determined that the random access procedure is successfully completed and thus the UE may determine that the first condition is satisfied. In another method, when the UE first receives a UL transmission resource after reception of the RAR message, the UE may determine that the first condition is satisfied.

If the UE performs a contention-based random access (CBRA) procedure (e.g., if a pre-designated preamble or a UE cell identifier (e.g., C-RNTI) is not allocated)

in a case where the UE transmits a preamble (e.g., arbitrary preamble) to the cell, receives an RAR message, transmits message3 (e.g., a handover completion message) by using an UL transmission resource allocated or included or indicated in the RAR message, and receives, via message4 from a target BS, a contention resolution MAC CE indicating that contention has been resolved or receives a UL transmission resource via the PDCCH corresponding to the C-RNTI of the UE, the UE may determine that the random access procedure to the target BS is successfully completed and thus may determine that the first condition is satisfied. In another method, in a case where the size of the UL transmission resource allocated in the RAR message is sufficient and thus, the message3 can be transmitted and the UE can additionally transmit UL data, the UE may determine that the UL transmission resource is first received and the first condition is satisfied. That is, when the UE receives the RAR message, the UE may determine that the UL transmission resource is first received and may determine that the first condition is satisfied.

1> When a 2-step random access procedure is configured or indicated for the UE and thus, the UE performs the 2-step random access procedure 1> alternatively, when message2 does not configure or indicate the 2-step random access procedure but UE capability supports the 2-step random access procedure, the 2-step random access procedure is supported in system information of the cell, information (e.g., 2-step random access resource or threshold value for determining whether to or not to perform 2-step random access) for the 2-step random access procedure is broadcast in the system information, the UE receives the system information and a strength of a signal is better or greater than the threshold value broadcast in the system information and thus the UE performs the 2-step random access procedure on the cell, 2> when the 2-step random access procedure is successfully completed, the UE may determine that the first condition is satisfied.

2> The 2-step random access procedure may be performed by one of a CBRA method or a CFRA method.

3> If the UE performs the CBRA-based 2-step random access procedure,

4> the UE may transmit a preamble on a transmission resource (e.g., a transmission resource configured by Physical Random Access Channel (PRACH) occasion or via the RRC message by the BS or a transmission resource broadcast in the system information) for 2-step random access, and may transmit data (e.g., MsgA MAC PDU) on a transmission resource (e.g., Physical Uplink Shared Channel (PUSCH) occasion)

for data transmission. The data may include the MAC control information (C-RNTI MAC CE) including the UE identifier (C-RNTI), or the RRC message (RRCReconfigurationComplete message or handover completion message).

4> The UE may monitor the PDCCH scrambled by the UE identifier (C-RNTI) or a first identifier (MsgB-RNTI) derived by a time or a frequency on which a preamble has been transmitted.

4> If the UE receives the PDCCH scrambled by the UE identifier or is allocated a DL transmission resource via the PDCCH or receives the MAC control information for timing adjustment (timing advance command MAC CE) on the DL transmission resource, 5> the UE may determine that the 2-step random access procedure is successfully completed and may determine that the first condition is satisfied.

4> If the UE does not receive the PDCCH scrambled by the first identifier (MsgB-RNTI) or is allocated a DL transmission resource via the PDCCH or receives a fallback RAR with respect to the preamble transmitted by the UE on the DL transmission resource (i.e., if the UE receives the fallback RAR indicating to transmit MsgA on another transmission resource when the BS receives the preamble but does not receive MsgA), 5> the UE may transmit data (MsgA MAC PDU) on a transmission resource indicated in the fallback RAR.

5> The UE may monitor the PDCCH scrambled by the UE identifier (C-RNTI).

5> If the UE receives the PDCCH scrambled by the UE identifier or is allocated a UL transmission resource via the PDCCH, the UE may determine that the 2-step random access procedure is successfully completed and may determine that the first condition is satisfied.

3> If the UE performs the CFRA-based 2-step random access procedure,

4> the UE may transmit a preamble on a transmission resource (e.g., a transmission resource configured by PRACH occasion or via the RRC message by the BS) for 2-step random access, and may transmit data (e.g., MsgA MAC PDU) on a transmission resource (e.g., PUSCH occasion) for data transmission. The data may include the MAC control information (C-RNTI MAC CE) including the UE identifier (C-RNTI) or the RRC message (RRCReconfigurationComplete message or handover completion message).

4> The UE may monitor the PDCCH scrambled by the UE identifier (C-RNTI) or the first identifier (MsgB-RNTI) derived by a time or a frequency on which a preamble has been transmitted.

4> If the UE receives the PDCCH scrambled by the UE identifier or is allocated a DL transmission resource via the PDCCH or receives the MAC control information for timing adjustment (timing advance command MAC CE) on the DL transmission resource, 5> the UE may determine that the 2-step random access procedure is successfully completed and may determine that the first condition is satisfied.

4> If the UE does not receive the PDCCH scrambled by the first identifier (MsgB-RNTI) or is allocated a DL transmission resource via the PDCCH or receives a fallback RAR with respect to the preamble transmitted by the UE on the DL transmission resource (i.e., if the UE receives the fallback RAR indicating to transmit MsgA on another transmission resource when the BS receives the preamble but does not receive MsgA), 5> the US may determine that the 2-step random access procedure is successfully completed and may determine that the first condition is satisfied.

5> The UE may transmit data (MsgA MAC PDU) on a transmission resource indicated in the fallback RAR.

1> The UE may determine that the first condition is satisfied when the random access procedure starts or a preamble for the random access procedure is transmitted.

1> In another method, when a message configures or indicates the 2-step random access procedure for the UE, the UE may determine that the first condition is satisfied. For example, when a message configures or indicates the 2-step random access procedure for the UE, the UE may determine that the first condition is satisfied before the 2-step random access procedure starts.

1> In another method, when a message configures or indicates the 2-step random access procedure for the UE and a transmission resource (PUSCH) configured for data transmission in the 2-step random access procedure is greater than a first threshold value, or when a configuration value for timing adjustment (timing advance value) is included in the RRC message, the UE may determine that the first condition is satisfied. The first threshold value may be configured in the RRC message (e.g., RRCReconfiguration) by the BS, or may be broadcast in the system information. Alternatively, the first threshold value may be configured in a size of data which the UE has to transmit. For example, in the above case, the UE may determine that the first condition is satisfied before the 2-step random access procedure starts. In another method, when the configuration value for timing adjustment (timing advance value) is included in the RRC message or the 2-step random access procedure is configured, the UE may not transmit a preamble and may directly transmit data on a configured transmission resource (e.g., a transmission resource configured by using the RRC message or a transmission resource indicated via the PDCCH of a target BS, the PDCCH being monitored by the UE). Accordingly, in the above case, before the 2-step random access procedure starts or when the data is transmitted or before the data is transmitted, the UE may determine that the first condition is satisfied. In another method, when the configuration value for timing adjustment (timing advance value) is included in an RRC message or the 2-step random access procedure is configured, the UE may not transmit a preamble and may directly transmit data on a configured transmission resource (PUSCH) (e.g., a transmission resource configured by using the RRC message or a transmission resource indicated via the PDCCH of a target BS, the PDCCH being monitored by the UE). In this above case, when the configured transmission resource (PUSCH) (e.g., a transmission resource configured by using the RRC message or a transmission resource indicated via the PDCCH of the target BS, the PDCCH being monitored by the UE) is greater than the first threshold value, or when the configuration value for timing adjustment (timing advance value) is included in the RRC message, before the 2-step random access procedure starts or when the data is transmitted or before the data is transmitted, the UE may determine that the first condition is satisfied.

1> When the RRC inactive mode UE transmits an RRCResumeRequest message and receives an RRCResume message (or RRCSetup message) as a response thereto, the UE may determine that the first condition is satisfied.

1> Alternatively, in a case where a point of time when the UE is indicated to resume or activate the cell group, via an RRC message or MAC control information or DCI information of a PDCCH is n, up to a point of time of n+X or when the point of time of n+X is reached or after the point of time of n+X (in the above case, a time unit of n or X may be a time unit such as a symbol unit or a subframe unit or a millisecond unit or a slot unit or the like, and the X may be configured in the RRC message or may be a value predefined and preset by another method.)

In the above case, when the first condition is satisfied, an upper layer (e.g., RRC layer) may indicate by using an indicator to a lower layer (e.g., PDCP layer or RLC layer or MAC layer or PHY layer), or a lower layer (e.g., PDCP layer or RLC layer or MAC layer or PHY layer) may indicate to an upper layer (e.g., RRC layer).

In the disclosure, the term 'BWP' may be used without being distinguished between a UL and a DL, and may refer to each of a UL BWP and a DL BWP according to the context.

In the disclosure, the term 'link' may be used without being distinguished between a UL and a DL, and may refer to each of the UL and the DL according to the context.

According to an embodiment of the disclosure, the term 'cell' may indicate a PCell or a SCell (e.g., SCell configured in an MCG), a PSCell (e.g., PCell of an SCG), or a SCell (e.g., SCell configured in the SCG). In the disclosure, a dormant BWP may be configured or introduced for the SCell or the PSCell of the UE that performs carrier aggregation or dual connectivity, and the UE is configured not to monitor the PDCCH in the dormant BWP, such that battery consumption of the UE may be reduced. Also, according to an embodiment of the disclosure, the UE is configured to perform channel measurement (e.g., CSI or channel quality information (CQI) measurement or reporting) in the dormant BWP and reports its result or is configured to perform beam measurement or beam tracking or beam operation, such that, when data transmission is required, the UE may switch to or activate a normal BWP and then may rapidly start the data transmission on the normal BWP. The dormant BWP may not be configured or applied to the SpCell (PCell of the MCG or PCell (or PSCell) of the SCG) or the SCell configured with a Physical Uplink Control Channel (PUCCH), in which a signal should be continuously monitored or a feedback should be transmitted or received or synchronization should be identified and maintained.

If the UE is indicated to switch to or activate the dormant BWP for the SCell of the MCG via the PCell, the UE may perform a channel measurement procedure on the dormant BWP of the SCell, and may report a result of the channel measurement on a transmission resource of the PCell of the MCG (e.g., on a PUCCH transmission resource of the PCell) or on a transmission resource (e.g., on a PUCCH transmission resource) of the SCell of the MCG which is configured with the PUCCH. On which transmission resource (e.g., PUCCH or PUSCH) of which cell a channel measurement result of which cell or a BWP of which cell is to be reported may be configured for the UE via the RRC message per each cell or per each BWP.

If the UE is indicated to switch to or activate the dormant BWP for the SCell of the SCG via the PSCell, the UE may perform a channel measurement procedure on the dormant BWP of the SCell, and may report a result of the channel measurement on a transmission resource of the PSCell of the SCG (e.g., on a PUCCH transmission resource of the PSCell) or on a transmission resource (e.g., on a PUCCH transmission resource) of the SCell of the SCG which is configured with the PUCCH. On which transmission resource (e.g., PUCCH or PUSCH) of which cell a channel measurement result of which cell or a BWP of which cell is to be reported may be configured for the UE via the RRC message per each cell or per each BWP.

If the UE is indicated to switch to or activate the dormant BWP for the PSCell or the SCell of the SCG via the PCell or is indicated to suspend a cell group for the SCG (or PSCell) (SCG suspension or cell group suspension), the UE may perform a channel measurement procedure on a BWP of the PSCell or the SCell (BWP configured by the RRC message or last activated BWP) or the dormant BWP, and may report a result of the channel measurement on a transmission resource of the PCell of the MCG (e.g., on a PUCCH transmission resource of the PCell), or on a transmission resource (e.g., on a PUCCH transmission resource) of the SCell of the MCG which is configured with the PUCCH, or on a transmission resource of the PSCell of the SCG (e.g., on a PUCCH transmission resource of the PSCell). On which transmission resource (e.g., PUCCH or PUSCH) of which cell a channel measurement result of which cell or a BWP of which cell is to be reported may be configured for the UE via the RRC message per each cell or per each BWP.

The disclosure provides various embodiments in which a communication system operates based on the DCI of the PDCCH, the MAC CE, or the RRC message, in order to operate the dormant BWP or cell group suspension state for the SCell (SCell of the MCG when carrier aggregation is configured or SCell of the SCG when dual connectivity is configured) or the PSCell (PCell of the SCG when dual connectivity is configured) of the UE.

The network or the BS may configure a Spcell (Pcell and PScell) and a plurality of Scells for the UE. When the UE communicates with one BS, the Spcell may refer to the Pcell, and when the UE communicates with two BSs (a master BS and a secondary BS), the Spcell may indicate the Pcell of the master BS or the PScell of the secondary BS. In the above case, the Pcell or the Pscell may be a primary cell used when the UE and the BS communicate with each other in respective MAC layers, and may indicate a cell on which timing for performing synchronization is matched, a random access is performed, an HARQ ACK/NACK feedback is transmitted on a PUCCH transmission resource, and most control signals are transmitted and received. Technology in which the BS increases transmission resources and increases UL or DL data transmission resources by operating the plurality of Scells along with the Spcell is referred to as carrier aggregation or dual connectivity.

When the UE is configured with the Spcell and the plurality of S cells via the RRC message, the UE may be configured with a state or mode of each cell (PCell or PSCell or SCell), or each Scell or a BWP of each SCell or a cell group via the RRC message or the MAC CE or the DCI of the PDCCH. The state or mode of the cell may be configured as an active (activated) mode or an active (activated) state, and an inactive (deactivated) mode or an inactive (deactivated) state.

When the cell is in the active mode or the active state, it may mean that the UE may transmit and receive UL or DL data to and from the BS on an activated BWP or an activated normal BWP or an activated non-dormant BWP of the cell that is in the active mode or is activated. Also, when the cell is in the active mode or the active state, it may mean that the UE may monitor the PDCCH to detect an indication by the BS, may perform channel measurement on the DL of the cell of the active mode or the active state (or the activated BWP or the activated normal BWP or the activated non-dormant BWP of the cell) and may periodically report measurement information to the BS, and may periodically transmit a pilot signal (sounding reference signal (SRS)) to the BS so that the BS can perform UL channel measurement. Alternatively, the UE may activate or switch the BWP of the activated cell to the dormant BWP in response to the indication by the BS (e.g., the PDCCH or the MAC CE or the RRC message), and when the dormant BWP is activated in the activated cell, the UE may not perform PDCCH monitoring on the cell but may perform channel measurement and perform a procedure for reporting a channel measurement result.

In another method, when the cell in which the dormant BWP is activated is the SCell, the UE may not monitor the PDCCH or may not receive DL data or may perform channel measurement or measurement result reporting or may suspend a configured periodic transmission resource (e.g., type 1 periodic transmission resource (configured uplink grant type 1)) or may clear or initialize a configured periodic transmission resource (e.g., type 2 periodic transmission resource (configured uplink grant type 2)) or may not transmit a sounding reference signal (SRS) or may not transmit UL data or may not transmit the PUCCH (e.g., scheduling request (SR) or preamble for random access). However, if the cell in which the dormant BWP is activated or for which cell group suspension is indicated is the PSCell, the UE may not monitor the PDCCH or may perform PDCCH monitoring with a very long interval or may not receive DL data or may perform channel measurement or measurement result reporting or may suspend the configured periodic transmission resource (e.g., type 1 periodic transmission resource) (configured uplink grant type 1)) or may clear or initialize the configured periodic transmission resource (e.g., type 2 periodic transmission resource (configured uplink grant type 2)) or may transmit an SRS or may not transmit UL data or may transmit the PUCCH (e.g., SR or preamble for random access) or may perform a random access procedure.

If the cell that is activated to the Non-dormant BWP is the SCell, the UE may monitor the PDCCH or may receive DL data or may perform channel measurement or measurement result reporting or may resume the configured periodic transmission resource (e.g., type 1 periodic transmission resource (configured uplink grant type 1)) or may configure or activate the configured periodic transmission resource (e.g., type 2 periodic transmission resource (configured uplink grant type 2)) or may transmit an SRS or may transmit UL data or may transmit the PUCCH (e.g., SR or preamble for random access) or may perform a random access procedure.

If the cell that is activated to the non-dormant BWP or for which cell group resumption (SCG resumption) is indicated is the PSCell, the UE may perform PDCCH monitoring or may receive DL data or may perform channel measurement or measurement result reporting or may resume the configured periodic transmission resource (e.g., type 1 periodic transmission resource (configured uplink grant type 1)) or may configure or activate the configured periodic transmission resource (e.g., type 2 periodic transmission resource (configured uplink grant type 2)) or may transmit an SRS or may transmit UL data or may transmit the PUCCH (e.g., SR or preamble for random access) or may perform a random access procedure.

However, when the cell is in the inactive mode or the inactive state, it may mean that because the UE is in a state in which BWPs configured in the cell are deactivated or the configured BWPs are not activated, or there is no activated BWP from among the configured BWPs, the UE is not able to transmit and receive data to and from the BS, does not monitor the PDCCH to detect an indication by the BS, does not perform channel measurement, does not perform measurement reporting, and does not transmit a pilot signal.

Accordingly, in order to activate the cells in the inactive mode, the BS may first configure frequency measurement configuration information for the UE by using the RRC message, and the UE may perform cell or frequency measurement based on the frequency measurement configuration information. The BS may receive a cell or frequency measurement report of the UE, and then may activate the deactivated cells based on frequency/channel measurement information. Due to that, long latency occurs when the BS activates carrier aggregation or dual connectivity and starts data transmission or reception to or from the UE.

The disclosure provides a dormant BWP or a dormant state for a BWP of each activated cell (e.g., activated Scell or activated PSCell) so as to reduce battery consumption of the UE and rapidly start data transmission or reception. Also, the disclosure proposes the configuration or introduction of a dormant BWP with respect to each activated cell. Alternatively, the disclosure provides the configuration or introduction of a state of a cell group for each cell group as an active state or a dormant state or a suspended state or an inactive state or a resumed state, when dual connectivity is configured for the UE, and the disclosure provides a method of performing a cell group suspension (SCG suspension or Cell group suspension) indication or a cell group resumption (SCG resumption or Cell group resumption) indication indicating switching of the cell group state.

In a BWP or a dormant BWP that is a dormant mode of the activated cell (dormant BWP in activated SCell), when the dormant BWP is activated, the UE is not able to transmit and receive data to and from the BS, or may not monitor the PDCCH to detect an indication by the BS, or may not transmit a pilot signal but may perform channel measurement. Also, the UE is configured to report a measured frequency/cell/channel measurement result according to the BS configuration periodically or when an event occurs. Accordingly, because the UE does not monitor the PDCCH and does not transmit a pilot signal on the dormant BWP of the activated cell, battery consumption may be reduced compared to a normal BWP of the activated cell (or non-dormant BWP) or compared to when the normal BWP of the activated cell (or non-dormant BWP) is activated. Also, unlike a case where the cell is deactivated, because the UE performs channel measurement reporting, the BS may rapidly activate the normal BWP of the activated cell based on a measurement report or a measurement report of the dormant BWP of the activated cell, such that rapid use of carrier aggregation is possible and thus transmission latency may be decreased.

When the cell is in the active mode or the active state, it may mean that the UE may transmit and receive UL or DL data to and from the BS on an activated BWP or an activated normal BWP or an activated non-dormant BWP of the cell that is in the active mode or is activated. Also, when the cell is in the active mode or the active state, it may mean that the UE may monitor the PDCCH to detect an indication by the BS, may perform channel measurement on the DL of the cell of the active mode or the active state (or the activated BWP or the activated normal BWP or the activated non-dormant BWP of the cell) and may periodically report measurement information to the BS, and may periodically transmit a pilot signal (SRS) to the BS so that the BS can perform UL channel measurement. Also, in the disclosure, when the cell is in the active mode or the active state, it may mean that the UE is not able to transmit and receive UL or DL data to and from the BS on the activated dormant BWP of the cell of the active mode or the active state or may not monitor the PDCCH to detect an indication by the BS but may perform channel measurement on the DL of the activated dormant BWP of the cell of the active mode or the active state and may periodically report measurement information to the BS.

If the cell in which the dormant BWP is activated or cell group suspension is indicated is the PSCell, the UE may not monitor the PDCCH or may perform PDCCH monitoring with a very long interval or may not receive DL data or may perform channel measurement or measurement result reporting or may suspend the configured periodic transmission resource (e.g., type 1 periodic transmission resource (configured uplink grant type 1)) or may clear or initialize the configured periodic transmission resource (e.g., type 2 periodic transmission resource (configured uplink grant type 2)) or may transmit an SRS or may not transmit UL data or may transmit the PUCCH (e.g., SR or preamble for random access) or may perform a random access procedure.

Also, in the disclosure, a dormant BWP may indicate a state of a BWP or may be used as a name of a logical concept indicating a specific BWP. Accordingly, the dormant BWP may be activated or may be deactivated or may be switched. For example, an indication to switch a second BWP activated in a first cell to a dormant BWP or an indication to transition the first cell to hibernation or a dormant mode or an indication to activate a dormant BWP of the first cell may be interpreted as the same meaning.

Also, in the disclosure, a normal BWP may indicate non-dormant BWPs from among BWPs configured for each cell of the UE via an RRC message, and in the normal BWP, the UE may transmit and receive UL or DL data to and from the BS, may monitor the PDCCH to detect an indication by the BS, may perform channel measurement on the DL and may periodically report measurement information to the BS, and may periodically transmit a pilot signal (SRS) to the BS so that the BS can perform UL channel measurement. Also, the normal BWP may indicate a first active BWP or a default BWP or a first active BWP or an initial BWP activated from hibernation.

Also, from among BWPs configured for each cell of the UE, only one dormant BWP may be configured for the DL. In another method, from among BWPs configured for each cell of the UE, one dormant BWP may be configured for the UL or the DL.

Also, in the disclosure, a state of a cell group may be configured as an active state or a suspended state or an inactive state. The state of the cell group may be indicated by a bitmap or an indicator of DCI of a PDCCH or may be indicated by MAC control information or may be indicated by an indicator of an RRC message. When the state of the cell group is indicated as the active state, the UE may store or apply or recover or resume configuration information of the cell group configured or indicated in the RRC message (e.g., RRCReconfiguration message or RRCSetup message or RRCResume message). Also, the UE may monitor the PDCCH according to the configuration by the RRC message on the configured SCell or the PCell or the PSCell of the cell group or may receive DL data or may perform channel measurement or measurement result reporting or may resume the configured periodic transmission resource (e.g., type 1 periodic transmission resource (configured uplink grant type 1)) or may configure or activate a configured periodic transmission resource (e.g., type 2 periodic transmission resource (configured uplink grant type 2)) or may transmit an SRS or may transmit UL data or may transmit the PUCCH (e.g., SR or preamble for random access) or may perform a random access procedure.

Also, when the state of the cell group is indicated as the suspended state or the inactive state, the UE may store configuration information of the cell group configured or indicated in the RRC message (e.g., RRCReconfiguration message, or RRCSetup message, or RRCResume message), and may not discard the configuration information but may stop applying the configuration information. The UE may not monitor the PDCCH according to the configuration by the RRC message on the configured SCell or the PCell or the PSCell of the cell group or may perform PDCCH monitoring with a very long interval or may not receive DL data or may perform channel measurement or measurement result reporting or may suspend the configured periodic transmission resource (e.g., type 1 periodic transmission resource (configured uplink grant type 1)) or may clear or initialize the configured periodic transmission resource (e.g., type 2 periodic transmission resource (configured uplink grant type 2)) or may transmit an SRS or may not transmit UL data or may transmit the PUCCH (e.g., SR or preamble for random access) or may perform a random access procedure.

Also, when the state of the cell group is indicated as the inactive state or when release of the cell group configuration information is indicated, the UE may release or discard the configuration information of the cell group configured or indicated in the RRC message (e.g., RRCReconfiguration message or RRCSetup message or RRCResume message).

FIG. 1E is a diagram illustrating a procedure for providing a service to a UE by efficiently using a very wide frequency bandwidth in a mobile communication system according to an embodiment of the disclosure.

Referring to FIG. 1E, how a next-generation mobile communication system can efficiently use a very wide frequency bandwidth to provide services to UEs having different capabilities (or categories) and reduce battery consumption will now be described.

One cell via which a BS provides a service may service a very wide frequency band as in 1e-05. However, in order to provide services to UEs having different capabilities, the BS may divide the wide frequency band into a plurality of BWPs and may manage the same as one cell.

First, a UE that is initially turned on may search a whole frequency band provided by a service provider (public land mobile network (PLMN)) in units of certain resource blocks (e.g., 12 resource blocks (RBs)). That is, the UE may start to monitor a primary synchronization sequence (PSS)/secondary synchronization sequence (SSS) in a whole system bandwidth in units of resource blocks (1e-10). When the UE detects signals of the PSS/SSS while monitoring the PSS/SSS in units of resource blocks (1e-01 or 1e-02), the UE may read and interpret (decode) the signals of the PSS/SSS to identify a boundary between a subframe and a radio transmission resource frame (radio frame). Accordingly, the UE may identify the subframe in units of 1 ms, and may synchronize a DL signal with the BS. In the case above, a resource block (RB) may be defined as a two-dimensional unit with a size of a certain frequency resource and a certain time resource. For example, the RB may be defined as the time resource in a unit of 1 ms and as the frequency resource in 12 subcarriers (1 carrier×15 kHz=180 kHz). When synchronization is completed, the UE may identify control resource set (CORESET) information and initial access BWP information by identifying a master system information (MIB) or minimum system information (MSI) (1e-15 and 1e-20). The CORESET information refers to a position of a time/frequency transmission resource on which a control signal is transmitted from the BS, and indicates, for example, a position of a resource on which a PDCCH channel is transmitted. That is, the CORESET information is information indicating where first system information (system information block 1 (SIB1)) is transmitted, and may indicate via which frequency/time resource the PDCCH is transmitted. In the above case, when the UE receives the first system information, the UE may identify information about an initial BWP. When the UE completes synchronization of a DL signal with the BS and is able to receive a control signal, the UE may perform a random access procedure on an initial BWP of a cell on which the UE camps, may request an RRC connection configuration, may receive an RRC message, and may perform an RRC connection configuration.

In the RRC connection configuration, a plurality of BWPs may be configured for one cell (Pcell or Pscell or Spcell or S cell). In one cell, a plurality of BWPs may be configured for a DL, and separately from this configuration, a plurality of BWPs may be configured for a UL.

The plurality of BWPs may be indicated and configured by a BWP identifier to be used as an initial BWP or a default BWP or a first active BWP or a dormant BWP or a first active BWP activated from dormancy.

The initial BWP may be used as a cell-specific BWP existing for each cell, and may be used as a BWP on which the UE first accessing the cell can configure a connection to the cell via a random access procedure or the UE connected to the cell can perform synchronization. Also, the BS may configure, for each cell, an initial DL BWP to be used in the DL and an initial UL BWP to be used in the UL. Also, configuration information about the initial BWP may be broadcast in the first system information (system information 1 (SIB1)) indicated by the CORESET, and the BS may re-configure, via an RRC message, the initial BWP for the UE connected to the cell. Also, the initial BWP may be used by being designated as 0 of a BWP identifier in each of the UL and the DL. That is, all UEs accessing the same cell may use the equal initial BWP by designating the same as the equal BWP identifier #0. This is because, when a random access procedure is performed, the BS may transmit an RAR message on the initial BWP that may be read by all the UEs, and thus a CBRA procedure may be facilitated.

In the above case, the first active BWP may be differently configured for each UE (UE specific), and may be indicated by being designated by a BWP identifier from among a plurality of BWPs. The first active BWP may be configured for each of the DL and the UL, and a first active DL BWP and a first active UL BWP may be respectively configured as BWP identifiers. The first active BWP may be used to indicate which BWP is to be first activated and used when a plurality of BWPs are configured for one cell. For example, when a Pcell or a Pscell and a plurality of Scells are configured for the UE and a plurality of BWPs are configured for the Pcell or the Pscell or an Scell, if the Pcell or the Pscell or the Scell is activated, the UE may activate and use the first active BWP from among the plurality of BWPs configured for the Pcell or the Pscell or the S cell. That is, for the DL, the first active DL BWP may be activated and used, and for the UL, the first active UL BWP may be activated and used.

In the above case, an operation in which the UE activates the first active DL BWP (or BWP configured or indicated via the RRC message) by switching the current or activated DL BWP or in which the UE activates the first active UL BWP (or BWP configured or indicated via the RRC message) by switching the current or activated UL BWP may be performed when the UE receives an indication to activate the cell or the BWP in the inactive state via the RRC message or the MAC control information or the DCI.

Also, the operation may be performed when the UE receives an indication to transition the cell or the BWP to the dormant state or an indication to activate the dormant BWP via the RRC message or the MAC control information or the DCI. This is because, when the cell or the BWP is activated, the first active DL BWP (or BWP configured or indicated via the RRC message) is to be activated by switching the current or activated DL BWP or the first active UL BWP (or BWP configured or indicated via the RRC message) is to be activated by switching the UL BWP, and thus even when channel measuring reporting is performed in the dormant state, the BS can effectively use carrier aggregation only when a frequency/channel should be measured and reported for the first active DL/UL BWP.

In the above case, the default BWP may be differently configured for each UE (UE specific), and may be indicated by being designated by a BWP identifier from among a plurality of BWPs. The default BWP may be configured only for the DL. The default BWP may be used as a BWP to which an activated BWP from among a plurality of DL BWPs is to fall back after a certain time. For example, a BWP inactivity timer may be configured for each cell or each BWP via an RRC message, and the BWP inactivity timer may start or re-start when data transmission/reception occurs on the activated BWP other than the default BWP, or may start or re-start when the activated BWP is switched to another BWP. When the BWP inactivity timer expires, the UE may fall back or switch the activated DL BWP to the default bandwidth in the cell.

In the above case, switching may refer to a procedure for deactivating a currently activated BWP and activating a BWP for which the switching is indicated, and the switching may be triggered by an RRC message or MAC control information (MAC CE) or L1 signaling (DCI of the PDCCH). In the above case, the switching may be triggered by an indication of the BWP to be switched or activated, and the BWP may be indicated by a BWP identifier (e.g., 0 or 1 or 2 or 3 or 4).

The reason why the default BWP is applied and used only for the DL is that the UE is indicated (e.g., DCI of the PDCCH) by the BS to fall back to the default BWP after a certain time for each cell, and thus BS scheduling is facilitated. For example, when the BS configures the default BWP of UEs accessing one cell as the initial BWP, the BS may continuously perform scheduling indication only on the initial BWP after a certain time. When the default BWP is not configured in the RRC message, the UE may consider the initial BWP as the default BWP and may fall back to the initial BWP when the BWP inactivity timer expires.

In another method, in order to increase an implementation degree of freedom of the BS, a default BWP may also be defined and configured for the UL and may be used like the default BWP of the DL.

In the above case, the dormant BWP may refer to a BWP that is in a dormant mode of an activated cell or a dormant BWP (dormant BWP in activated SCell) When the dormant BWP is activated, the UE is not able to transmit and receive data to and from the BS or may not monitor the PDCCH to detect an indication by the BS or may not transmit a pilot signal but may perform channel measurement. Also, the UE is configured to report a measured frequency/cell/channel measurement result according to the BS configuration periodically or when an event occurs.

Accordingly, because the UE does not monitor the PDCCH and does not transmit a pilot signal on the dormant BWP of the activated cell, battery consumption may be reduced compared to a normal BWP of the activated cell (or non-dormant BWP) or compared to when the normal BWP of the activated cell (or non-dormant BWP) is activated. Also, unlike a case where the cell is deactivated, because the UE performs channel measurement reporting, the BS may rapidly activate the normal BWP of the activated cell based on a measurement report or a measurement report of the dormant BWP of the activated cell, such that rapid use of carrier aggregation is possible and thus transmission latency may be decreased.

When the UE operates a BWP of one activated cell as a dormant BWP or when an activated BWP in an activated cell is a dormant BWP or when it is switched to a dormant BWP in a cell or when the BS indicates the UE to switch the BWP of the activated cell from the dormant BWP to the normal BWP (or non-dormant BWP) via the DCI of the PDCCH or the MAC CE or the RRC message or when the BS indicates to switch or transition the active BWP from the dormant BWP to the normal BWP or when the BS indicates to switch or transition or activate the active BWP from the dormant BWP to the normal BWP (e.g., first active BWP activated from dormancy), the first active BWP switched and activated from the dormant state or from the dormant BWP (or first active non-dormant BWP or BWP configured or indicated via the RRC message) may be a BWP to be activated by switching the current or activated BWP of the activated cell by the UE according to the indication or a BWP to be activated from the dormant state configured in the RRC message.

Figure 1F:
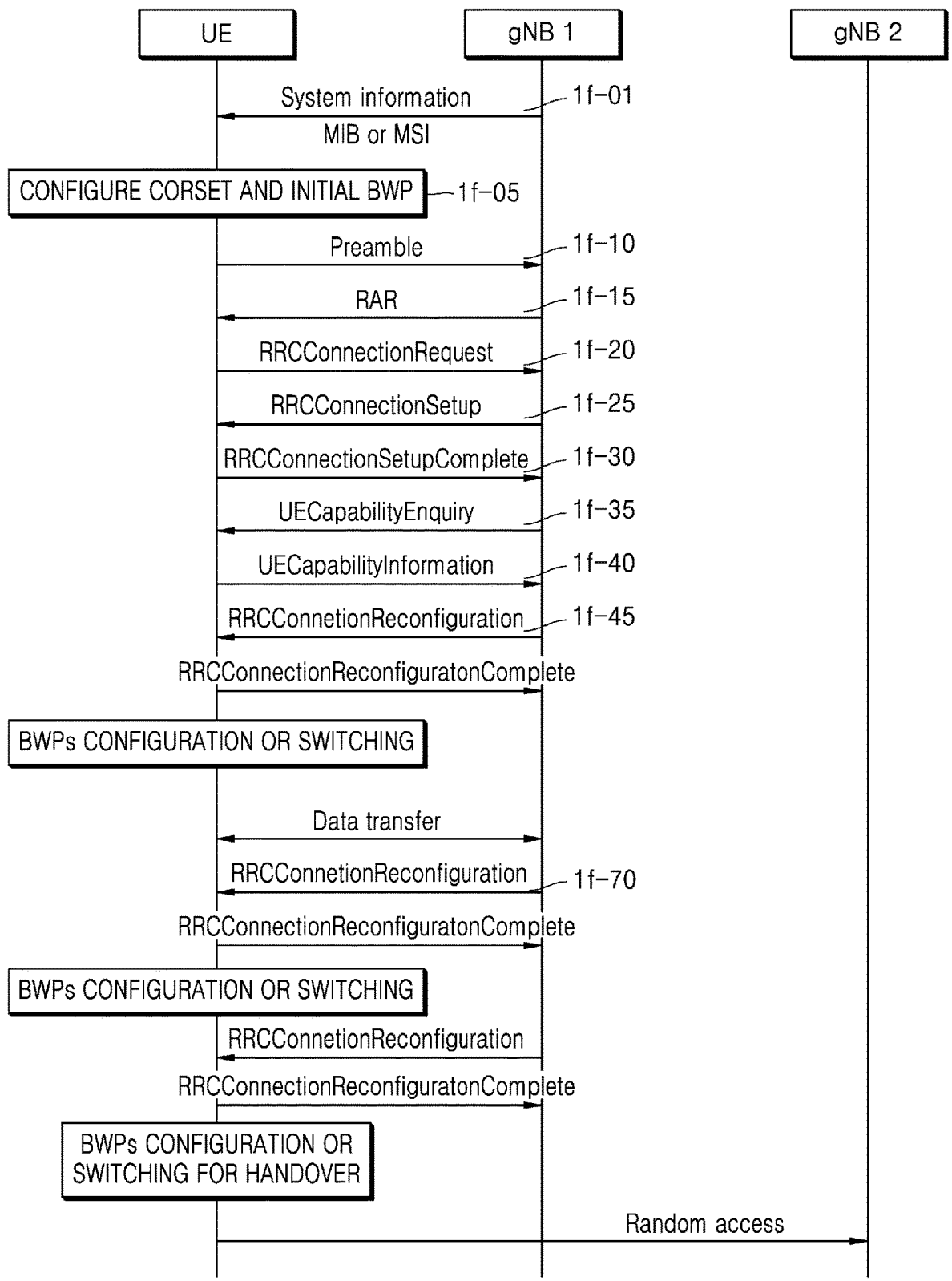
FIG. 1F illustrates a procedure by which a UE transitions from a Radio Resource Control (RRC) idle mode to an RRC connected mode in a mobile communication system of the disclosure, in which a method of configuring a plurality of bandwidth parts (BWPs) and configuring a default BWP or a first active BWP or a dormant BWP will now be proposed, according to an embodiment of the disclosure.

FIG. 1F illustrates a procedure by which a UE transitions from an RRC idle mode to an RRC connected mode in a mobile communication system, and illustrates a method of configuring a plurality of BWPs and configuring a default BWP or a first active BWP or a dormant BWP according to an embodiment of the disclosure.

One cell via which a BS provides a service may service a very wide frequency band. First, the UE may search a whole frequency band provided by a service provider (PLMN) in units of certain resource blocks (e.g., 12 resource blocks (RBs)). That is, the UE may start to monitor a PSS/SSS in a whole system bandwidth in units of resource blocks. When the UE detects signals of the PSS/SSS while monitoring the PSS/SSS in units of resource blocks, the UE may read and interpret (decode) the signals of the PSS/SSS to identify a boundary between a subframe and a radio transmission resource frame (radio frame). When synchronization is completed, the UE may read system information of a cell on which the UE currently camps. That is, the UE may identify CORESET information by identifying a MIB or MSI and may identify initial BWP information by reading the system information (1f-01 and 1f-05). The CORESET information refers to a position of a time/frequency transmission resource on which a control signal is transmitted from the BS, and indicates, for example, a position of a resource on which a PDCCH channel is transmitted.

When the UE completes synchronization of a DL signal with the BS and is able to receive a control signal, the UE may perform a random access procedure on an initial BWP, may receive an RAR, may request an RRC connection configuration, may receive an RRC message, and thus, may perform an RRC connection configuration (1f-10, 1f-15, 1f-20, 1f-25, and 1f-30).

When a basic RRC connection configuration is completed, the BS may transmit an RRC message asking a capability of the UE so as to identify a UE capability (UECapabilityEnquiry) (1f-35). In another method, the BS may ask an MME or an access and mobility management function (AMF) about a capability of the UE so as to identify a UE capability. This is because, if the UE previously accessed the BS, the MME or the AMF may have stored capability information of the UE. If the BS does not store desired UE capability information, the BS may request the UE for a UE capability. In the above case, when the UE reports a UE capability, the UE may report, to the BS, as a UE capability, whether the UE supports a dormant BWP for a SCell of each cell group (MCG or SCG) or whether the UE supports Embodiment 1, Embodiment 2, Embodiment 3, or Embodiment 4 of the disclosure or whether the UE supports a dormant BWP for a PSCell of each cell group or whether the UE supports a cell group suspension or resume procedure for a PSCell of each cell group or the number of supported cell groups. Also, the UE may report, to the BS, as a UE capability via an RRCResume message in an RRC connection resume procedure, whether the UE is able to store and recover configuration information of the SCell of the MCG or the SCell of the SCG or the PSCell of the SCG or whether the UE is able to discard the configuration information or whether the UE is able to re-configure part of the configuration information or whether the UE is able to activate the configuration information.

The reason why the BS transmits an RRC message to the UE so as to identify a capability of the UE is to identify a capability of the UE, for example, a range of a frequency band the UE is able to monitor or a region of the frequency band that may be monitored by the UE. After the BS identifies the capability of the UE, the BS may configure an appropriate BWP for the UE. When the UE receives the RRC message asking the capability of the UE, the UE may indicate, as a response thereto, a range of a bandwidth supported by the UE or to which extent the bandwidth is supported in the current system bandwidth by an offset from a reference center frequency, or to directly indicate a start point and an end point of the supported frequency bandwidth, or to indicate the same by the center frequency and the bandwidth (1f-40).

In the above case, the BWP may be configured via an RRCSetup message or an RRCResume message of the RRC connection configuration (1f-25) or an RRCReconfiguration message (1f-45 and 1f-70), and the RRC message may include configuration information of a PCell or a Pscell or a plurality of cells, and a plurality of BWPs may be configured for each cell (PCell or Pscell or S cell). When the plurality of BWPs are configured for each cell, a plurality of BWPs to be used in the DL of each cell may be configured, and in a case of a frequency division duplex (FDD) system, a plurality of BWPs to be used in the UL of each cell may be configured separately from DL BWPs. In a case of a time division duplex (TDD) system, a plurality of BWPs to be commonly used in the DL and the UL of each cell may be configured.

Information for configuring a BWP of each cell (PCell or Pscell or Scell) may include some of a plurality of pieces of information below.
    DL BWP configuration information of the cell
    Initial DL BWP configuration information
    Configuration information of a plurality of BWPs and BWP identifiers (IDs) respectively corresponding to the BWPs Initial state configuration information (e.g., active state or dormant state or inactive state) of the cell or DL BWP BWP identifier indicating first active DL BWP BWP identifier indicating default BWP Configuration information for PDCCH monitoring for each BWP. For example, CORESET information or search space resource information or PDCCH transmission resource, period, subframe number information, or the like BWP identifier indicating dormant BWP BWP identifier indicating first active BWP activated from dormancy BWP inactivity timer configuration and timer value UL BWP configuration information of the cell Initial UL BWP configuration information Configuration information of a plurality of BWPs and BWP identifiers (IDs) respectively corresponding to the BWPs Initial state configuration information (e.g., active state or dormant state or inactive state) of the cell or DL BWP BWP identifier indicating first active UL BWP Configuration information about the transmission resource to perform channel measurement on a dormant BWP or a non-dormant BWP and report the measurement result (e.g., PUCCH transmission resource information of PCell or PUCCH SCell or PSCell)

In the above case, the configured initial BWP or default BWP or first active BWP may be used for the following purposes, and may operate as below according to the purposes.

The initial BWP may be used as a cell-specific BWP existing for each cell, and may be used as a BWP on which the UE first accessing the cell can configure a connection to the cell via a random access procedure or the UE connected to the cell can perform synchronization. Also, the BS may configure, for each cell, an initial DL BWP to be used in the DL and an initial UL BWP to be used in the UL. Also, configuration information about the initial BWP may be broadcast in the first system information (system information 1 (SIB1)) indicated by the CORESET, and the BS may re-configure, via an RRC message, the initial BWP for the UE connected to the cell. Also, the initial BWP may be used by being designated as 0 of a BWP identifier in each of the UL and the DL. That is, all UEs accessing the same cell may use the equal initial BWP by designating the same as the equal BWP identifier #0. This is because, when a random access procedure is performed, the BS may transmit an RAR message on the initial BWP that may be read by all the UEs, and thus a CBRA procedure may be facilitated.

In the above case, the first active BWP may be differently configured for each UE (UE specific), and may be indicated by being designated by a BWP identifier from among a plurality of BWPs. The first active BWP may be configured for each of the DL and the UL, and a first active DL BWP and a first active UL BWP may be respectively configured as BWP identifiers. The first active BWP may be used to indicate which BWP is to be first activated and used when a plurality of BWPs are configured for one cell. For example, when a Pcell or a Pscell and a plurality of Scells are configured for the UE and a plurality of BWPs are configured for the Pcell or the Pscell or an Scell, if the Pcell or the Pscell or the Scell is activated, the UE may activate and use the first active BWP from among the plurality of BWPs configured for the Pcell or the Pscell or the S cell. That is, for the DL, the first active DL BWP may be activated and used, and for the UL, the first active UL BWP may be activated and used.

An operation in which the UE activates the first active DL BWP (or BWP configured or indicated via the RRC message) by switching the current or activated DL BWP or in which the UE activates the first active UL BWP (or BWP configured or indicated via the RRC message) by switching the current or activated UL BWP may be performed when the UE receives an indication to activate a certain cell or an inactive or dormant-state BWP of a certain activated cell or to switch or activate the cell or the inactive or dormant BWP to a normal BWP via an RRC message or MAC control information or DCI of a PDCCH. Also, when the UE receives an indication to transition an activated cell or an activated BWP to a dormant state or an indication to switch or activate the activated BWP to a dormant BWP via the RRC message or the MAC control information or the DCI of the PDCCH, the UE may switch or activate the activated BWP to the dormant BWP or may hibernate the activated BWP.

In the above case, switching to the dormancy or the dormant BWP or activation to the dormant BWP may refer to performing, in the dormant state, an operation proposed in the disclosure. That is, without performing PDCCH monitoring, the UE may perform an operation of measuring a channel on a DL BWP (or dormant BWP) and reporting a result to the BS. In another method, when the activated cell or BWP is activated or switched to the normal BWP, because the first active DL BWP is to be activated by switching the DL BWP and the first active UL BWP is to be activated by switching the UL BWP, the dormant BWP may be configured as the first active DL or the UL BWP or the default BWP. In the above case, the default BWP may be differently configured for each UE (UE specific), and may be indicated by being designated by a BWP identifier from among a plurality of BWPs. The default BWP may be configured only for the DL. The default BWP may be used as a BWP to which an activated BWP from among a plurality of DL BWPs is to fall back after a certain time. For example, a BWP inactivity timer may be configured for each cell or each BWP via an RRC message, and the BWP inactivity timer may start or re-start when data transmission/reception occurs on the activated BWP other than the default BWP, or may start or re-start when the activated BWP is switched to another BWP. When the BWP inactivity timer expires, the UE may fall back or switch the activated DL BWP to the default bandwidth in the cell. In the above case, switching may refer to a procedure for deactivating a currently activated BWP and activating a BWP for which the switching is indicated, and the switching may be triggered by an RRC message or MAC control information (MAC CE) or L1 signaling (DCI of the PDCCH). In the above case, the switching may be triggered by an indication of the BWP to be switched or activated, and the BWP may be indicated by a BWP identifier (e.g., 0 or 1 or 2 or 3 or 4).

The reason why the default BWP is applied and used only for the DL is that the UE is indicated (e.g., DCI of the PDCCH) by the BS to fall back to the default BWP after a certain time for each cell, and thus BS scheduling is facilitated. For example, when the BS configures the default BWP of UEs accessing one cell as the initial BWP, the BS may continuously perform scheduling indication only on the initial BWP after a certain time. When the default BWP is not configured in the RRC message, the UE may consider the initial BWP as the default BWP and may fall back to the initial BWP when the BWP inactivity timer expires.

In another method, in order to increase an implementation degree of freedom of the BS, a default BWP may also be defined and configured for the UL and may be used like the default BWP of the DL.

In the above case, the dormant BWP may refer to a BWP that is in a dormant mode of an activated cell or a dormant BWP (dormant BWP in activated SCell) When the dormant BWP is activated, the UE is not able to transmit and receive data to and from the BS or may not monitor the PDCCH to detect an indication by the BS or may not transmit a pilot signal but may perform channel measurement. Also, the UE is configured to report a measured frequency/cell/channel measurement result according to the BS configuration periodically or when an event occurs. Accordingly, because the UE does not monitor the PDCCH and does not transmit a pilot signal on the dormant BWP of the activated cell, battery consumption may be reduced compared to a normal BWP of the activated cell (or non-dormant BWP) or compared to when the normal BWP of the activated cell (or non-dormant BWP) is activated, and also, unlike a case where the cell is deactivated, because the UE performs channel measurement reporting, the BS may rapidly activate the normal BWP of the activated cell based on a measurement report or a measurement report of the dormant BWP of the activated cell, such that rapid use of carrier aggregation is possible and thus transmission latency may be decreased.

When a BWP of one activated cell of the UE is operated as a dormant BWP or when an activated BWP in an activated cell is a dormant BWP or when it is switched to a dormant BWP in a cell or when the BS indicates to switch the BWP of the activated cell from the dormant BWP to the normal BWP (or non-dormant BWP) via the DCI of the PDCCH or the MAC CE or the RRC message or when the BS indicates to switch or transition the active BWP from the dormant BWP to the normal BWP or when the BS indicates to switch, transition, or activate the active BWP from the dormant BWP to the normal BWP (e.g., first active BWP activated from dormancy), the first active BWP activated from dormancy (or first active non-dormant BWP) may be a BWP to be switched from the BWP of the activated cell by the UE according to the indication or a first active BWP activated from dormancy configured in the RRC message.

In the disclosure, when a first BWP is switched to a second BWP, it may be interpreted that the second BWP is activated, or the activated first BWP is deactivated and the second BWP is activated.

Also, in the above case, in the RRCSetup message or the RRCResume message of the RRC connection configuration (1f-25) or the RRCReconfiguration message (1f-45), a state transition timer may be configured so that the UE itself may perform state transition even without receiving an indication from the BS via the RRC message or the MAC control information or the DCI of the PDCCH. For example, the UE may configure a cell deactivation timer (ScellDeactivationTimer) for each cell, and when the cell deactivation timer expires, the UE may transition a state of the cell to the inactive state. Alternatively, the UE may configure a DL (or UL) BWP hibernation timer (DLBWPHibernationTimer or ULBWPHibernationTimer) for each cell or each BWP of each cell or may configure a cell hibernation timer (ScellHibernationTimer) for each cell, and when the cell hibernation timer or the DL (or UL) BWP hibernation timer expires, the UE may transition or switch the cell or the DL (or UL) BWP to the dormant state or the dormant BWP. For example, when the cell hibernation timer or the DL (or UL) BWP hibernation timer expires, the UE may transition or switch the activated cell or DL (UL) BWP to the dormant state or the dormant BWP, and may allow the deactivated or hibernated cell or DL (or UL) BWP not to be transitioned to the dormant state or the dormant BWP.

Also, the UE may start the BWP hibernation timer when receiving an indication to switch or activate the BWP via the RRC message or the MAC CE or the DCI of the PDCCH, or may stop when receiving an indication to switch to the dormant BWP or an indication to hibernate or an indication to activate the dormant BWP via the RRC message or the MAC CE or the DCI of the PDCCH. Also, the UE may configure, for each cell or DL (or UL) BWP, a dormant cell deactivation timer (dormantScellDeactivationTimer) or a dormant state or DL (or UL) dormant BWP deactivation timer (dormantDLDeactivationTimer or dormantULDeactivationTimer), and thus, may transition the dormant cell or DL (or UL) dormant BWP to the inactive state. When the dormant cell deactivation timer or the dormant state or DL (or UL) dormant BWP deactivation timer expires, the UE may transition only the dormant cell or DL (or UL) dormant BWP to the inactive state, and may not transition the active or inactive cell or DL (or UL) BWP to the inactive state. Also, the UE may start the dormant BWP hibernation timer when receiving an indication to switch the dormant BWP or an indication to hibernate or an indication to activate the dormant BWP via the RRC message or the MAC CE or the DCI of the PDCCH, or may stop when receiving an indication to deactivate or activate the BWP or the cell or an indication to activate the normal BWP (e.g., non-dormant BWP configured by the RRC) via the RRC message or the MAC CE or the DCI of the PDCCH.

When the cell deactivation timer (ScellDeactivationTimer) (or DL (or UL) BWP hibernation timer) and the cell hibernation timer (ScellHibernationTimer) (or DL (or UL) dormant BWP deactivation timer) are configured together, the cell hibernation timer (ScellHibernationTimer) (or DL (or UL) dormant BWP hibernation timer) may be prioritized. That is, when the cell hibernation timer (ScellHibernationTimer) (or DL (or UL) BWP hibernation timer) is configured, even when the cell deactivation timer (ScellDeactivationTimer) (or DL (or UL) dormant BWP deactivation timer) expires, the cell or DL (or UL) BWP may not be deactivated. In other words, when the cell hibernation timer (or DL (or UL) BWP hibernation timer) is configured, the cell or DL (or UL) BWP may be first transitioned from the active state to the dormant state or switched to the dormant BWP, in response to the expiration of the timer, and the dormant cell or the cell or BWP transitioned to the dormant state in response to the expiration of the BWP deactivation timer may be stepwise transitioned back to the inactive state. Accordingly, when the cell hibernation timer or the BWP hibernation timer is configured, the cell deactivation timer or the dormant BWP deactivation timer may not affect the cell or DL (or UL) BWP state transition, and even when the cell deactivation timer or the dormant BWP deactivation timer expires, when the cell hibernation timer or the BWP hibernation timer is configured, the cell or DL (or UL) BWP may not be directly transitioned to the inactive state.

When the cell deactivation timer (or DL (or UL) BWP hibernation timer) is not configured in the RRC message, the UE may regard that the cell deactivation timer (or DL (or UL) BWP hibernation timer) is set to an infinite value.

In the RRCSetup message or the RRCResume message of the RRC connection configuration (1f-25) or the RRCReconfiguration message (1f-45), frequency measurement configuration information and frequency measurement gap configuration information may be configured, and frequency measurement object information may be included. In the RRCSetup message or the RRCResume message of the RRC connection configuration (1*f*-25) or the RRCReconfiguration message (1*f*-45), a function for reducing power consumption of the UE (power saving mode) may be configured, and also, along with the function for reducing power consumption, configuration information such as discontinuous reception (DRX) cycle or offset or on-duration period (duration in which the UE should monitor the PDCCH) or time information or short time period information or time information indicating when to monitor or detect the PDCCH from the BS before the on-duration period in the DRX cycle may be configured. When the function for reducing power consumption of the UE is configured, the UE may configure a DRX cycle, and may detect a wake-up signal (WUS) in duration configured for the UE to monitor the PDCCH of the BS before the on-duration period, and the BS may indicate the UE whether to skip (or not to perform) or to perform PDCCH monitoring in an immediately next on-duration period via the DCI of the PDCCH of the WUS. The UE should always monitor the PDCCH in the on-duration period, and, however, when the BS indicates the UE not to perform PDCCH monitoring in the on-duration period by using the WUS, battery consumption of the UE may be reduced.

When the RRC connection configuration is completed, the UE may configure a plurality of BWPs according to an indication configured by the RRC message. In order to reduce battery consumption, one or a small number of BWPs from among the configured plurality of BWPs may be activated. For example, the BS may indicate one BWP to be activated. The BS may indicate activation of the BWP by using an RRC message or MAC control information (MAC CE) or L1 signaling (a PHY layer control signal such as DCI of the PDCCH) so as to indicate switching from an initial access BWP to a new BWP. In another method, the BS may define new bitmap information in the DCI of the PDCCH, and may indicate whether to activate the normal BWP (or non-dormant BWP) or activate the dormant BWP or deactivate the BWP. In another method, the BS may indicate, by the bitmap, whether to activate the normal BWP (e.g., first active BWP to be activated from dormancy) or activate the dormant BWP or switch to the dormant BWP or perform BWP switching. Because there may be many newly connected users on the initial access BWP, it may be more advantageous to allocate a new BWP and separately manage the connected users in terms of scheduling. This is because the initial access BWP may not be configured for each UE but may be commonly shared and used by all the UEs. In order to reduce signaling overhead, the default BWP may be dynamically indicated by the MAC control information or the L1 signaling or the system information.

In the RRC message (the RRCSetup message or the RRCResume (1*f*-25) or the RRCReconfiguration message (1*f*-70)), configuration information for a cell group may be included. The configuration information for the cell group may include some of a plurality of pieces information below, and may indicate a state or procedure or configuration information application or release for each cell group.

- Cell group identifier indicating a cell group (e.g., cell group identifier or index)
- Indicator indicating a state of a cell group (e.g., active state or suspended state or inactive state)
- Indicator indicating a state of a cell group (e.g., indicator to suspend (or deactivate) the cell group (e.g., cellgroup (SCG) suspension indicator) or indicator to resume (or activate) the cell group (e.g., cellgroup (SCG) resumption indicator))
- Indicator (e.g., PDCP reestablishment indicator or PDCP data recovery indicator or indicator to trigger new procedure or RLC reestablishment indicator or MAC layer reset indicator or MAC layer partial reset indicator) triggering a procedure for a corresponding protocol layer (e.g., SDAP layer or PDCP layer or RLC layer or MAC layer) according to an indicator indicating a state of a cell group
- When an indicator to suspend (or deactivate) a state of a cell group is included, second DRX configuration information (e.g., monitoring interval or active period (on-duration) length or period or offset) may be configured to perform PDCCH monitoring with a very long interval on the PSCell of the cell group. For example, when the UE receives an indicator to suspend the cell group, the UE may perform PDCCH monitoring with a very long interval by applying the second DRX configuration information, thereby reducing power consumption of the UE. In another method, when the UE receives an indicator to suspend the cell group, the UE may activate or switch the DL BWP to the dormant BWP of the PSCell of the cell group by applying BWP configuration information of the PSCell of the cell group, and may perform a UE operation in the cell in which the dormant BWP is activated according to the disclosure. Also, when the UE receives an indicator to suspend the cell group, the UE may deactivate all SCells configured in the cell group. In another method, when the UE receives an indicator to suspend the cell group, the UE may activate or switch the DL BWP to the dormant BWP for the SCell in which the dormant BWP is configured from among SCells configured in the cell group, and may perform a UE operation in the cell in which the dormant BWP is activated according to the disclosure, or may deactivate the SCell in which the dormant BWP is not configured. In another method, when the UE receives an indicator to suspend the cell group in the RRC message, the UE may perform activation, deactivation, hibernation, or dormant BWP activation on each SCell according to an indicator or configuration information for each SCell of the cell group included in the RRC message, or, alternatively, before or after the UE receives an indictor to suspend the cell group, the UE may perform activation or deactivation or hibernation or dormant BWP activation on each SCell of the cell group via the indicator (e.g., bitmap) of the PDCCH or the MAC control information or the RRC message.
- Configuration information about the transmission resource to perform channel measurement on a dormant BWP or a non-dormant BWP and report the measurement result (e.g., PUCCH transmission resource information of PCell or PUCCH SCell or PSCell)
- When an indicator to resume (or activate) the state of the cell group is included, first DRX configuration information (e.g., monitoring duration or active period (on-duration) length or period or offset) may be configured for the UE to re-perform PDCCH monitoring on the PSCell of the cell group. Alternatively, the UE may recover and apply the first DRX configuration information that is stored for the cell group. For example, when the UE receives an indicator to resume the cell group, the UE may perform PDCCH monitoring by applying the first DRX configuration information that is received from the RRC message or that is stored to resume data transmission or reception. In another method, when the UE receives an indicator to resume the cell group, the UE may activate or switch the DL BWP of the PSCell of the cell group to the non-dormant BWP (e.g., BWP configured in the RRC message) by applying BWP configuration information of the PSCell of the cell group, and may perform a UE operation in the cell in which the normal BWP (non-dormant BWP) is activated according to the disclosure. Alternatively, when the UE receives an indicator to resume the cell group, the UE may trigger a random access procedure in the PSCell of the cell group by applying random access configuration information that is received from the RRC message or that is stored (random access transmission resource information for preamble transmission (time or frequency transmission resource) or designated preamble information). In another method, when the UE receives an indicator to resume the cell group, if random access configuration information (random access transmission resource information for preamble transmission (time or frequency transmission resource) or designated preamble information) is included in the RRC message, the UE may trigger a random access procedure (e.g., CFRA procedure) in the PSCell of the cell group by applying the random access configuration information, and when random access configuration information (random access transmission resource information for preamble transmission (time or frequency transmission resource) or designated preamble information) is not included in the RRC message indicating to resume or activate the cell group, the UE may trigger a random access procedure (e.g., CBRA procedure) in the PSCell of the cell group, or may trigger a random access procedure (CBRA or 2-step random access) based on system information. When there is random access configuration information (random access transmission resource information for preamble transmission (time or frequency transmission resource) or designated preamble information) that is stored in the UE before an indicator to resume the cell group is received, the UE may release or discard the random access configuration information. In another method, the UE may perform PDCCH monitoring on the indicated or configured cell group or cell, and may trigger and perform a random access procedure according to an indication indicated by the PDCCH.

When an indicator to resume (or activate) the state of the cell group is included or when the UE receives an indicator to resume the cell group, the UE may activate all SCells configured in the cell group. In another method, when the UE receives an indicator to resume the cell group, the UE may activate or switch the DL BWP to the non-dormant BWP (e.g., BWP configured in the RRC message or the first active BWP) for the SCell in which the dormant BWP is configured from among SCells configured in the cell group, and may perform a UE operation in the cell in which the non-dormant BWP is activated according to the disclosure or may activate the SCell in which the dormant BWP is not configured. In another method, when the UE receives an indicator to resume the cell group in the RRC message, the UE may perform activation or deactivation or hibernation or dormant BWP activation on each SCell according to an indicator or configuration information for each SCell of the cell group included in the RRC message, and alternatively, before or after the UE receives an indicator to resume the cell group, the UE may perform activation or deactivation or hibernation or dormant BWP activation on each SCell of the cell group via the indicator (e.g., bitmap) of the PDCCH or the MAC control information or the RRC message.

Indicator adding cell group configuration

Indicator releasing cell group configuration

Security configuration information (security key information or security information for cell group or additional information (e.g., sk-counter))

Indicator indicating handover or cell group addition or cell group modification (e.g., ReconfigurationWithSync indicator or mobilitycontrolInfo indicator)

First channel measurement configuration information or second channel measurement configuration information for rapid activation of a cell group or a cell It is proposed that, when the RRC message (e.g., RRCReconfiguration message) includes an indicator for suspending the cell group, an indicator indicating handover or cell group addition or cell group modification (e.g., ReconfigurationWithSync indicator or mobilitycontrolInfo indicator) may not be included, and when the RRC message includes an indicator or configuration information for resuming the cell group, an indicator indicating handover or cell group addition or cell group modification (e.g., ReconfigurationWithSync indicator or mobilitycontrolInfo indicator) may be included. This is because, when the cell group is resumed, a connection to the cell group should be re-performed, and thus synchronization should be performed or system information should be received, or a random access procedure should be performed when necessary.

In the disclosure, a dormant BWP in a mobile communication system is newly proposed, and a UE operation on each BWP when each BWP is transitioned or switched is proposed in detail.

A state transition for each bandwidth or a BWP switching procedure which is proposed in the disclosure will now be described.

In the above case, a BWP of each cell (e.g., SCell or PSCell) of each cell group of a UE may be activated to a normal BWP or may be activated to a dormant BWP or may be deactivated, and the UE may activate or deactivate the normal BWP or the dormant BWP in response to an indication according to configuration information of an RRC message or MAC control information or DCI of a PDCCH.

According to the disclosure, a state transition operation (activation or deactivation or hibernation) for each BWP of the cell or an operation of activating the normal BWP or activating the dormant BWP or activating a first active BWP activated from dormancy or deactivating the normal BWP or the dormant BWP may be performed in response to an indication or configuration in one of the following cases.

When the BWP state of the cell is configured via the RRC message, or when the BWP of each cell is configured via the RRC message and the dormant BWP is configured in the cell, or when the first active BWP is configured as the dormant BWP, the UE may start the cell by switching to or activating the dormant BWP and may perform an operation on the dormant BWP.

When a cell activation or deactivation or hibernation MAC CE is received,

When the MAC CE indicating to activate or deactivate the normal BWP or the first active BWP activated from dormancy or the dormant BWP is received, When the DCI of the PDCCH indicating to activate or deactivate the normal BWP or the first active BWP activated from dormancy or the dormant BWP is received, When a cell hibernation timer is not configured for the active-state cell and a configured cell deactivation timer expires, When the BWP hibernation timer is not configured for the active BWP and a configured BWP state deactivation timer (e.g., bwpInactivityTimer) expires, Also, a state transition operation or a dormant BWP operating method according to the disclosure may have the following characteristics.

The dormant BWP cannot be configured for the Spcell (Pcell or Pscell) (or DL BWP or UL BWP of the cell), and only the normal BWP may be configured and may always be activated. As synchronization and transmission/reception of a primary control signal are performed on the Spcell, the Spcell should always be maintained in the active state because a connection with a BS is disconnected when the BWP of the Spcell is hibernated or deactivated or is operated as the dormant BWP.

When a PUCCH is configured for the S cell or for the BWP of the S cell, the dormant state or the dormant BWP may not be configured. In this case, because there may be another cell to which a feedback such as HARQ ACK/NACK should be transmitted via the PUCCH, the active state or the normal BWP should be activated and used.

Due to such characteristics, the cell deactivation timer (ScellDeactivationTimer) or the BWP hibernation timer may not be applied to the Spcell or the BWP of the Spcell and the Scell or the BWP of the SCell for which the PUCCH is configured, and may run only for other SCells.

The cell or BWP hibernation timer (ScellHibernationTimer) may be prioritized over the cell or BWP state deactivation timer (ScellDeactivationTimer). When one value is set via the RRC message as a timer value, the same value may be applied to all the cells. In another method, the BS may set a different timer value for each SCell or each BWP by considering characteristics of each cell or characteristics of each BWP.

The cell or the BWP may basically operate in the inactive state initially when it is not indicated as active or dormant in the RRC message.

In the disclosure, a UL may indicate the UL BWP, and a DL may indicate the DL BWP. This is because only one activated or hibernated BWP may operate for each UL or each DL.

In the disclosure, hereinafter, a method of operating state transition or switching in units of BWPs (BWP level) to rapidly activate carrier aggregation or dual connectivity and reduce battery consumption of a UE will now be particularly proposed.

In the disclosure, the BWP may be configured for each cell by the RRCSetup message or the RRCReconfiguration message or the RRCResume message as described with reference to FIG. 1F. The RRC message may include configuration information about a PCell or a Pscell or a plurality of S cells, and a plurality of BWPs may be configured for each cell (PCell or Pscell or Scell). When the plurality of BWPs are configured for each cell by the RRC message, a plurality of BWPs to be used in the DL of each cell may be configured, and in a case of an FDD system, a plurality of BWPs to be used in the UL of each cell may be configured separately from the DL BWPs. In a case of a TDD system, a plurality of BWPs to be commonly used in the DL and the UL of each cell may be configured.

According to a first method of an information configuration method for BWP configuration for each cell (PCell or Pscell or Scell), BWP configuration information may include one or more of the following information, and a new indicator may be introduced in the BWP to indicate whether each BWP is the normal BWP (e.g., BWP that may operate or may be configured in the active state or the inactive state) or the dormant BWP (e.g., BWP that may operate or may be configured in the dormant state). For example, whether or not each BWP is the dormant BWP may be indicated by using a BWP identifier.

DL BWP configuration information of each cell

Initial DL BWP configuration information

A plurality of pieces of BWP configuration information and BWP identifier (ID) corresponding to each BWP DL initial state configuration information of the cell (e.g., active state or dormant state or inactive state)

BWP identifier indicating first active DL BWP

BWP identifier indicating default BWP

BWP identifier indicating dormant BWP or 1-bit indicator indicating dormant BWP for each BWP in BWP configuration information When the first active DL BWP is configured as the dormant BWP, the first active UL BWP may also have to be configured as the dormant BWP BWP inactivity timer configuration and timer value BWP identifier that is first activated from dormant BWP UL BWP configuration information of each cell Initial UL BWP configuration information A plurality of pieces of BWP configuration information and BWP ID corresponding to each BWP UL initial state configuration information of the cell (e.g., active state or dormant state or inactive state)

BWP identifier indicating first active UL BWP

BWP identifier indicating dormant BWP or 1-bit indicator indicating dormant BWP for each BWP in BWP configuration information When the first active DL BWP is configured as the dormant BWP, the first active UL BWP may also have to be configured as the dormant BWP.

BWP identifier that is first activated from dormant BWP

SRS-related configuration information may be configured by using the following methods.

Embodiment 1 of Configuring SRS

First SRS configuration information (SRS configuration information for the BWP other than the normal BWP or the dormant BWP or the PSCell (or SCell) of the cell group for which the cell group is not suspended or the PSCell (or SCell) of the cell group for which the cell group is resumed or activated or the BWP (e.g., indicator indicating whether it is SRS configuration information for SRS transmission resource or period or offset or dormant BWP))

Second SRS configuration information (SRS configuration information for the dormant BWP or the PSCell (or SCell) of the cell group for which the cell group is suspended or deactivated or the PSCell (or SCell) of the cell group for which the cell group is not resumed or the BWP (e.g., indicator indicating whether it is SRS configuration information for SRS transmission resource or period or offset or dormant BWP))

In the above case, the first SRS configuration information and the second SRS configuration information may be distinguished based on an indicator indicating whether it is SRS configuration information for the dormant BWP or the PSCell (or SCell) of the cell group for which the cell group is suspended or deactivated. For example, the first SRS configuration information and the second SRS configuration information may be distinguished according to an indicator value or may be distinguished according to whether an indicator value is configured or not or may be distinguished whether there is or is not an indicator value. In another method, the first SRS configuration information and the second SRS configuration may be distinguished by differently defining their names.

In Embodiment 1 of the disclosure, when the dormant BWP (e.g., dormant BWP identifier in DL BWP configuration information) is configured on a serving cell (PSCell or SCell) or when sell group suspension is indicated or supported or configured, the second SRS configuration information is always configured. Alternatively, when the dormant BWP (e.g., dormant BWP identifier in the DL BWP configuration information) is configured on the serving cell (PSCell or SCell) or when cell group suspension is indicated or supported or configured, an indicator indicating whether it is the first SRS configuration information or the second SRS configuration information is configured. For example, when the dormant BWP identifier is configured in the DL BWP configuration information or when cell group suspension is indicated or supported or configured, the second SRS configuration information may be configured in each UL BWP configuration information. For example, when the dormant BWP identifier is configured in the DL BWP configuration information or when cell group suspension is indicated or supported or configured, the second SRS configuration information has to be configured in the UL BWP configuration information for the UL BWP or the UL BWP having the same BWP identifier as the DL dormant BWP. In another method, in a case of TDD or an unpaired spectrum, when a dormant BWP identifier is configured in the DL BWP configuration information, the second SRS configuration information has to be configured in the UL BWP configuration information for the UL BWP or the UL BWP having the same BWP identifier as the DL dormant BWP.

For example, in Embodiment 1 of the disclosure, when the DL BWP is switched or activated to the non-dormant BWP (or normal BWP) for the activated cell or when cell group suspension is not indicated or when the cell group is in the active state or when cell group resumption is indicated, the UE may apply the first SRS configuration information to the UL BWP of the activated cell (Scell or PSCell), and may transmit an SRS based on an SRS transmission resource or a period or an offset corresponding to the first SRS configuration information. When the DL BWP is switched or activated to the dormant BWP for the activated cell or when cell group suspension is indicated or when the cell group is not in the active state (or is in the inactive or suspended state), the UE may apply the second SRS configuration information to the UL BWP of the cell (PSCell or SCell) of the suspended or deactivated cell group, and may transmit an SRS based on an SRS transmission resource a period or an offset corresponding to the second SRS configuration information. For example, an SRS transmission resource configured in the second SRS configuration information for the dormant BWP may be configured to be much smaller than an SRS transmission resource configured in the first SRS configuration information for the normal BWP, or an SRS transmission resource period configured in the second SRS configuration information may be configured to be much longer than an SRS transmission resource period configured in the first SRS configuration information, such that an effect of saving power of the UE in the dormant BWP or the suspended cell group may be improved. For example, an SRS transmission period of the second SRS configuration information may be configured to be equal to or greater than 100 ms. In another method, in the above case, when the DL BWP is activated to the dormant BWP or when cell group suspension is indicated or when the cell group is not in the active state (or is in the inactive or suspended state), if the second SRS configuration information is not configured, the UE may apply the first SRS configuration information to the UL BWP, and may transmit an SRS based on an SRS transmission resource or period or offset corresponding to the first SRS configuration information. In another method, in the above case, when the DL BWP is activated to the dormant BWP or when cell group suspension is indicated or when the cell group is not in the active state (or is in the inactive or suspended state), if the second SRS configuration information is not configured, the UE may not transmit an SRS.

Embodiment 2 of Configuring SRS

In Embodiment 2 of the disclosure, the first SRS configuration information and the second SRS configuration information may be included one SRS configuration information, and may be respectively configured as SRS configuration information (e.g., SRS transmission resource or period or offset) for the normal BWP or the non-dormant BWP or the PSCell (or SCell) of the cell group for which the cell group is not suspended, or the PSCell (or SCell) of the cell group for which the cell group is resumed or activated, or the BWP, and SRS configuration information (e.g., SRS transmission resource or period or offset) for the dormant BWP or the PSCell (SCell) of the cell group for which the cell group is suspended or deactivated or the PSCell (or SCell) of the cell group for which the cell group is not resumed or the BWP.

The first SRS configuration information (SRS configuration information (e.g., indicator indicating whether it is SRS configuration information for SRS transmission resource or period or offset or dormant BWP) for the normal BWP or the non-dormant BWP or the PSCell (or SCell) of the cell group for which the cell group is not suspended or the PSCell (or SCell) of the cell group for which the cell group is resumed or activated or the BWP).

The second SRS configuration information (SRS configuration information (e.g., indicator indicating whether it is SRS configuration information for SRS transmission resource or period or offset or dormant BWP) for the dormant BWP or the PSCell (or SCell) for which the cell group is suspended or deactivated or the PSCell (or SCell) for which the cell group is not resumed or the BWP).

In Embodiment 2 of the disclosure, when the dormant BWP (e.g., dormant BWP identifier in the DL BWP configuration information) is configured for the serving cell (cell) or when cell group suspension is indicated or supported or configured, the second SRS configuration information is always configured. Alternatively, when the dormant BWP (e.g., dormant BWP identifier in the DL BWP configuration information) is configured for the serving cell (cell) or when cell group suspension is indicated or supported or configured, an indicator indicating whether it is the first SRS configuration information or the second SRS configuration information is configured. For example, when a dormant BWP identifier is configured in the DL BWP configuration information, the second SRS configuration information has to be configured in each UL BWP configuration information. For example, when a dormant BWP identifier is configured in the DL BWP configuration information or when cell group suspension is indicated or supported or configured, the second SRS configuration information has to be configured in the UL BWP configuration information for the UL BWP or the UL BWP having the same BWP identifier as the DL dormant BWP. In another method, in a case of TDD or an unpaired spectrum, when a dormant BWP identifier is configured in the DL BWP configuration information or when cell group suspension is indicated or supported or configured, the second SRS configuration information has to be configured in the UL BWP configuration information for the UL BWP or the UL BWP having the same BWP identifier as the DL dormant BWP.

For example, in Embodiment 2 of the disclosure, when the DL BWP is switched or activated to the non-dormant BWP (or normal BWP) for the activated cell or when cell group suspension is not indicated or when the cell group is in the active state or cell group resumption is indicated, the UE may apply the first SRS configuration information to the UL BWP of the activated cell, and may transmit an SRS based on an SRS transmission resource or period or offset corresponding to the first SRS configuration information. When the DL BWP is switched or activated to the dormant BWP for the activated cell or when cell group suspension is indicated or when the cell group is not in the active state (or is in the inactive or suspended state), the UE may apply the second SRS configuration information to the UL BWP of the activated cell, and may transmit an SRS based on an SRS transmission resource or period or offset corresponding to the second SRS configuration information. For example, an SRS transmission resource configured in the second SRS configuration information may be configured to be much smaller than an SRS transmission resource configured in the first SRS configuration information or an SRS transmission resource period configured in the second SRS configuration information may be configured to be much longer than an SRS transmission resource period configured in the first SRS configuration information, such that an effect of saving power of the UE may be improved. For example, an SRS transmission period in the second SRS configuration information may be configured to be equal to or greater than 100 ms. In another method, when the DL BWP is activated to the dormant BWP or when cell group suspension is indicated or when the cell group is not in the active state (or is in the inactive or suspended state), if the second SRS configuration information is not configured, the UE may apply the first SRS configuration information to the UL BWP, and may transmit an SRS based on an SRS transmission resource or period or offset corresponding to the first SRS configuration information. In another method, when the DL BWP is activated to the dormant BWP or when cell group suspension is indicated or when the cell group is not in the active state (or is in the inactive or suspended state), if the second SRS configuration information is not configured, the UE may not transmit an SRS.

Embodiment 3 of Configuring SRS

In Embodiment 3 of the disclosure, the second SRS configuration information, that is, SRS configuration information (e.g., SRS transmission resource or period or offset) for indication or configuration of the dormant BWP or cell group suspension may be configured only for a BWP or a BWP configured as the UL dormant BWP (BWP indicated by a dormant BWP identifier) in the UL BWP configuration information. Alternatively, the first SRS configuration information, that is, SRS configuration information (e.g., SRS transmission resource or period or offset) for the normal BWP or the non-dormant BWP may be configured only for the BWP configured as the UL non-dormant BWP (BWP not indicated by a dormant BWP identifier) in the UL BWP configuration information. In another method, in a case of TDD or an unpaired spectrum, when a dormant BWP identifier is configured in the DL BWP configuration information, the second SRS configuration information has to be configured in the UL BWP configuration information for the UL dormant BWP (BWP indicated by a dormant BWP identifier) or the UL BWP having the same BWP identifier as the DL dormant BWP.

For example, in Embodiment 3 of the disclosure, when the DL BWP is switched or activated to the non-dormant BWP (or normal BWP) for the activated cell, the UE may apply the first SRS configuration information to the UL BWP of the activated cell, and may transmit an SRS based on an SRS transmission resource or period or offset corresponding to the first SRS configuration information. However, when the DL BWP is switched or activated to the dormant BWP for the activated cell, the UE may apply the second SRS configuration information to the UL BWP of the activated cell, and may transmit an SRS based on an SRS transmission resource or period or offset corresponding to the second SRS configuration information. For example, an SRS transmission resource configured in the second SRS configuration information for the dormant BWP may be configured to be much smaller than an SRS transmission resource configured in the first SRS configuration information for the normal BWP, or an SRS transmission resource period configured in the second SRS configuration information for the dormant BWP may be configured to be much longer than an SRS transmission resource period configured in the first SRS configuration information for the normal BWP, such that an effect of saving power of the UE in the dormant BWP may be improved. For example, an SRS transmission period in the second SRS configuration information may be configured to be equal to or greater than 100 ms. In another method, when the DL BWP is activated to the dormant BWP, if the second SRS configuration information is not configured, the UE may apply the first SRS configuration information to the UL BWP, and may transmit an SRS based on an SRS transmission resource or period or offset corresponding to the first SRS configuration information. In another method, in the above case, when the DL BWP is activated to the dormant BWP, if the second SRS configuration information is not configured, the UE may not transmit an SRS.

As another method of the information configuration method for BWP configuration of each cell (PCell or Pscell or S cell), a second method may not involve configuring configuration information (e.g., search space, PDCCH transmission resource, or period) required to read the PDCCH for the BWP corresponding to the dormant BWP (in another method, a period may be configured to be very long along with other configuration information), and may involve configuring configuration information (e.g., search space, PDCCH transmission resource, or period) required to read the PDCCH for the normal BWP. This is because the dormant BWP is a BWP for not reading the PDCCH to reduce battery consumption of the UE and for performing channel measurement and reporting a channel measurement result to the PCell to enable rapid activation of the BWP or cell to allow rapid allocation of UL or DL transmission resources. Accordingly, in the disclosure, a dormant BWP may indicate a BWP for which configuration information (e.g., search space, PDCCH transmission resource, or period) for PDCCH monitoring is not configured or may refer to a BWP indicated by a dormant BWP identifier or may refer to a BWP for which configuration information for PDCCH monitoring is configured but monitoring is configured to be performed with a very long interval. In another method, in the disclosure, a dormant BWP may indicate a BWP for which a PDCCH transmission resource or a period is not configured in configuration information for PDCCH monitoring so as not to perform PDCCH monitoring on the cell for which the dormant BWP is configured, but search space information or cross-carrier scheduling configuration information is configured so that an indication or switching for the dormant BWP is received on another cell by cross-carrier scheduling, and because data transmission and reception is unavailable on the dormant BWP, only PDCCH configuration information (PDCCH-config) may be configured (e.g., only search space information may be configured) for the dormant BWP (or first BWP). On the other hand, because PDCCH monitoring should also be performed and data transmission and reception should also be available on the normal BWP (or second BWP) other than the dormant BWP, PDCCH configuration information (e.g., CORESET configuration information or search space configuration information or PDCCH transmission resource or period) or PDSCH configuration information or PUSCH configuration information or random access-related configuration information may be further configured.

Accordingly, although the UL or DL normal BWP should be configured for each cell, the dormant BWP may or may not be configured for each cell, and the configuration thereof may depend on implementation of the BS according to purposes. Also, the first active BWP or the default BWP or the initial BWP may be configured as the dormant BWP according to the implementation of the BS.

The UE is not able to transmit and receive data to and from the BS on the dormant BWP, does not monitor the PDCCH to detect an indication by the BS, may not transmit a pilot signal but may perform channel measurement, and may report a measured frequency/cell/channel measurement result according to the BS configuration periodically or when an event occurs. Accordingly, because the UE does not monitor the PDCCH and does not transmit a pilot signal on the dormant BWP, battery consumption may be reduced compared to the active mode, and unlike the inactive mode, the UE performs channel measurement reporting, and thus, the BS may rapidly activate the cell for which the dormant BWP is configured based on a measurement report of the dormant BWP to use carrier aggregation. In the disclosure, the dormant BWP may be configured in the DL BWP configuration information, and may be used only for the DL BWP.

In the disclosure, a UE operation for the dormant BWP or a UE operation with respect to the activated SCell or PSCell when the dormant BWP is activated will now be described below.

When the UE is indicated to operate or activate the dormant BWP for a certain serving cell (PCell, PSCell, or SCell) from the PCell or the SpCell or when the UE receives an indication to hibernate a BWP (e.g., DL BWP) of a certain serving cell (e.g., SCell) or the serving cell (e.g., SCell) or an indication to activate the dormant BWP by the DCI of the PDCCH (L1 control signal) or the MAC CE or the RRC message or when the UE receives an indication to switch the BWP (e.g., DL BWP) to the dormant BWP via the DCI of the PDCCH (L1 control signal) or the MAC CE or the RRC message (when the UE receives the indication by the L1 control signal of the PDCCH, the UE may receive the indication via the PDCCH of its own cell by self-scheduling or may receive the indication via the PDCCH for the cell on the PCell by cross-carrier scheduling). Alternatively, when the BWP hibernation timer is configured and expires or when the activated BWP of the activated cell is the dormant BWP or when the activated BWP of the activated cell is not the normal BWP, the UE may perform one or more of the following operations.

In the above case, the UL BWP or the DL BWP may be switched to the BWP (e.g., dormant BWP) configured by the RRC and the BWP may be activated or hibernated.

The cell deactivation timer configured or running on the cell or the BWP may be stopped.

When the BWP hibernation timer is configured on the BWP of the cell, the BWP hibernation timer may be stopped.

The dormant BWP deactivation timer on the BWP of the cell may start or re-start.

The BWP inactivity timer configured for the BWP of the cell may be stopped. This is to prevent an unnecessary BWP switching procedure on the cell.

A periodic DL transmission resource (DL SPS or configured downlink assignment) or a periodic UL transmission resource (UL SPS or configured uplink grant type 2) configured on the BWP of the cell may be cleared. In the above case, the term 'clear' means that the UE stores configuration information such as period information configured in the RRC message but information about a periodic transmission resource indicated or activated by L1 signaling (e.g., DCI) is discarded and is no longer used. The method proposed above, that is, an operation of clearing the configured periodic DL transmission resource (DL SPS or configured downlink assignment) or the configured periodic UL transmission resource (UL SPS or configured uplink grant) may be performed only when the BWP is transitioned from the active state to the dormant state. This is because, when the BWP is transitioned from the inactive state to the dormant state, there is no information about periodic transmission resource information indicated or activated by L1 signaling. In another method, only when the periodic DL transmission resource or the periodic UL transmission resource is configured or is configured and used, the periodic transmission resources may be cleared.

The periodic UL transmission resource configured in the BWP of the cell (configured uplink grant type 1 configured in the RRC) may be suspended. In the above case, 'suspend' means that transmission resource configuration information configured in the RRC message is stored in the UE but is no longer used. The method proposed above, that is, an operation of suspending the configured periodic UL transmission resource (configured uplink grant type 1) may be performed only when the BWP is transitioned from the active state to the dormant state. This is because the periodic transmission resource is not used when the BWP is transitioned from the inactive state to the dormant state. In another method, only when the periodic DL transmission resource or the periodic UL transmission resource is configured or is configured and used, the periodic transmission resources may be cleared.

All HARQ buffers configured in the UL or DL BWP may be emptied.

The UE may not transmit an SRS on the UL BWP of the cell.

In another method, when the first SRS configuration information (SRS configuration information for the normal BWP (non-dormant BWP) (e.g., SRS transmission resource or period or offset)) or the second SRS configuration information (SRS configuration information for the dormant BWP (e.g., SRS transmission resource or period or offset)) is configured in the UL BWP configuration information, the UE may transmit an SRS so as to facilitate power control or scheduling of the network or to rapidly reactivate the UL BWP of the UE. For example, when the DL BWP is switched or activated to the non-dormant BWP (or normal BWP) for the activated cell (when the activated BWP is not the dormant BWP), the UE may apply the first SRS configuration information to the UL BWP of the activated cell, and may transmit an SRS based on an SRS transmission resource or period or offset corresponding to the first SRS configuration information. However, when the DL BWP is switched or activated to the dormant BWP (when the activated BWP is the dormant BWP) for the activated cell, the UE may apply the second SRS configuration information to the UL BWP of the activated cell, and may transmit an SRS based on an SRS transmission resource or period or offset corresponding to the second SRS configuration information. For example, an SRS transmission resource configured in the second SRS configuration information for the dormant BWP may be configured to be much smaller than an SRS transmission resource configured in the first SRS configuration information for the normal BWP, or an SRS transmission resource period configured in the second SRS configuration information for the dormant BWP may be configured to be much longer than an SRS transmission resource period configured in the first SRS configuration information for the normal BWP, such that an effect of saving power of the UE in the dormant BWP may be improved. For example, an SRS transmission period in the second SRS configuration information may be configured to be equal to or greater than 100 ms. In another method, when the DL BWP is activated to the dormant BWP, if the second SRS configuration information is not configured, the UE may apply the first SRS configuration information to the UL BWP, and may transmit an SRS based on an SRS transmission resource or period or offset corresponding to the first SRS configuration information. In another method, when the DL BWP is activated to the dormant BWP, if the second SRS configuration is not configured, the UE may not transmit an SRS.

In another method, when the DL BWP is switched or activated to the DL dormant BWP (when the activated BWP is the dormant BWP) for the activated cell, the UE may switch or activate the UL BWP to the UL dormant BWP. In the above case, the UL dormant BWP may be indicated as the dormant BWP by a BWP identifier in the UL BWP configuration information configured by the RRC message (e.g., in a case of FDD or an unpaired spectrum or TDD), and in another method, the UL BWP having the same BWP identifier as the DL dormant BWP may be the dormant BWP (e.g., in the case of an unpaired spectrum or TDD). In the above case, the UE may apply the configured second SRS configuration information to the UL dormant BWP, and may transmit an SRS based on an SRS transmission resource or period or offset corresponding to the second SRS configuration information.

In another method, the current UL BWP or the last activated UL BWP may be changelessly activated.

On the BWP of the cell, the UE may perform channel measurement (channel state information (CSI) or channel quality indicator (CQI) or precoding matrix indicator (PMI) or rank indicator (RI) or precoding type indicator (PTI) or CSI-reference signal indicator (CRI)) on the DL according to the BS configuration and may perform measurement reporting. For example, channel or frequency measurement reporting may be periodically performed.

UL data does not be transmitted via a UL-SCH on the BWP of the cell.

A random access procedure does not be performed on the BWP of the cell.

The UE does not monitor the PDCCH on the BWP of the cell.

The UE does not monitor the PDCCH on the BWP of the cell. However, in a case of cross-scheduling, the UE may receive an indication by monitoring the PDCCH on the cell (e.g., SCell) in the scheduled cell (e.g., PCell).

PUCCH or SPUCCH transmission is not performed on the BWP of the cell.

The DL BWP may be hibernated, channel measurement may be performed and reported, and the UL BWP of the cell may be deactivated and may not be used. This is because, in the dormant cell, channel measurement is performed only on the DL BWP, and a measurement result is reported on the UL BWP of the Spcell (Pcell or Pscell) or the SCell with the PUCCH.

When switching or activation to the dormant BWP is indicated for the DL or hibernation is indicated for the BWP, a random access procedure may be performed without being cancelled. This is because, when a random access procedure is performed on the cell, a preamble is transmitted via the UL and an RAR is received via the DL of the Pcell. Accordingly, even when the DL BWP is hibernated or switched to the dormant BWP, a problem does not occur.

In the disclosure, a UE operation when the normal BWP (active BWP) of the activated cell is activated or when the non-dormant BWP is activated will now be described below.

When an indication to activate the normal BWP (e.g., DL BWP) of the current cell (PCell or PSCell or SCell) or the normal BWP other than the dormant BWP or an indication to activate the cell is received by the DCI of the PDCCH (L1 control signal) or the MAC CE or the RRC message or when an indication to switch the BWP (e.g., DL BWP) to the active BWP (or non-dormant BWP) is received by the DCI of the PDCCH (L1 control signal) or the MAC CE or the RRC message or when the activated BWP of the currently activated cell is the normal BWP or when the activated BWP of the currently activated cell is not the dormant BWP (when the indication is received by the L1 control signal of the PDCCH, the indication may be received via the PDCCH of its own cell by self-scheduling or the indication may be received via the PDCCH for the cell on the PCell by cross-carrier scheduling), the UE may perform one or more of the following operations.

In the above case, it may be switched or activated to the indicated UL or DL BWP. Alternatively, the UE may switch the UL or DL BWP to the designated BWP (e.g., UL or DL first active BWP) and may activate the BWP.

The UE may transmit an SRS on the activated BWP so that the BS can perform channel measurement for the UL. For example, the SRS may be periodically transmitted.

In another method, when the first SRS configuration information (SRS configuration information for the normal BWP (non-dormant BWP) (e.g., SRS transmission resource or period or offset)) or the second SRS configuration information (SRS configuration information for the dormant BWP (e.g., SRS transmission resource or period or offset)) is configured in the UL BWP configuration information, the UE may transmit an SRS so as to facilitate power control or scheduling of the network or to rapidly deactivate the UL BWP of the UE. For example, when the DL BWP is switched or activated to the non-dormant BWP (or normal BWP) for the activated cell (when the first active BWP is not the dormant BWP), the UE may apply the first SRS configuration information to the UL BWP of the activated cell, and may transmit an SRS based on an SRS transmission resource or period or offset corresponding to the first SRS configuration information. When the DL BWP is switched or activated to the dormant BWP for the activated cell (when the first active BWP is the dormant BWP), the UE may apply the second SRS configuration information to the UL BWP of the activated cell, and may transmit an SRS based on an SRS transmission resource or period or offset corresponding to the second SRS configuration information. For example, an SRS transmission resource configured in the second SRS configuration information for the dormant BWP may be configured to be much smaller than an SRS transmission resource configured in the first SRS configuration information for the normal BWP, or an SRS transmission resource period configured in the second SRS configuration information for the dormant BWP may be configured to be much longer than an SRS transmission resource period configured in the first SRS configuration information for the normal BWP, such that an effect of saving power of the UE may be improved. For example, an SRS transmission period in the second SRS configuration information may be configured to be equal to or greater than 100 ms. In another method, when the DL BWP is activated to the dormant BWP, if the second SRS configuration information is not configured, the UE may apply the first SRS configuration information to the UL BWP, and may transmit an SRS based on an SRS transmission resource or period or offset corresponding to the first SRS configuration information. In another method, when the DL BWP is activated to the dormant BWP, if the second SRS configuration information is not configured, the UE may not transmit an SRS.

In another method, when the DL BWP is switched or activated to the BWP or the normal BWP other than the DL dormant BWP for the activated cell (when the first active BWP is not the dormant BWP), the UE may switch or activate the UL BWP to the BWP first activated from dormancy configured by the RRC. The BWP first activated from UL dormancy may be indicated as the BWP first activated from dormancy by a BWP identifier in the UL BWP configuration information configured by the RRC message (e.g., in the case of FDD, an unpaired spectrum, or TDD), and in another method, the UL BWP having the same BWP identifier as the DL dormant BWP may be the dormant BWP (e.g., in the case of an unpaired spectrum or TDD). The UE may apply the first SRS configuration information to the BWP first activated from dormancy, and may transmit an SRS based on an SRS transmission resource or period or offset corresponding to the first SRS configuration information.

In another method, the current UL BWP or the last activated UL BWP may be changelessly activated.

In another method, when the first active DL BWP is not the dormant BWP,
  when the cell is in the inactive state before MAC control information indicating cell activation or deactivation is received or when the cell is configured to have the active state in cell configuration or configuration information via the RRC message,
  the UL BWP or the DL BWP may be activated to a BWP indicated by a first active UL BWP identifier or a first active DL BWP identifier which is configured by RRC configuration information.

In another method, when the first active DL BWP is the dormant BWP
  the BWP inactivity timer may be stopped.
  When the cell is in the inactive state before MAC control information indicating cell activation or deactivation is received or when the cell is configured to have the active state in cell configuration or configuration information via the RRC message,
  the UL BWP or the DL BWP may be activated to a BWP indicated by a first active UL BWP identifier (or dormant BWP identifier) or a first active DL BWP identifier (or dormant BWP identifier) which is configured by RRC configuration information. For example, when the first active DL BWP is configured as the dormant BWP, the first active UL BWP may also be configured as the dormant BWP.

In another method, the DL BWP may be activated to a BWP indicated by a first active DL BWP identifier (or dormant BWP identifier) in RRC configuration information. The UL BWP may be activated to a BWP indicated by a dormant BWP identifier (or first active UL BWP identifier) in RRC configuration information.

When the PUCCH is configured in the activated BWP, the UE may perform PUCCH transmission.

For the above case, a BWP or cell deactivation timer may start or re-start. In another method, only when a BWP or cell hibernation timer is not configured, the BWP or cell deactivation timer may start or re-start. When the BWP or cell hibernation timer can be configured by the RRC message, and when the BWP or cell hibernation timer expires, the BWP or cell may be hibernated. For example, the BWP or cell deactivation timer may start or re-start only on the hibernated BWP or cell.

When there is a suspended type 1 configuration transmission resource, the stored type 1 transmission resource may be initialized and used as configured. In the above case, the type 1 configuration transmission resource is a periodic transmission resource (UL or DL) that is previously allocated via the RRC message and refers to a transmission resource that may be activated and used via the RRC message.

Power headroom report (PHR) may be triggered for the BWP.

On the activated BWP, the UE may report a channel measurement result (CSI, CQI, PMI, RI, PTI, or CRI) for the DL according to the BS configuration.

On the activated BWP, the PDCCH may be monitored to read an indication of the BS.

In order to read cross-scheduling for the activated BWP, the PDCCH may be monitored.

In the above case, the BWP inactivity timer may start or re-start. In another method, only when the BWP hibernation timer is not configured, the BWP inactivity timer may start or re-start. The BWP hibernation timer may be configured by the RRC message, and when the BWP hibernation timer expires, the UE may switch the BWP to dormancy or the dormant BWP. For example, the BWP inactivity timer may start or re-start only on the dormant BWP.

When a link BWP hibernation timer is configured for the BWP, the BWP hibernation timer may start or re-start for the BWP.

In the disclosure, a UE operation when the inactive BWP (non-active BWP) or the BWP or the cell is deactivated will now be described below.

When an indication to deactivate the BWP (e.g., DL BWP) of the current cell (PCell or PSCell or SCell) or the cell is received by the DCI of the PDCCH (L1 control signal) or the MAC CE or the RRC message or when an indication to deactivate the BWP (e.g., DL BWP) or an indication to switch to the inactive BWP is received by the DCI of the PDCCH (L1 control signal) or the MAC CE or the RRC message (when the indication is received by the L1 control signal of the PDCCH, the indication may be received via the PDCCH of its own cell by self-scheduling, or the indication may be received via the PDCCH for the cell in the PCell by cross-carrier scheduling.) Alternatively, when the BWP or cell deactivation timer expires on the cell or when the activated cell is deactivated or when the BWP of the cell is deactivated, the UE may perform one or more of the following operations.

The cell or the indicated UL or DL BWP may be deactivated.

The UE may stop the BWP inactivity timer (e.g., inactivity timer for the DL BWP) that is configured and running on the cell or the BWP.

A periodic DL transmission resource (DL SPS or configured downlink assignment) or a periodic UL transmission resource (UL SPS or configured uplink grant type 2) configured on the cell or the BWP may be cleared. In the above case, 'clear' means that the UE stores configuration information such as period information configured in the RRC message but information about a periodic transmission resource indicated or activated by L1 signaling (e.g., DCI) is discarded and is no longer used. The periodic transmission resource may be referred to as a type 2 configuration transmission resource. Also, an operation of clearing the periodic transmission resource may be performed only when the cell is transitioned from the active state to the inactive state. This is because, when the cell is transitioned from the dormant state to the inactive state, there is no periodic transmission resource in the dormant state, and thus a clearing operation is not necessary. In another method, only when the periodic DL transmission resource or the periodic UL transmission resource is configured or is configured and used, the periodic transmission resources may be cleared.

The periodic UL transmission resource configured on the cell or the BWP (configured uplink grant type 1 configured in the RRC) may be suspended. In the above case, 'suspend' means that transmission resource configuration information configured in the RRC message is stored in the UE but is no longer used. The periodic transmission resource may be referred to as a type 1 configuration transmission resource. Also, in the above case, an operation of clearing a periodic transmission resource may be performed only when the cell is transitioned from the active state to the inactive state. This is because, when the cell is transitioned from the dormant state to the inactive state, there is no periodic transmission resource in the dormant state, and thus a clearing operation is not necessary. In another method, only when the periodic DL transmission resource or the periodic UL transmission resource is configured or is configured and used, the periodic transmission resources may be cleared.

All HARQ buffers configured for the cell or the BWP are emptied.

When there is a PUSCH transmission resource configured for periodic channel measurement reporting (semi-persistent CSI reporting) on the cell or the BWP, the PUSCH transmission resource is cleared.

The UE does not transmit an SRS on the cell or the BWP.

On the cell or the BWP, the UE does not perform channel measurement (CSI, CQI, PMI, RI, PTI, or CRI) for the DL and does not perform reporting.

UL data is not transmitted via the UL-SCH on the cell or the BWP.

A random access procedure is not performed on the cell or the BWP.

The UE does not monitor the PDCCH on the cell or BWP.

The UE does not monitor the PDCCH on the cell or the BWP. Also, even in a case of cross-scheduling, the UE does not monitor the PDCCH on the cell in the scheduled cell.

PUCCH or SPUCCH transmission is not performed on the cell or the BWP.

In the disclosure, when an active state or an inactive state or a dormant state is operated and cell or BWP transition or switching is performed, it may be performed in units of BWPs, and when state transition or switching occurs in units of BWPs, a BWP (DL BWP or UL BWP) indicated with state transition or switching may perform state transition or switching according to a state transition or switching indication. For example, when the BWP (DL BWP or UL BWP) is transitioned from the active state to the dormant state or is switched (or activated) to the dormant BWP, the BWP may be transitioned to the dormant state, or may be switched (or activated) to the dormant BWP.

In the disclosure, 'BWP switching' may mean that, when BWP switching is indicated by the DCI of the PDCCH and when switching is indicated by a BWP identifier while allocating a downlink assignment, the DL BWP is switched to the BWP indicated by the BWP identifier, and when BWP switching is indicated by the DCI of the PDCCH and when switching is indicated by a BWP identifier while allocating an UL grant, the UL BWP is switched to the BWP indicated by the BWP identifier. Also, because the DCI format of the PDCCH varies between the format for downlink assignment (format1) and the format for UL grant (format0), the UE may operate according to the DCI format even when the UL and the DL are not separately described.

Figure 1G:
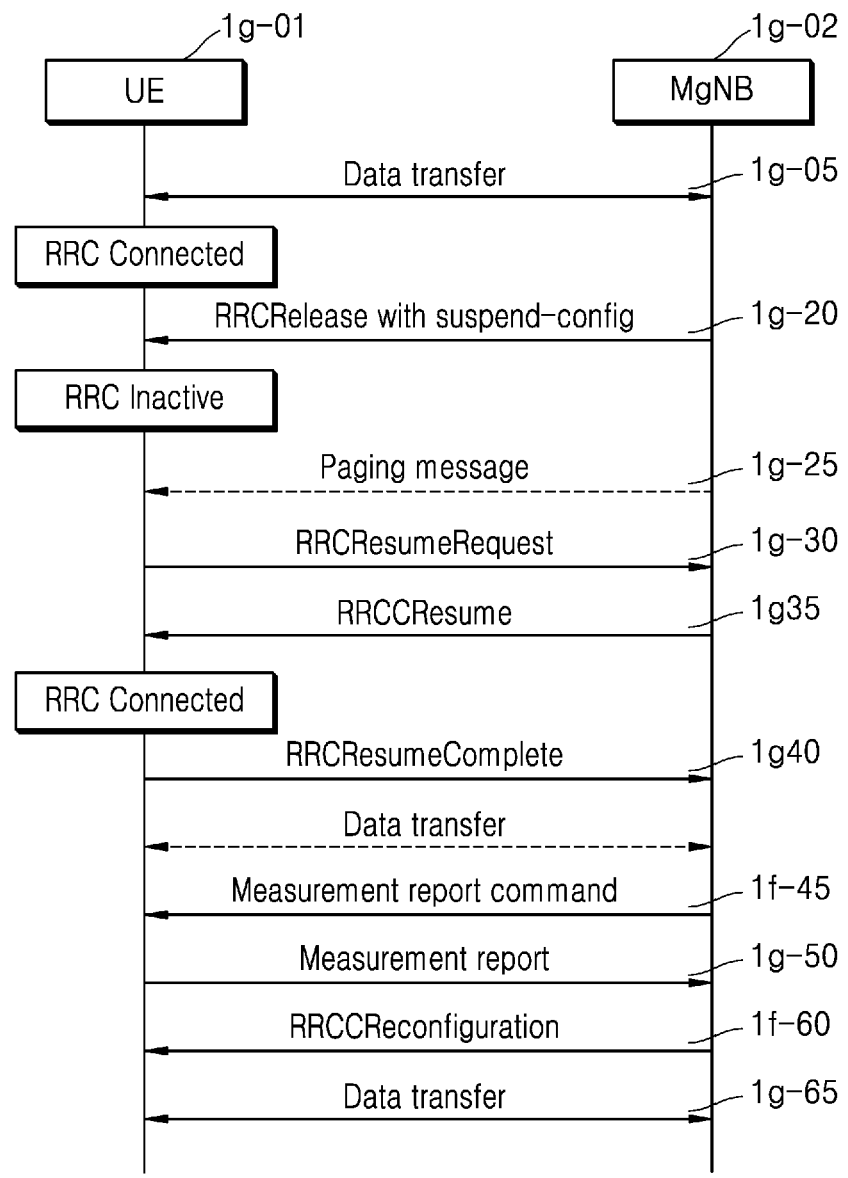
FIG. 1G is a diagram illustrating Embodiment 1 in which an embodiment of the disclosure is extended and applied to an RRC inactive mode UE according to an embodiment of the disclosure.

FIG. 1G is a diagram illustrating Embodiment 1 in which an embodiment of the disclosure is extended and applied to an RRC inactive mode UE according to an embodiment of the disclosure.

In the Embodiment 1, even when a UE is transitioned to an RRC inactive mode, the UE may not release or discard but may continuously store a plurality of pieces of SCell configuration information (e.g., a plurality of pieces of configuration information described with reference to FIG. 1F) or a plurality of pieces of PSCell (or SCell) configuration information of a cell group (e.g., SCG) which are configured or stored as in FIG. 1F in an RRC connected mode. Also, when an RRC connection resume procedure is performed, an RRC inactive mode UE may determine, via an indicator of an RRCResume message or an RRCReconfiguration message transmitted by a BS or through a reconfiguration procedure, whether to discard or release, or maintain and apply, or reconfigure the SCell configuration information (e.g., configuration information described or provided in FIG. 1F) or the PSCell (or SCell) configuration information of the cell group (e.g., SCG) stored in the UE. Also, when the BS transmits, to the UE, an RRCRelease message including a configuration or an indicator to transition the UE to an RRC inactive mode, the BS may transmit, to the UE, the RRCRelease message including an indicator or configuration information indicating whether to discard or release, or maintain and apply, or reconfigure the SCell configuration information (e.g., configuration information described with reference to FIG. 1F) or the PSCell (or SCell) configuration information of the cell group (e.g., SCG) stored in the UE. Also, the UE may move in the RRC inactive mode, and when RAN notification area (RNA) updating is performed, via the RRCRelease message transmitted by the BS to the UE, the UE may receive and apply the indicator or the configuration information indicating whether to discard or release, or maintain and apply, or reconfigure the SCell configuration information (e.g., configuration information described with reference to FIG. 1F) or the PSCell (or SCell) configuration information of the cell group (e.g., SCG) stored in the UE.

In Embodiment 1 proposed in the disclosure, in the SCell configuration information (e.g., a plurality of pieces of configuration information described or proposed with reference to FIG. 1F) and the PSCell (or SCell) configuration information of the cell group (e.g., SCG) of the RRC message, the BS may allow a first active BWP of DL or UL BWP configuration information of each cell to be configured as a dormant BWP, and when the UE activates each SCell, each cell group, or the PSCell of each cell group, the BS may allow the UE to directly operate a DL BWP or a UL BWP of each SCell, or each cell group, or the PSCell of each cell group as the dormant BWP, or to suspend or resume the cell group, such that battery consumption of the UE may be reduced.

In another method, in Embodiment 1 proposed in the disclosure, in the SCell configuration information (e.g., configuration information described with reference to FIG. 1F) or the PSCell (or SCell) configuration information of the cell group (e.g., SCG) of the RRC message, the BS may not configure the first active BWP of the DL or UL BWP configuration information of each cell as the dormant BWP, and when the UE activates or resumes each SCell, each cell group, or the PSCell of each cell group, the BS may allow the UE to always activate the DL BWP or the UL BWP of each SCell, or each cell group, or the PSCell of each cell group to the first active BWP, or to switch or activate the same to the dormant BWP according to Embodiment 1 or Embodiment 2 or Embodiment 3, or to suspend or resume the cell group, such that battery consumption of the UE may be reduced.

Embodiment 1 of the disclosure may be extended and applied to each SCell configuration information or PSCell configuration information of an MCG or SCG of the UE for which dual connectivity is configured. That is, the SCell configuration information or the PSCell configuration information of the SCG may also be stored when the UE is transitioned to the RRC inactive mode, and the BS may transmit, to the UE, the RRC message (e.g., RRCResume, RRCReconfiguration, or RRCRelease) including the indicator or the configuration information indicating whether to discard or release, or maintain and apply, or reconfigure the SCell configuration information (e.g., a plurality of pieces of configuration information described or proposed with reference to FIG. 1F) or the PSCell configuration information of the MCG or SCG stored in the UE, when the BS performs the RRC connection resume procedure or transitions the UE to the RRC inactive mode.

Referring to FIG. 1G, a UE 1g-01 may perform a network connection with a BS 1g-02 and may transmit and receive data (1g-05). When the BS 1g-02 needs to transition the UE 1g-01 to an RRC inactive mode for a certain reason, the BS 1g-02 may transmit an RRCRelease message 1g-20 to the UE 1g-01 and may transition the UE 1g-01 to the RRC inactive mode. The BS 1g-02 may transmit, to the UE 1g-01, an RRC message (e.g., RRCRelease) including an indicator or configuration information indicating whether to discard or release, or maintain and apply, or reconfigure SCell configuration information of an MCG or an SCG (e.g., a plurality of pieces of configuration information described or proposed with reference to FIG. 1F) or PSCell (or SCell) configuration information of the cell group (e.g., SCG) stored in the UE 1g-01. In the above case, when the UE 1g-01 supports dual connectivity, the BS 1g-02 may determine whether to suspend and resume a master cell group bearer configuration or RRC configuration information or SCell configuration information of the MCG or SCG, and may determine whether to suspend and resume a secondary cell group bearer configuration and RRC configuration by asking a secondary cell BS whether to suspend and resume the same and receiving a response from the secondary cell BS (1g-20). In the RRCRelease message, the BS 1g-02 may configure a frequency list to be measured by the UE 1g-01 in an RRC idle mode or an RRC inactive mode, or frequency measurement configuration information, or a frequency measurement period.

When the UE 1g-01 in the RRC inactive mode receives a paging message (1g-25), needs to transmit UL data, or needs to update an RNA while moving, the UE 1g-01 may perform an RRC connection resume procedure.

When the UE 1g-01 needs to configure a connection, the UE 1g-01 may perform a random access procedure and may transmit an RRCResumeRequest message to the BS 1g-02, and here, proposed UE operations related to transmission of the message are as below (1g-30).

1. A UE identifies system information, and when the system information indicates to transmit a complete terminal connection resume identifier (I-RNTI or Full resume ID), the UE prepares to transmit the message including a stored complete terminal connection resume identifier (I-RNTI). When the system information indicates to transmit a truncated UE connection resume identifier (truncated I-RNTI or truncated resume ID), the UE configures a truncated UE connection resume identifier (truncated resume ID) from the stored complete UE connection resume identifier (I-RNTI) by using a certain method and prepares to transmit the message including the truncated UE connection resume identifier.

2. The UE recovers RRC connection configuration information and security contact information from stored UE context.

3. The UE updates a new KgNB security key corresponding to the MCG based on a current KgNB security key, a Next Hop (NH) value, and a Next Hop Chaining Counter (NCC) value received in the RRCRelease message and stored.

4. When the UE receives an SCG-counter value (or sk-counter) in the RRCRelease message, the UE updates a new SKgNB security key corresponding to the SCG based on the KgNB security key and the SCG-counter value (or sk-counter).

5. The UE derives new security keys (K_RRCenc, K_RRC_int, K_UPint, and K_UPenc) to be used in an integrity protection and verification procedure and a ciphering and deciphering procedure, by using the newly updated KgNB security key.

6. When the UE receives the SCG-counter value (or sk-counter) in the RRCRelease message, the UE derives new security keys (SK_RRCenc, SK_RRC_int, SK_UPint, and SK_UPenc) to be used in an integrity protection and verification procedure and a ciphering and deciphering procedure, by using the newly updated SKgNB security key corresponding to the SCG.

7. The UE calculates a message authentication code for integrity (MAC-I) and prepares to transmit the message including the MAC-I.

8. The UE resumes a signaling radio bearer 1 (SRB1) (the UE has to resume the SRB1 in advance because the UE will receive the RRCResume message via the SRB1 in response to the RRCReseumeRequest message to be transmitted).

9. The UE configures the RRCResumeRequest message and transmits the RRCResumeRequest message to a lower layer.

10. For all bearers except for an SRB0 corresponding to the MCG (MCG terminated RBs), an integrity protection and verification procedure may be resumed by applying the updated security keys and a previously configured algorithm, and integrity verification and protection may be applied to a plurality of pieces of data to be subsequently transmitted and received (in order to improve the reliability and security of data subsequently transmitted and received via the SRB1 or DRBs).

11. For all the bearers except for the SRB0 corresponding to the MCG (MCG terminated RBs), a ciphering and deciphering procedure may be resumed by applying the updated security keys and the previously configured algorithm, and ciphering and deciphering may be applied to a plurality of pieces of data to be subsequently transmitted and received (in order to improve the reliability and security of data subsequently transmitted and received via the SRB1 or DRBs).

12. When the UE receives the SCG-counter value (or sk-counter) in the RRCRelease message, the UE may resume an integrity protection and verification procedure by applying the updated security keys and the previously configured algorithm for all bearers corresponding to the SCG (SCG terminated RBs), and may apply integrity verification and protection to a plurality of pieces of data to be subsequently transmitted and received (in order to improve the reliability and security of data subsequently transmitted and received via the DRBs).

13. When the UE receives the SCG-counter value (or sk-counter) in the RRCRelease message, the UE may resume a ciphering and deciphering procedure by applying the updated security keys and the previously configured algorithm for all the bearers corresponding to the SCG (SCG terminated RBs) and may apply ciphering and deciphering to a plurality of pieces of data to be subsequently transmitted and received (in order to improve the reliability and security of data subsequently transmitted and received via the DRBs).

As described above, when the UE 1g-01 needs to configure a connection, and performs a random access procedure, transmits the RRCResumeRequest message to the BS 1g-02, and then receives the RRCResume message as a response thereto (1g-35), the UE 1g-01 performs operations below. When the RRCResume message includes an indicator indicating the UE 1g-01 to report when there is a valid frequency measurement result obtained in the RRC inactive mode, the UE 1g-01 may configure a frequency measurement result in an RRCResumeComplete message and may report the frequency measurement result. Also, the BS 1g-02 may transmit, to the UE 1g-01, the RRC message (RRCResume) including the indicator or the configuration information indicating whether to discard or release, or maintain and apply, or reconfigure the SCell configuration information of the MCG or the SCG (e.g., a plurality of pieces of configuration information described or proposed with reference to FIG. 1F) stored in the UE 1g-01.

1. When receiving the message, the UE restores a PDCP state corresponding to the MCG, resets a COUNT value, and re-establishes PDCP layers of an SRB2 and all DRBs (MCG terminated RBs) corresponding to the MCG.

2. When receiving the SCG-counter value (or sk-counter) in the message, the UE updates a new SKgNB security key corresponding to the SCG based on a KgNB security key and the SCG-counter value (sk-counter). The UE derives new security keys (SK_RRCenc, SK_RRC_int, SK_UPint, and SK_UPenc) to be used in an integrity protection and verification procedure and a ciphering and deciphering procedure, by using the newly updated SKgNB security keys corresponding to the SCG.

3. When the message includes MCG (maserCellgroup) configuration information

A. the MCG configuration information included in the message is performed and applied. The MCG information may include configuration information about RLC layers belonging to the MCG, a logical channel identifier, and a bearer identifier.

4. When the message includes bearer configuration information (radioBearerConfig)

A. the bearer configuration information (radioBearerConfig) included in the message is performed and applied. The bearer configuration information (radioBearerConfig) may include configuration information about PDCP layers for each bearer, configuration information about SDAP layers, a logical channel identifier, and a bearer identifier.

5. When the message includes SCG (masterCellgroup) configuration information

A. the SCG configuration information included in the message is performed and applied. The SCG information may include configuration information about RLC layers belonging to the SCG, a logical channel identifier, and a bearer identifier.

6. When the message includes secondary bearer configuration information (radioBearerConfig)

A. the secondary bearer configuration information (radioBearerConfig) included in the message is performed and applied. The secondary bearer configuration information (radioBearerConfig) may include configuration information about PDCP layers for each secondary bearer, configuration information about SDAP layers, a logical channel identifier, and a bearer identifier.

7. The UE resumes the SRB2 and all the DRBs (MCG terminated RBs) corresponding to the MCG.

8. When the message includes frequency measurement configuration information (measConfig)

A. the frequency measurement configuration information included in the message is performed and applied. That is, frequency measurement may be performed according to the configuration.

9. The UE is transitioned to the RRC connected mode.

10. The UE indicates a higher layer that a suspended RRC connection has been resumed.

11. Then, the UE configures and transmits the RRCResumeComplete message to a lower layer (1g-40).

When the UE 1g-01 has bearer configuration information and UE context information for a suspended SCG, the UE 1g-01 may perform frequency measurement based on the system information or the frequency configuration information configured in the RRCRelease message or the RRCResume message, and when there is a valid result, in order to indicate that there is the valid result, the UE 1g-01 may transmit the RRCResumeComplete message including the indicator. When the BS 1g-02 receives the indicator, if carrier aggregation or dual connectivity needs to be resumed, the BS 1g-02 may indicate the UE 1g-01 to report the frequency measurement result (1g-45) and may receive the frequency measurement result, or may receive a report of the frequency measurement result in the RRCResumeComplete message (1g-50). When the BS 1g-02 receives the frequency measurement result, the BS 1g-02 may ask the secondary cell BS whether to resume bearer information for the suspended SCG, may perform determination by receiving a response thereto, and may transmit an RRCReconfiguration message to the UE 1g-01 (1g-60) to indicate whether to resume or release bearers for the SCG. Also, the BS 1g-02 may transmit, to the UE 1g-01, the RRC message (e.g., RRCReconfiguration) including the indicator or the configuration information indicating whether to discard or release, or maintain and apply, or reconfigure the SCell configuration information (e.g., a plurality of pieces of configuration information described or proposed with reference to FIG. 1F) of the MCG or the SCG stored in the UE 1g-01.

1> When only one cell group (e.g., SCG) configuration information is configurable for the UE (e.g., if the UE can have MCG configuration information and one SCG configuration information), the UE may apply cell group configuration information or apply dual connectivity according to an indicator of an RRCResume message.

n 2> When the RRCResume message includes new cell group (e.g., SCG) configuration information without an indicator indicating to recover a cell group, the UE may release stored cell group (e.g., SCG) configuration information and may apply the cell group configuration information included in the RRCResume message and may use dual connectivity.

n 2> When the RRCResume message includes new cell group (e.g., SCG) configuration information with an indicator indicating to recover a cell group, the UE may recover stored cell group (e.g., SCG) configuration information and may add the cell group configuration information included in the RRCResume message to existing cell group configuration information or may reconfigure the cell group configuration information to the existing cell group configuration information (delta configuration), and may use dual connectivity, based on the added or reconfigured cell group configuration information. In the above case, when the RRCResume message includes the new cell group (e.g., SCG) configuration information with the indicator indicating to recover a cell group, but the new cell group configuration information does not have configuration information for a bearer or a protocol layer, the UE may recover the stored cell group (e.g., SCG) configuration information and may use dual connectivity, based on the recovered cell group configuration information.

1> When a plurality of pieces of cell group (e.g., SCGs) configuration information are configurable for the UE (e.g., if the UE can have MCG configuration information and a plurality of pieces of SCG configuration information), the UE may apply cell group configuration information or apply dual connectivity according to an indicator of an RRCResume message.

2> When the RRCResume message includes new cell group (e.g., SCG) configuration information without an indicator indicating to recover a cell group, the UE may release all stored cell group (e.g., SCG) configuration information and may apply the cell group configuration information included in the RRCResume message and may use dual connectivity. In another method, the RRCResume message may include an indicator or a list or a cell group identifier for releasing a cell group, and thus, may indicate which cell group configuration information is to be released or recovered from among a plurality of pieces of stored cell group configuration information.

2> When the RRCResume message includes new cell group (e.g., SCG) configuration information with an indicator indicating to recover a cell group or includes cell group identifier information or cell group state information to be recovered (or applied or activated or resumed), the UE may recover the indicated cell group configuration information from among the plurality of pieces of stored cell group (e.g., SCG) configuration information and may add the cell group configuration information included in the RRCResume message to existing cell group configuration information or may reconfigure the cell group configuration information to the existing cell group configuration information (delta configuration), and may use dual connectivity, based on the added or reconfigured cell group configuration information. In the above case, when the RRCResume message includes the new cell group (e.g., SCG) configuration information with the indicator indicating to recover a cell group or includes cell group identifier information or cell group state information to be recovered (or applied or activated or resumed) or includes the new cell group configuration information which does not have configuration information for a bearer or a protocol layer, the UE 1g-01 may recover the indicated cell group configuration information from among the plurality of pieces of stored cell group (e.g., SCG) configuration information and may use dual connectivity, based on the recovered cell group configuration information.

In Embodiment 1 of FIG. 1G, in the SCell configuration information (e.g., a plurality of pieces of configuration information described or proposed with reference to FIG. 1F) or the PSCell (or SCell) configuration information of the cell group (e.g., SCG) of the RRC message (e.g., RRCRelease, RRCResume, or RRCReconfiguartion), the BS 1g-02 may allow a first active BWP of DL or UL BWP configuration information of each cell to be configured as a dormant BWP, and when the UE activates each SCell or the PSCell of each cell group (SCG), the BS 1g-02 may allow the UE 1g-01 to directly operate a DL BWP or a UL BWP of each SCell or the PSCell as the dormant BWP, or to suspend or resume the cell group, such that battery consumption of the UE 1g-01 may be reduced. For example, for each SCell or each PSCell, when a SCell state is configured as the active state, or a cell group state is configured as the active state, or the suspended state, or the deactivated state, or an indication to suspend or resume the cell group is configured in the SCell configuration information or the cell group configuration information of the RRC message (e.g., RRCRelease or RRCResume or RRCReconfiguartion), or when an indication to activate the SCell is received in MAC control information according the disclosure, the SCell or the PSCell may be activated or resumed or suspended, and the DL BWP or the UL BWP of the SCell or PSCell may be directly activated when the SCell or the PSCell is activated, such that battery consumption of the UE 1g-01 may be reduced.

When the UE 1g-01 in the RRC inactive mode is transitioned to the RRC connected mode and recovers or applies or reconfigures the SCell configuration information or the PSCell (or SCell) configuration information of the cell group (e.g., SCG) of the disclosure, according to an embodiment of the disclosure, switching or activation between BWPs or activation or application of a dormant BWP may be performed on each activated SCell or PSCell (or SCell) of the cell group. Also, Embodiment 1 of the disclosure may be extended applied even when handover is performed.

The BS 1g-02 and the UE 1g-01 may perform data transmission and reception based on an RRCReconfiguration message transmitted from the BS 1g-02 to the UE 1g-01 (1g-65).

In the disclosure, when the UE receives an indicator indicating to suspend or resume or activate or deactivate a cell group or a PSCell of the cell group by MAC control information of FIG. 1H, a PHY layer or a MAC layer receiving the indication may transmit the indication to a higher layer (e.g., MAC layer or RLC layer or PDCP layer or RRC layer). When the higher layer receives the indication (e.g., to suspend or resume or activate or deactivate the cell group) from the lower layer, the higher layer may perform a corresponding procedure of a protocol layer for cell group suspension or resumption or activation or deactivation.

Alternatively, as in Embodiment 1 of the disclosure, when the UE receives an indicator indicating to suspend or resume or activate or deactivate a cell group or a PSCell of the cell group by an RRC message, an RRC layer receiving the indication may transmit the indication to a lower layer (e.g., PHY layer or MAC layer or RLC layer or PDCP layer). When the lower layer receives the indication (e.g., to suspend or activate or deactivate the cell group) from the higher layer (e.g., RRC layer), the lower layer may perform a corresponding procedure of a protocol layer for cell group suspension or resumption or activation or deactivation.

Various embodiments may be configured and operated by combining or extending embodiments proposed in the disclosure.

FIG. 1H is a diagram illustrating MAC control information indicating state transition to an active state (or resumed state) or a dormant state (or suspended state) or an inactive state for a cell or a cell of a cell group, according to an embodiment of the disclosure.

Referring to FIG. 1H, an active and inactive MAC CE according to the disclosure may have a structure of FIG. 1H, and may be divided into a MAC CE structure 1h-05 having a size of 1 byte supporting 7 Scells and a MAC CE structure 1h-10 having a size of 4 bytes supporting 31 Scells. Also, it has characteristics below.

UE operations when a hibernation MAC CE is not received and only an active and inactive MAC CE is received are as below.

Each field of the active and inactive MAC CE indicates each S cell identifier, and a value corresponding to each field indicates whether the S cell is activated or deactivated. When a value of an indicator for a Scell indicated by a Scell identifier is 1, the Scell is activated when the state of the S cell is the inactive state. However, when the state of the Scell is not the inactive state, the indicator value is ignored. When the value of the indicator for the Scell indicated by the Scell identifier is 0, the Scell is deactivated. That is, when the value of the indicator for the Scell is 0, the Scell is deactivated regardless of the state of the Scell.

Also, a new MAC CE may be designed or an existing MAC CE function may be extended to support embodiments of the disclosure and extend to various embodiments.

For example, MAC CEs proposed and described with reference to FIG. 1H may be applied, and the functions described with reference to FIG. 1H may be extended and applied by extending a reserved bit (R bit) in 1h-05 or 1h-10 of FIG. 1H.

For example, when the reserved bit (e.g., R field) is configured as 0 (or 1), a 1-bit indicator (e.g., C field) indicating the identifier of each cell (SCell) may be defined and used as follows. In another method, when the reserved bit (e.g., R field) is configured as 0 (or 1), it may mean an indication to deactivate or suspend the cell group (e.g., SCG). For example, the cell or the BWP or the cell group in the inactive or suspended state may be transitioned to the inactive state or may be maintained, and the cell or the BWP or the cell group in the active state (or resumed state) may be transitioned to the inactive state. The indicator may be indicated to a higher layer.

When the 1-bit indicator is configured as 0 (or 1), state transition for each cell (e.g., SCell or SCell of MCG or SCG) or the BWP may be performed as below.

The cell or the BWP in the inactive state is transitioned to the inactive state or is maintained The cell or the BWP in the active state is transitioned to the inactive state When the 1-bit indicator is configured as 1, state transition for each cell (e.g., SCell or SCell of the MCG or the SCG) may be performed as below.

The cell or the BWP in the active state is transitioned to the active state or is maintained The cell or the BWP in the inactive state is transitioned to the active state When the reserved bit (R bit) is configured as 1 (or 0), the 1-bit indicator indicating the identifier of each cell (SCell) may be defined and used as below. In another method, a logical identifier may be newly defined, a new MAC CE may be defined and may be defined and used as below. In another method, when the reserved bit (e.g., R field) is configured as 1 (or 0), it may mean an indication to activate or resume the cell group (e.g., SCG). For example, the cell or the BWP or the cell group in the active or resumed state may be transitioned to the active state or may be maintained, and the cell or the BWP or the cell group in the inactive state (e.g., suspended state) may be transitioned to the active state. The indicator may be indicated to a higher layer.

When the 1-bit indicator is configured as 0 (or 1), state transition for each cell (e.g., SCell or SCell of the MCG or the SCG) or the BWP may be performed as below.

The cell or the BWP in the inactive state is transitioned to the inactive state or is maintained The cell or the BWP in the active state is transitioned to the inactive state When the 1-bit indicator is configured as 1, state transition for each cell (e.g., SCell or SCell of the MCG or the SCG) or the BWP may be performed as below.

The cell or the BWP in the active state is transitioned to the active state or is maintained The cell or the BWP in the inactive state is transitioned to the active state In the above case, for example, the function of the MAC CE may be variously extended and designed to indicate state transition or switching of a cell or a BWP, and may be applied to various embodiments of the disclosure. For example, new MAC control information may be designed, and a cell group identifier or a cell identifier or a BWP identifier or bitmap information may be included in the MAC control information so as to indicate activation (resumption) or hibernation (or suspension) or deactivation (or suspension) of a cell group or a cell or a BWP.

In the disclosure, hereinafter, a procedure for reporting a power headroom will now be described.

In the disclosure, Embodiment 1 of reporting a power headroom is as below.

In Embodiment 1 of the disclosure, a power headroom reporting procedure may be used to provide the following information to a BS (serving gNB) that services a UE. In the above case, a power headroom may indicate a difference between maximum transmit power (or calculated or nominal maximum transmit power) transmittable by the UE on each activated serving cell (PCell or SCell or PSCell or SPCell) and power measured for UL data transmission (UL-SCH) or SRS transmission, or may indicate a difference between maximum transmit power transmittable by the UE and power measured for PUCCH transmission and UL data transmission on an SPCell (PCell or PSCell) of another MAC layer (e.g., LTE MAC or E-UTRA MAC). According to the power headroom reporting procedure, the UE may configure a power headroom value in MAC control information and transmit the MAC control information on a UL transmission resource, thereby reporting to the BS.

A type 1 power headroom is a difference between maximum transmit power (or calculated or nominal maximum transmit power) transmittable by the UE on each activated serving cell (PCell, SCell, PSCell, or SPCell) and power measured for UL data transmission (UL-SCH), and may be reported.

A type 2 power headroom is a difference between maximum transmit power (or calculated or nominal maximum transmit power) transmittable by the UE and power measured for PUCCH transmission or UL data transmission (UL-SCH) on the SpCell (PCell or PSCell) of another MAC layer (e.g., when dual connectivity is configured, LTE MAC or E-UTRA MAC), and may be reported.

A type 3 power headroom is a difference between maximum transmit power (or calculated or nominal maximum transmit power) transmittable by the UE on each activated serving cell (PCell, SCell, PSCell, or SpCell) and power measured for SRS transmission, and may be reported.

The UE may receive configuration information for power headroom reporting by an RRC message (e.g., RRCReconfiguration), and an RRC layer may adjust a power headroom reporting procedure by using parameters below.

Timer value (phr-PeriodicTimer) for periodically reporting a power headroom; for example, when a periodic power headroom reporting timer expires, the power headroom reporting procedure may be triggered.

Timer value (phr-ProhibitTimer) for prohibiting power headroom reporting: For example, when a power headroom reporting prohibit timer is running, the power headroom reporting procedure is not triggered.

Threshold value (phr-Tx-PowerFactorChange) for triggering power headroom reporting;

Indicator (phr-Type2OtherCell) indicating type 2 power headroom reporting considering another cell or MAC layer;

Indicator (phr-ModeOtherCG) indicating power headroom reporting considering another cell group;

Indicator (multiplePHR) indicating multiple power headroom reports.

The parameters may be configured by the RRC message (e.g., RRCReconfiguration) as shown in FIG. 1F.

The power headroom reporting procedure may be triggered when one event occurs or one condition is satisfied from among conditions below.

When the power headroom reporting prohibit timer (phr-ProhibitTimer) expires or has expired, and pathloss is changed by a threshold value (phr-Tx-PowerFactorChange) dB configured by the RRC message for at least one activated serving cell of a certain MAC layer, the UE triggers the power headroom reporting procedure. The pathloss may be used as a pathloss reference value when a MAC layer has (or receives) a UL transmission resource for new transmission after a power headroom last transmitted by the MAC layer.

When the periodic power headroom reporting timer expires, the UE may trigger the power headroom reporting procedure.

When a power headroom reporting function is configured or reconfigured by a higher layer (e.g., RRC layer), the UE may trigger the power headroom reporting procedure. The configuration or reconfiguration may not be used to deactivate the power headroom reporting function.

When a certain cell for which a UL of a certain MAC layer is configured is activated, the UE may trigger the power headroom reporting procedure.

When a PSCell is added or newly added or modified (or when dual connectivity is configured, and a PSCell of an SCG is newly added or modified), the UE may trigger the power headroom reporting procedure.

When the power headroom reporting prohibit timer (phr-ProhibitTimer) expires or has expired, and a MAC layer has (or receives) an UL transmission resource for new transmission, if the following condition is true or satisfied for a certain activated serving cell for which a UL of a certain MAC layer is configured, the UE may trigger the power headroom reporting procedure.

When there is a UL transmission resource allocated for PUCCH transmission or transmission on the cell, and the MAC layer has a UL resource for PUCCH transmission or transmission on the cell, if power backoff required for power management (e.g., to reduce interference of another frequency or avoid harm to human body) for the cell after a last transmitted power headroom is changed by a threshold value (phr-Tx-Power-FactorChange) dB configured in the RRC message, the UE may trigger the power headroom reporting procedure.

According to an embodiment of the disclosure, it is proposed that, when one or more events occurs or one or more conditions are satisfied from among the conditions proposed above and thus the power headroom reporting procedure is triggered, a MAC layer operates in a manner below.

When the MAC layer has or receives a UL allocated for new transmission, the MAC layer may operate as below.

1> When the UL transmission resource after a last MAC reset procedure is a first UL transmission resource allocated for new transmission,
 2> the periodic power headroom reporting timer for periodically reporting a power headroom starts.
1> When it is decided (or determined) that a power headroom or a power headroom reporting procedure has been triggered and has not been cancelled, and
1> when the allocated UL transmission resource may include MAC control information (MAC CE or MAC control element) or its subheader (e.g., MAC subheader) for power headroom reporting configured to be transmitted by the MAC layer or may be transmitted on the transmission resource as a result of a logical channel prioritization (LCP) procedure (e.g., procedure of allocating a UL transmission resource to data or MAC control information),
 2> when an indicator (multiplePHR) indicating multiple power headroom reportings is configured as TRUE (or configured to report),
  3> for each activated serving cell connected to a certain MAC layer, or configured in a certain MAC layer and configured with a UL
   4> a value of a type 1 power headroom or a type 3 power headroom for a UL carrier (or frequency) corresponding to the cell is obtained (or calculated).
   4> When the MAC layer has or receives a UL transmission resource allocated for transmission on the serving cell,
   4> alternatively, when another MAC layer is configured, the other MAC layer has or receives a UL transmission resource allocated for transmission on the serving cell, and an indicator (phr-ModeOtherCG) indicating power headroom reporting considering another cell group by a higher layer (RRC layer) is configured as Real (or configured to report as a real value),
   5> a maximum transmit power value (or power value required for power headroom calculation) corresponding to the serving cell is obtained from a PHY layer.
  3> When an indicator (phr-Type2OtherCell) indicating type 2 power headroom reporting considering another cell or MAC layer is configured as TRUE (or is configured to report);
   4> when another MAC layer is an E-UTRA MAC layer,
    5> a value for type 2 power headroom reporting for a SpCell of the other MAC layer is obtained (or calculated).
   5> When an indicator (phr-ModeOtherCG) indicating power headroom reporting considering another cell group by a higher layer (RRC layer) is configured as Real (or is configured to report as a real value),
    6> a maximum transmit power value (or power value required for power headroom calculation) for a SPCell of the other MAC layer (E-UTRA MAC layer) is obtained from a PHY layer.
  3> A multiplexing and reassembly procedure (multiplexing and assembly procedure of the MAC layer) for generating and transmitting MAC control information reporting a plurality of power headrooms based on values reported from a PHY layer is indicated.
 2> When an indicator (multiplePHR) indicating multiple power headroom reportings is not configured as TRUE (or is not configured to report), or when one power headroom reporting is indicated, or when one power headroom reporting format is used,
  3> a type 1 power headroom value for a UL carrier (or frequency) of the serving cell (or PCell) is obtained (or calculated) from a PHY layer.
  3> A maximum transmit power value (or power value required for power headroom calculation) for the serving cell (or PCell) is obtained from a PHY layer.
  3> A multiplexing and reassembly procedure (multiplexing and assembly procedure of the MAC layer) for generating and transmitting MAC control information reporting one power headroom based on values reported from a PHY layer is indicated.
 2> The timer for periodically reporting a power headroom starts or restarts.
 2> The timer for prohibiting power headroom reporting starts or restarts.
 2> All triggered power headrooms or power headroom reporting procedures are cancelled.

According to the power headroom reporting procedure proposed in the disclosure, the UE reports a power headroom to the BS for each cell, such that the BS may adjust or manage UL transmit power of the UE. However, in a case of a cell (SCell) or a serving cell in which a dormant BWP according to the disclosure is configured, or a suspended (or deactivated) cell group or cell, when a current or activated BWP (or DL BWP) of an activated serving cell is a dormant BWP, or when it is activated to a BWP indicated by a dormant BWP indicator, or when a cell group is a suspended (or deactivated) cell (e.g., PSCell or SCell), even if a power headroom is reported, UL data transmission or PUCCH transmission is impossible on the dormant BWP or the suspended (or deactivated) cell group or cell, and thus, the UE performs unnecessary power headroom reporting.

Accordingly, in the disclosure, in order to reduce unnecessary processing load on the UE and prevent waste of a transmission resource due to unnecessary power headroom reporting, the UE may first determine whether a cell is activated or deactivated, and may perform a procedure for determining, for an activated cell, whether an activated BWP (e.g., DL BWP) of the activated cell is a dormant BWP (or BWP having a dormant BWP identifier configured in the RRC message) or is not a dormant BWP (or not a BWP having a dormant BWP identifier configured in the RRC message), or whether a cell group or cell (e.g., PSCell) is suspended (or deactivated) or activated (or resumed). In another method, the UE may first determine whether a cell is activated or deactivated, and may perform a procedure for determining, for an activated cell when a dormant BWP is configured (e.g., when a dormant BWP identifier is configured for the cell in the RRC message), whether an activated BWP (e.g., DL BWP) of the activated cell is a dormant BWP (or BWP having a dormant BWP identifier configured in the RRC message) or is not a dormant BWP (or not a BWP having a dormant BWP identifier configured in the RRC message), and for a cell in which a dormant BWP is not configured, the procedure for identifying an activated BWP may be omitted (or may not be performed).

In a case of a cell (SCell) or a serving cell in which a dormant BWP is configured in the identifying procedure, when a current or activated BWP (or DL BWP) of an activated serving cell is a dormant BWP, or when it is activated to a BWP indicated by a dormant BWP identifier, or when a cell group or a cell (e.g., PSCell or SCell) is suspended (or deactivated), the power headroom reporting procedure may not be triggered, and even if the power headroom reporting procedure is triggered by another cell, a power headroom for the cell may not be reported. In another method, in a case of a cell (SCell) or a serving cell in which a dormant BWP is configured, only when a current or activated BWP (or DL BWP) of an activated serving cell is not a dormant BWP, or when it is not activated to a BWP indicated by a dormant BWP identifier, or when a cell group or a cell (e.g., PSCell or SCell) is not suspended (or is not deactivated, or is activated, or is resumed), the power headroom reporting procedure may be triggered, and alternatively, even if the power headroom reporting procedure is triggered by another cell, only when a current or activated BWP (or DL BWP) of an activated serving cell is not a dormant BWP, or when it is not activated to a BWP indicated by a dormant BWP identifier, or when a cell group or a cell (e.g., PSCell or SCell) is not suspended (or not deactivated, or is activated, or is resumed), a power headroom may be reported. Accordingly, the procedure proposed in the disclosure may reduce unnecessary processing load, and may prevent a transmission resource from being wasted due to unnecessary power headroom reporting. A particular embodiment of the proposed procedure will now be described in Embodiment 2 of the disclosure in which a dormant BWP below is considered.

In Embodiment 2 of the disclosure in which the dormant BWP below is considered, a power headroom reporting procedure may be used to provide the following information to the BS (serving gNB) that services the UE. A power headroom may indicate a difference between maximum transmit power (or calculated or nominal maximum transmit power) transmittable by the UE on each activated serving cell (PCell or SCell or PSCell or SPCell) and power measured for UL data transmission (UL-SCH) or SRS transmission, or may indicate a difference between maximum transmit power transmittable by the UE and power measured for PUCCH transmission and UL data transmission on an SPCell (PCell or PSCell) of another MAC layer (e.g., LTE MAC or E-UTRA MAC). The power headroom may be reported to the BS by configuring a power headroom value in MAC control information by the power headroom reporting procedure and transmitting the MAC control information on a UL transmission resource.

A type 1 power headroom is a difference between maximum transmit power (or calculated or nominal maximum transmit power) transmittable by the UE on each activated serving cell (PCell or SCell or PSCell or SpCell) and power measured for UL data transmission (UL-SCH), and may be reported.

A type 2 power headroom is a difference between maximum transmit power (or calculated or nominal maximum transmit power) transmittable by the UE and power measured for PUCCH transmission or UL data transmission (UL-SCH) on another MAC layer (e.g., when dual connectivity is configured, LTE MAC or E-UTRA MAC), and may be reported.

A type 3 power headroom is a difference between maximum transmit power (or calculated or nominal maximum transmit power) transmittable by the UE on each activated serving cell (PCell or SCell or PSCell or SpCell) and power measured for SRS transmission, and may be reported.

Embodiment 2 of a procedure for reporting a power headroom considering a dormant BWP according to the disclosure is as below.

In Embodiment 2 of the disclosure, the UE may receive configuration information for power headroom reporting by an RRC message (e.g., RRCReconfiguration), and an RRC layer may adjust a power headroom reporting procedure by using parameters below.

Timer value (phr-PeriodicTimer) for periodically reporting a power headroom; for example, when a periodic power headroom reporting timer expires, the power headroom reporting procedure may be triggered.

Timer value (phr-ProhibitTimer) for prohibiting power headroom reporting: For example, when a power headroom reporting prohibit timer is running, the power headroom reporting procedure is not triggered.

Threshold value (phr-Tx-PowerFactorChange) for triggering power headroom reporting;

Indicator (phr-Type2OtherCell) indicating type 2 power headroom reporting considering another cell or MAC layer;

Indicator (phr-ModeOtherCG) indicating power headroom reporting considering another cell group;

Indicator (multiplePHR) indicating multiple power headroom reports.

A cell group state indicator (e.g., an indicator indicating whether a cell group state is activated or inactivated or suspended).

An indicator indicating whether to trigger a power headroom on a cell group.

The parameters may be configured by the RRC message (e.g., RRCReconfiguration) as shown in FIG. 1F of the disclosure.

In Embodiment 2 of a procedure for reporting a power headroom considering a dormant BWP according to the disclosure, the power headroom reporting procedure may be triggered when one event occurs or one condition is satisfied from among conditions below.

When the power headroom reporting prohibit timer (phr-ProhibitTimer) expires or has expired, a BWP (or DL BWP) of an activated serving cell of a certain MAC layer is activated, and pathloss is changed by a threshold value (phr-Tx-PowerFactorChange) dB configured by the RRC message for at least one activated serving cell in which an activated BWP (or DL BWP) is not a dormant BWP or an activated BWP (or DL BWP) or a current BWP (or activated current DL BWP) of an activated serving cell is not a dormant BWP, the UE may trigger the power headroom reporting procedure. The pathloss may be used as a pathloss reference value when a MAC layer has (or receives) a UL transmission resource for new transmission after a power headroom last transmitted by the MAC layer.

When the periodic power headroom reporting timer expires, the UE may trigger the power headroom reporting procedure.

When a power headroom reporting function is configured or reconfigured by a higher layer (e.g., RRC layer), the UE may trigger the power headroom reporting procedure. The configuration or reconfiguration may not be used to deactivate the power headroom reporting function.

When a certain cell for which a UL of a certain MAC layer is configured is activated and a first active DL BWP (or first active DL BWP identifier (firstActive-DownlinkBWP-Id)) configured on the cell is not configured as a dormant BWP, the UE may trigger the power headroom reporting procedure.

When a PSCell or a cell group or a cell is added or newly added or modified (or when dual connectivity is configured and a PSCell of an SCG is newly added or modified), or when the PSCell or the cell group or the cell is activated or resumed, the UE may trigger the power headroom reporting procedure.

In another method, when a PSCell or a cell group or a cell, which is in an active state, is added or newly added or modified (e.g., when, in an RRC message, a cell group state is configured as the active state or the cell group is not configured as an inactive state or an indicator (or an indicator (e.g., ReconfigurationWithSync) to trigger a random access) indicating to activate the cell group is included), the UE may trigger the power headroom reporting procedure. For example, when dual connectivity is configured and a PSCell of SCG, which is in an active state, is newly added or modified (e.g., when a cell group state is configured as an active state or the cell group is not configured as an inactive state or an indicator indicating to activate the cell group is included) or when the PSCell or the cell group or the cell is activated, the UE may trigger the power headroom reporting procedure. Therefore, when a PSCell or a cell group or a cell, which is in an inactive state, is added or newly added or modified (e.g., when, in an RRC message, a cell group state is configured as the inactive state or the cell group is not configured as an active state or an indicator indicating to activate the cell group is not included), the UE may trigger the power headroom reporting procedure.

In another method, when a PSCell or a cell group or a cell is activated (e.g., when, by DCI of a PDCCH or MAC control information or an RRC message from a BS, a cell group state is configured as an active state or the cell group is not configured as an inactive state or an indicator (or an indicator to trigger a random access) indicating to activate the cell group is included), the UE may trigger the power headroom reporting procedure.

In another method, when a PSCell or a cell group or a cell is activated from an inactive state (or a suspended state or a dormant state) (e.g., when a cell group state is configured as an active state or the cell group is not configured as an inactive state or an indicator (or an indicator to trigger a random access) indicating to activate the cell group is included), the UE may trigger the power headroom reporting procedure. For example, in a case where the PSCell or the cell group or the cell is in an inactive state or a suspended state and then is activated from the inactive state (or a suspended state or a dormant state) by receiving, from the BS by DCI of a PDCCH or MAC control information or an RRC message, an indication indicating to activate the PSCell or the cell group or the cell, the UE may trigger the power headroom reporting procedure. By doing so, it is possible to prevent a power headroom reporting procedure from being unnecessarily triggered when the PSCell or the cell group or the cell in the active state is reactivated. That is, when the PSCell or the cell group or the cell is in the active state, if the UE receives an indication indicating to activate the PSCell or the cell group or the cell from the BS by DCI of a PDCCH or MAC control information or an RRC message, the UE may not unnecessarily trigger the power headroom reporting procedure.

In another method, when a PSCell is added or newly added or modified (or when dual connectivity is configured or a PSCell of an SCG is newly added or modified), or when the PSCell or the cell group or the cell is activated or resumed, if a first active DL BWP (or first active DL BWP identifier (firstActiveDownlinkBWP-Id)) configured on the cell is not configured as a dormant BWP, the UE may trigger the power headroom reporting procedure.

When the power headroom reporting prohibit timer (phr-ProhibitTimer) expires or has expired, and a MAC layer has (or receives) an UL transmission resource for new transmission, if a condition below is true or satisfied for a certain activated serving cell for which a UL of a certain MAC layer is configured, the power headroom reporting procedure may be triggered.

According to the condition, when there is a UL transmission resource allocated for PUCCH transmission or transmission on the cell, and the MAC layer has a UL resource for PUCCH transmission or transmission on the cell, if power backoff required for power management (e.g., to reduce interference of another frequency or avoid harm to human body) for the cell after a last transmitted power headroom is changed by a threshold value (phr-Tx-PowerFactorChange) dB configured in the RRC message, the UE may trigger the power headroom reporting procedure.

When a UL BWP is activated (or when activated to a first active UL BWP), or when a DL BWP (or activated BWP or current BWP (or DL BWP)) of a certain activated SCell configured with a UL in a certain MAC layer is switched or activated from a dormant BWP to a normal BWP (or non-dormant BWP), or a non-dormant BWP first activated from dormancy configured in the RRC message (BWP indicated by firstActiveNonDormantDownlinkBWP-Id or BWP indicated by an identifier of the non-dormant BWP), the UE may trigger the power headroom reporting procedure.

When a DL BWP (or activated BWP or current BWP (or DL BWP)) of a certain activated SCell configured with a UL in a certain MAC layer is activated to a BWP indicated by a BWP identifier (firstOutsideActiveTimeBWP-Id or firstWithinActiveTimeBWP-Id) first activated from dormancy configured by the RRC message, the UE may trigger the power headroom reporting procedure. The activation of the BWP may be indicated by DCI of a PDCCH.

When a UL BWP is activated (or when activated to a first active UL BWP), or when a DL BWP (or activated BWP or current BWP (or DL BWP)) of a certain activated SCell configured with the UL in a certain MAC layer is switched or activated from a dormant BWP to a normal BWP (or non-dormant BWP) or a non-dormant BWP first activated from dormancy configured by the RRC message (BWP indicated by firstActiveNonDormantDownlinkBWP-Id, firstOutsideActiveTimeBWP-Id, or firstWithinActiveTimeBWP-Id, or a BWP indicated by an identifier of the non-dormant BWP), or when first SRS configuration information or second SRS configuration information is configured (or when an activated BWP (or DL BWP) of an activated serving cell or a current BWP (or activated current DL BWP) is the dormant BWP and the first SRS configuration information or the second SRS configuration information is configured), the UE may trigger the power headroom reporting procedure.

When the power headroom reporting prohibit timer (phr-ProhibitTimer) expires or has expired, a BWP (or DL BWP) of an activated serving cell of a certain MAC layer is activated, and an activated BWP (or DL BWP) is not a dormant BWP, or when an activated BWP (or DL BWP) or a current BPW (or activated current BWP) of an activated serving cell is not a dormant BWP, or when first SRS configuration information or second SRS configuration information is configured (or when an activated BWP (or DL BWP) or a current BWP (or activated current DL BWP) of an activated serving cell is a dormant BWP and first SRS configuration information or second SRS configuration information is configured), if pathloss is changed by a threshold value (phr-Tx-Pow erFactorChange) dB configured in the RRC message for at least one activated serving cell, the UE triggers the power headroom reporting procedure. The pathloss may be used as a pathloss reference value when a MAC layer has (or receives) a UL transmission resource for new transmission after a last transmitted power headroom in the MAC layer.

The disclosure proposes that, when one or more events occur or one or more conditions are satisfied from among the conditions and thus the power headroom reporting procedure is triggered, a MAC layer operates in a manner below.

When the MAC layer has or receives a UL allocated for new transmission, the MAC layer operates in a manner below.

1> When the UL transmission resource after a last MAC reset procedure is a first UL transmission resource allocated for new transmission,
2> the periodic power headroom reporting timer for periodically reporting a power headroom starts.
1> When it is decided (or determined) that the power headroom reporting procedure has been triggered and has not been cancelled, and
1> when the allocated UL transmission resource may include MAC control information (MAC CE or MAC control element) or its subheader (e.g., MAC subheader) for power headroom reporting configured to be transmitted by the MAC layer or may be transmitted on the transmission resource as a result of an LCP procedure (e.g., procedure of allocating a UL transmission resource to data or MAC control information),
2> when an indicator (multiplePHR) indicating multiple power headroom reports is configured as TRUE (or configured to report)
3> for each activated serving cell connected to a certain MAC layer, or configured for a certain MAC layer and configured with a UL
3> when a BWP (or DL BWP) of the activated serving cell is activated and an activated BWP (or DL BWP) is not a dormant BWP, or when an activated BWP (or DL BWP) or a current BWP (or activated current DL BWP) of the activated serving cell is not a dormant BWP, or when the cell group or cell (e.g., PSCell) is not suspended or is not deactivated,
3> alternatively, when a BWP (or DL BWP) of the activated serving cell is activated and an activated BWP (or DL BWP) is not a dormant BWP, or when an activated BWP (or DL BWP) or a current BWP (or activated current DL BWP) of the activated serving cell is not a dormant BWP, or when the cell group or cell (e.g., PSCell) is not suspended or is not deactivated, or when first SRS configuration information or second SRS configuration information is configured (or when an activated BWP (or DL BWP) or current BWP (or activated current DL BWP of the activated serving cell is a dormant BWP and first SRS configuration information or second SRS configuration information is configured),
4> a value of a type 1 power headroom or a type 3 power headroom for a UL carrier (or frequency) corresponding to the cell is obtained (or calculated).
4> When the MAC layer has or receives a UL transmission resource allocated for transmission for the serving cell,
4> alternatively, when another MAC layer is configured, the other MAC layer has or receives a UL transmission resource allocated for transmission on the serving cell, and an indicator (phr-ModeOtherCG) indicating power headroom reporting considering another cell group by a higher layer (RRC layer) is configured as Real (or configured to report a real value),
5> a maximum transmit power value (or power value required for power headroom calculation) corresponding to the serving cell is obtained from a PHY layer.
3> When an indicator (phr-Type2OtherCell) indicating type 2 power headroom reporting considering another cell or MAC layer is configured as TRUE (or is configured to report);
4> when another MAC layer is an E-UTRA MAC layer,
5> a value for type 2 power headroom reporting for a SpCell of the other MAC layer is obtained (or calculated).
5> When an indicator (phr-ModeOtherCG) indicating power headroom reporting considering another cell group by a higher layer (RRC layer) is configured as Real (or is configured to report a real value),
6> a maximum transmit power value (or power value required for power headroom calculation) for a SpCell of the other MAC layer (E-UTRA MAC layer) is obtained from a PHY layer.
3> A multiplexing and reassembly procedure (multiplexing and assembly procedure of the MAC layer) for generating and transmitting MAC control information reporting a plurality of power headrooms based on the values reported from a PHY layer is indicated.
2> When an indicator (multiplePHR) indicating multiple power headroom reports is not configured as TRUE (or is not configured to report), or when one power headroom reporting is indicated, or when one power headroom reporting format is used, 3> a type 1 power headroom value for a UL carrier (or frequency) of the serving cell (or Pcell) is obtained (or calculated) from a PHY layer.

3> A maximum transmit power value (or power value required for power headroom calculation) for the serving cell (or Pcell) is obtained from a PHY layer.

3> A multiplexing and reassembly procedure (multiplexing and assembly procedure of the MAC layer) for generating and transmitting MAC control information reporting one power headroom based on the values reported from a PHY layer is indicated.

2> The timer for periodically reporting a power headroom starts or restarts.

2> The timer for prohibiting power headroom reporting starts or restarts.

2> All triggered power headrooms or power headroom reporting procedures are cancelled.

In the disclosure, a serving cell or a cell may indicate a PCell or a PSCell or a SCell.

Figure 1I:
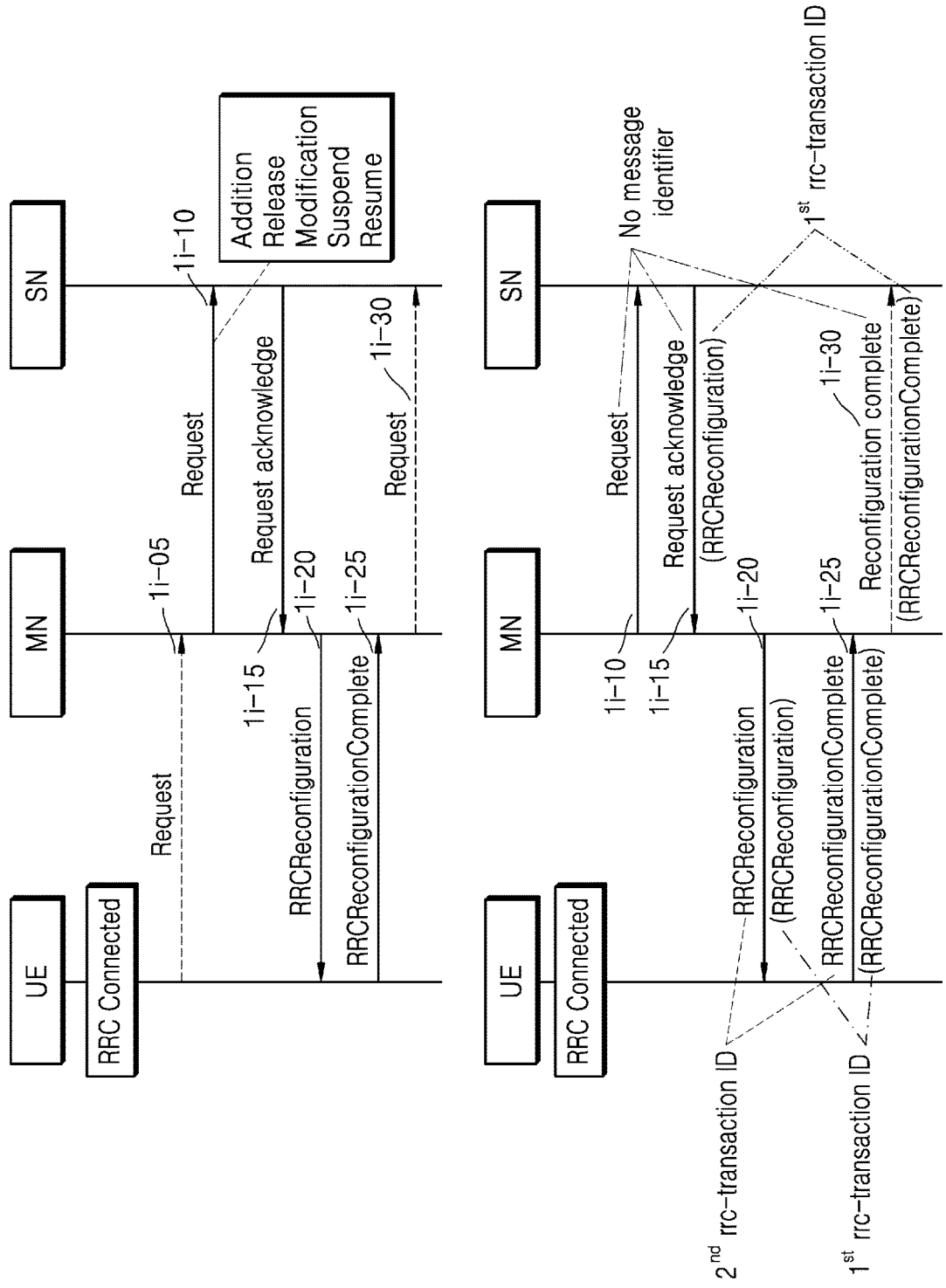
FIG. 1I is a flowchart illustrating a signaling procedure for configuring or releasing dual connectivity, or activating, resuming, suspending or deactivating a Secondary Cell Group (SCG) configured with dual connectivity, in a mobile communication system according to an embodiment of the disclosure.

FIG. 1I is a flowchart illustrating a signaling procedure for configuring or releasing dual connectivity, or activating, resuming, suspending or deactivating an SCG configured with dual connectivity, in a mobile communication system according to an embodiment of the disclosure.

Referring to FIG. 1I, a first signaling procedure for configuring or releasing dual connectivity, or activating or resuming or suspending or deactivating an SCG configured with dual connectivity is as below.

Referring to FIG. 1I, a UE may configure an RRC connection with a network or a BS as shown in FIG. 1F of the disclosure, and may perform data transmission or reception with the BS (e.g., MCG, master node (MN), or cells (PCells or SCells) of MCG).

In the above case, the BS may configure dual connectivity for the UE due to a certain reason (e.g., when a high data rate is required, at a request (1i-05) of the UE, or when a high QoS requirement should be satisfied). For example, the UE may transmit, to the BS, a request to configure or release or activate or deactivate or resume or suspend dual connectivity or a cell group (e.g., SCG) or a cell, and a message of the request may include a frequency (or channel) measurement result report or a cell group identifier or cell identifiers or measurement results (1i-05). In another method, the BS may determine whether to configure or release or add or deactivate or activate or resume or modify or reconfigure or suspend dual connectivity, a cell group (e.g., SCG), or a cell, by considering the amount of DL (or UL) data or the amount of buffer.

In the above case, a master BS (MN or MCG) may receive a frequency or channel measurement report for each frequency or channel from the UE, and may determine a secondary BS (secondary node (SN) or SCG) for configuring dual connectivity, based on the measurement report. Alternatively, the master BS may determine whether to configure or release or add or deactivate or activate or resume or modify or reconfigure or suspend dual connectivity or a cell group (e.g., SCG) or a cell, by considering the amount of DL (or UL) data or the amount of buffer. In the above case, in order to configure or release or add or deactivate or activate or resume or modify or reconfigure or suspend dual connectivity or a cell group (e.g., SCG) or a cell to the determined secondary BS, the master BS may transmit, to the secondary BS, a request message for requesting to configure or add to the SCG of the UE through an Xn interface (e.g., interface between BSs) or an Sn interface (interface between a BS and an AMF or a UMF, or interface between BSs) (1i-10). In the request message, in order to configure or release or add or deactivate or activate or resume or modify or reconfigure or suspend dual connectivity or a cell group (e.g., SCG) or a cell for the secondary BS, each separate new request message may be defined and used, and in another method, and a new indicator may be defined in an existing message (e.g., SN addition request message or SN modification request message or SN release request message) to indicate (or request) to configure or release or add or deactivate or activate or resume or modify or reconfigure or suspend a cell group (e.g., SCG) or a cell. The request message may include information such as cell group configuration information (e.g., MCG configuration information) currently configured for the UE or bearer configuration information or capability information of the UE or frequency (or channel) measurement result information of the UE, and by referring to the above information, the secondary BS may configure SCG configuration information or bearer configuration information to correspond to UE capability or not to exceed UE capability or to match bearer configuration information of the MCG when the SCG is configured for the UE.

In the above case, when the secondary BS having received the request message 1i-10 rejects the request message, the secondary BS may configure and transmit a rejection message to the master BS through the Xn interface (e.g., interface between BSs) or the Sn interface (interface between a BS and an AMF or a UMF, or interface between BSs) (1i-15). When the secondary BS accepts the request message, the secondary BS may transmit a request acceptance message including configuration information or an indicator for configuring or releasing or adding or deactivating or activating or resuming or modifying or reconfiguring or suspending dual connectivity or a cell group (e.g., SCG) or a cell through the Xn interface (e.g., interface between BSs) or the Sn interface (interface between a BS and an AMF or a UMF, or interface between BSs) to the master BS (1i-15). The request acceptance message may include some of a plurality of pieces of information below.

The same identifier as a message identifier included in the request message, or an indicator indicating that a request in the request message is accepted Configuration information or indicator (e.g., configuration information or indicator for the MCG) for configuring or releasing or adding or deactivating or activating or resuming or modifying or reconfiguring or suspending dual connectivity or a cell group (e.g., SCG) or a cell First RRC message (e.g., RRCReconfiguration message) including configuration information or an indicator for configuring or releasing or adding or deactivating or activating or resuming or modifying or reconfiguring or suspending dual connectivity a cell group (e.g., SCG) or a cell The first RRC message may include some of a plurality of pieces of information below.

First RRC message identifier (e.g., rrc-Transaction identifier) for identifying the first RRC message. Because the UE and the BS (e.g., secondary BS) transmit or receive a plurality of RRC messages therebetween, an identifier for identifying each RRC message may be included in each of the RRC messages. For example, the same first RRC identifier may be included in an RRC message (e.g., RRCReconfiguration) transmitted by a transmitting end, or an RRC message (e.g., RRCReconfigurationComplete) corresponding to the RRC message (e.g., RRCReconfiguration) transmitted by a receiving end, or an RRC message corresponding to the RRC message transmitted by the transmitting end.

Configuration information or an indicator (e.g., configuration information or an indicator for the UE) for configuring or releasing or adding or deactivating or activating or resuming or modifying or reconfiguring or suspending dual connectivity or a cell group (e.g., SCG) or a cell Indicator indicating a state of a cell group (e.g., active or inactive or suspended or resumed)

Cell group identifier for identifying cell groups. The cell group identifier may be allocated by the master BS, or one identifier from among already preset identifiers may be allocated by the secondary BS.

Cell group or cell configuration information

Bearer configuration information. For example, indicator information indicating an operation of a protocol layer (e.g., SDAP layer or PDCP layer or RLC layer or MAC layer) for each bearer (e.g., PDCP suspension indicator or PDCP reestablishment indicator or PDCP data recovery indicator or RLC reestablishment indicator or MAC partial reset indicator or MAC reset indicator or indicator to trigger new operation)

In the above case, when configuration information or an indicator for configuring or adding or activating or resuming or modifying or reconfiguring dual connectivity or a cell group (e.g., SCG) or a cell is included, a first indicator (e.g., mobilityControlInfor or ReconfigurationWithSync) may also be included. However, in the above case, when configuration information or an indicator for releasing or deactivating or reconfiguring or suspending dual connectivity or a cell group (e.g., SCG) or a cell is included, the first indicator (e.g., mobilityControlInfor or ReconfigurationWithSync) may not be included. In the above case, the first indicator may be an indicator to trigger a random access procedure for the cell group or the cell or may be an indicator to perform signal synchronization with a new cell or may be an indicator indicating to perform frequency shift of the UE, or may be an indicator indicating to modify the cell group (or cell).

When configuration information or an indicator for configuring or adding or activating or resuming or modifying or reconfiguring dual connectivity or a cell group (e.g., SCG) or a cell is included, random access configuration information may also be included. However, in the above case, when configuration information or an indicator for releasing or deactivating or reconfiguring or suspending dual connectivity or a cell group (e.g., SCG) or a cell is included, the random access configuration information may not be included. The random access configuration information may include random access transmission resource information (time or frequency transmission resource) for preamble transmission or designated preamble information for the cell group or cell.

Time information indicating when to activate or resume or deactivate or suspend dual connectivity or a cell group (e.g., SCG) or a cell (PSCell or SCG SCell) (e.g., information indicating a timing (e.g., X), a time unit, a subframe, a time slot, or a symbol unit, for example, when the message is received in an $n^{th}$ time unit, time information indicating whether to activate or resume or deactivate or suspend a cell in an $n+X^{th}$ time unit)

In the above case, when the master BS receives the request acceptance message 1i-15, the master BS may identify the request acceptance message, and may transmit, to the UE, a second RRC message 1i-20 (e.g., RRCReconfiguration) including information included in the request acceptance message (e.g., first RRC message included in the request acceptance message 1i-15). The second RRC message may include some of a plurality of pieces of information below.

Second RRC message identifier (e.g., rrc-Transaction identifier) for identifying the second RRC message. Because the UE and the BS (e.g., master BS) transmit or receive a plurality of RRC messages therebetween, the RRC messages may each include an identifier for identifying each RRC message. For example, the same second RRC identifier may be included in an RRC message (e.g., RRCReconfiguration) transmitted by a transmitting end, or an RRC message (e.g., RRCReconfigurationComplete) corresponding to the RRC message (e.g., RRCReconfiguration) transmitted by a receiving end, or an RRC message corresponding to the RRC message transmitted by the transmitting end.

First RRC message included in the request acceptance message 1i-15

Configuration information or an indicator (e.g., configuration information or an indicator for the UE) for configuring or releasing or adding or deactivating or activating or resuming or modifying or reconfiguring or suspending dual connectivity or a cell group (e.g., SCG) or a cell Indicator indicating a state of a cell group (e.g., active or inactive or suspended or resumed)

Cell group identifier for identifying cell groups. The cell group identifier may be allocated by the master BS, or one identifier from among already preset identifiers may be allocated by the secondary BS.

Cell group or cell configuration information

Bearer configuration information. For example, indicator information indicating an operation of a protocol layer (e.g., SDAP layer or PDCP layer or RLC layer or MAC layer) for each bearer (e.g., PDCP suspension indicator or PDCP reestablishment indicator or PDCP data recovery indicator or RLC reestablishment indicator or MAC partial reset indicator or MAC reset indicator or indicator to trigger new operation)

When configuration information or an indicator for configuring or adding or activating or resuming or modifying or reconfiguring dual connectivity or a cell group (e.g., SCG) or a cell is included, a first indicator (e.g., mobilityControlInfor or ReconfigurationWithSync) may also be included. When configuration information or an indicator for releasing or deactivating or reconfiguring or suspending dual connectivity or a cell group (e.g., SCG) or a cell is included, the first indicator (e.g., mobilityControlInfor or ReconfigurationWithSync) may not be included. In the above case, the first indicator may be an indicator to trigger a random access procedure for the cell group or the cell or may be an indicator to perform signal synchronization with a new cell or may be an indicator indicating to perform frequency shift of the UE or may be an indicator indicating to modify the cell group (or cell). In another method, the UE may perform PDCCH monitoring on the indicated or configured cell group or cell, and may trigger and perform a random access procedure according to an indication indicated in the PDCCH. For example, a higher layer (e.g., RRC layer) may transmit an indicator to trigger a random access procedure to a lower layer (e.g., MAC layer).

When configuration information or an indicator for configuring or adding or activating or resuming or modifying or reconfiguring dual connectivity or a cell group (e.g., SCG) or a cell is included, random access configuration information may also be included. When configuration information or an indicator for releasing, deactivating, reconfiguring, or suspending dual connectivity, a cell group (e.g., SCG), or a cell is included, the random access configuration information may not be included. The random access configuration information may include random access transmission resource information (time or frequency transmission resource) for preamble transmission or designated preamble information for the cell group or cell.

Time information indicating when to activate or resume or deactivate or suspend dual connectivity or a cell group (e.g., SCG) or a cell (PSCell or SCG SCell) (e.g., information indicating a timing (e.g., X), a time unit, a subframe, a time slot, or a symbol unit, for example, when the message is received in an $n^{th}$ time unit, time information indicating whether to activate or resume or deactivate or suspend a cell in an $n+X^{th}$ time unit)

In the above case, when the UE receives the second RRC message 1*i*-20, the UE may read and identify the second RRC message, or may read information included in the second RRC message (e.g., first RRC message included in the second RRC message) and may configure or add or modify or resume or suspend or deactivate dual connectivity or a cell group (e.g., SCG). Also, when a first indicator to trigger a random access procedure is included in the second RRC message or the first RRC message, or when a state indicator of the cell group indicates activation or resumption, the bearer configuration information or each configuration information of protocol layers configured above may be applied or set, or a random access procedure may be triggered for the configured or indicated cell group or cell. When a random access procedure is performed, if there is random access information in the RRC message or if there is stored random access information, the UE may perform a random access procedure (e.g., CFRA procedure (e.g., 4-step random access or 2-step random access)), based on the stored random access information or the random access information received in the RRC message or system information. When there is no random access information in the RRC message, the UE may perform a random access procedure (e.g., CBRA procedure (e.g., 4-step random access or 2-step random access)). In another method, the UE may perform PDCCH monitoring on the indicated or configured cell group or cell, and may trigger and perform a random access procedure according to an indication indicated in the PDCCH. For example, a higher layer (e.g., RRC layer) may transmit an indicator to trigger a random access procedure to a lower layer (e.g., MAC layer). Also, when the second RRC message or the first RRC message does not include a first indicator to trigger a random access procedure, or when the cell group state indicates suspension or inactivation or release, the UE may store, by considering the indication, cell group configuration information corresponding to the cell group identifier, or the RRC message.

The UE may receive the second RRC message 1*i*-20 or apply received configuration information, and may generate a third RRC message or a fourth RRC message and may transmit the third RRC message or the fourth RRC message to the BS (1*i*-25). The third RRC message may include some of a plurality of pieces of information below.

Second RRC message identifier having the same value as a second RRC message identifier included in the second RRC message Indicator or an identifier indicating that the second RRC message is successfully received Fourth RRC message including a response indicating the first RRC message generated and transmitted by the secondary BS is successfully received. The fourth RRC message may include some of a plurality of pieces of information below.

First RRC message identifier having the same value as a first RRC message identifier included in the first RRC message Indicator or an identifier indicating that the first RRC message is successfully received Response indicator indicating that the first RRC message is successfully applied When the BS (e.g., master BS) receives the third RRC message, the BS may identify whether the third RRC message is a response message to the second RRC message via a second identifier. The BS may identify the fourth RRC message included in the third RRC message, may include the fourth RRC message in a configuration complete message indicating that a configuration is completed to an SCG BS, and may transmit the same to the secondary BS through the Xn interface (e.g., interface between BSs) or the Sn interface (interface between a BS and an AMF or a UMF, or interface between BSs) (1*i*-30). The configuration complete message may include some of a plurality of pieces of information below.

Fourth RRC message included in the third RRC message

Indicator or an identifier indicating that a configuration (cell group addition or modification or release) or an indication (e.g., cell group activation or deactivation or suspension or resumption) indicated in the request acceptance message or the first RRC message is completed When the BS (e.g., secondary BS) receives the configuration complete message, the BS may read or identify the fourth RRC message included in the configuration complete message, and may determine whether the fourth RRC message is a response message to the first RRC message via a first identifier. It may be identified whether a configuration or an indication indicated by the BS is successfully completed. In the above case, when the secondary BS receives the configuration complete message or the fourth RRC message, the secondary BS may transmit, to the master BS, a response message indicating that the configuration complete message or the fourth RRC message is successfully received as a response.

Figure 1J:
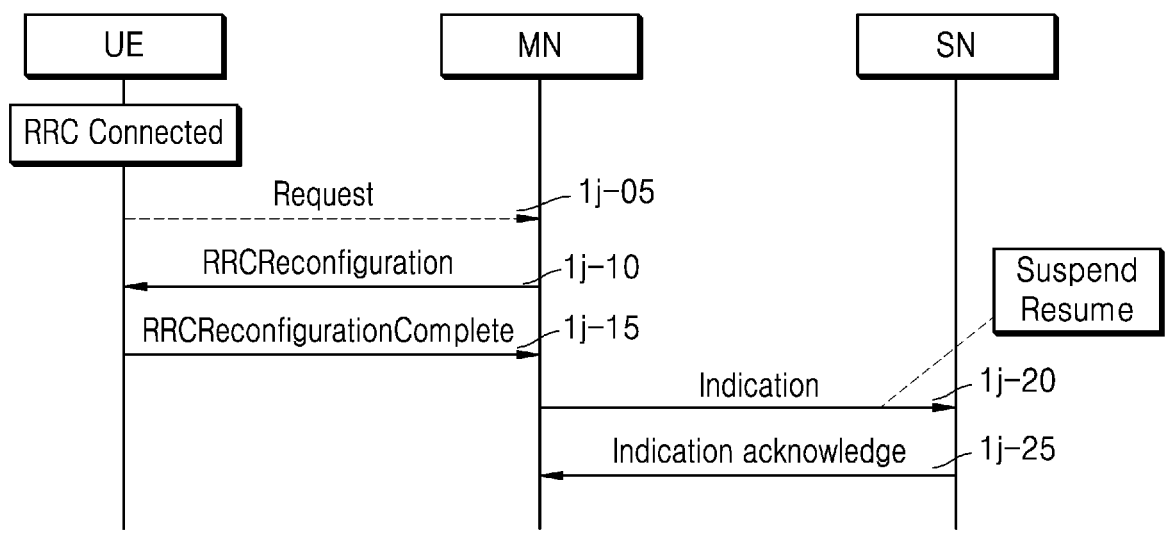
FIG. 1J illustrates a second signaling procedure for configuring or releasing dual connectivity, or configuring, releasing, activating, resuming, suspending or deactivating an SCG configured with dual connectivity according to an embodiment of the disclosure.

FIG. 1J illustrates a second signaling procedure for configuring or releasing dual connectivity, or configuring, releasing, activating, resuming, suspending or deactivating an SCG configured with dual connectivity according to an embodiment of the disclosure.

Referring to FIG. 1J, a UE may configure an RRC connection with a network or a BS as shown in FIG. 1F of the disclosure, and may perform data transmission or reception with the BS (e.g., MCG, MN, or cells (PCells or SCells) of MCG).

In the above case, the BS may configure dual connectivity for the UE due to a certain reason (e.g., when a high data rate is required, at a request of the UE (1*j*-05), or when a high QoS requirement should be satisfied). For example, the UE may transmit, to the BS, a request to configure or release or activate or deactivate or resume or suspend dual connectivity or a cell group (e.g., SCG) or a cell, and a request message of the UE may include a frequency (or channel) measurement result report, or a cell group identifier, or cell identifiers, or measurement results (1*j*-05). In another method, the BS may determine whether to configure or release or add or deactivate or activate or resume or modify or reconfigure or suspend dual connectivity or a cell group (e.g., SCG) or a cell, by considering the amount of DL (or UL) data or the amount of buffer.

In the above case, a master BS (MN or MCG) may receive a frequency or channel measurement report for each frequency or channel from the UE, and may determine a secondary BS (SN or SCG) for configuring dual connectivity based on the measurement report. Alternatively, the master BS may determine whether to configure or release or add or deactivate or activate or resume or modify or reconfigure or suspend dual connectivity or a cell group (e.g., SCG) or a cell, by considering the amount of DL (or UL) data or the amount of buffer. In the above case, with respect to the determined secondary BS, in order to configure or release or add or deactivate or activate or resume or modify or reconfigure or suspend dual connectivity or a cell group (e.g., SCG) or a cell, the master BS may transmit a first RRC message to the UE (1*j*-10). In order to indicate the UE to configure or release or add or deactivate or activate or resume or modify or reconfigure or suspend dual connectivity or a cell group (e.g., SCG) or a cell, each separate new request message may be defined and indicated in the first RRC message, and in another method, a new indicator may be defined in an existing message (e.g., RRCReconfiguration message or RRCResume message) to indicate (or request) to configure or release or add or deactivate or activate or resume or modify or reconfigure or suspend a cell group (e.g., SCG) or a cell. The first RRC message may include some of a plurality of pieces of information below.

- First RRC message identifier (e.g., rrc-Transaction identifier) for identifying the first RRC message. Because the UE and the BS (e.g., master BS) transmit or receive a plurality of RRC messages therebetween, an identifier for identifying each RRC message may be included in each of the RRC messages. For example, the same first RRC message identifier may be included in an RRC message (e.g., RRCReconfiguration) transmitted by a transmitting end, or an RRC message (e.g., RRCReconfigurationComplete) corresponding to the RRC message (e.g., RRCReconfiguration) transmitted by a receiving end, or an RRC message corresponding to the RRC message transmitted by the transmitting end.
- Configuration information or an indicator (e.g., configuration information or an indicator for the UE) for configuring or releasing or adding or deactivating or activating or resuming or modifying or reconfiguring or suspending dual connectivity or a cell group (e.g., SCG) or a cell
- Indicator indicating a state of a cell group (e.g., active or inactive or suspended or resumed)
- Cell group identifier for identifying cell groups. The cell group identifier may be allocated by the master BS, or one identifier from among already preset identifiers may be allocated by the secondary BS)
- Cell group or cell configuration information
- Bearer configuration information. For example, indicator information indicating an operation of a protocol layer (e.g., SDAP layer or PDCP layer or RLC layer or MAC layer) for each bearer (e.g., PDCP suspension indicator or PDCP reestablishment indicator or PDCP data recovery indicator or RLC reestablishment indicator or MAC partial reset indicator or MAC reset indicator or indicator to trigger new operation)
- When configuration information or an indicator for configuring or adding or activating or resuming or modifying or reconfiguring dual connectivity or a cell group (e.g., SCG) or a cell is included, a first indicator (e.g., mobilityControlInfor or ReconfigurationWithSync) may also be included. However, in the above case, when configuration information or an indicator for releasing or deactivating or reconfiguring or suspending dual connectivity or a cell group (e.g., SCG) or a cell is included, the first indicator (e.g., mobilityControlInfor or ReconfigurationWithSync) may not be included. In the above case, the first indicator may be an indicator to trigger a random access procedure for the cell group or the cell or may be an indicator to perform signal synchronization with a new cell or may be an indicator indicating to perform frequency shift of the UE, or may be an indicator indicating to modify the cell group (or cell). In another method, the UE may perform PDCCH monitoring on the indicated or configured cell group or cell, and may trigger and perform a random access procedure according to an indication indicated in the PDCCH. For example, a higher layer (e.g., RRC layer) may transmit an indicator to trigger a random access procedure to a lower layer (e.g., MAC layer).
- When configuration information or an indicator for configuring or adding or activating or resuming or modifying or reconfiguring dual connectivity or a cell group (e.g., SCG) or a cell is included, random access configuration information may also be included. However, when configuration information or an indicator for releasing or deactivating or reconfiguring or suspending dual connectivity or a cell group (e.g., SCG) or a cell is included, the random access configuration information may not be included. The random access configuration information may include random access transmission resource information (time or frequency transmission resource) for preamble transmission or designated preamble information for the cell group or cell.
- Time information indicating when to activate or resume or deactivate or suspend dual connectivity or a cell group (e.g., SCG) or a cell (PSCell or SCG SCell) (e.g., information indicating a timing (e.g., X), a time unit, a subframe, a time slot, or a symbol unit, for example, when the message is received in an $n^{th}$ time unit, time information indicating whether to activate or resume or deactivate or suspend a cell in an $n+X^{th}$ time unit)

In the above case, when the UE receives the first RRC message 1*j*-15, the UE may read and identify the first RRC message, and may configure or add or modify or resume or suspend or deactivate dual connectivity or a cell group (e.g., SCG). Also, when a first indicator to trigger a random access procedure is included in the first RRC message, or when a state indicator of the cell group indicates activation or resumption, the bearer configuration information or each configuration information of protocol layers configured above may be applied or set, or a random access procedure may be triggered for the configured or indicated cell group or cell. When the random access procedure is performed, if there is random access information in the RRC message or if there is stored random access information, the UE may perform a random access procedure (e.g., CFRA procedure (e.g., 4-step random access or 2-step random access)), based on the stored random access information, or the random access information received in the RRC message, or system information. When there is no random access information in the RRC message, the UE may perform a random access procedure (e.g., CBRA procedure (e.g., 4-step random access or 2-step random access)). In another method, the UE may perform PDCCH monitoring on the indicated or configured cell group or cell, and may trigger and perform a random access procedure according to an indication indicated in the PDCCH. For example, a higher layer (e.g., RRC layer) may transmit an indicator to trigger a random access procedure to a lower layer (e.g., MAC layer). Also, when the second RRC message or the first RRC message does not include a first indicator to trigger a random access procedure, or when the cell group state indicates suspension or inactivation or release, the UE may store, by considering the indication, cell group configuration information corresponding to the cell group identifier, or the RRC message.

The UE may receive the first RRC message 1j-10 or apply received configuration information, and may generate and transmit a second RRC message to the BS (1j-15). The second RRC message may include some of a plurality of pieces of information below.

First RRC message identifier having the same value as a first RRC message identifier included in the first RRC message Indicator or an identifier indicating that the first RRC message is successfully received In the above case, when the BS (e.g., master BS) receives the second RRC message, the BS may identify whether the second RRC message is a response message to the first RRC message via a first identifier. The BS may identify the first RRC message and may transmit, to the secondary BS, an indication message including an indication that a cell group has been configured or added or released or activated or resumed or suspended or deactivated to an SCG BS through an Xn interface (e.g., interface between BSs) or an Sn interface (interface between a BS and an AMF or a UMF, or interface between BSs) (1j-20). The indication message may include some of a plurality of pieces of information below.

Identifier for identifying the indication message

Configuration information or an indicator (e.g., configuration information or an indicator for the SCG) indicating that dual connectivity or a cell group or a cell has been configured or released or added or deactivated or activated or resumed or modified or reconfigured or suspended In the above case, when the BS (e.g., secondary BS) receives the indication message, the BS may read or identify configuration information or a message included in the indication message, may generate an indication acknowledgement message as a response message to the indication message, and may transmit the indication acknowledgement message to the master BS (1j-25).

Figure 1K:
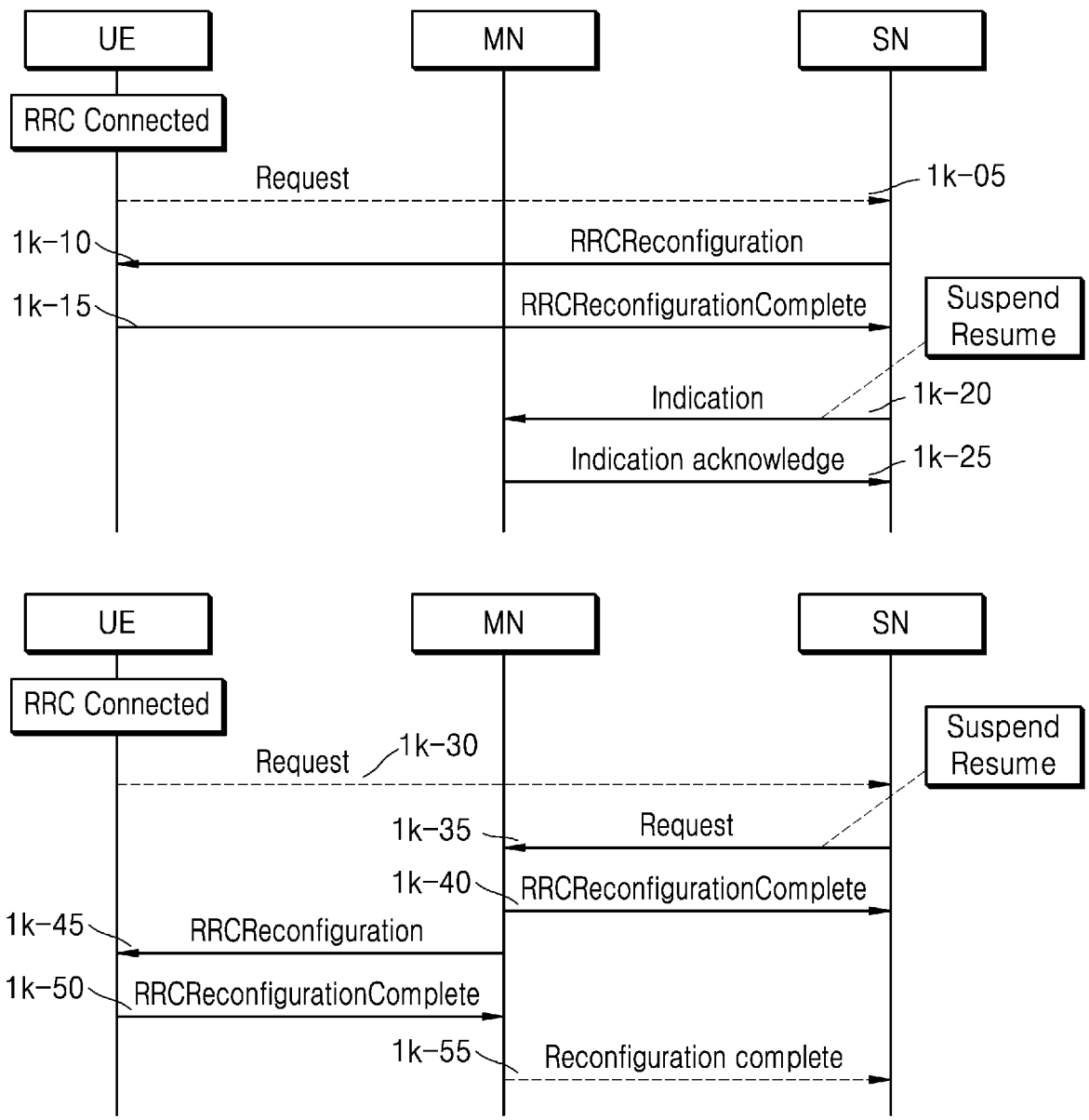
FIG. 1K illustrates a third signaling procedure for configuring or releasing dual connectivity, or configuring, releasing, activating, resuming, suspending or deactivating an SCG configured with dual connectivity according to an embodiment of the disclosure.

Identifier having the same value as an identifier included in the indication message Indicator or an identifier indicating that the indication message is successfully received Response indicator indicating that the indication message is successfully applied FIG. 1K illustrates a third signaling procedure for configuring or releasing dual connectivity, or configuring, releasing, activating, resuming, suspending or deactivating an SCG configured with dual connectivity according to an embodiment of the disclosure.

Referring to FIG. 1K, a UE may configure an RRC connection with a network or a BS as shown in FIG. 1F of the disclosure, and may perform data transmission or reception with the BS (e.g., MCG, MN, or cells (PCells or SCells) of MCG).

In FIG. 1K, according to a configuration procedure of 1F, the BS may configure, for the UE, an SRB (e.g., SRB3) for directly transmitting or receiving a control message or an RRC message between the UE and a secondary BS.

In the above case, the BS (e.g., secondary BS or master BS) may configure dual connectivity for the UE due to a certain reason (e.g., when a high data rate is required, at a request of the UE (1k-05), or when a high QoS requirement should be satisfied). For example, the UE may transmit, to the BS, a request to configure or release or activate or deactivate or resume or suspend dual connectivity or a cell group (e.g., SCG) or a cell, or may transmit a request to the secondary BS via the SRB3, and a message of the request may include a frequency (or channel) measurement result report, or a cell group identifier, or cell identifiers, or measurement results (1k-05). In another method, the secondary BS may determine whether to configure or release or add or deactivate or activate or resume or modify or reconfigure or suspend dual connectivity or a cell group (e.g., SCG) or a cell, by considering the amount of DL (or UL) data or the amount of buffer.

In the above case, the secondary BS (MN or MCG) may receive a frequency or channel measurement report for each frequency or channel from the UE, and may determine whether to configure or release or add or deactivate or activate or resume or modify or reconfigure or suspend dual connectivity or a cell group (e.g., SCG) or a cell based on the measurement result. Alternatively, the secondary BS may determine whether to configure or release or add or deactivate or activate or resume or modify or reconfigure or suspend dual connectivity or a cell group (e.g., SCG) or a cell, by considering the amount of DL (or UL) data or the amount of buffer.

In the above case, in order to configure or release or add or deactivate or activate or resume or modify or reconfigure or suspend dual connectivity or a cell group (e.g., SCG) or a cell, the secondary BS may transmit a first RRC message to the UE via the SRB3 (1k-10). In order to indicate the UE to configure or release or add or deactivate or activate or resume or modify or reconfigure or suspend dual connectivity or a cell group (e.g., SCG) or a cell, each separate new request message may be defined and indicated in the first RRC message, and in another method, a new indicator may be defined in an existing message (e.g., RRCReconfiguration message or RRCResume message) to indicate (or request) to configure or release or add or deactivate or activate or resume or modify or reconfigure or suspend a cell group (e.g., SCG) or a cell. The first RRC message may include some of a plurality of pieces of information below.

First RRC message identifier (e.g., rrc-Transaction identifier) for identifying the first RRC message. Because the UE and the BS (e.g., secondary BS) transmit or receive a plurality of RRC messages therebetween, an identifier for identifying each RRC message may be included in each of the RRC messages. For example, the same first RRC message identifier may be included in an RRC message (e.g., RRCReconfiguration) transmitted by a transmitting end, or an RRC message (e.g., RRCReconfigurationComplete) corresponding to the RRC message (e.g., RRCReconfiguration) transmitted by a receiving end, or an RRC message corresponding to the RRC message transmitted by the transmitting end.

Configuration information or an indicator (e.g., configuration information or an indicator for the UE) for configuring or releasing or adding or deactivating or activating or resuming or modifying or reconfiguring or suspending dual connectivity or a cell group (e.g., SCG) or a cell Indicator indicating a state of a cell group (e.g., active or inactive or suspended or resumed)

Cell group identifier for identifying cell groups. The cell group identifier may be allocated by the master BS, or one identifier from among already preset identifiers may be allocated by the secondary BS)

Cell group or cell configuration information

Bearer configuration information. For example, indicator information indicating an operation of a protocol layer (e.g., SDAP layer or PDCP layer or RLC layer or MAC layer) for each bearer (e.g., PDCP suspension indicator or PDCP reestablishment indicator or PDCP data recovery indicator or RLC reestablishment indicator or MAC partial reset indicator or MAC reset indicator or indicator to trigger new operation)

In the above case, when configuration information or indicator for configuring or adding or activating or resuming or modifying or reconfiguring dual connectivity or a cell group (e.g., SCG) or a cell is included, a first indicator (e.g., mobilityControlInfor or ReconfigurationWithSync) may also be included. However, in the above case, when configuration information or an indicator for releasing or deactivating or reconfiguring or suspending dual connectivity or a cell group (e.g., SCG) or a cell is included, the first indicator (e.g., mobilityControlInfor or ReconfigurationWithSync) may not be included. In the above case, the first indicator may be an indicator to trigger a random access procedure for the cell group or the cell or may be an indicator to perform signal synchronization with a new cell or may be an indicator indicating to perform frequency shift of the UE, or may be an indicator indicating to modify the cell group (or cell). In another method, the UE may perform PDCCH monitoring on the indicated or configured cell group or cell, and may trigger and perform a random access procedure according to an indication indicated in the PDCCH. For example, a higher layer (e.g., RRC layer) may transmit an indicator to trigger a random access procedure to a lower layer (e.g., MAC layer).

In the above case, when configuration information or an indicator for configuring or adding or activating or resuming or modifying or reconfiguring dual connectivity or a cell group (e.g., SCG) or a cell is included, random access configuration information may also be included. However, in the above case, when configuration information or an indicator for releasing or deactivating or reconfiguring or suspending dual connectivity or a cell group (e.g., SCG) or a cell is included, the random access configuration information may not be included. The random access configuration information may include random access transmission resource information (time or frequency transmission resource) for preamble transmission or designated preamble information for the cell group or cell.

Time information indicating when to activate or resume or deactivate or suspend dual connectivity or a cell group (e.g., SCG) or a cell (PSCell or SCG SCell) (e.g., information indicating a timing (e.g., X), a time unit, a subframe, a time slot, or a symbol unit, for example, when the message is received in an $n^{th}$ time unit, time information indicating whether to activate or resume or deactivate or suspend a cell in an $n+X^{th}$ time unit)

When the UE receives the first RRC message 1k-10 via the SRB3, the UE may read and identify the first RRC message, and may configure or add or modify or resume or suspend or deactivate dual connectivity or a cell group (e.g., SCG). Also, when a first indicator to trigger a random access procedure is included in the first RRC message, or when a state indicator of the cell group indicates activation or resumption, the bearer configuration information or each configuration information of protocol layers configured above may be applied or set, or a random access procedure may be triggered for the configured or indicated cell group or cell. In the above case, when the random access procedure is performed, if there is random access information in the RRC message or if there is stored random access information, the UE may perform a random access procedure (e.g., CFRA procedure (e.g., 4-step random access or 2-step random access)), based on the stored random access information, or the random access information received in the RRC message, or system information. When there is no random access information in the RRC message, the UE may perform a random access procedure (e.g., CBRA procedure (e.g., 4-step random access or 2-step random access)). In another method, the UE may perform PDCCH monitoring on the indicated or configured cell group or cell, and may trigger and perform a random access procedure according to an indication indicated in the PDCCH. For example, a higher layer (e.g., RRC layer) may transmit an indicator to trigger a random access procedure to a lower layer (e.g., MAC layer). Also, when the second RRC message or the first RRC message does not include a first indicator to trigger a random access procedure, or when the cell group state indicates suspension or inactivation or release, the UE may store, by considering the indication, cell group configuration information corresponding to the cell group identifier, or the RRC message.

The UE may receive the first RRC message 1k-10 or apply received configuration information, and may generate and transmit a second RRC message to the secondary BS via the SRB3 (1k-15). The second RRC message may include some of a plurality of pieces of information below.

First RRC message identifier having the same value as a first RRC message identifier included in the first RRC message Indicator or an identifier indicating that the first RRC message is successfully received In the above case, when the BS (e.g., secondary BS) receives the second RRC message, the BS may identify whether the second RRC message is a response message to the first RRC message via a first identifier. When the BS identifies the first RRC message, the BS may transmit, to the master BS or an MCG BS, an indication message including an indication indicating that a cell group has been configured or added or released or activated or resumed or suspended or deactivated through an Xn interface (e.g., interface between BSs) or an Sn interface (interface between a BS and an AMF or a UMF, or interface between BSs) (1k-20). The indication message may include some of a plurality of pieces of information below.

Identifier for identifying the indication message

Configuration information or an indicator (e.g., configuration information or an indicator for the SCG) indicating that dual connectivity or a cell group or a cell has been configured or released or added or deactivated or activated or resumed or modified or reconfigured or suspended In the above case, when the BS (e.g., master BS) receives the indication message, the BS may read or identify configuration information or a message included in the indication message, may generate an indication acknowledgement message as a response message to the indication message, and may transmit the indication acknowledgement message to the secondary BS (1k-25).

Identifier having the same value as an identifier included in the indication message Indicator or an identifier indicating that the indication message is successfully received Response indicator indicating that the indication message is successfully applied In another method, in FIG. 1K, the UE may activate or suspend or resume or deactivate or release a cell group, based on a signaling procedure below.

In the above case, the BS may configure dual connectivity for the UE due to a certain reason (e.g., when a high data rate is required, at a request of the UE (1k-30), or when a high QoS requirement should be satisfied). For example, the UE may transmit, to the BS, a request to configure or release or activate or deactivate or resume or suspend dual connectivity or a cell group (e.g., SCG) or a cell, and a message of the request may include a frequency (or channel) measurement result report, or a cell group identifier, or cell identifiers, or measurement results (1k-30). In another method, the BS may determine whether to configure or release or add or deactivate or activate or resume or modify or reconfigure or suspend dual connectivity or a cell group (e.g., SCG) or a cell, by considering the amount of DL (or UL) data or the amount of buffer.

In the above case, a secondary BS (SN or SCG) may receive a frequency or channel measurement report for each frequency or channel from the UE, and may perform determination with respect to activation or suspension or deactivation or resumption of the secondary BS (secondary node (SN) or SCG) configured with dual connectivity, based on the measurement report. Alternatively, the secondary BS may determine whether to configure or release or add or deactivate or activate or resume or modify or reconfigure or suspend dual connectivity or a cell group (e.g., SCG) or a cell, by considering the amount of DL (or UL) data or the amount of buffer which is configured for the secondary BS. In the above case, the secondary BS may transmit, to the master BS, a request message to configure or release or add or deactivate or activate or resume or modify or reconfigure or suspend dual connectivity or a cell group (e.g., SCG) or a cell through an Xn interface (e.g., interface between BSs) or a Sn interface (interface between a BS and an AMF or a UMF or interface between BSs) (1k-35). Each separate new request message may be defined and used in the request message for the master BS so as to configure or release or add or deactivate or activate or resume or modify or reconfigure or suspend dual connectivity or a cell group (e.g., SCG) or a cell, and in another method, and a new indicator may be defined in an existing message (e.g., SN addition request message or SN modification request message or SN release request message) to indicate (or request) to configure or release or add or deactivate or activate or resume or modify or reconfigure or suspend a cell group (e.g., SCG) or a cell. The request message may include information such as cell group configuration information (e.g., MCG configuration information) currently configured for the UE or bearer configuration information or capability information of the UE or frequency (or channel) measurement result information of the UE, and by referring to the above information, the master BS may configure SCG configuration information or bearer configuration information to correspond to UE capability or not to exceed UE capability or to match bearer configuration information of the MCG when the SCG is configured for the UE. In another method, the request message may include an RRC message including configuration information of the UE, and the master BS may forward the RRC message to the UE so as to indicate the UE to configure or release or add or deactivate or activate or resume or modify or reconfigure or suspend the cell group (e.g., SCG) or a cell.

In the above case, when the master BS having received the request message 1k-35 rejects the request message, the master BS may configure and transmit a rejection message to the secondary BS through the Xn interface (e.g., interface between BSs) or the Sn interface (interface between a BS and an AMF or a UMF, or interface between BSs) (1k-40). When the master BS accepts the request message, the master BS may transmit a request acceptance message including configuration information or an indicator for configuring or releasing or adding or deactivating or activating or resuming or modifying or reconfiguring or suspending dual connectivity or a cell group (e.g., SCG) or a cell through the Xn interface (e.g., interface between BSs) or the Sn interface (interface between a BS and an AMF or a UMF, or interface between BSs) to the secondary BS (1k-40). The request message 1k-35 or the request acceptance message 1k-40 may include some of a plurality of pieces of information below.

The same identifier as a message identifier included in the request message, or an indicator indicating that a request in the request message is accepted, or an identifier for identifying the request message Configuration information or indicator (e.g., configuration information or indicator for the MCG) for configuring or releasing or adding or deactivating or activating or resuming or modifying or reconfiguring or suspending dual connectivity or a cell group (e.g., SCG) or a cell First RRC message (e.g., RRCReconfiguration message) including configuration information or an indicator for configuring or releasing or adding or deactivating or activating or resuming or modifying or reconfiguring or suspending dual connectivity a cell group (e.g., SCG) or a cell The first RRC message may include some of a plurality of pieces of information below.

First RRC message identifier (e.g., rrc-Transaction identifier) for identifying the first RRC message. Because the UE and the BS (e.g., secondary BS) transmit or receive a plurality of RRC messages therebetween, an identifier for identifying each RRC message may be included in each of the RRC messages. For example, the same first RRC identifier may be included in an RRC message (e.g., RRCReconfiguration) transmitted by a transmitting end, or an RRC message (e.g., RRCReconfigurationComplete) corresponding to the RRC message (e.g., RRCReconfiguration) transmitted by a receiving end, or an RRC message corresponding to the RRC message transmitted by the transmitting end.

Configuration information or an indicator (e.g., configuration information or an indicator for the UE) for configuring or releasing or adding or deactivating or activating or resuming or modifying or reconfiguring or suspending dual connectivity or a cell group (e.g., SCG) or a cell Indicator indicating a state of a cell group (e.g., active or inactive or suspended or resumed)

Cell group identifier for identifying cell groups. The cell group identifier may be allocated by the master BS, or one identifier from among already preset identifiers may be allocated by the secondary BS.

Cell group or cell configuration information

Bearer configuration information. For example, indicator information indicating an operation of a protocol layer (e.g., SDAP layer or PDCP layer or RLC layer or MAC layer) for each bearer (e.g., PDCP suspension indicator or PDCP reestablishment indicator or PDCP data recovery indicator or RLC reestablishment indicator or MAC partial reset indicator or MAC reset indicator or indicator to trigger new operation)

In the above case, when configuration information or an indicator for configuring or adding or activating or resuming or modifying or reconfiguring dual connectivity or a cell group (e.g., SCG) or a cell is included, a first indicator (e.g., mobilityControlInfor or ReconfigurationWithSync) may also be included. However, in the above case, when configuration information or an indicator for releasing or deactivating or reconfiguring or suspending dual connectivity or a cell group (e.g., SCG) or a cell is included, the first indicator (e.g., mobilityControlInfor or ReconfigurationWithSync) may not be included. In the above case, the first indicator may be an indicator to trigger a random access procedure for the cell group or the cell or may be an indicator to perform signal synchronization with a new cell or may be an indicator indicating to perform frequency shift of the UE, or may be an indicator indicating to modify the cell group (or cell).

When configuration information or an indicator for configuring or adding or activating or resuming or modifying or reconfiguring dual connectivity or a cell group (e.g., SCG) or a cell is included, random access configuration information may also be included. However, in the above case, when configuration information or an indicator for releasing or deactivating or reconfiguring or suspending dual connectivity or a cell group (e.g., SCG) or a cell is included, the random access configuration information may not be included. The random access configuration information may include random access transmission resource information (time or frequency transmission resource) for preamble transmission or designated preamble information for the cell group or cell.

Time information indicating when to activate or resume or deactivate or suspend dual connectivity or a cell group (e.g., SCG) or a cell (PSCell or SCG SCell) (e.g., information indicating a timing (e.g., X), a time unit, a subframe, a time slot, or a symbol unit, for example, when the message is received in an $n^{th}$ time unit, time information indicating whether to activate or resume or deactivate or suspend a cell in an $n+X^{th}$ time unit)

In the above case, when the master BS accepts the request message 1k-35, the master BS may identify the request message, and may transmit, to the UE, a second RRC message 1k-45 (e.g., RRCReconfiguration) including information included in the request message (e.g., first RRC message included in the request message 1k-35). The second RRC message may include some of a plurality of pieces of information below.

Second RRC message identifier (e.g., rrc-Transaction identifier) for identifying the second RRC message. Because the UE and the BS (e.g., master BS) transmit or receive a plurality of RRC messages therebetween, the RRC messages may each include an identifier for identifying each RRC message. For example, the same second RRC identifier may be included in an RRC message (e.g., RRCReconfiguration) transmitted by a transmitting end, or an RRC message (e.g., RRCReconfigurationComplete) corresponding to the RRC message (e.g., RRCReconfiguration) transmitted by a receiving end, or an RRC message corresponding to the RRC message transmitted by the transmitting end.

First RRC message included in the request message 1k-35 or the request acceptance message 1k-40

Configuration information or an indicator (e.g., configuration information or an indicator for the UE) for configuring or releasing or adding or deactivating or activating or resuming or modifying or reconfiguring or suspending dual connectivity or a cell group (e.g., SCG) or a cell Indicator indicating a state of a cell group (e.g., active or inactive or suspended or resumed)

Cell group identifier for identifying cell groups. The cell group identifier may be allocated by the master BS, or one identifier from among already preset identifiers may be allocated by the secondary BS.

Cell group or cell configuration information

Bearer configuration information. For example, indicator information indicating an operation of a protocol layer (e.g., SDAP layer or PDCP layer or RLC layer or MAC layer) for each bearer (e.g., PDCP suspension indicator or PDCP reestablishment indicator or PDCP data recovery indicator or RLC reestablishment indicator or MAC partial reset indicator or MAC reset indicator or indicator to trigger new operation)

When configuration information or an indicator for configuring or adding or activating or resuming or modifying or reconfiguring dual connectivity or a cell group (e.g., SCG) or a cell is included, a first indicator (e.g., mobilityControlInfor or ReconfigurationWithSync) may also be included. When configuration information or an indicator for releasing or deactivating or reconfiguring or suspending dual connectivity or a cell group (e.g., SCG) or a cell is included, the first indicator (e.g., mobilityControlInfor or ReconfigurationWithSync) may not be included. In the above case, the first indicator may be an indicator to trigger a random access procedure for the cell group or the cell or may be an indicator to perform signal synchronization with a new cell or may be an indicator indicating to perform frequency shift of the UE or, may be an indicator indicating to modify the cell group (or cell). In another method, the UE may perform PDCCH monitoring on the indicated or configured cell group or cell, and may trigger and perform a random access procedure according to an indication indicated in the PDCCH. For example, a higher layer (e.g., RRC layer) may transmit an indicator to trigger a random access procedure to a lower layer (e.g., MAC layer).

When configuration information or an indicator for configuring or adding or activating or resuming or modifying or reconfiguring dual connectivity or a cell group (e.g., SCG) or a cell is included, random access configuration information may also be included. When configuration information or an indicator for releasing or deactivating or reconfiguring or suspending dual connectivity or a cell group (e.g., SCG) or a cell is included, the random access configuration information may not be included. The random access configuration information may include random access transmission resource information (time or frequency transmission resource) for preamble transmission or designated preamble information for the cell group or cell.

Time information indicating when to activate or resume or deactivate or suspend dual connectivity or a cell group (e.g., SCG) or a cell (PSCell or SCG SCell) (e.g., information indicating a timing (e.g., X), a time unit, a subframe, a time slot, or a symbol unit, for example, when the message is received in an $n^{th}$ time unit, time information indicating whether to activate or resume or deactivate or suspend a cell in an $n+X^{th}$ time unit)

In the above case, when the UE receives the second RRC message 1k-45, the UE may read and identify the second RRC message or may read information included in the second RRC message (e.g., first RRC message included in the second RRC message), and may configure or add or modify or resume or suspend or deactivate dual connectivity or a cell group (e.g., SCG). Also, when a first indicator to trigger a random access procedure is included in the second RRC message or the first RRC message, or when a state indicator of the cell group indicates activation or resumption, the bearer configuration information or each configuration information of protocol layers configured above may be applied or set, or a random access procedure may be triggered for the configured or indicated cell group or cell. When a random access procedure is performed, if there is random access information in the RRC message or if there is stored random access information, the UE may perform a random access procedure (e.g., CFRA procedure (e.g., 4-step random access or 2-step random access)), based on the stored random access information or the random access information received in the RRC message or system information. When there is no random access information in the RRC message, the UE may perform a random access procedure (e.g., CBRA procedure (e.g., 4-step random access or 2-step random access)). In another method, the UE may perform PDCCH monitoring on the indicated or configured cell group or cell, and may trigger and perform a random access procedure according to an indication indicated in the PDCCH. For example, a higher layer (e.g., RRC layer) may transmit an indicator to trigger a random access procedure to a lower layer (e.g., MAC layer). Also, when the second RRC message or the first RRC message does not include a first indicator to trigger a random access procedure, or when the cell group state indicates suspension or inactivation or release, the UE may store, by considering the indication, cell group configuration information corresponding to the cell group identifier, or the RRC message.

The UE may receive the second RRC message 1k-45 or apply received configuration information, and may generate and transmit a third RRC message or a fourth RRC message to the BS (1k-50). The third RRC message may include some of a plurality of pieces of information below.

Second RRC message identifier having the same value as a second RRC message identifier included in the second RRC message Indicator or an identifier indicating that the second RRC message is successfully received Fourth RRC message including a response indicating that the first RRC message generated and transmitted by the secondary BS is successfully received. The fourth RRC message may include some of a plurality of pieces of information below.

First RRC message identifier having the same value as a first RRC message identifier included in the first RRC message Indicator or an identifier indicating that the first RRC message is successfully received Response indicator indicating that the first RRC message is successfully applied When the BS (e.g., master BS) receives the third RRC message, the BS may identify whether the third RRC message is a response message to the second RRC message via a second identifier. The BS may identify the fourth RRC message included in the third RRC message, may include the fourth RRC message in a configuration complete message indicating, to an SCG BS, that a configuration is completed, and may transmit the same to the secondary BS through the Xn interface (e.g., interface between BSs) or the Sn interface (interface between a BS and an AMF or a UMF, or interface between BSs) (1k-55). The configuration complete message may include some of a plurality of pieces of information below.

Fourth RRC message included in the third RRC message

Indicator or an identifier indicating that a configuration (cell group addition or modification or release) or an indication (e.g., cell group activation or deactivation or suspension or resumption) indicated in the request message or the request acceptance message or the first RRC message is completed When the BS (e.g., secondary BS) receives the configuration complete message, the BS may read or identify the fourth RRC message included in the configuration complete message, and may identify whether the fourth RRC message is a response message to the first RRC message via a first identifier. It may be determined whether a configuration or an indication indicated by the BS is successfully completed. In the above case, when the secondary BS receives the configuration complete message or the fourth RRC message, the secondary BS may transmit, to the master BS, a response message indicating that the configuration complete message or the fourth RRC message is successfully received as a response.

In the disclosure, when a message is transmitted to the UE so as to configure or indicate cell group or cell configuration information for the UE, for example, when configuration information or an indicator for configuring or adding or activating or resuming or modifying or reconfiguring dual connectivity or a cell group (e.g., SCG) or a cell is included in the message, the UE may include, in the message, or reconfigure SDAP configuration information, or may include, in the message, or configure or reconfigure mapping configuration information between a QoS flow and a bearer of an SDAP layer. However, when configuration information or an indicator for releasing or deactivating or reconfiguring or suspending dual connectivity or a cell group (e.g., SCG) or a cell is included in the message, the UE may not include, in the message, or may not reconfigure the SDAP configuration information, or may not include, may not configure, may not reconfigure, or may suspend applying of the mapping configuration information between the QoS flow and the bearer of the SDAP layer.

The signaling procedures according to the disclosure may be combined and modified, and thus may be extended to new signaling procedures.

The signaling procedures according to the disclosure may be extended to a multiple access technology. For example, a plurality of pieces of configuration information of a plurality of cell groups may be configured for a UE via an RRC message, and one or more cell groups (or cells) from among the configured cell groups may be activated or resumed by an indicator of a PDCCH or MAC control information or an RRC message, or one or more cell groups may be suspended or deactivated.

In the disclosure, hereinafter, when dual connectivity or a cell group (e.g., SCG) or a cell (PSCell or SCG SCell) is activated or resumed or added or deactivated or released or suspended, UE operations with respect to each cell (PSCell or SCG SCell) or UE operations with respect to each protocol layer (e.g., SDAP layer or PDCP layer or RLC layer or MAC layer or PHY layer) will now be described.

1> When a UE receives configuration information or an indicator (e.g., via DCI of a PDCCH or MAC control information or an RRC message) for configuring or adding or activating or resuming or modifying or reconfiguring dual connectivity or a cell group (e.g., SCG) or a cell, the UE may perform some of procedures below.

2> A higher layer (e.g., RRC layer) may indicate the configuration information or the indicator to a lower layer (e.g., PDCP layer or RLC layer or MAC layer or PHY layer).

2> UE operation for PSCell: When the UE receives the configuration information or the indicator, the UE may maintain a PSCell in an active state, may activate a DL BWP of the PSCell to a normal BWP (e.g., first active BWP or non-dormant BWP) or a last activated BWP configured in the RRC message, and may perform a UE operation in the activated BWP. In another method, when the UE receives the configuration information or the indicator, the UE may maintain a PSCell in an active state, may reconfigure or switch a PDCCH monitoring period or a DRX configuration period of the PSCell to a short period based on first DRX configuration information, and may perform PDCCH monitoring and perform a UE operation in the active cell. By using the method, the UE may perform a UE operation of the PSCell, thereby rapidly receiving a scheduling indication from a cell group or a cell and starting data transmission or reception. Also, in the above case, in order to further rapidly receive a scheduling indication from a cell group or a cell and start data transmission or reception, the UE may measure many or frequent channel signals based on first channel measurement configuration information configured in the RRC message, thereby rapidly reporting a channel measurement result to a BS. In the above case, when a certain condition is satisfied, the UE may measure a channel signal again based on second channel measurement configuration information and may report a measurement result to the BS.

2> UE operation for SCell of SCG: When the UE receives the configuration information or the indicator, the UE may activate a SCell of an SCG, may activate a DL BWP or a UL BWP to a BWP (e.g., first active BWP) configured in the RRC message, and may perform a UE operation in the activated SCell or BWP. In another method, when the UE receives the configuration information or the indicator, if a dormant BWP is configured in the SCell of the SCG, the UE may maintain the SCell in an active state, may activate a DL BWP of the SCell to a BWP (e.g., first active BWP) configured in the RRC message, and may perform a UE operation in the activated BWP, and alternatively, when a dormant BWP is not configured in the SCell of the SCG, the UE may switch the SCell to an active state, may activate a DL BWP or a UL BWP to a BWP (e.g., first active BWP) configured in the RRC message, and may perform a UE operation in the activated SCell or BWP. In another method, when the UE receives the configuration information or the indicator, the UE may determine switching or activation or deactivation of a BWP or a state of the SCell according to SCell configuration information or an indicator configured in a message including the configuration information or the indicator and may perform a UE operation.

2> UE operation of MAC layer for SCG: When the UE receives the configuration information or the indicator, the UE may perform a MAC reset procedure on a MAC layer (e.g., may initialize or release a plurality of pieces of configuration information configured in the MAC layer, and may stop or initialize configured timers or may stop or initialize an HARQ procedure). For example, a Time Alignment Timer (TAT) indicating the validity of signal synchronization between the UE and the BS may be considered as stopped or expired. In another method, when the UE receives the configuration information or the indicator, the UE may perform a MAC partial reset procedure (or when an indicator indicating a MAC partial reset procedure is included in a message including the configuration information or the indicator, the UE may perform the MAC partial reset procedure). For example, the TAT indicating the validity of signal synchronization between the UE and the BS may be continuously maintained, or HARQ retransmission may be continuously performed. In another method, the UE may not perform any procedure on the MAC layer and may maintain a current configuration. Also, in the above case, when an indication to trigger a random access procedure is indicated from a higher layer (e.g., RRC layer), or the TAT stops or expires, the UE may trigger a random access procedure. In another method, when the TAT does not stop or expire, the UE may not trigger or not perform a random access procedure. This is because, when the TAT is running, signal synchronization with the SCG is matched or maintained, and thus, the UE does not need to perform an unnecessary random access procedure.

2> Operation for data radio bearer (DRB): The UE may resume RLC bearers or RLC layers which belong to the cell group for which activation or resumption is indicated.

2> Operation for DRB: When the UE receives the configuration information or the indicator, the UE may resume DRBs (or SCG (SN) terminated DRBs or DRBs with a PDCP layer configured for the SCG) included in the SCG. For example, for a split bearer with a PDCP layer configured for an MCG (bearer via which one RLC layer is configured for the MCG and another RLC layer is configured for the SCG), an indicator (reestablishRLC) to trigger a procedure for reestablishing the RLC layer configured for the SCG may also be included in the RRC message including the configuration information or the indicator, and alternatively, the UE may perform a reestablishment procedure on the RLC layer configured for the SCG (or, the UE may resume the RLC layer or the RLC bearer). For example, for a split bearer with a PDCP layer configured for the SCG (bearer via which one RLC layer is configured for the MCG and another RLC layer is configured for the SCG), an indicator (reestablishRLC) to trigger a procedure for reestablishing the RLC layer configured for the MCG may also be included (or, the UE may resume the RLC layer or the RLC bearer), or an indicator to trigger a PDCP reestablishment procedure (reestablishPDCP) or a PDCP resume procedure (PDCP resume) in the PDCP layer configured for the SCG may also be included, in the RRC message including the configuration information or the indicator, or alternatively, the UE may perform a reestablishment procedure on the RLC layer configured for the MCG (or, the UE may resume the RLC layer or the RLC bearer) or may perform a PDCP reestablishment procedure or a PDCP resume procedure in the PDCP layer configured for the SCG. For example, for a bearer configured for the SCG, the UE may resume bearers, or may indicate an RRC layer to trigger a PDCP reestablishment procedure or a PDCP resume procedure in a PDCP layer, or may perform the PDCP reestablishment procedure or the PDCP resume procedure in the PDCP layer. In the above case, the UE may trigger a first PDCP resume procedure for bearers configured for the SCG, or may perform the first PDCP resume procedure in a PDCP layer. In another method, in order to solve a security issue problem (e.g., a security problem which may occur when security configuration information or a security key is not changed (or updated or reconfigured) when it is configured to activate or resume the cell group) which occurs when different data are transmitted with the same security key when the SCG is activated or resumed, the UE may trigger a second PDCP resume procedure for bearers configured for the SCG, or a second PDCP resume procedure may be performed in a PDCP layer. In another method, when a higher layer triggers a PDCP layer resume procedure, a first PDCP resume procedure may be triggered and performed, and when the higher layer triggers a PDCP layer resume procedure or indicates an indicator to activate or resume a cell group (or cell), a second PDCP resume procedure may be triggered and performed. In another method, in the above case, in order to solve a security issue problem occurring when different data are transmitted with the same security key, when the BS indicates an indicator to activate or resume a cell group (or cell), the BS may configure a new security key including security key configuration information (e.g., sk-counter) in an RRC message including the indicator to activate or resume the cell group (or cell) and may modify or update the security key, or may include a PDCP reestablishment procedure indicator in the RRC message to modify or update a security key of bearers configured for the SCG, or the UE may perform a PDCP reestablishment procedure on the bearers. In another method, when the RRC message includes security key configuration information and thus a security key is changed, or includes an indication of a PDCP layer reestablishment procedure, the PDCP layer reestablishment procedure is performed, or when the RRC message does not include the security key configuration information or indicates, by using an indicator, an operation of a PDCP layer, the UE may trigger and perform the first PDCP resume procedure or the second PDCP resume procedure. Also, when the suspended bearer or PDCP layer or RLC layer is resumed, in order to prevent stored old data from being transmitted, the UE may perform a procedure for discarding a plurality of pieces of stored data (e.g., PDCP PDU or PDCP SDU or RLC PDU or RLC SDU). For example, the UE may perform a data discard procedure (SDU discard) in the PDCP layer or may perform a RLC layer reestablishment procedure. In the above case, the data discard procedure (SDU discard) in the PDCP layer, in which a plurality of pieces of stored data are discarded, or the RLC layer reestablishment procedure may be performed when suspension or inactivation or release of a cell group is indicated by an RRC message or MAC control information or DCI of a PDCCH.

2> Operation for SRB configured for SCG: When the UE receives the configuration information or the indicator and activates a PSCell, or when an activated DL BWP of the PSCell is a normal BWP other than a dormant BWP or when the UE monitors the PDCCH on an activated PSCell with a long interval based on first DRX configuration information, SRBs (or SN (SCG) terminated SRBs or SRBs or SRB3s with a PDCP layer configured for the SCG) included in the SCG may be continuously maintained (e.g., the UE may continuously transmit or receive a control message to or from a secondary BS). Alternatively, in order to discard a plurality of pieces of old data (PDCP SDU or PDCP PDU) stored in the SRBs configured for the SCG, the UE may perform a data discard procedure (e.g., a discard indication to a PDCP layer) or a RLC layer reestablishment procedure. In another method, when the UE receives the configuration information or the indicator, the UE may resume SRBs (or SN (SCG) terminated SRBs or SRBs or SRB3s with a PDCP layer configured in the SCG) included in the SCG. Alternatively, in order to discard a plurality of pieces of old data (PDCP SDU or PDCP PDU) stored in the SRBs configured for the SCG, the UE may perform a data discard procedure (e.g., a discard indication to a PDCP layer) or a RLC layer reestablishment procedure. For example, for a split bearer with a PDCP layer configured for the MCG (bearer via which one RLC layer is configured for the MCG and another RLC layer is configured for the SCG), an indicator (reestablishRLC) to trigger a procedure for reestablishing the RLC layer configured for the SCG may also be included in the RRC message including the configuration information or the indicator, or alternatively, the UE may perform a reestablishment procedure on the RLC layer configured for the SCG. For example, for a split bearer with a PDCP layer configured for the SCG (bearer via which one RLC layer is configured for an MCG and another RLC layer is configured for an SCG), an indicator (reestablishRLC) to trigger a procedure for reestablishing the RLC layer configured for an MCG may also be included, or an indicator to trigger a PDCP reestablishment procedure (reestablishPDCP) or a PDCP resume procedure (PDCP resume) in the PDCP layer configured for the SCG may also be included in the RRC message including the configuration information or the indicator, or alternatively, the UE may perform a reestablishment procedure on the RLC layer configured for the MCG, or may perform a PDCP reestablishment procedure or a PDCP resume procedure in the PDCP layer configured for the SCG. For example, for a bearer configured for the SCG, the UE may resume bearers, or may indicate an RRC layer to trigger a PDCP reestablishment procedure or a PDCP resume procedure in a PDCP layer, or may perform the PDCP reestablishment procedure or the PDCP resume procedure in the PDCP layer. In the above case, the UE may trigger a first PDCP resume procedure for bearers configured for the SCG, or may perform a first PDCP resume procedure in a PDCP layer. In another method, in order to solve a security issue problem occurring when different data are transmitted with the same security key when the SCG is activated or resumed, the UE may trigger a second PDCP resume procedure for bearers configured for the SCG, or may perform a second PDCP resume procedure in a PDCP layer. In another method, when a higher layer triggers a PDCP layer resume procedure, a first PDCP resume procedure may be triggered and performed, and when the higher layer triggers a PDCP layer resume procedure or indicates an indicator to activate or resume a cell group (or cell), a second PDCP resume procedure may be triggered and performed. In another method, in the above case, in order to solve a security issue problem occurring when different data are transmitted with the same security key, when the BS indicates an indicator to activate or resume a cell group (or cell), the BS may configure a new security key including security key configuration information (e.g., sk-counter) in an RRC message including the indicator to activate or resume the cell group (or cell) and may modify or update the security key, or may include a PDCP reestablishment procedure indicator in the RRC message to modify or update a security key of bearers configured for the SCG, or the UE may perform a PDCP reestablishment procedure on the bearers. In another method, when the RRC message includes security key configuration information and thus a security key is changed, or includes an indication of a PDCP layer reestablishment procedure, the PDCP layer reestablishment procedure is performed, or when the RRC message does not include the security key configuration information or indicates, by using an indicator, an operation of a PDCP layer, the UE may trigger and perform the first PDCP resume procedure or the second PDCP resume procedure. Also, when the suspended bearer or PDCP layer or RLC layer is resumed, in order to prevent stored old data from being transmitted, the UE may perform a procedure for discarding a plurality of pieces of stored data (e.g., PDCP PDU or PDCP SDU or RLC PDU or RLC SDU). For example, the UE may perform a data discard procedure (SDU discard) in the PDCP layer or may perform a RLC layer reestablishment procedure. In the above case, the data discard procedure (SDU discard) in the PDCP layer, in which a plurality of pieces of stored data are discarded, or the RLC layer reestablishment procedure may be performed when suspension or inactivation or release of a cell group is indicated by an RRC message or MAC control information or DCI of a PDCCH.

2> UE operation for PUCCH SCell of SCG: When the UE receives the configuration information or the indicator, the UE may activate a PUCCH SCell of an SCG, may activate a DL BWP or a UL BWP to a BWP (e.g., first active BWP) configured in the RRC message, and may perform a UE operation in the activated SCell or BWP. In another method, when the UE receives the configuration information or the indicator, if a dormant BWP is configured in a PUCCH SCell of the SCG, the UE may maintain the SCell in an active state, may activate a DL BWP of the SCell to a BWP (e.g., first active BWP) configured in the RRC message, and may perform a UE operation in the activated BWP, and alternatively, when a dormant BWP is not configured in the SCell of the SCG, the UE may switch the SCell to an active state, may activate a DL BWP or a UL BWP to a BWP (e.g., first active BWP) configured in the RRC message, and may perform a UE operation in the activated SCell or BWP. In another method, when the UE receives the configuration information or the indicator, the UE may determine switching or activation or deactivation of a BWP or a state of the SCell according to SCell configuration information or an indicator configured in a message including the configuration information or the indicator and may perform a UE operation. In another method, when the UE receives the configuration information or the indicator, the UE may apply, to the PUCCH SCell, first DRX configuration information (e.g., suspension of second DRX configuration information and reconfiguration to the first DRX configuration information) configured in an RRC message, and may perform a UE operation in an activated SCell when it is possible to perform PDCCH monitoring.

1> When the UE receives configuration information or an indicator (e.g., via DCI of a PDCCH or MAC control information or an RRC message) for releasing or deactivating or reconfiguring or suspending dual connectivity or a cell group (e.g., SCG) or a cell, the UE may perform some of procedures below.

2> A higher layer (e.g., RRC layer) may indicate the configuration information or the indicator to a lower layer (e.g., PDCP layer or RLC layer or MAC layer or PHY layer).

2> UE operation for PSCell: When the UE receives the configuration information or the indicator, the UE may maintain a PSCell in an active state, may activate a DL BWP of the PSCell to a dormant BWP configured in the RRC message, and may perform a UE operation in the dormant BWP. In another method, when the UE receives the configuration information or the indicator, the UE may maintain a PSCell in an active state, may reconfigure or switch a PDCCH monitoring period or a DRX configuration period of the PSCell to a very long period based on second DRX configuration information, and may perform PDCCH monitoring and perform a UE operation in the active cell. In another method, when the UE receives the configuration information or the indicator, the UE may deactivate the PSCell and may perform a UE operation in an inactive cell. By using the above method, the UE may perform a UE operation in the PSCell, thereby reducing power consumption of the UE.

2> UE operation for SCell of SCG: When the UE receives the configuration information or the indicator, the UE may deactivate a SCell of an SCG, and may perform a UE operation in the deactivated SCell. In another method, when the UE receives the configuration information or the indicator, if a dormant BWP is configured in the SCell of the SCG, the UE may maintain the SCell in an active state, may activate a DL BWP of the SCell to the dormant BWP, and may perform a UE operation in the dormant BWP, or alternatively, when a dormant BWP is not configured in the SCell of the SCG, the UE may switch the SCell to an inactive state, and may perform a UE operation in the deactivated cell or BWP. In another method, when the UE receives the configuration information or the indicator, the UE may determine switching or activation or deactivation of a BWP or a state of the SCell according to SCell configuration information or an indicator configured in a message including the configuration information or the indicator, and may perform a UE operation.

2> UE operation of MAC layer for SCG: When the UE receives the configuration information or the indicator, the UE may perform a MAC reset procedure on a MAC layer (e.g., may initialize or release a plurality of pieces of configuration information configured in the MAC layer, and may stop or initialize configured timers or may stop or initialize an HARQ procedure). For example, a TAT indicating the validity of signal synchronization between the UE and the BS may be considered as stopped or expired In another method, in order to prevent data loss due to the reset procedure of the MAC layer, when the UE receives the configuration information or the indicator, the UE may perform a MAC partial reset procedure (or when an indicator indicating a MAC partial reset procedure is included in a message including the configuration information or the indicator, the UE may perform the MAC partial reset procedure). For example, the TAT indicating the validity of signal synchronization between the UE and the BS may be continuously maintained, or HARQ retransmission may be continuously performed. In another method, the UE may not perform any procedure on the MAC layer and may maintain a current configuration.

2> Operation for DRB: The UE may suspend RLC bearers or RLC layers which belong to the cell group for which deactivation or suspension is indicated.

2> Operation for DRB: When the UE receives the configuration information or the indicator, the UE may suspend DRBs (or SCG (SN) terminated DRBs or DRBs with a PDCP layer configured for the SCG) included in the SCG. For example, for a split bearer with a PDCP layer configured for an MCG (bearer via which one RLC layer is configured for the MCG and another RLC layer is configured for the SCG), an indicator (reestablishRLC) to trigger a procedure for reestablishing the RLC layer configured for the SCG may also be included in the RRC message including the configuration information or the indicator (or, the RLC layer may be suspended, or, an indicator may be configured to trigger an RLC establishment procedure when the cell group is activated or resumed at a later time), or, alternatively, an indicator to trigger a PDCP data recovery procedure in the PDCP layer configured for the MCG may also be included, or the UE may perform a reestablishment procedure on the RLC layer configured for the SCG, or may perform a PDCP data recovery procedure in the PDCP layer configured for the MCG (i.e., when an RLC layer corresponding to the deactivated or suspended SCG is in an AM mode, the PDCP layer may perform a procedure of retransmission to a RLC layer corresponding to the MCG, with respect to a plurality of pieces of data for which successful delivery is not acknowledged). For example, for a split bearer with a PDCP layer configured for the SCG (bearer via which one RLC layer is configured for the MCG and another RLC layer is configured for the SCG), an indicator (reestablishRLC) to trigger a procedure for reestablishing the RLC layer configured for the MCG may also be included in the RRC message including the configuration information or the indicator (or, the RLC layer may be suspended, or, an indicator may be configured to trigger an RLC establishment procedure when the cell group is activated or resumed at a later time), or, alternatively, an indicator to trigger a PDCP reestablishment procedure (reestablishPDCP) or a PDCP suspend procedure (PDCP suspend) in the PDCP layer configured for the SCG may also be included, or the UE may perform a reestablishment procedure on the RLC layer configured for the SCG (or, the RLC layer may be suspended, or, an indicator may be configured to trigger an RLC establishment procedure when the cell group is activated or resumed at a later time), or may perform a PDCP reestablishment procedure or a PDCP suspend procedure (PDCP suspend) in the PDCP layer configured for the SCG. For example, for a bearer configured for the SCG, the UE may suspend bearers, or may indicate an RRC layer to trigger a PDCP reestablishment procedure or a PDCP suspend procedure in a PDCP layer, or may perform the PDCP reestablishment procedure or the PDCP suspend procedure in the PDCP layer. In the above case, the UE may trigger a first PDCP suspend procedure for bearers configured for the SCG, or may perform the first PDCP suspend procedure in a PDCP layer. In another method, in order to solve a security issue problem (e.g., a security problem which may occur when security configuration information or a security key is not changed (or updated or reconfigured) when it is configured to activate or resume the cell group) which occurs when different data are transmitted with the same security key when the SCG is activated or resumed, the UE may trigger a second PDCP suspend procedure for bearers configured for the SCG, or a second PDCP suspend procedure may be performed in a PDCP layer. In another method, when a higher layer triggers a PDCP layer suspend procedure, a first PDCP suspend procedure may be triggered and performed, and when the higher layer indicates an indicator to trigger a PDCP layer suspend procedure or to deactivate or suspend a cell group (or cell), a second PDCP suspend procedure may be triggered and performed. In another method, when the RRC message includes security key configuration information and thus a security key is changed, or includes an indication of a PDCP layer reestablishment procedure, the PDCP layer reestablishment procedure is performed, or when the RRC message does not include the security key configuration information or indicates, by using an indicator, an operation of a PDCP layer, the UE may trigger and perform the first PDCP resume procedure or the second PDCP resume procedure. Also, when the suspended bearer or PDCP layer or RLC layer is resumed, in order to prevent stored old data from being transmitted, the UE may perform a procedure for discarding a plurality of pieces of stored data (e.g., PDCP PDU or PDCP SDU or RLC PDU or RLC SDU). For example, the UE may perform a data discard procedure (SDU discard) in the PDCP layer or may perform a RLC layer reestablishment procedure. In the above case, the data discard procedure (SDU discard) in the PDCP layer, in which a plurality of pieces of stored data are discarded, or the RLC layer reestablishment procedure may be performed when suspension or inactivation or release of a cell group is indicated by an RRC message or MAC control information or DCI of a PDCCH.

2> Operation for SRB configured for SCG: When the UE receives the configuration information or the indicator and activates a PSCell, or when an activated DL BWP of the PSCell is a normal BWP other than a dormant BWP or when the UE monitors the PDCCH on an activated PSCell with a long interval based on second DRX configuration information, SRBs (or SN (SCG) terminated SRBs or SRBs or SRB3s with a PDCP layer configured for the SCG) included in the SCG may be continuously maintained (e.g., the UE may continuously transmit or receive a control message to or from a secondary BS). Alternatively, in order to discard a plurality of pieces of old data (PDCP SDU or PDCP PDU) stored in the SRBs configured for the SCG, the UE may perform a data discard procedure (e.g., a discard indication to a PDCP layer) or a RLC layer reestablishment procedure. In another method, when the UE receives the configuration information or the indicator, the UE may resume SRBs (or SN (SCG) terminated SRBs or SRBs or SRB3s with a PDCP layer configured in the SCG) included in the SCG. Alternatively, in order to discard a plurality of pieces of old data (PDCP SDU or PDCP PDU) stored in the SRBs configured for the SCG, the UE may perform a data discard procedure (e.g., a discard indication to a PDCP layer) or a RLC layer reestablishment procedure. For example, for a split SRB bearer with a PDCP layer configured for the MCG (bearer via which one RLC layer is configured for the MCG and another RLC layer is configured for the SCG), an indicator (reestablishRLC) to trigger a procedure for reestablishing the RLC layer configured for the SCG may also be included, or an indicator to trigger a PDCP data recovery procedure in the PDCP layer configured for the MCG may also be included, in the RRC message including the configuration information or the indicator, or the UE may perform a reestablishment procedure on the RLC layer configured for the SCG, or may perform a PDCP data recovery procedure in the PDCP layer configured for the MCG. For example, for a split bearer with a PDCP layer configured for the SCG (bearer via which one RLC layer is configured for the MCG and another RLC layer is configured for the SCG), an indicator (reestablishRLC) to trigger a procedure for reestablishing the RLC layer configured for the MCG may also be included, or an indicator to trigger a PDCP reestablishment procedure (reestablishPDCP) or a PDCP suspend procedure (PDCP suspend) in the PDCP layer configured for the SCG may also be included, in the RRC message including the configuration information or the indicator, or the UE may perform a reestablishment procedure on the RLC layer configured for the MCG, or may perform a PDCP reestablishment procedure or a PDCP suspend procedure (PDCP suspend) in the PDCP layer configured for the SCG. For example, for a bearer configured for the SCG, the UE may suspend bearers, or may indicate an RRC layer to trigger a PDCP reestablishment procedure or a PDCP suspend procedure in a PDCP layer, or may perform the PDCP reestablishment procedure or the PDCP suspend procedure in the PDCP layer. In the above case, the UE may trigger a first PDCP suspend procedure for bearers configured in an SCG, or may perform a first PDCP suspend procedure in the PDCP layer. In another method, in order to solve a security issue problem occurring when different data are transmitted with the same security key when the SCG is activated or resumed, the UE may trigger a second PDCP suspend procedure for bearers configured for the SCG, or may perform a second PDCP suspend procedure in the PDCP layer. In another method, when a higher layer triggers a PDCP layer suspend procedure, a first PDCP suspend procedure may be triggered and performed, and when the higher layer triggers a PDCP layer suspend procedure or indicates an indicator to deactivate or suspend a cell group (or cell), a second PDCP suspend procedure may be triggered and performed. In another method, when the RRC message includes security key configuration information and thus a security key is changed, or includes an indication of a PDCP layer reestablishment procedure, the PDCP layer reestablishment procedure is performed, or when the RRC message does not include the security key configuration information or indicates, by using an indicator, an operation of a PDCP layer, the UE may trigger and perform the first PDCP resume procedure or the second PDCP resume procedure. Also, when the suspended bearer or PDCP layer or RLC layer is resumed, in order to prevent stored old data from being transmitted, the UE may perform a procedure of discarding a plurality of pieces of stored data (e.g., PDCP PDU or PDCP SDU or RLC PDU or RLC SDU). For example, the UE may perform a data discard procedure (SDU discard) in the PDCP layer or may perform a RLC layer reestablishment procedure. In the above case, the data discard procedure (SDU discard) in the PDCP layer, in which a plurality of pieces of stored data are discarded, or the RLC layer reestablishment procedure may be performed when suspension or inactivation or release of a cell group is indicated via an RRC message or MAC control information or DCI of a PDCCH.

2> UE operation for PUCCH SCell of SCG: When the UE receives the configuration information or the indicator, the UE may deactivate a PUCCH SCell of an SCG, and may perform a UE operation in the deactivated SCell. In another method, when the UE receives the configuration information or the indicator, if a dormant BWP is configured in the PUCCH SCell of the SCG, the UE may maintain the SCell in an active state, may activate a DL BWP of the SCell to the dormant BWP, and may perform a UE operation in the dormant BWP, or alternatively, when a dormant BWP is not configured for the PUCCH SCell of the SCG, the UE may switch the SCell to an inactive state, and may perform a UE operation in the deactivated cell or BWP. In another method, when the UE receives the configuration information or the indicator, the UE may determine switching or activation or deactivation of a BWP or a state of the SCell according to SCell configuration information or an indicator configured in a message including the configuration information or the indicator, and may perform a UE operation. In another method, when the UE receives the configuration information or the indicator, the UE may apply, to the PUCCH SCell, second DRX configuration information configured in an RRC message, and may perform a UE operation in an activated SCell when it is possible to perform PDCCH monitoring with a long interval.

The MAC partial reset procedure according to the disclosure may include one or more UE operations from among procedures below.

A UE may perform an operation of flushing the remaining HARQ processes (i.e., general HARQ process or HARQ process for system information) except for an HARQ process for multicast and broadcast service (MBS) from among HARQ processes configured for a serving cell, and after handover completion or after RRC state mode transition (to an RRC inactive mode or an RRC idle mode), the HARQ process for MBS may be emptied (flushed) or released (flushed) or initialized (flushed), or flushing may be omitted In a case of flushing operation, after handover completion or after RRC state mode transmission (to an RRC inactive mode or an RRC idle mode), when MBS reception in a target BS is possible or when G-RNTI monitoring starts, data of the HARQ process related to an MBS may be flushed. Alternatively, until handover is completed or until RRC state mode transition (to an RRC inactive mode or an RRC idle mode) is completed, data reception through a G-RNTI may be continuously performed, and in a case of handover, the UE may perform an operation of monitoring a C-RNTI from a target cell allocated by the target BS via the RRC message. In another method, even before random access is completed from the target BS, the UE may continuously perform data reception through the G-RNTI.

A random access procedure that is being performed, if any, may be stopped.

A specifically configured or indicated preamble identifier, or preamble configuration information, or random access configuration related information (PRACH) configuration information, if any, may be discarded.

A temporary cell identifier (temporary C-RNTI), if any, may be released.

A buffer for message3 transmission may be flushed.

All new data indicators for an HARQ process for a UL may be configured as 0.

When a UL DRX retransmission timer for the UL is running, the UL DRX retransmission timer may stop.

When all UL HARQ related timers are running, the UL HARQ related timers may stop.

In the above case, when a MAC reset procedure is performed or when an indicator indicating a MAC partial reset procedure is not included or the MAC partial reset procedure is not indicated or is not performed, the UE may perform a whole MAC reset procedure, and thus, may flush all of the configured general HARQ process, HARQ process for MBS, and HARQ process for system information.

The first PDCP suspension (resume) procedure provided in the disclosure may include one or more UE operations from among procedures below.

A transmission PDCP layer of the UE may initialize a transmission window variable or may configure the transmission window variable as an initial value, or may discard stored data (e.g., PDCP PDU or PDCP SDU). In another method, in order to prevent data loss, only the PDCP PDU may be discarded. This is a procedure for preventing old data from being transmitted or retransmitted when an SCG is activated or resumed at a later time.

When a reordering timer (t-reordering) (timer for arranging data in an ascending order based on PDCP sequence numbers or COUNT values) is running, a reception PDCP layer of the UE may stop or initialize the reordering timer. Alternatively, the reception PDCP layer of the UE may perform a header decompression procedure on a plurality of pieces of stored data (e.g., PDCP SDU), and may deliver the data to a higher layer in an ascending order of COUNT values. The reception PDCP layer of the UE may initialize a reception window variable or may configure the reception window variable as an initial value.

A second PDCP suspend (or resume) procedure provided in the disclosure may include one or more UE operations from among procedures below.

A transmission PDCP layer of a UE may maintain a variable value without initializing a transmission window variable or without configuring the transmission window variable as an initial value. The reason why the variable value (e.g., COUNT value) is maintained is to solve a security issue problem occurring when different data are transmitted with the same security key (e.g., COUNT value) when an SCG is activated or resumed. In the above case, the transmission PDCP layer of the UE may discard stored data (e.g., PDCP PDU or PDCP SDU). In another method, in order to prevent data loss, only the PDCP PDU may be discarded. This is a procedure for preventing old data from being transmitted or retransmitted when the SCG is activated or resumed at a later time.

When a reordering timer (t-reordering) (timer for arranging data in an ascending order based on PDCP sequence numbers or COUNT values) is running, a reception PDCP layer of the UE may stop or initialize the reordering timer. Alternatively, the reception PDCP layer of the UE may perform a header decompression procedure on a plurality of pieces of stored data (e.g., PDCP SDU), and may deliver the data to a higher layer in an ascending order of COUNT values. The reception PDCP layer of the UE may maintain a variable value without initializing a reception window variable or without configure the reception window variable as an initial value. The reason why the variable value (e.g., COUNT value) is maintained is to solve a security issue problem occurring when different data are transmitted with the same security key (e.g., COUNT value) when the SCG is activated or resumed. In another method, in order not to directly trigger the reordering timer even without a COUNT value or a PDCP sequence number gap when the SCG is activated or resumed or data is received, the UE may configure or update an RX_NEXT window variable (variable indicating a COUNT value of data expected to be received next) to a value of an RX_DELIV window variable (variable indicating a COUNT value corresponding to next data of data delivered to a higher layer) or to a COUNT value of data first received by the UE. In another method, when a reordering timer value is configured in the message or when an indicator is received from a higher layer, the UE may configure or update an RX_REORD window variable (variable indicating a COUNT value of next data of data triggering the reordering timer) to a variable value of an RX_NEXT window variable value, or may stop or restart the reordering timer.

In the above case, when the UE receives configuration information or an indicator for releasing or deactivating or reconfiguring or suspending dual connectivity or a cell group (e.g., SCG) or a cell (e.g., by DCI of a PDCCH or MAC control information or an RRC message) and the UE performs the above UE operations, if data to be transmitted via a UL occurs or is generated in the UE, the UE may transmit a scheduling request (SR) or MAC control information (or indicator or the amount of buffer or a buffer state report) on a transmission resource of the PUCCH configured in the RRC message to a master BS or a secondary BS to request a UL transmission resource or to request to configure or add or activate or resume or modify or reconfigure dual connectivity or a cell group (e.g., SCG) or a cell. In another method, when the UE receives configuration information or an indicator for releasing or deactivating or reconfiguring or suspending dual connectivity or a cell group (e.g., SCG) or a cell (e.g., by DCI of a PDCCH or MAC control information or an RRC message) and the UE performs the above UE operations, if data to be transmitted via a UL occurs or is generated in the UE, the UE may generate an RRC message and may transmit the RRC message to a master BS or a secondary BS to request a UL transmission resource or to request to configure or add or activate or resume or modify or reconfigure dual connectivity or a cell group (e.g., SCG) or a cell.

Procedures proposed in the disclosure may be extended to a multiple access technology. For example, a plurality of pieces of configuration information of a plurality of cell groups may be configured for a UE by an RRC message, and one or more cell groups (or cells) from among the configured plurality of cell groups may be activated or resumed by an indicator of a PDCCH or MAC control information or an RRC message, or one or more cell groups may be suspended or deactivated.

In the disclosure, when a SCG or a PSCell of the SCG is deactivated or suspended due to a deactivation or suspend procedure of a cell group or a cell, which is proposed in the disclosure, UE operations of the UE to activate or resume the cell group or the cell, in response to UL data with respect to the SCG (or bearers that belong to the SCG) being generated or occurring in the UE, will now be described.

As proposed in the disclosure, when the cell group or the cell is deactivated or suspended, the UE is not able to transmit or receive data, and thus, if UL data of the UE is generated with respect to the SCG (or bearers that belong to the SCG), it is required to activate or resume the cell group or the cell again. In the above case, a procedure, by the UE, for requesting a BS (a master BS or a secondary BS) to activate or resume the cell group or the cell again will be performed by using one method or a method extended from a combination or application of methods below.

First method: The UE configures a message (e.g., an RRC message) of requesting to activate or resume the cell group or the cell again and transmits the message to the master BS. In the above case, upon reception of the message, the master BS may request the secondary BS for a resume procedure as the first signaling procedure of FIG. 1I proposed in the disclosure, may receive a response, and may configure and transmit, to the UE, a message (e.g., an RRC message) of indicating activation or resumption of the SCG again. In another method, as in the second signaling procedure of FIG. 1J, the master BS may configure and transmit, to the UE, a message (e.g., an RRC message) of indicating activation or resumption of the SCG again, and then may indicate the secondary BS with activation or resumption. In another method, as in the third signaling procedure of FIG. 1K, the UE may configure and transmit, to the secondary BS via SRB3, a message (e.g., an RRC message) of requesting to activate or resume the cell group or the cell again, and the secondary BS may configure and transmit, to the UE, a message (e.g., an RRC message) of indicating activation or resumption of the SCG again, and then may indicate the master BS with activation or resumption.

Second method: The UE configures a message (e.g., MAC control information) of requesting to activate or resume the SCG or the cell again and transmits the message to the master BS. In the above case, upon reception of the message, the master BS may request the secondary BS for a resume procedure as the first signaling procedure of FIG. 1I proposed in the disclosure, may receive a response, and may configure and transmit, to the UE, a message (e.g., an RRC message or MAC control information) of indicating activation or resumption of the SCG again. In another method, as in the second signaling procedure of FIG. 1J, the master BS may configure and transmit, to the UE, a message (e.g., an RRC message or MAC control information) of indicating activation or resumption of the SCG again, and then may indicate the secondary BS with activation or resumption. In another method, as in the third signaling procedure of FIG. 1K, the UE may configure and transmit, to the secondary BS via SRB3, a message (e.g., MAC control information) of requesting to activate or resume the SCG or the cell again, and the secondary BS may configure and transmit, to the UE, a message (e.g., an RRC message or MAC control information) of indicating activation or resumption of the SCG again, and then may indicate the master BS with activation or resumption. In the above case, when activation or resumption of the cell group is requested or indicated by MAC control information, the MAC control information may be newly defined and designed, and in another method, a new field (or indicator) may be defined or a new value (or field value or identifier value) may be defined in legacy MAC control information to indicate the new field or the new value.

Third method: The UE configures a message (e.g., a physical signal of a PHY layer) of requesting to activate or resume the cell group or the cell again and transmits the message to the master BS. In the above case, upon reception of the message, the master BS may request the secondary BS for a resume procedure as the first signaling procedure of FIG. 1I proposed in the disclosure, may receive a response, and may configure and transmit, to the UE, a message (e.g., an RRC message or a physical signal of a PHY layer) of indicating activation or resumption of the SCG again. In another method, as in the second signaling procedure of FIG. 1J, the master BS may configure and transmit, to the UE, a message (e.g., an RRC message or a physical signal of a PHY layer) of indicating activation or resumption of the SCG again, and then may indicate the secondary BS with activation or resumption. In another method, as in the third signaling procedure of FIG. 1K, the UE may configure and transmit, to the secondary BS via SRB3, a message (e.g., a physical signal of a PHY layer) of requesting to activate or resume the SCG or the cell again, and the secondary BS may configure and transmit, to the UE, a message (e.g., an RRC message or a physical signal of a PHY layer) of indicating activation or resumption of the SCG again, and then may indicate the master BS with activation or resumption. In the above case, when activation or resumption of the cell group is requested or indicated by a physical signal of a PHY layer, the physical signal of the PHY layer may be newly defined and designed as a new transmit resource (e.g., a new SR transmission resource (e.g., a PUCCH transmission resource of a PCell or PSCell) or a new field of DCI of a PDCCH (a PDCCH transmission resource transmitted from a PSCell or transmitted from a PCell) which is for the SCG), and in another method, a new field (or indicator) may be defined or a new value (or field value or identifier value) may be defined in a legacy physical signal of a PHY layer (e.g., a SR transmission resource (e.g., a PUCCH transmission resource of a PCell or PSCell) or a field of DCI of a PDCCH (a PDCCH transmission resource transmitted from a PSCell or transmitted from a PCell)) to indicate the new field or the new value. In another method, when the UE performs PDCCH monitoring on a PSCell of the SCG with a long interval by applying second DRX configuration information or when the SCG of the UE is in an inactive state or a suspended state, if the PSCell triggers a random access procedure to the UE by DCI of PDCCH, the UE may interpret an indication of the triggering as activation or resumption of the SCG.

As proposed in the disclosure, when the UE activates or resumes the cell group (e.g., the SCG) or the cell (e.g., a PSCell), in response to an indicator of a PDCCH or MAC control information or an RRC message, the UE may complete activation or resumption of the cell group or the cell at a first point of time. The first point of time may be configured by an RRC message, as proposed above in the disclosure. For example, the RRC message may include time information (e.g., information (e.g., X) to indicate timing, a time unit, a subframe or a time slot or a symbol unit) to indicate when to activate or resume or deactivate or suspend dual connectivity or a cell group (or a SCG) or a cell (a PSCell or a SCG SCell). For example, in the above case, when the UE has received PDCCH or MAC control information or an RRC message to indicate to activate or resume or deactivate or suspend the cell group (e.g., the SCG) or the cell (e.g., the PSCell) at an $n^{th}$ time unit, time information to complete, at an $n+X^{th}$ time unit, activation or resumption or deactivation or suspension of the cell group or the cell may be configured. In another method, in the above case, the time information (e.g., X) may not be configured by a BS but may be used as a value that is preset and defined and thus fixed. As another example, in the above case, when a random access is started (a preamble is transmitted) at an $n^{th}$ time unit or a random access is successfully completed after the PDCCH or the MAC control information or the RRC message to indicate to activate or resume or deactivate or suspend the cell group (e.g., the SCG) or the cell (e.g., the PSCell) is received, time information to complete, at an $n+X^{th}$ time unit, activation or resumption or deactivation or suspension of the cell group or the cell may be configured. In another method, in the above case, the time information (e.g., X) may not be configured by a BS but may be used as a value that is preset and defined and thus fixed. In the above case, when activation or suspension or deactivation or resumption of the cell group or the cell is completed, the UE may perform UE operations according to a state (e.g., activation or hibernation or deactivation) of each cell or BWP, which is proposed in the disclosure. Also, in the above case, when activation or resumption of the cell group or the cell is completed, a DRX operation of the UE may be started or restarted, or in the above case, when deactivation or suspension of the cell group or the cell is completed, the DRX operation of the UE may be suspended or deactivated.

Also, as proposed above in the disclosure, when the UE activates a cell (e.g., PSCell or SCell) of a cell group (e.g., MCG or SCG), in response to an indication of MAC control information, the UE may complete activation of the cell at a second point of time. The second point of time may be configured by an RRC message, as proposed above in the disclosure. For example, the RRC message may include time information (e.g., information (e.g., X) to indicate timing, a time unit, a subframe or a time slot or a symbol unit) to indicate when to activate or deactivate carrier aggregation or dual connectivity or a cell group (or MCG or SCG) or a cell (a MCG SCell or a SCG SCell). For example, in the above case, when the UE has received MAC control information to indicate to activate or deactivate a cell (e.g., SCell) at an $nt^h$ time unit, time information to complete, at an $n+X^{th}$ time unit, activation or deactivation of the cell may be configured. In another method, in the above case, the time information (e.g., X) may not be configured by a BS but may be used as a value that is preset and defined and thus fixed. As another example, in the above case, when a random access is started (a preamble is transmitted) at an $n^{th}$ time unit or a random access is successfully completed after the MAC control information to indicate to activate or deactivate the cell (e.g., the SCell or the PSCell) is received, time information to complete, at an $n+X^{th}$ time unit, activation or deactivation of the cell may be configured. In another method, in the above case, the time information (e.g., X) may not be configured by a BS but may be used as a value that is preset and defined and thus fixed. In the above case, when activation or suspension or deactivation or resumption of the cell group or the cell is completed, the UE may perform UE operations according to a state (e.g., activation or hibernation or deactivation) of each cell or BWP, which is proposed in the disclosure. Also, in the above case, when activation or resumption of the cell group or the cell is completed, a DRX operation of the UE may be started or restarted, or in the above case, when deactivation or suspension of the cell group or the cell is completed, the DRX operation of the UE may be suspended or deactivated.

Also, as proposed above in the disclosure, when the UE activates a cell (e.g., PSCell or SCell) of a cell group (e.g., MCG or SCG), in response to an indication of an RRC message, activation of the cell may be completed at a third point of time. The third point of time may be configured by an RRC message, as proposed above in the disclosure. For example, the RRC message may include time information (e.g., information (e.g., X) to indicate timing, a time unit, a subframe or a time slot or a symbol unit) to indicate when to activate or deactivate carrier aggregation or dual connectivity or a cell group (or MCG or SCG) or a cell (a MCG SCell or a SCG SCell or a PSCell). For example, in the above case, when the UE has received an RRC message to indicate to activate or deactivate a cell (e.g., SCell) at an $n^{th}$ time unit, time information to complete, at an $n+X^{th}$ time unit, activation or deactivation of the cell may be configured. In another method, in the above case, the time information (e.g., X) may not be configured by a BS but may be used as a value that is preset and defined and thus fixed. As another example, in the above case, when a random access is started (a preamble is transmitted) at an $n^{th}$ time unit or a random access is successfully completed after the RRC message to indicate to activate or deactivate the cell (e.g., the SCell or the PSCell) is received, time information to complete, at an $n+X^{th}$ time unit, activation or deactivation of the cell may be configured. In another method, in the above case, the time information (e.g., X) may not be configured by a BS but may be used as a value that is preset and defined and thus fixed. In the above, X may be configured or preset, based on a slot number, or may be configured or preset, based on a shortest slot length from among preset PCells or PSCells or SCells. In the above case, when activation or suspension or deactivation or resumption of the cell group or the cell is completed, the UE may perform UE operations according to a state (e.g., activation or hibernation or deactivation) of each cell or BWP, which is proposed in the disclosure. Also, in the above case, when activation or resumption of the cell group or the cell is completed, a DRX operation of the UE may be started or restarted, or in the above case, when deactivation or suspension of the cell group or the cell is completed, the DRX operation of the UE may be suspended or deactivated.

A concept of a cell group which is proposed in the disclosure may be extended to a subcell group. For example, in the disclosure, in order to configure dual connectivity for a UE, a first cell group and a second cell group are configured and applied as a MCG and a SCG, such that the dual connectivity may be configured and thus the UE can perform data transmission or reception to or from two BSs. However, if the concept of the cell group is extended to a subcell group, a plurality of subcell groups of the cell group may be configured for a UE connected with one BS, or subcell group identifiers may be respectively configured for the subcell groups. Then, the UE performs data transmission or reception with one BS, but, the UE may extend and apply an activation or suspension or resumption or deactivation procedure to different frequencies or cells for each of subcell groups, in response to PDCCH or MAC control information or an RRC message, which is proposed in the disclosure. For example, when the UE performs communication with one BS on a plurality of frequencies or cells, the BS may configure the UE with a plurality of subcell groups with respect to the plurality of frequencies or cells of the BS, which correspond to the cell group (MCG), so as to allow the UE to apply carrier aggregation, and may define fields to indicate activation or deactivation or suspension or resumption of each subcell group, the fields respectively indicating the subcell groups in PDCCH or MAC control information or an RRC message. Then, the UE may apply an activation or suspension or resumption or deactivation procedure to different frequencies or cells for each of the subcell groups, in response to PDCCH or MAC control information or an RRC message, which is proposed in the disclosure. In another method, a subcell group proposed above may be implemented by introducing DL or UL logical channel restriction with respect to each cell. For example, an RRC message may include configuration information to restrict logical channels, which belong to one cell group, to transmit or receive data only for a particular frequency or cell and may be transmitted to the UE. As described above, logical channels (e.g., logical channel identifiers) may be configured by mapping them to respective cells or frequencies, and thus may be grouped to be regarded as a subcell group proposed above, and fields to respectively indicate the cells may be defined in PDCCH or MAC control information or an RRC message, such that the fields may indicate activation or deactivation or suspension or resumption of the respective cells.

In the disclosure, when the UE for which dual connectivity is configured performs data transmission or reception to or from a MCG or a SCG or when the SCG is suspended or deactivated, if the MCG detects a radio link failure, the UE may report the radio link failure to the SCG or to the MCG via the SCG. For example, the UE may configure an RRC message for reporting the radio link failure and may report the radio link failure by transmitting the RRC message via split SRB1 or SRB3. In the above case, in a case where split SRB1 is configured, the UE may report the radio link failure always via split SRB1. In another method, when the UE for which dual connectivity is configured performs data transmission or reception to or from a MCG or a SCG or when the SCG is suspended or deactivated, if the MCG detects radio link failure, the UE may declare the radio link failure and may perform an RRC connection re-establishment procedure.

In the disclosure, when the UE for which dual connectivity is configured performs data transmission or reception to or from a MCG or a SCG or when the SCG is suspended or deactivated, if the SCG detects a radio link failure, the UE may report the radio link failure to the MCG or to the SCG via the MCG. For example, the UE may configure an RRC message for reporting the radio link failure and may report the radio link failure by transmitting the RRC message via SRB1 or split SRB1 or SRB3. In the above case, in a case where SRB1 or split SRB1 is configured, the UE may report the radio link failure always via split SRB1.

In the disclosure, it is not the case that, when the UE receives an RRC message including a SCG configuration information, the UE stores cell group configuration information, configures the SCG based on the cell group configuration information, always configures dual connectivity, and then transmits or receives data. In the disclosure, when the UE receives the RRC message, the UE may only store the cell group configuration information based on indication information, e.g., a cell group identifier or cell group state information or an indicator, which is configured in the RRC message proposed in the disclosure, or may store or recover, apply and establish the cell group configuration information, or may store or recover, apply and establish the cell group configuration information and may perform data transmission or reception based on dual connectivity. A BS, by extending the disclosure, may configure one UE with a plurality of pieces of cell group configuration information via an RRC message and allow the UE to store them, and may indicate, by indicating one cell group configuration information among the stored plurality of pieces of cell group configuration information, the UE to configure dual connectivity by applying and establishing configuration and then to transmit or receive data, or to activate or deactivate or suspend or resume or release the cell group, when required. Also, the BS may configure a MCG or a SCG by using one cell group configuration information among the stored plurality of pieces of cell group configuration information. In the above case, when dual connectivity is configured based on one cell group configuration information, the UE may attempt an access to the cell group via a CBRA procedure. If the cell group configuration information includes configuration information related to a contention-free random access, the UE may perform, on the cell group, a CFRA procedure based on the configuration information, and thus may perform an access to the cell group.

Hereinafter, in the disclosure, various methods by which the BS configures a cell group via an RRC message (e.g., an RRCReconfiguration message or a newly-defined RRC message) and UE operations in response thereto will now be proposed.

1> When the BS newly adds a cell group (SCG) (or configures a cell group state to an active state while adding the cell group) by transmitting an RRC message (e.g., an RRCReconfiguration message or a newly-defined RRC message) to a UE for which dual connectivity is not configured, or when the BS changes a configured cell group (SCG) to a different cell group (or a new cell group) (or configures a cell group state to an active state while changing the cell group) by transmitting an RRC message to the UE for which dual connectivity is configured, or when the BS configures (or changes) an inactive state of a configured cell group (SCG) to an active state by transmitting an RRC message to the UE for which dual connectivity is configured 2> the BS may include, in the RRC message, a ReconfigurationWithSync indicator, and bearer configuration information about the cell group or cell group configuration information or cell configuration information or protocol layer configuration information (e.g., SDAP layer or PDCP layer or RLC layer or MAC layer or PHY layer configuration information), and may transmit the RRC message to the UE. In another method, the BS may include state configuration information of the cell group in the RRC message, and may configure and indicate activation of the cell group.

2> When the UE receives the RRC message, the UE may configure a cell group based on the cell group configuration information, and may configure or establish each protocol layer, and when the ReconfigurationWithSync indicator is included, the UE may perform or trigger a random access procedure to the cell group (or a cell or a frequency or a PSCell). In the above case, the UE may transmit, to the BS, a response RRC message (e.g., an RRC Reconfiguration Complete message or a newly-defined response message) in response to the RRC message. In another method, when the ReconfigurationWithSync indicator is included in the RRC message or when a cell group state is configured as an active state or when a TAT configured in an MAC layer expires (or is not running), the UE may be allowed to perform or trigger a random access procedure to the cell group (or a cell or a frequency or a PSCell), such that it is possible to prevent the random access procedure from being unnecessarily triggered. In another method, when the ReconfigurationWithSync indicator is included in the RRC message or when a cell group state is configured as an active state and a TAT configured in an MAC layer expires (or is not running), the UE may be allowed to perform or trigger a random access procedure to the cell group (or a cell or a frequency or a PSCell), such that it is possible to prevent the random access procedure from being unnecessarily triggered.

1> When the BS changes a configuration of a configured cell group (SCG) by transmitting an RRC message to the UE for which dual connectivity is configured, or when the BS reconfigures configuration information while maintaining a configured active state of a cell group (SCG) as an active state by transmitting an RRC message to the UE for which dual connectivity is configured, 2> the BS does not include a ReconfigurationWithSync indicator in the RRC message, and may include bearer configuration information about the cell group or cell group configuration information or cell configuration information or protocol layer configuration information (e.g., SDAP layer or PDCP layer or RLC layer or MAC layer or PHY layer configuration information), and may transmit the RRC message to the UE. In another method, the BS may include state configuration information of the cell group in the RRC message, and may configure and indicate activation of the cell group.

2> When the UE receives the RRC message, the UE may configure a cell group based on the cell group configuration information, may configure or establish or reconfigure or reestablish each protocol layer, and may transmit, to the BS, a response RRC message (e.g., an RRC Reconfiguration Complete message or a newly-defined response message) in response to the RRC message. Then, the UE may be allowed to not perform or not trigger a random access procedure to the cell group (or a cell or a frequency or a PSCell), such that it is possible to prevent the random access procedure from being unnecessarily triggered to a deactivated cell group.

1> When the BS configures an inactive state (or a suspended state) as a state of a configured cell group (SCG) by transmitting an RRC message (e.g., an RRCReconfiguration message or a newly-defined RRC message) to a UE for which dual connectivity is configured, or when the BS newly adds a cell group (SCG) by transmitting an RRC message (e.g., an RRCReconfiguration message or a newly-defined RRC message) to the UE for which dual connectivity is not configured, and configures a state of the newly-added cell group as an inactive state (or a suspended state), or when the BS reconfigures configuration information while maintaining a configured inactive state (or a suspended state) of a cell group (SCG) as an inactive state (or a suspended state) by transmitting an RRC message (e.g., an RRCReconfiguration message or a newly-defined RRC message) to the UE for which dual connectivity is configured, 2> the BS does not include a ReconfigurationWithSync indicator in the RRC message and, when a configuration is required, the BS may include bearer configuration information about the cell group or cell group configuration information or cell configuration information or protocol layer configuration information (e.g., SDAP layer or PDCP layer or RLC layer or MAC layer or PHY layer configuration information), and may transmit the RRC message to the UE. The BS may include state configuration information of the cell group in the RRC message, and may configure and indicate deactivation of the cell group.

2> When the UE receives the RRC message including the cell group configuration information, the UE may reconfigure a cell group based on the cell group configuration information, and may configure or reconfigure or establish or reestablish each protocol layer. In the above case, the UE may transmit, to the BS, a response RRC message (e.g., an RRC Reconfiguration Complete message or a newly-defined response message) in response to the RRC message. Then, the UE may perform UE operations proposed in the disclosure. In the above case, the UE may transmit, to the BS, a response RRC message (e.g., an RRC Reconfiguration Complete message or a newly-defined response message) in response to the RRC message. Then, the UE may be allowed not perform or not trigger a random access to the cell group (or a cell or a frequency or a PSCell), such that it is possible to prevent the random access procedure from being unnecessarily triggered to a deactivated cell group.

1> When the BS configures (or changes) an inactive state (or a suspended state) of a configured cell group (SCG) to an active state by transmitting an RRC message to the UE for which dual connectivity is configured, 2> the BS does not include a ReconfigurationWithSync indicator in the RRC message and, when a reconfiguration is required, the BS may include bearer configuration information about the cell group or cell group configuration information or cell configuration information or protocol layer configuration information (e.g., SDAP layer or PDCP layer or RLC layer or MAC layer or PHY layer configuration information), and may transmit the RRC message to the UE. The BS may include state configuration information of the cell group in the RRC message, and may configure and indicate activation of the cell group.

2> When the UE receives the RRC message including the cell group configuration information, the UE may reconfigure a cell group based on the cell group configuration information, and may configure or reconfigure or establish or reestablish each protocol layer. In the above case, the UE may transmit, to the BS, a response RRC message (e.g., an RRC Reconfiguration Complete message or a newly-defined response message) in response to the RRC message. Then, the UE may perform UE operations proposed in the disclosure. In another method, when a cell group state is configured as an active state or when a TAT configured in an MAC layer expires (or is not running), the UE may be allowed to perform or trigger a random access procedure to the cell group (or a cell or a frequency or a PSCell), such that it is possible to prevent the random access procedure from being unnecessarily triggered.

In the disclosure, when the BS configures cell group configuration information in the RRC message, the BS may always include (e.g., may define as a mandatory field) cell group state information in the RRC message, and thus may allow the UE to perform a procedure based on a cell group state.

In the disclosure, when the BS configures the cell group configuration information in the RRC message, if the cell group state information is configured as an inactive state, the BS may restrict a ReconfigurationWithSync indicator from being co-included (or configured), thereby preventing the UE from unnecessarily triggering a random access procedure.

Hereinafter, the disclosure provides methods for solving a problem that may occur when a BS deactivates or suspends one cell group in a case where a split bearer is configured for a UE for which dual connectivity is configured.

When a split bearer is configured for a UE for which dual connectivity with respect to a first cell group (MCG) and a second cell group (SCG) is configured, if the second cell group is deactivated or suspended, when UL data with respect to the second cell group occurs in the UE, the UE is not able to transmit the UL data. In the above case, the split bearer may be a split bearer with a PDCP layer configured for the first cell group and may indicate a bearer via which one RLC layer is configured for the first cell group and the other RLC layer is configured for the second cell group, or alternatively, in the above case, the split bearer may be a split bearer with a PDCP layer configured for the second cell group and may indicate a bearer via which one RLC layer is configured for the first cell group and the other RLC layer is configured for the second cell group.

A first method for solving a problem in which, even when UL data with respect to a cell group in a deactivated state (or suspended state) occurs in the UE, the UE is not able to transmit the data via the split bearer is that, when the BS configures a state of a cell group for the UE to an inactive state via an RRC message, the BS may change configuration information of the split bearer so as to prevent the UL data from being generated with respect to the deactivated cell group or may release or modify the split bearer so as to prevent the UL data from being generated with respect to the deactivated cell group. The first method may be performed as one method or a combination of a plurality of methods below.

First-1 method: When a split bearer is configured for the UE, and the BS attempts to configure a second cell group of the UE to an inactive state (or suspended state) by transmitting the RRC message, the BS may release the split bearer and may configure a normal bearer (e.g., a bearer for which a PDCP layer, a RLC layer, and an MAC layer are configured only for a first cell group or a bearer for which the PDCP layer, the RLC layer, and the MAC layer are configured only for the second cell group) or may modify and configure the split bearer to a normal bearer (e.g., a bearer for which a PDCP layer, a RLC layer, and an MAC layer are configured only for a first cell group or a bearer for which the PDCP layer, the RLC layer, and the MAC layer are configured only for the second cell group).

First-2 method: When a split bearer is configured for the UE, and the BS attempts to configure a second cell group of the UE to an inactive state (or suspended state) by transmitting the RRC message, the BS may reconfigure configuration information of the split bearer, and thus, may configure a ul-DataSplitThreshold value of the split bearer to an infinite value or may configure a primary path to a first cell group or an RLC layer belonging to the first cell group or a logical channel identifier corresponding thereto or may configure a duplicate state to an inactive state.

First-3 method: In a case where a split bearer is configured for the UE, and the BS attempts to configure a second cell group of the UE to an inactive state (or suspended state) by transmitting the RRC message, when the UE receives the RRC message, the UE may reconfigure configuration information of the split bearer, and thus, may configure a ul-DataSplitThreshold value of the split bearer to an infinite value or may configure a primary path to a first cell group or an RLC layer belonging to the first cell group or a logical channel identifier corresponding thereto or may configure a duplicate state to an inactive state.

A second method for solving a problem in which, even when UL data with respect to a cell group in a deactivated state (or suspended state) occurs in the UE, the UE is not able transmit the data via the split bearer is that, when the BS configures a cell group of the UE to an inactive state via the RRC message and then UL data via the split bearer occurs with respect to the deactivated cell group, the UE may activate the deactivated cell group or trigger a procedure for activating the cell group so as to transmit the UL data. The second method may be performed as one method or a combination of a plurality of methods below. The methods below may be performed by an MAC layer or an RRC layer of the UE.

Second-1 method: When a split bearer is configured for the UE, and the BS attempts to configure a second cell group of the UE to an inactive state (or suspended state) by transmitting the RRC message, the UE may perform a random access procedure on the second cell group when UL data with respect to the second cell group occurs. The UE may perform the random access procedure, may configure connection to the second cell group or perform synchronization with respect to the second cell group, and may transmit an RRC message requesting activation of the second cell group or may transmit the UL data. In another method, when the UE maintains synchronization with the second cell group or a TAT does not expire (or is running), the UE may transmit the UL data on an SR transmit resource configured for the UE or a transmit resource allocated via a random access procedure.

Second-2 method: When a split bearer is configured for the UE, and the BS attempts to configure a second cell group of the UE to an inactive state (or suspended state) by transmitting the RRC message, if UL data with respect to the second cell group occurs, the UE may request activation of the second cell group by transmitting, to the first cell group, an RRC message or MAC control information (e.g., MAC control information indicating cell group activation or indicating a buffer status report for the second cell group, as new MAC control information (e.g., via an MAC layer for the first cell group)), such that a BS corresponding to the first cell group can perform a procedure for activating the second cell group and the UE can transmit the UL data.

Operations of a PDCP layer for supporting the second-2 method or the second-2 method the second method of the disclosure is performed are supported as below.

When transmitting data (PDCP PDU) to a lower layer, a transmit PDCP layer may perform a procedure below.

1> If the transmit PDCP layer is connected with one RLC layer,
2> the transmit PDCP layer transmits the data (PDCP PDU) to the connected RLC layer.
1> Otherwise, if the transmit PDCP layer is connected with at least two RLC layers,
2> if a PDCP duplicate function (a packet duplicate technology or PDCP packet duplication) is activated,
3> if data (PDCP PDU) to be transmitted to a lower layer is PDCP user data (PDCP Data PDU),
4> the transmit PDCP layer performs duplicate processing on the data (PDCP Data PDU) and transmits the data (PDCP Data PDU) to the connected RLC layers.
3> Otherwise (i.e., data (PDCP PDU) to be transmitted to the lower layer is PDCP control data (PDCP Control PDU)),
4> the transmit PDCP layer transmits the data (PDCP Control PDU) to the connected primary RLC layer (i.e., the connected primary RLC entity). In the above case, the primary RLC layer or the secondary RLC layer may be configured in an RRC message received from the BS as in FIG. 1E, and the primary RLC layer may not be deactivated, and when the packet duplicate technology is configured, the transmit PDCP layer may not duplicate process the PDCP control data (PDCP Control PDU) and may always transfer the PDCP control data (PDCP Control PDU) to the primary RLC layer and then transmit it.
2> Otherwise (i.e., if a PDCP duplicate function (a packet duplicate technology or PDCP packet duplication) is not activated or is deactivated),
3> if a secondary RLC layer (split secondary RLC layer (which may be configured by an RRC message of FIG. 1F and may indicate an RLC layer with respect to a second cell group for the split bearer)) is configured,
3> and (or), if an amount of all data of a size of a volume of PDCP data queuing for initial transmission and a size of a volume of RLC data in RLC layers (e.g., a primary RLC layer (which may be configured by an RRC message of FIG. 1F and may indicate an identifier of a logical channel configured as a primary path or an RLC layer corresponding thereto) connected to a PDCP layer or a secondary RLC layer (split secondary RLC layer) is equal to or greater than a threshold value for UL data transmission,
4> if the secondary RLC layer (split secondary RLC layer) is suspended or a state of a cell group corresponding to the secondary RLC layer (split secondary RLC layer) is deactivated (or suspended),
5> the transmit PDCP layer may perform the second-1 method or the second-2 method proposed in the disclosure. Alternatively, the transmit PDCP layer may transmit an indicator (or a request) to a lower layer (an MAC layer connected with a primary RLC layer or a secondary RLC layer) or to an upper layer (an RRC layer) so as to perform the second-1 method or the second-2 method.

4> The transmit PDCP layer may transmit the data (PDCP PDU or PDCP data PDU or PDCP Control PDU) to the primary RLC layer or the secondary RLC layer. In the above case, the primary RLC layer or the secondary RLC layer may be configured by an RRC message received from a BS as in FIG. 1F. In another method, the transmit PDCP layer may transmit the data (PDCP PDU or PDCP data PDU or PDCP Control PDU) to a primary RLC layer or a secondary RLC layer, which is of a cell group that is not suspended or is not in an inactive state (or in an active state). In the above case, a primary RLC layer or a secondary RLC layer may be configured by an RRC message received from the BS as in FIG. 1F. In another method, the transmit PDCP layer may transmit the data (PDCP PDU or PDCP data PDU or PDCP Control PDU) to a primary RLC layer, or a secondary RLC layer of a cell group that is not suspended or is not in an inactive state (or in an active state). In the above case, a primary RLC layer or a secondary RLC layer may be configured by an RRC message received from the BS as in FIG. 1F. In another method, if the secondary RLC layer (split secondary RLC layer) is suspended or a state of a cell group corresponding to the secondary RLC layer (split secondary RLC layer) is deactivated (or is suspended), the transmit PDCP layer may transmit the data (PDCP PDU or PDCP data PDU or PDCP Control PDU) only to the primary RLC layer.
3> Otherwise, if the transmit PDCP layer is connected with a bearer for which dual active protocol stack (DAPS) handover is configured (or DAPS handover is configured),
4> if the transmit PDCP layer did not receive, from an upper layer or a lower layer, an indicator (or a request) to switch UL data transmission,
5> the transmit PDCP layer may transfer the data (PDCP PDU or PDCP data PDU or PDCP Control PDU) to a source BS or an RLC layer for the source BS and thus transmit it.
4> Otherwise (i.e., if the transmit PDCP layer received, from an upper layer or a lower layer, the indicator (or the request) to switch UL data transmission),
5> if the data is PDCP user data (PDCP data PDU),
6> the transmit PDCP layer may transfer the PDCP user data to a target BS or an RLC layer for the target BS and thus transmit it.
5> Otherwise (i.e., if the data is PDCP control data (PDCP control PDU)),
6> if the PDCP control data is data for a source BS or is related to the source BS,
7> the transmit PDCP layer may transfer the PDCP control data to the source BS or an RLC layer for the source BS and thus transmit it.
6> Otherwise (i.e., if the PDCP control data is data for a target BS or is related to the target BS),
7> the transmit PDCP layer may transfer the PDCP control data to the target BS or an RLC layer for the target BS and then transmit it.
3> Otherwise (i.e., if an amount of all data of a size of a volume of PDCP data queuing for initial transmission and a size of a volume of RLC data in RLC layers connected to a PDCP layer is not greater than the threshold value for UL data transmission, or if the transmit PDCP layer is not connected with a bearer for which DAPS handover is configured (or DAPS handover is configured), 4> the transmit PDCP layer may transfer the data (PDCP PDU or PDCP data PDU or PDCP Control PDU) to a primary RLC layer and thus transmit it.

If the transmit PDCP layer is connected with a plurality of RLC layers (or two RLC layers), and indicates a PDCP data size to an MAC layer for a source BS or a target BS so as to trigger a buffer state report or to calculate a buffer size, the transmit PDCP layer may perform a procedure below.
  1> If a PDCP duplicate function (a packet duplicate technology or PDCP packet duplication) is activated,
  2> the transmit PDCP layer may indicate a size of PDCP data (PDCP data PDU or PDCP control PDU) to an MAC layer connected with a primary RLC layer.
  2> The transmit PDCP layer may indicate a size of PDCP data (PDCP data PDU) excluding a size of PDCP control data (PDCP control PDU) to an MAC layer connected with a secondary RLC layer.
  2> The transmit PDCP layer may indicate a PDCP data volume as 0, with respect to an MAC layer connected with an RLC layer for which PDCP duplication is deactivated.
  1> Otherwise (i.e., if the PDCP duplicate function (the packet duplicate technology or PDCP packet duplication) is not activated or is deactivated),
  2> if a secondary RLC layer (split secondary RLC layer (which may be configured by an RRC message of FIG. 1F and may indicate an RLC layer with respect to a second cell group for split bearer)) is configured,
  2> and (or), if an amount of all data of a size of a volume of PDCP data queuing for initial transmission and a size of a volume of RLC data in RLC layers (e.g., a primary RLC layer (which may be configured by an RRC message of FIG. 1F and may indicate an identifier of a logical channel configured as a primary path or an RLC layer corresponding thereto) connected to a PDCP layer or a secondary RLC layer (split secondary RLC layer) is equal to or greater than a threshold value for UL data transmission,
  3> if the secondary RLC layer (split secondary RLC layer) is suspended or a state of a cell group corresponding to the secondary RLC layer (split secondary RLC layer) is deactivated (or suspended),
  4> the primary RLC layer or the MAC layer may perform the second-1 method or the second-2 method proposed in the disclosure. Alternatively, the transmit PDCP layer may transmit an indicator (or a request) to a lower layer (an MAC layer connected with a primary RLC layer or a secondary RLC layer) or to an upper layer (an RRC layer) to perform the second-1 method or the second-2 method.
  3> The transmit PDCP layer may indicate a size of PDCP data to the MAC layer connected with the primary RLC layer and the MAC layer connected with the secondary RLC layer. The indicated size of the PDCP data may function as an indicator (or a request) to be sent to a lower layer (a MAC layer connected with the primary RLC layer or the secondary RLC layer) to perform the second-1 method or the second-2 method proposed in the disclosure.
  3> The transmit PDCP layer may indicate a size of PDCP data as 0 to an MAC layer connected with an RLC layer excluding the primary RLC layer and the secondary RLC layer.
  2> Otherwise, if the transmit PDCP layer is connected with a bearer for which DAPS handover is configured (or DAPS handover is configured),
  3> if the transmit PDCP layer did not receive, from an upper layer or a lower layer, an indicator (or a request) to switch UL data transmission,
  4> the transmit PDCP layer may indicate the size of the PDCP data to a source BS or an MAC layer for the source BS.
  3> Otherwise (i.e., if the transmit PDCP layer receives, from an upper layer or a lower layer, the indicator (or the request) to switch UL data transmission),
  4> the transmit PDCP layer may indicate, to a target BS or an MAC layer for the target BS, a size of PDCP data which excludes PDCP control data (an interspersed ROHC feedback or a PDCP status report) or a size of the PDCP control data for the target BS or related to the target BS.
  4> The transmit PDCP layer may indicate, to a source BS or an MAC layer for the source BS, PDCP control data (an interspersed ROHC feedback or a PDCP status report) or a size of the PDCP control data for the source BS or related to the source BS.
  2> Otherwise (i.e., an amount of all data of the size of the PDCP data and a size of RLC data queuing for initial transmission in RLC layers connected with the PDCP layer is not greater than a threshold value for UL data transmission, or if the transmit PDCP layer is not connected with a bearer for which DAPS handover is configured (or DAPS handover is not configured),
  3> the transmit PDCP layer may indicate a size of PDCP data (PDCP PDU or PDCP data PDU or PDCP control PDU) to an MAC layer connected with a primary RLC layer.
  3> The transmit PDCP layer may indicate, to an MAC layer connected with an RLC layer excluding the primary RLC layer, that the size of the PDCP data (PDCP PDU or PDCP data PDU or PDCP control PDU) is 0.

According to the proposal of the disclosure, a UE configured with dual connectivity performs a power control procedure based on configuration information of the dual connectivity. Alternatively, when a state of a SCG is not configured as an inactive state (or when the state of the SCG is configured as an active state), the UE performs a power control procedure.

Hereinafter, the disclosure provides a power control procedure of a UE configured with EN-DC dual connectivity in which a MCG is an eNB (or E-UTRA) and a SCG is a gNB (or NR). Alternatively, the disclosure provides that a UE performs a power control procedure when a state of a SCG is not configured as an inactive state.
  1> If an MCG using an E-UTRA radio access technology and an SCG using an NR radio access technology are configured for a UE, the UE may be configured with a maximum transmit power P_LTE for the MCG by a p-MaxEUTRA parameter (e.g., may be configured by RRC message of the disclosure) and may be configured with a maximum transmit power P_NR for transmission in FR1 (first frequency region, e.g., frequency region of 7.125 GHz or below) of the SCG by a p-NR-FR1 parameter (e.g., may be configured by RRC message of the disclosure).
  1> The UE determines (or calculates) a transmit power for the MCG by using (or considering) P_LTE as a maximum transmit power.
  1> The UE determines (or calculates) a transmit power for the SCG in FR1 by using (or considering) P_NR as a maximum transmit power.

1> When a value configured as a maximum value with respect to EN-DC dual connectivity is P_EN-DC (or a value configured by RRC message), if a linear value of P_EN-DC in FR1 which is calculated (or derived) according to a rule or method defined to determine a transmit power is x_P_EN-DC, a linear value of P_LTE is x_P_LTE and a linear value of P_NR is x_P_NR, when x_P_LTE+x_P_NR>x_P_EN-DC, the UE may determine a transmit power for the SCG in a manner below.

2> If the UE is configured with TDD configuration information as tdm-PatternConfig (time transmission resource configuration information configured by RRC message) for E-UTRA, 3> If the UE has not indicated UE capability report for dynamic power sharing with respect to E-UTRA and NR of EN-DC dual connectivity, the UE may not perform transmission in the SCG when a time resource where UL subframe is a subframe of the MCG overlaps with a time slot of the SCG in FR1 in the TDD configuration information. For example, as the UE does not use a transmit power of the SCG, the UE may transmit a sufficient transmit power to the MCG.

3> Even when the UE has indicated UE capability report for dynamic power sharing with respect to E-UTRA and NR of EN-DC dual connectivity, if the UE did not indicate that the UE can perform simultaneous UL transmission (UplinkTxSwitching-OptionSupport=dualUL) or TDD configuration information is configured in tdm-PatternConfig (time transmission resource configuration information configured by RRC message), the UE may not perform transmission in the SCG when a time resource that is a subframe of the MCG overlaps with a time resource of the SCG in FR1. For example, as the UE does not use a transmit power of the SCG, the UE may transmit a sufficient transmit power to the MCG.

Hereinafter, the disclosure provides a power control procedure of a UE configured with NE-DC dual connectivity in which a MCG is a gNB (or NR) and a SCG is an eNB (or E-UTRA). Alternatively, the disclosure provides that a UE performs a power control procedure when a state of a SCG is not configured as an inactive state.

1> If an MCG using an NR radio access technology and an SCG using an E-UTRA radio access technology are configured for a UE, the UE may be configured with a maximum transmit power P_LTE for the SCG by a p-MaxEUTRA parameter (e.g., may be configured by RRC message of the disclosure) and may be configured with a maximum transmit power P_NR for transmission in FR1 (first frequency region, e.g., frequency region of 7.125 GHz or below) of the MCG by a p-NR-FR1 parameter (e.g., may be configured by RRC message of the disclosure).

1> The UE determines a transmit power for the MCG in FR1 by using (or considering) P_NR as a maximum transmit power, in a case where P_NR is greater than a maximum power (P_EMAX) transmittable by the UE on a cell (or frequency). The UE determines (or calculates) a transmit power for the MCG in FR2 without considering P_NR.

1> If the UE is not configured with TDD configuration information (configured by tdd-UL-DL-Configuration-Common or tdd-UL-DL-ConfigurationDedicated RRC message or system information) for the MCG, the UE determines (or calculates) a transmit power for the SCG by using (or considering) P_LTE as a maximum transmit power.

1> If the UE is configured with TDD configuration information (configured by tdd-UL-DL-Configuration-Common RRC message or system information) for the MCG, and a UL or at least one symbol of $i^{th}$ slot of the MCG which is indicated as being available in the TDD configuration information overlaps with a $k^{th}$ subframe of the SCG, 2> with respect to the $k^{th}$ subframe, the UE determines (or calculates) a transmit power for the SCG by using (or considering) P_LTE as a maximum transmit power.

2> Otherwise, (if the UE is configured with TDD configuration information (configured by tdd-UL-DL-ConfigurationCommon or tdd-UL-DL-ConfigurationDedicated, RRC message or system information) for the MCG, and a UL or at least one symbol of $i^{th}$ slot of the MCG which is indicated as being available in the TDD configuration information does not overlap with a $k^{th}$ subframe of the SCG, 2> the UE determines (or calculates) a transmit power for the SCG without using (or without considering) P_LTE as a maximum transmit power.

1> When a value configured as a maximum value with respect to NE-DC dual connectivity is P_NE-DC (or a value configured by RRC message), if a linear value of P_NE-DC in FR1 which is calculated (or derived) according to a rule or method defined to determine a transmit power is x_P_NE-DC, a linear value of P_LTE is x_P_LTE and a linear value of P_NR is x_P_NR, when x_P_LTE+x_P_NR>x_P_NE-DC, the UE may determine a transmit power for the MCG in a manner below.

2> If the UE is configured with TDD configuration information as tdm-PatternConfig (time transmission resource configuration information configured by RRC message) for E-UTRA, 3> If the UE has not indicated UE capability report for dynamic power sharing with respect to E-UTRA and NR of NE-DC dual connectivity, the UE may not perform transmission in the MCG when a time resource where UL subframe is a subframe of the SCG overlaps with a time slot of the MCG in FR1 in the TDD configuration information (or the UE may not expect to perform transmission on the MCG in FR1). For example, as the UE does not use a transmit power of the MCG (or as a BS does not schedule on the MCG to the UE), the UE may transmit a sufficient transmit power to the SCG.

Hereinafter, the disclosure provides a power control procedure of a UE configured with NR-DC dual connectivity in which a MCG is a gNB (or NR) and a SCG is a gNB (or NR). Alternatively, the disclosure provides that a UE performs a power control procedure when a state of a SCG is not configured as an inactive state.

1> If the UE is configured with the MCG using an NR radio access technology in FR1 or FR2 and configured with the SCG using an NR radio access technology in FR2 or FR1, the UE may separately perform transmission power control with respect to the MCG or the SCG. For example, when the UE determines a transmit power for the MCG, the UE may determine the transmit power without considering P_MCG that is a maximum transmit power. That is, when the UE determines a transmit power for the MCG, the UE may determine the transmit power without considering P_MCG value but considering a maximum transmit power (p-Max, e.g., configured by system information or RRC message) transmittable to a corresponding frequency (or cell) or a maximum transmit power (Ppower class, e.g., configured by system information or RRC message) of the UE. For example, when the UE determines a transmit power for the SCG, the UE may determine the transmit power without considering P_SCG that is a maximum transmit power. That is, when the UE determines a transmit power for the SCG, the UE may determine the transmit power without considering P_SCG value but considering a maximum transmit power (p-Max, e.g., configured by system information or RRC message) transmittable to a corresponding frequency (or cell) or a maximum transmit power (Ppower class, e.g., configured by system information or RRC message) of the UE.

1> If the UE is configured with an MCG and an SCG using an NR radio access technology in FR1 (first frequency region, e.g., frequency region of 7.125 GHz or below) or FR2 (first frequency region, e.g., frequency region of 7.125 GHz or above), the UE may be configured with a maximum transmit power P_MCG for the MCG by p-NR-FR1 or p-NR-FR2 parameter (e.g., may be configured by RRC message of the disclosure) and may be configured with a maximum transmit power P_SCG for the SCG by p-NR-FR1 or p-NR-FR2 parameter (e.g., may be configured by RRC message of the disclosure). Also, NR-DC power control modes (nrdc-PCmode-FR1 and nrdc-PCmode-FR2) may be respectively configured for FR1 and FR2. In the above, the UE may determine a power of the MCG and a power of the SCG for each frequency region (FR1 or FR2).

1> If the UE is configured with semi-static-model as an NR-DC power control mode for FR1 or FR2, the UE determines (or calculates) a transmit power for the MCG by using (or considering) P_MCG as a maximum transmit power. Alternatively, the UE determines (or calculates) a transmit power for the SCG by using (or considering) P_SCG as a maximum transmit power.

1> If the UE is configured with semi-static-mode2 as an NR-DC power control mode for FR1 or FR2, 2> if the UE is not configured with TDD configuration information (configured by tdd-UL-DL-Configuration-Common or tdd-UL-DL-ConfigurationDedicated RRC message or system information) for the MCG or the SCG, the UE determines (or calculates) a transmit power for the MCG by using (or considering) P_MCG as a maximum transmit power. Alternatively, the UE determines (or calculates) a transmit power for the SCG by using (or considering) P_SCG as a maximum transmit power.

2> If the UE is configured with TDD configuration information (configured by tdd-UL-DL-Configuration-Common or tdd-UL-DL-ConfigurationDedicated RRC message or system information) for the MCG or the SCG, and a UL or at least one symbol of $i^{th}$ slot of the MCG or the SCG which is indicated as being available in the TDD configuration information overlaps with a $k^{th}$ subframe of the SCG or the MCG, the UE determines (or calculates) a transmit power for the MCG by using (or considering) P_MCG as a maximum transmit power. Alternatively, the UE determines (or calculates) a transmit power for the SCG by using (or considering) P_SCG as a maximum transmit power.

2> If the UE is configured with TDD configuration information (configured by tdd-UL-DL-Configuration-Common or tdd-UL-DL-ConfigurationDedicated RRC message or system information) for the MCG or the SCG, and a UL or at least one symbol of $i^{th}$ slot of the MCG or the SCG which is indicated as being available in the TDD configuration information does not overlap with a $k^{th}$ subframe of the SCG or the MCG, the UE determines (or calculates) a transmit power for the MCG without using (or without considering) P_MCG as a maximum transmit power. Alternatively, the UE determines (or calculates) a transmit power for the SCG without using (or without considering) P SCG as a maximum transmit power.

Provided is Embodiment 1 of the disclosure, in which, when dual connectivity is configured for a UE and an SCG is configured as an inactive state, the UE performs a power control procedure based on configuration information of dual connectivity.

The disclosure proposes a power control procedure of the UE configured with EN-DC dual connectivity in which a MCG is an eNB (or E-UTRA) and a SCG is a gNB (or NR), when the SCG is configured as an inactive state.

1> If an MCG using an E-UTRA radio access technology and an SCG using an NR radio access technology are configured for a UE, the UE may be configured with a maximum transmit power P_LTE for the MCG by a p-MaxEUTRA parameter (e.g., may be configured by RRC message of the disclosure) and may be configured with a maximum transmit power P_NR for transmission in FR1 (first frequency region, e.g., frequency region of 7.125 GHz or below) of the SCG by a p-NR-FR1 parameter (e.g., may be configured by RRC message of the disclosure).

1> The UE determines (or calculates) a transmit power for the MCG by using (or considering) P_LTE as a maximum transmit power.

1> The UE determines (or calculates) a transmit power for the SCG in FR1 by using (or considering) P_NR as a maximum transmit power.

1> When a value configured as a maximum value with respect to EN-DC dual connectivity is P_EN-DC (or a value configured by RRC message), if a linear value of P_EN-DC in FR1 which is calculated (or derived) according to a rule or method defined to determine a transmit power is x_P_EN-DC, a linear value of P_LTE is x_P_LTE and a linear value of P_NR is x_P_NR, when x_P_LTE+x_P_NR>x_P_EN-DC, the UE may determine a transmit power for the SCG in a manner below.

2> If the UE is configured with TDD configuration information as tdm-PatternConfig (time transmission resource configuration information configured by RRC message) for E-UTRA, 3> If the UE has not indicated UE capability report for dynamic power sharing with respect to E-UTRA and NR of EN-DC dual connectivity, the UE may not perform transmission in the SCG when a time resource where UL subframe is a subframe of the MCG overlaps with a time slot of the SCG in FR1 in the TDD configuration information. For example, as the UE does not use a transmit power of the SCG, the UE may transmit a sufficient transmit power to the MCG.

3> Even when the UE has indicated UE capability report for dynamic power sharing with respect to E-UTRA and NR of EN-DC dual connectivity, if the UE did not indicate that the UE can perform simultaneous UL transmission (UplinkTxSwitching-OptionSupport=dualUL) or TDD configuration information is configured in tdm-PatternConfig (time transmission resource configuration information configured by RRC message), the UE may not perform transmission in the SCG when a time resource that is a subframe of the MCG overlaps with a time resource of the SCG in FR1. For example, as the UE does not use a transmit power of the SCG, the UE may transmit a sufficient transmit power to the MCG.

Hereinafter, the disclosure provides a power control procedure of a UE configured with NE-DC dual connectivity in which a MCG is a gNB (or NR) and a SCG is an eNB (or E-UTRA), when the SCG is configured as an inactive state.

1> If an MCG using an NR radio access technology and an SCG using an E-UTRA radio access technology are configured for a UE, the UE may be configured with a maximum transmit power P_LTE for the SCG by a p-MaxEUTRA parameter (e.g., may be configured by RRC message of the disclosure) and may be configured with a maximum transmit power P_NR for transmission in FR1 (first frequency region, e.g., frequency region of 7.125 GHz or below) of the MCG by a p-NR-FR1 parameter (e.g., may be configured by RRC message of the disclosure).

1> The UE determines a transmit power for the MCG in FR1 by using (or considering) P_NR as a maximum transmit power, in a case where P_NR is greater than a maximum power (P_EMAX) transmittable by the UE on a cell (or frequency). The UE determines (or calculates) a transmit power for the MCG in FR2 without considering P_NR.

1> If the UE is not configured with TDD configuration information (configured by tdd-UL-DL-ConfigurationCommon or tdd-UL-DL-ConfigurationDedicated RRC message or system information) for the MCG, the UE determines (or calculates) a transmit power for the SCG by using (or considering) P_LTE as a maximum transmit power.

1> If the UE is configured with TDD configuration information (configured by tdd-UL-DL-ConfigurationCommon or tdd-UL-DL-ConfigurationDedicated RRC message or system information) for the MCG, and a UL or at least one symbol of $i^{th}$ slot of the MCG which is indicated as being available in the TDD configuration information overlaps with a $k^{th}$ subframe of the SCG, 2> with respect to the $k^{th}$ subframe, the UE determines (or calculates) a transmit power for the SCG by using (or considering) P_LTE as a maximum transmit power.

2> Otherwise, (if the UE is configured with TDD configuration information (configured by tdd-UL-DL-ConfigurationCommon or tdd-UL-DL-ConfigurationDedicated, RRC message or system information) for the MCG, and a UL or at least one symbol of $i^{th}$ slot of the MCG which is indicated as being available in the TDD configuration information does not overlap with a $k^{th}$ subframe of the SCG, 2> the UE determines (or calculates) a transmit power for the SCG without using (or without considering) P_LTE as a maximum transmit power.

1> When a value configured as a maximum value with respect to NE-DC dual connectivity is P_NE-DC (or a value configured by RRC message), if a linear value of P_NE-DC in FR1 which is calculated (or derived) according to a rule or method defined to determine a transmit power is x_P_NE-DC, a linear value of P_LTE is x_P_LTE and a linear value of P_NR is x_P_NR, when x_P_LTE+x_P_NR>x_P_NE-DC, the UE may determine a transmit power for the MCG in a manner below.

2> If the UE is not configured as an inactive state with respect to E-UTRA or the SCG, 3> if the UE is configured with TDD configuration information as tdm-PatternConfig (time transmission resource configuration information configured by RRC message) for E-UTRA, 4> if the UE has not indicated UE capability report for dynamic power sharing with respect to E-UTRA and NR of NE-DC dual connectivity, the UE may not perform transmission in the MCG when a time resource that is UL subframe of a subframe of the SCG overlaps with a time slot of the MCG in FR1 in the TDD configuration information (or the UE may not expect to perform transmission on the MCG in FR1). For example, as the UE does not use a transmit power of the MCG (or as a BS does not schedule on the MCG to the UE), the UE may transmit a sufficient transmit power to the SCG.

2> If the UE is configured as an inactive state with respect to E-UTRA or the SCG, 3> the UE determines a transmit power for the MCG in FR1 by using (or considering) P_NR as a maximum transmit power, in a case where P_NR is greater than a maximum power (P_EMAX) transmittable by the UE on a cell (or frequency). Alternatively, the UE determines a transmit power for the MCG in FR1 by using (or considering) P_NR as a maximum transmit power. Alternatively, when the UE determines a transmit power for the MCG, the UE may determine the transmit power without considering P_LTE or P_NR which is the maximum transmit power. That is, when the UE determines a transmit power for the MCG, the UE may determine the transmit power without considering P_LTE or P_NR value but considering a maximum transmit power (p-Max, e.g., configured by system information or RRC message) transmittable to a corresponding frequency (or cell) or a maximum transmit power (Ppower class, e.g., configured by system information or RRC message) of the UE. For example, as described above, even when time transmission resources of the MCG and the SCG overlap according to the TDD configuration information, because the SCG becomes deactivated, the UE is able to identify that a transport power will not be used in the SCG, and thus, the UE is able to transmit data in the MCG by transmitting a transmit power or the BS may allocate scheduling to the UE with respect to the MCG. That is, the UE may expect transmission with respect to the MCG.

Hereinafter, the disclosure provides a power control procedure of a UE configured with NR-DC dual connectivity in which a MCG is a gNB (or NR) and a SCG is a gNB (or NR), when the SCG is configured as an inactive state.

1> If the UE is configured with the MCG using an NR radio access technology in FR1 or FR2 and configured with the SCG using an NR radio access technology in FR2 or FR1, the UE may separately perform transmission power control with respect to the MCG or the SCG. For example, when the UE determines a transmit power for the MCG, the UE may determine the transmit power without considering P_MCG that is a maximum transmit power. That is, when the UE determines a transmit power for the MCG, the UE may determine the transmit power without considering P_MCG value but considering a maximum transmit power (p-Max, e.g., configured by system information or RRC message) transmittable to a corresponding frequency (or cell) or a maximum transmit power (Ppower class, e.g., configured by system information or RRC message) of the UE. For example, when the UE determines a transmit power for the SCG, the UE may determine the transmit power without considering P_SCG that is a maximum transmit power. That is, when the UE determines a transmit power for the SCG, the UE may determine the transmit power without considering P_SCG value but considering a maximum transmit power (p-Max, e.g., configured by system information or RRC message) transmittable to a corresponding frequency (or cell) or a maximum transmit power (Ppower class, e.g., configured by system information or RRC message) of the UE.

1> If the UE is configured with an MCG and an SCG using an NR radio access technology in FR1 (first frequency region, e.g., frequency region of 7.125 GHz or below) or FR2 (first frequency region, e.g., frequency region of 7.125 GHz or above), the UE may be configured with a maximum transmit power P_MCG for the MCG by p-NR-FR1 or p-NR-FR2 parameter (e.g., may be configured by RRC message of the disclosure) and may be configured with a maximum transmit power P_SCG for the SCG by p-NR-FR1 or p-NR-FR2 parameter (e.g., may be configured by RRC message of the disclosure). Also, NR-DC power control modes (nrdc-PCmode-FR1 and nrdc-PCmode-FR2) may be respectively configured for FR1 and FR2. In the above, the UE may determine a power of the MCG and a power of the SCG for each frequency region (FR1 or FR2).

1> If the UE is configured with semi-static-model as an NR-DC power control mode for FR1 or FR2, the UE determines (or calculates) a transmit power for the MCG by using (or considering) P_MCG as a maximum transmit power. Alternatively, the UE determines (or calculates) a transmit power for the SCG by using (or considering) P_SCG as a maximum transmit power.

1> If the UE is configured with semi-static-mode2 as an NR-DC power control mode for FR1 or FR2, 2> if the SCG of the UE configured with dual connectivity is not configured as an inactive state, 3> if the UE is not configured with TDD configuration information (configured by tdd-UL-DL-Configuration-Common or tdd-UL-DL-ConfigurationDedicated RRC message or system information) for the MCG or the SCG, the UE determines (or calculates) a transmit power for the MCG by using (or considering) P_MCG as a maximum transmit power. Alternatively, the UE determines (or calculates) a transmit power for the SCG by using (or considering) P_SCG as a maximum transmit power.

3> If the UE is configured with TDD configuration information (configured by tdd-UL-DL-Configuration-Common or tdd-UL-DL-ConfigurationDedicated RRC message or system information) for the MCG or the SCG, and a UL or at least one symbol of $i^{th}$ slot of the MCG or the SCG which is indicated as being available in the TDD configuration information overlaps with a $k^{th}$ subframe of the SCG or the MCG, the UE determines (or calculates) a transmit power for the MCG by using (or considering) P_MCG as a maximum transmit power. Alternatively, the UE determines (or calculates) a transmit power for the SCG by using (or considering) P_SCG as a maximum transmit power.

3> If the UE is configured with TDD configuration information (configured by tdd-UL-DL-Configuration-Common or tdd-UL-DL-ConfigurationDedicated RRC message or system information) for the MCG or the SCG, and a UL or at least one symbol of $i^{th}$ slot of the MCG or the SCG which is indicated as being available in the TDD configuration information does not overlap with a $k^{th}$ subframe of the SCG or the MCG, the UE determines (or calculates) a transmit power for the MCG without using (or without considering) P_MCG as a maximum transmit power. Alternatively, the UE determines (or calculates) a transmit power for the SCG without using (or without considering) P_SCG as a maximum transmit power.

2> If the SCG of the UE configured with dual connectivity is not configured as an inactive state, 3> when the UE determines a transmit power for the MCG, the UE may determine the transmit power without considering P_MCG or P_SCG which is the maximum transmit power. That is, when the UE determines a transmit power for the MCG, the UE may determine the transmit power without considering P_MCG or P_SCG value but considering a maximum transmit power (p-Max, e.g., configured by system information or RRC message) transmittable to a corresponding frequency (or cell) or a maximum transmit power (Ppower class, e.g., configured by system information or RRC message) of the UE. Alternatively, the UE may determine a transmit power for the MCG in FR1 or FR2 by using (or considering) P_MCG as a maximum transmit power, and may determine a transmit power for the SCG in FR1 or FR2 by using (or considering) P_SCG as a maximum transmit power.

Provided is Embodiment 2 of the disclosure, in which, when dual connectivity is configured for a UE and an SCG is configured as an inactive state, the UE performs a power control procedure based on configuration information of dual connectivity.

The disclosure proposes a power control procedure of the UE configured with EN-DC dual connectivity in which a MCG is an eNB (or E-UTRA) and a SCG is a gNB (or NR), when the SCG is configured as an inactive state.

1> If an MCG using an E-UTRA radio access technology and an SCG using an NR radio access technology are configured for a UE, the UE may be configured with a maximum transmit power P_LTE for the MCG by a p-MaxEUTRA parameter (e.g., may be configured by RRC message of the disclosure) and may be configured with a maximum transmit power P_NR for transmission in FR1 (first frequency region, e.g., frequency region of 7.125 GHz or below) of the SCG by a p-NR-FR1 parameter (e.g., may be configured by RRC message of the disclosure).

1> If the SCG of the UE configured with dual connectivity is configured as an inactive state, when the UE determines a transmit power for the MCG, the UE may determine the transmit power without considering P_LTE or P_NR which is the maximum transmit power. That is, when the UE determines a transmit power for the MCG, the UE may determine the transmit power without considering P_LTE or P_NR value but considering a maximum transmit power (p-Max, e.g., configured by system information or RRC message) transmittable to a corresponding frequency (or cell) or a maximum transmit power (Ppower class, e.g., configured by system information or RRC message) of the UE.

Hereinafter, the disclosure provides a power control procedure of a UE configured with NE-DC dual connectivity in which a MCG is a gNB (or NR) and a SCG is an eNB (or E-UTRA), when the SCG is configured as an inactive state.

1> If an MCG using an NR radio access technology and an SCG using an E-UTRA radio access technology are configured for a UE, the UE may be configured with a maximum transmit power P_LTE for the SCG by a p-MaxEUTRA parameter (e.g., may be configured by RRC message of the disclosure) and may be configured with a maximum transmit power P_NR for transmission in FR1 (first frequency region, e.g., frequency region of 7.125 GHz or below) of the MCG by a p-NR-FR1 parameter (e.g., may be configured by RRC message of the disclosure).

1> If the SCG of the UE configured with dual connectivity is configured as an inactive state, when the UE determines a transmit power for the MCG, the UE may determine the transmit power without considering P_LTE or P_NR which is the maximum transmit power. That is, when the UE determines a transmit power for the MCG, the UE may determine the transmit power without considering P_LTE or P_NR value but considering a maximum transmit power (p-Max, e.g., configured by system information or RRC message) transmittable to a corresponding frequency (or cell) or a maximum transmit power (Ppower class, e.g., configured by system information or RRC message) of the UE.

Hereinafter, the disclosure provides a power control procedure of a UE configured with NR-DC dual connectivity in which a MCG is a gNB (or NR) and a SCG is a gNB (or NR), when the SCG is configured as an inactive state.

1> If the UE is configured with the MCG using an NR radio access technology in FR1 or FR2 and configured with the SCG using an NR radio access technology in FR2 or FR1, the UE may separately perform transmission power control with respect to the MCG or the SCG. For example, when the UE determines a transmit power for the MCG, the UE may determine the transmit power without considering P_MCG that is a maximum transmit power. That is, when the UE determines a transmit power for the MCG, the UE may determine the transmit power without considering P_MCG value but considering a maximum transmit power (p-Max, e.g., configured by system information or RRC message) transmittable to a corresponding frequency (or cell) or a maximum transmit power (Ppower class, e.g., configured by system information or RRC message) of the UE. For example, when the UE determines a transmit power for the SCG, the UE may determine the transmit power without considering P_SCG that is a maximum transmit power. That is, when the UE determines a transmit power for the SCG, the UE may determine the transmit power without considering P_SCG value but considering a maximum transmit power (p-Max, e.g., configured by system information or RRC message) transmittable to a corresponding frequency (or cell) or a maximum transmit power (Ppower class, e.g., configured by system information or RRC message) of the UE.

1> If the UE is configured with an MCG and an SCG using an NR radio access technology in FR1 (first frequency region, e.g., frequency region of 7.125 GHz or below) or FR2 (first frequency region, e.g., frequency region of 7.125 GHz or above), the UE may be configured with a maximum transmit power P_MCG for the MCG by p-NR-FR1 or p-NR-FR2 parameter (e.g., may be configured by RRC message of the disclosure) and may be configured with a maximum transmit power P_SCG for the SCG by p-NR-FR1 or p-NR-FR2 parameter (e.g., may be configured by RRC message of the disclosure). Also, NR-DC power control modes (nrdc-PCmode-FR1 and nrdc-PCmode-FR2) may be respectively configured for FR1 and FR2. In the above, the UE may determine a power of the MCG and a power of the SCG for each frequency region (FR1 or FR2).

1> If the SCG of the UE configured with dual connectivity is configured as an inactive state, when the UE determines a transmit power for the MCG, the UE may determine the transmit power without considering P_MCG or P_SCG which is the maximum transmit power. That is, when the UE determines a transmit power for the MCG, the UE may determine the transmit power without considering P_MCG or P SCG value but considering a maximum transmit power (p-Max, e.g., configured by system information or RRC message) transmittable to a corresponding frequency (or cell) or a maximum transmit power (Ppower class, e.g., configured by system information or RRC message) of the UE.

Provided is Embodiment 3 of the disclosure, in which, when dual connectivity is configured for a UE and an SCG is configured as an inactive state, the UE performs a power control procedure based on configuration information of dual connectivity.

According to Embodiment 3 of the disclosure, in a case where dual connectivity (EN-DC or NE-DC or NR-DC) is configured for the UE but the SCG is configured as an inactive state, a power control procedure for dual connectivity proposed above is not performed. For example, if the SCG of the UE configured with dual connectivity is configured as an inactive state, when the UE determines a transmit power for the MCG, the UE may determine the transmit power without consideration of a plurality of pieces of configuration information for dual connectivity (e.g., p-MaxEUTRA or p-NR-FR1 or p-NR-FR2 or tdm-pattern-Config or TDD configuration or tdd-UL-DL-Configuration-Common or tdd-UL-DL-ConfigurationDedicated or nrdc-PCmode-FR1 or nrdc-PCmode-FR2 which is configurable by RRC message or system information). For example, when the UE determines a transmit power for the MCG the UE may determine the transmit power by excluding (or not considering) the plurality of pieces of configuration information for dual connectivity but considering a maximum transmit power (p-Max, e.g., configured by system information or RRC message) transmittable to a corresponding frequency (or cell) or a maximum transmit power (Ppower class, e.g., configured by system information or RRC message) of the UE.

Alternatively, when the SCG of the UE configured with dual connectivity is configured as an inactive state, the UE may not apply (or may release application) a plurality of pieces of configuration information for dual connectivity (e.g., p-MaxEUTRA or p-NR-FR1 or p-NR-FR2 or tdm-patternConfig or TDD configuration or tdd-UL-DL-ConfigurationCommon or tdd-UL-DL-ConfigurationDedicated or nrdc-PCmode-FR1 or nrdc-PCmode-FR2 which is configurable by RRC message or system information) as configuration information of the UE. Alternatively, when the SCG of the UE configured with dual connectivity is configured as an active state, the UE may apply again a plurality of pieces of configuration information for dual connectivity (e.g., p-MaxEUTRA or p-NR-FR1 or p-NR-FR2 or tdm-patternConfig or TDD configuration or tdd-UL-DL-ConfigurationCommon or tdd-UL-DL-ConfigurationDedicated or nrdc-PCmode-FR1 or nrdc-PCmode-FR2 which is configurable by RRC message or system information) as configuration information of the UE. The method may be applied to LTE (E-UTRA) RRC or NR RRC.

In another method, when a BS configures an inactive state for an SCG of the UE configured with dual connectivity, the BS may configure (or indicate) the UE to release, as configuration information of the UE, a plurality of pieces of configuration information for dual connectivity (e.g., p-MaxEUTRA or p-NR-FR1 or p-NR-FR2 or tdm-patternConfig or TDD configuration or tdd-UL-DL-ConfigurationCommon or tdd-UL-DL-ConfigurationDedicated or nrdc-PCmode-FR1 or nrdc-PCmode-FR2 which is configurable by RRC message or system information) configured for the UE (e.g., the BS may reconfigure configuration information of the UE by an RRC message). Alternatively, when the BS configures an inactive state for an SCG of the UE configured with dual connectivity, the BS may reconfigure (e.g., may reconfigure by an RRC message) a plurality of pieces of configuration information for dual connectivity (e.g., p-MaxEUTRA or p-NR-FR1 or p-NR-FR2 or tdm-patternConfig or TDD configuration or tdd-UL-DL-ConfigurationCommon or tdd-UL-DL-ConfigurationDedicated or nrdc-PCmode-FR1 or nrdc-PCmode-FR2 which is configurable by RRC message or system information) as configuration information of the UE. The method may be applied to LTE (E-UTRA) RRC or NR RRC.

The plurality of pieces of configuration information for dual connectivity (p-MaxEUTRA or p-NR-FR1 or p-NR-FR2 or nrdc-PCmode-FR1 or nrdc-PCmode-FR2) may be configured in physical layer configuration information (PhysicalCellGroupConfig) included in an RRCReconfiguration message or an RRCSetup message or an RRCResume message or system information, or the configuration information for dual connectivity (tdm-patternConfig or TDD configuration or tdd-UL-DL-ConfigurationCommon or tdd-UL-DL-ConfigurationDedicated) may be configured by being included in serving cell configuration information (ServingCellConfig) of cell group configuration information (CellGroupConfig) included in an RRCReconfiguration message or an RRCSetup message or an RRCResume message or system information.

In the disclosure, system information may be interpreted as a type of an RRC message.

Figure 1L:
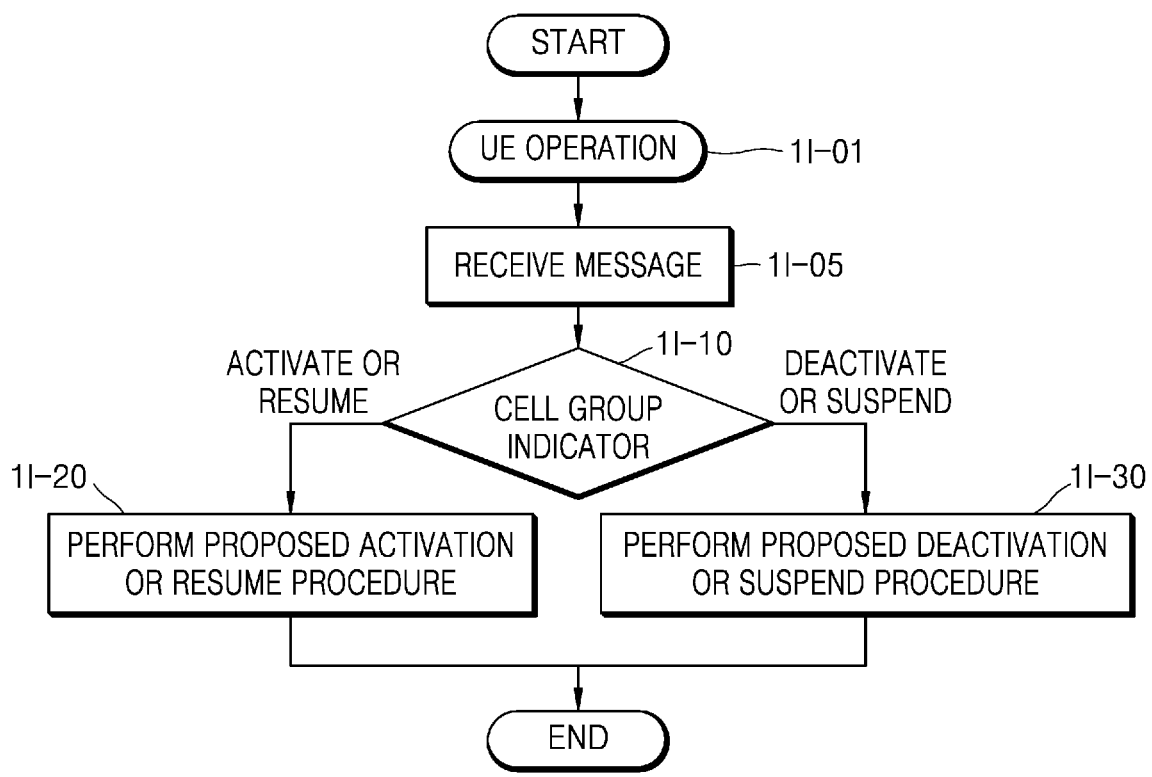
FIG. 1L is a diagram illustrating an operation of a UE according to an embodiment of the disclosure.

FIG. 1L is a diagram illustrating an operation of a UE 1*l*-01 according to an embodiment of the disclosure.

Referring to FIG. 1L, the UE 1*l*-01 may receive a message (e.g., DCI of a PDCCH or MAC control information or an RRC message) from a BS (1*l*-05). When cell group configuration information or a cell group state or a cell group indicator is included in the message, the UE 1*l*-01 may identify whether a cell group is indicated to be configured or added or activated or resumed or whether the cell group is indicated to be released or deactivated or suspended (1*l*-10). When the cell group is indicated to be configured or added or activated or resumed in the message, a cell group configuration or addition or activation or resume procedure, which is proposed in the disclosure, may be performed (1*l*-20), and when the cell group is indicated to be released or deactivated or suspended in the message, a cell group release or deactivation or suspend procedure, which is proposed in the disclosure, may be performed (1*l*-30).

Figure 1M:
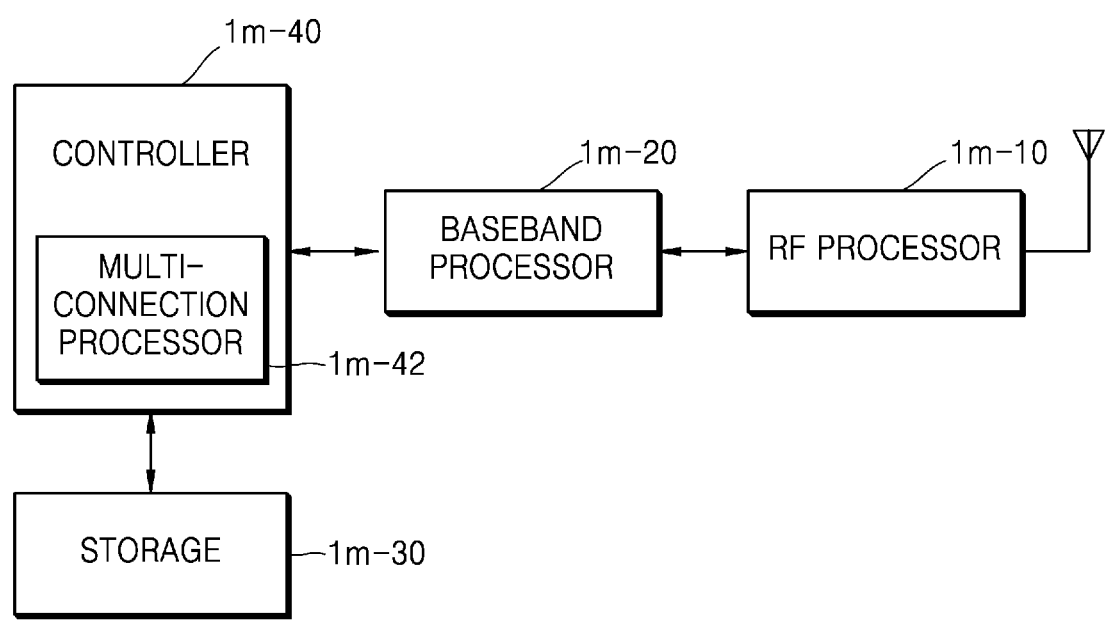
FIG. 1M illustrates a structure of a UE according to an embodiment of the disclosure.

FIG. 1M illustrates a structure of a UE according to an embodiment of the disclosure.

Referring to FIG. 1M, the UE may include a RF processor 1*m*-10, a baseband processor 1*m*-20, a storage 1*m*-30, and a controller 1*m*-40. However, the disclosure is not limited to the example of FIG. 1M, and the UE may include fewer or more configurations than those shown in FIG. 1M.

The RF processor 1*m*-10 performs functions of transmitting and receiving signals via radio channels, such as band conversion and amplification of the signals. That is, the RF processor 1*m*-10 up-converts a baseband signal provided from the baseband processor 1*m*-20, into an RF band signal and then transmits the RF band signal via an antenna, and down-converts an RF band signal received via the antenna, into a baseband signal. For example, the RF processor 1*m*-10 includes a transmission filter, a reception filter, an amplifier, a mixer, an oscillator, a digital-to-analog convertor (DAC), an analog-to-digital convertor (ADC), or the like. Although only one antenna is illustrated in FIG. 1M, the UE may include a plurality of antennas. Also, the RF processor 1*m*-10 may include a plurality of RF chains. In addition, the RF processor 1*m*-10 may perform beamforming. For the beamforming, the RF processor 1*m*-10 may respectively adjust phases and intensities of signals to be transmitted or received via a plurality of antennas or antenna elements. Also, the RF processor 1*m*-10 may perform a MIMO operation and may receive a plurality of layers in the MIMO operation. Under the control of the controller 1*m*-40, the RF processor 1*m*-10 may perform received beam sweeping by appropriately configuring a plurality of antennas or antenna elements, or may adjust a direction and a beam width of a received beam to coordinate with a transmit beam.

The baseband processor 1*m*-20 performs conversion between a baseband signal and a bitstream based on physical entity specifications of a system. For example, for data transmission, the baseband processor 1*m*-20 generates complex symbols by encoding and modulating a transmission bitstream. For data reception, the baseband processor 1*m*-20 reconstructs a received bit string by demodulating and decoding a baseband signal provided from the RF processor 1*m*-10. For example, according to an OFDM scheme, for data transmission, the baseband processor 1*m*-20 generates complex symbols by encoding and modulating a transmit bit string, maps the complex symbols to subcarriers, and then configures OFDM symbols by performing an inverse fast Fourier transform (IFFT) computation and cyclic prefix (CP) insertion. For data reception, the baseband processor 1*m*-20 segments a baseband signal provided from the RF processor 1*m*-10, into OFDM symbol units, reconstructs signals mapped to subcarriers by performing a fast Fourier transform (FFT) computation, and then reconstructs a received bit string by demodulating and decoding the signals.

The baseband processor 1*m*-20 and the RF processor 1*m*-10 transmit and receive signals as described above. Accordingly, the baseband processor 1*m*-20 and the RF processor 1*m*-10 may also be called a transmitter, a receiver, a transceiver, or a communicator. In addition, at least one of the baseband processor 1*m*-20 or the RF processor 1*m*-10 may include a plurality of communication modules to support a plurality of different radio access technologies. Also, at least one of the baseband processor 1*m*-20 or the RF processor 1*m*-10 may include different communication modules to process signals of different frequency bands. For example, the different radio access technologies may include an LTE network, an NR network, or the like. Also, the different frequency bands may include a super-high frequency (SHF) (e.g., 2.5 GHz, 5 GHz) band and a millimeter wave (mmWave) (e.g., 60 GHz) band.

The UE may transmit or receive signals to or from the BS by using the baseband processor $1m$-20 and the RF processor $1m$-10, and the signals may include control information and data.

The storage $1m$-30 stores basic programs, application programs, and data, e.g., configuration information, for operations of the UE. The storage $1m$-30 provides the stored data, in response to a request by the controller $1m$-40.

The controller $1m$-40 controls overall operations of the UE. For example, the controller $1m$-40 transmits and receives signals via the baseband processor $1m$-20 and the RF processor $1m$-10. Also, the controller $1m$-40 records and reads data on or from the storage $1m$-30. To this end, the controller $1m$-40 may include at least one processor. For example, the controller $1m$-40 may include a communication processor (CP) for controlling communications and an application processor (AP) for controlling an upper layer such as an application program.

Also, according to an embodiment of the disclosure, the controller $1m$-40 may include a multi-connection processor $1m$-42 configured to process a process running in a multi-connection mode. Also, at least one configuration in the UE may be implemented as one chip.

Figure 1N:
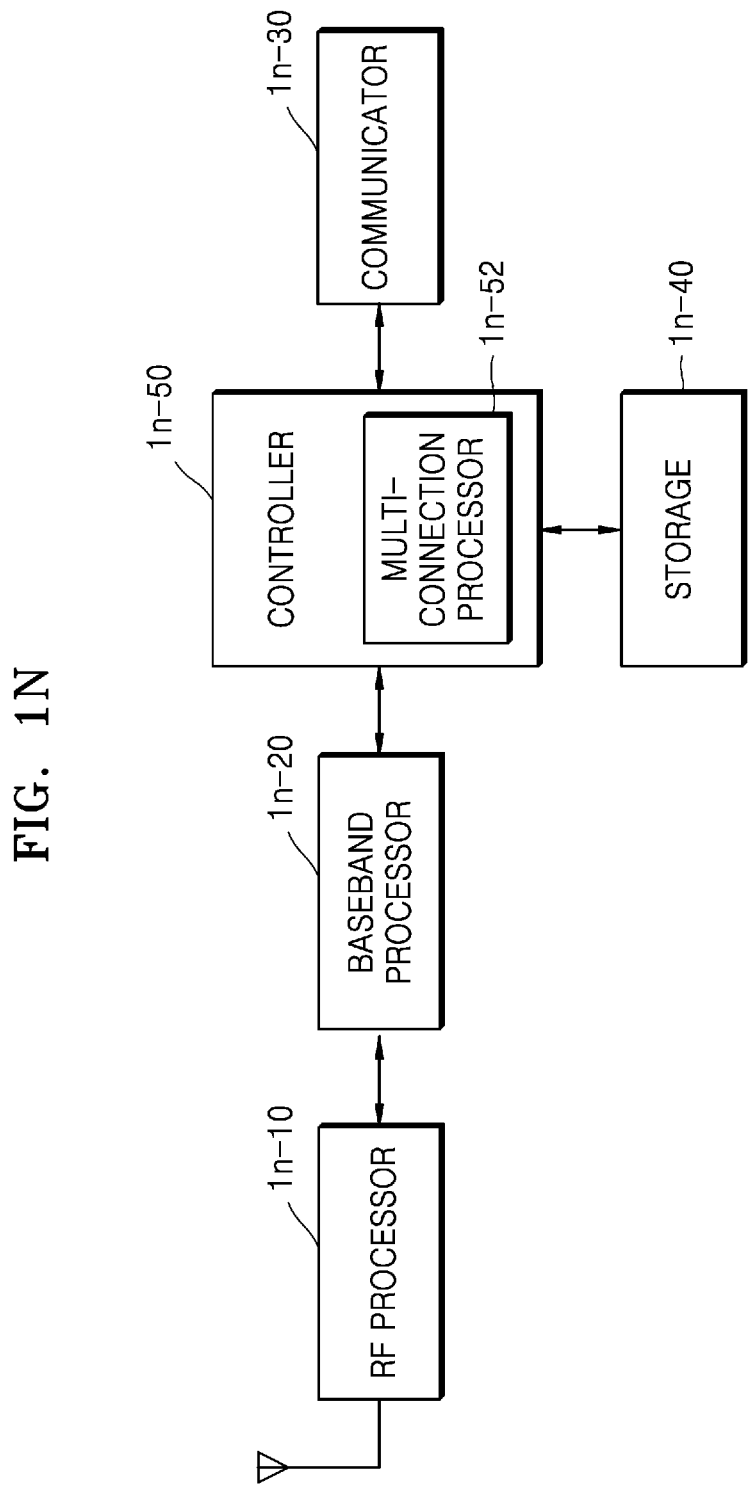
FIG. 1N is a block diagram of a configuration of a transmission and reception point (Tx/Rx point or TRP) in a wireless communication system according to an embodiment of the disclosure.

FIG. 1N is a block diagram of a configuration of a transmission and reception point (Tx/Rx point or TRP) in a wireless communication system according to an embodiment of the disclosure.

Referring to FIG. 1N, the Tx/Rx point (also referred to as the BS) may include a RF processor $1n$-10, a baseband processor $1n$-20, a communicator $1n$-30 including a backhaul communicator, a storage $1n$-40, and a controller $1n$-50. However, the disclosure is not limited to the example of FIG. 1N, and the TRP may include fewer or more configurations than those shown in FIG. 1N.

The RF processor $1n$-10 performs functions of transmitting and receiving signals via radio channels, e.g., band conversion and amplification of the signals. That is, the RF processor $1n$-10 up-converts a baseband signal provided from the baseband processor $1n$-20, into an RF band signal and then transmits the RF band signal via an antenna, and down-converts an RF band signal received via an antenna, into a baseband signal. For example, the RF processor $1n$-10 may include a transmission filter, a reception filter, an amplifier, a mixer, an oscillator, a DAC, an ADC, or the like. Although only one antenna is illustrated in FIG. 1N, the RF processor $1n$-10 may include a plurality of antennas. Also, the RF processor $1n$-10 may include a plurality of RF chains. In addition, the RF processor $1n$-10 may perform beamforming. For the beamforming, the RF processor $1n$-10 may respectively adjust phases and intensities of signals to be transmitted or received via a plurality of antennas or antenna elements. The RF processor $1n$-10 may perform a DL MIMO operation by transmitting one or more layers.

The baseband processor $1n$-20 performs conversion between a baseband signal and a bit string based on physical entity specifications. For example, for data transmission, the baseband processor $1n$-20 generates complex symbols by encoding and modulating a transmission bit string. For data reception, the baseband processor $1n$-20 reconstructs a received bit string by demodulating and decoding a baseband signal provided from the RF processor $1n$-10. For example, according to an OFDM scheme, for data transmission, the baseband processor $1n$-20 generates complex symbols by encoding and modulating a transmission bit string, maps the complex symbols to subcarriers, and then configures OFDM symbols by performing an IFFT computation and CP insertion. For data reception, the baseband processor $1n$-20 segments a baseband signal provided from the RF processor $1n$-10, into OFDM symbol units, reconstructs signals mapped to subcarriers by performing a FFT computation, and then reconstructs a received bit string by demodulating and decoding the signals. The baseband processor $1n$-20 and the RF processor $1n$-10 transmit and receive signals as described above. As such, the baseband processor $1n$-20 and the RF processor $1n$-10 may also be called a transmitter, a receiver, a transceiver, a communicator, or a wireless communicator.

The communicator $1n$-30 provides an interface for communicating with other nodes in a network.

The storage $1n$-40 stores basic programs, application programs, and data, e.g., configuration information, for operations of a primary BS. In particular, the storage $1n$-40 may store, for example, information about bearers allocated for a connected UE and measurement results reported from the connected UE. Also, the storage $1n$-40 may store criteria information used to determine whether to provide or release dual connectivity to or from the UE. The storage $1n$-40 may provide the stored data, in response to a request by the controller $1n$-50.

The controller $1n$-50 may control overall operations of the primary BS. For example, the controller $1n$-50 transmits and receives signals via the baseband processor $1n$-20 and the RF processor $1n$-10, or the communicator $1n$-30. Also, the controller $1n$-50 records and reads data on or from the storage $1n$-40. To this end, the controller $1n$-50 may include at least one processor.

Also, according to an embodiment of the disclosure, the controller $1n$-50 may include a multi-connection processor $1n$-52 configured to process a process running in a multi-connection mode.

An embodiment of the disclosure relates to a method and apparatus for allocating a UL transmission resource when an extended logical channel is used in a wireless communication system. An embodiment of the disclosure relates to a method of transmitting data on a UL transmission resource when radio nodes use a logical channel identifier or an extended logical channel identifier in a case where a wireless communication system supports network architecture supporting a wireless backhaul.

In the wireless communication system, BSs with various structures may be implemented, and various radio access technologies may coexist. In particular, according to an embodiment of the disclosure, provided are various schemes of transmitting data for each occasion where, in network architecture supporting a wireless backhaul or an integrated access backhaul (IAB), each radio node (IAB node or IAB donor) is allocated a UL transmission resource and uses a logical channel identifier or an extended logical channel identifier.

An embodiment of the disclosure provides different methods of transmitting data for each occasion where, in network architecture of a wireless communication system which supports a wireless backhaul or an IAB, each radio node (IAB node or IAB donor) is allocated a UL transmission resource and uses a logical channel identifier or an extended logical channel identifier, such that an error occurrable in data transmission may be solved, and a transmission resource may be efficiently used.

An embodiment of the disclosure provides a method for bearer operation and data processing by radio nodes in a next-generation mobile communication system supporting a wireless backhaul, and provides a method by which radio nodes prevent data errors or protect themselves against unexpected attacks, which are occurrable in a radio link, and enhance integrity verification or security.

In particular, provided is a procedure where an uppermost radio node (e.g., an IAB donor) of a wireless backhaul network configures a PDCP layer for security enhancement in the uppermost radio node and a radio node to which a UE accesses so as to enhance security in a radio period to the radio node to which the UE accesses, and performs a ciphering and deciphering procedure or an integrity protection or verification procedure.

Based on an embodiment of the disclosure, various embodiments associated with the descriptions above will now be described, and further detailed technical contents will now be provided.

Figure 2A:
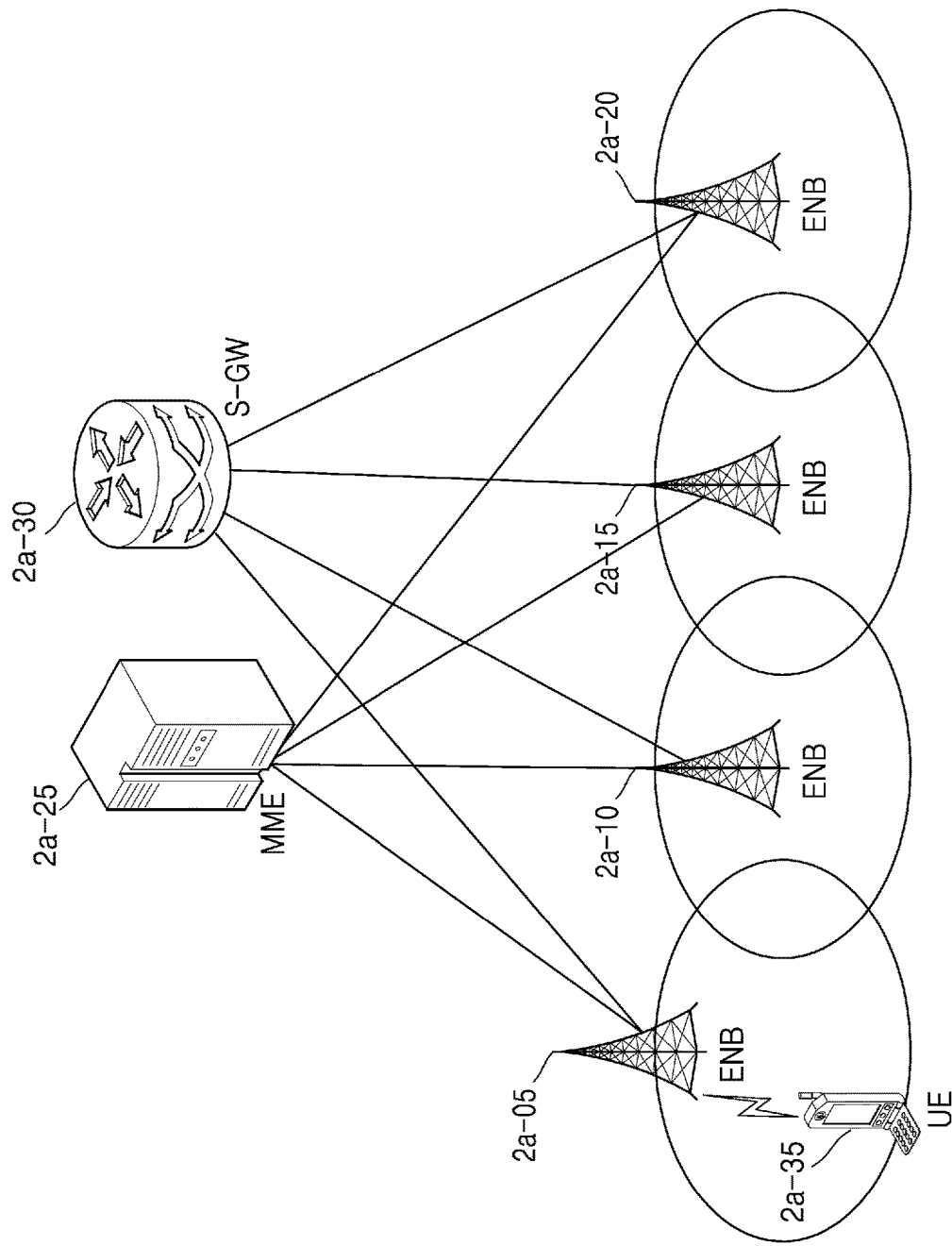
FIG. 2A is a diagram illustrating a configuration of an LTE system according to an embodiment of the disclosure.

FIG. 2A is a diagram illustrating a configuration of an LTE system according to an embodiment of the disclosure.

Referring to FIG. 2A, a RAN of the LTE system includes a plurality of eNBs (or nodes B or BSs) 2a-05, 2a-10, 2a-15, and 2a-20, a MME 2a-25, and an S-GW 2a-30. A UE (or a terminal) 2a-35 accesses an external network via the eNB 2a-05, 2a-10, 2a-15, or 2a-20 and the S-GW 2a-30.

In FIG. 2A, the eNB 2a-05, 2a-10, 2a-15, or 2a-20 corresponds to a legacy node B of a UMTS. The eNB may be connected to the UE 2a-35 via wireless channels and may perform complex functions compared to the legacy node B. All user traffic data including real-time services such as VoIP may be serviced through shared channels in the LTE system, and thus an entity for collating status information, e.g., buffer status information of UEs, available transmit power status information, and channel state information and performing scheduling may be required and the eNB 2a-05, 2a-10, 2a-15, or 2a-20 may operate as such an entity. One eNB generally controls a plurality of cells. For example, the LTE system may use radio access technology such as OFDM in a bandwidth of 20 MHz to achieve a data rate of 100 Mbps. Furthermore, the eNB may also use AMC to determine a modulation scheme and a channel coding rate in accordance with a channel state of the UE. The S-GW 2a-30 is an entity for providing data bearers and may establish and release the data bearers under the control of the MME 2a-25. The MME 2a-25 is an entity for performing a mobility management function and various control functions on the UE and is connected to the plurality of eNBs.

Figure 2B:
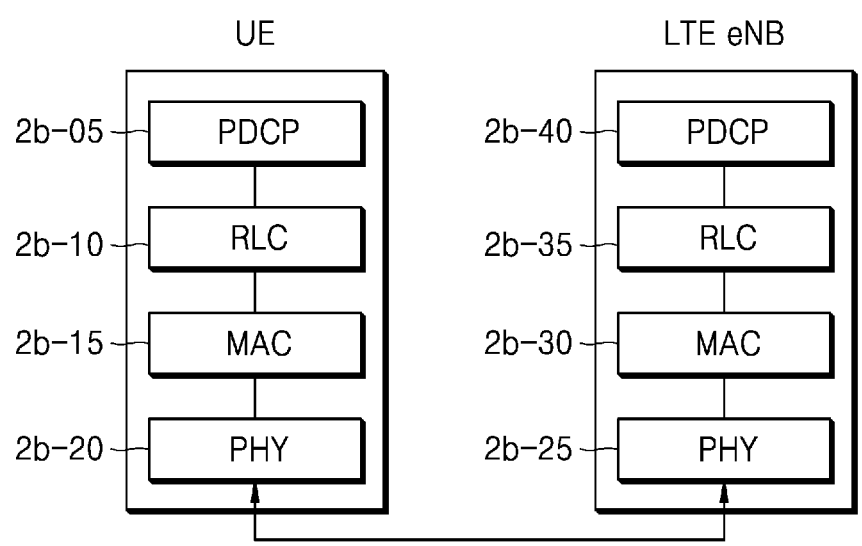
FIG. 2B is a diagram illustrating a radio protocol architecture of an LTE system according to an embodiment of the disclosure.

FIG. 2B is a diagram illustrating a radio protocol architecture of an LTE system according to an embodiment of the disclosure.

Referring to FIG. 2B, radio protocols of the LTE system may include PDCP layers 2b-05 and 2b-40, RLC layers 2b-10 and 2b-35, and MAC layers 2b-15 and 2b-30 respectively in a UE and an eNB. The PDCP layer 2b-05 or 2b-40 may perform IP header compression/decompression or the like. Main functions of the PDCP layer 2b-05 or 2b-40 are summarized as shown below.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The RLC layer 2b-10 or 2b-35 may perform an ARQ operation by reconfiguring a PDCP PDU or an RLC SDU to appropriate sizes. Main functions of the RLC layer 2b-10 or 2b-35 may be summarized as shown below.

Transfer of upper layer PDUs
Error correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer 2b-15 or 2b-30 may be connected to a plurality of RLC layers configured for one UE and may multiplex RLC PDUs into a MAC PDU and may demultiplex the RLC PDUs from the MAC PDU. Main functions of the MAC layer 2b-15 or 2b-30 may be summarized as shown below.

Mapping between logical channels and transport channels
Multiplexing/demultiplexing of MAC SDUs belonging to one or different logical channels into/from TBs delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding A PHY layer 2b-20 or 2b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer.

Although not illustrated in FIG. 2B, RRC layers are present respectively above PDCP layers of the UE and the LTE eNB, and the RRC layers may exchange configuration control messages related to an access and measurement so as to control radio resources.

Figure 2C:
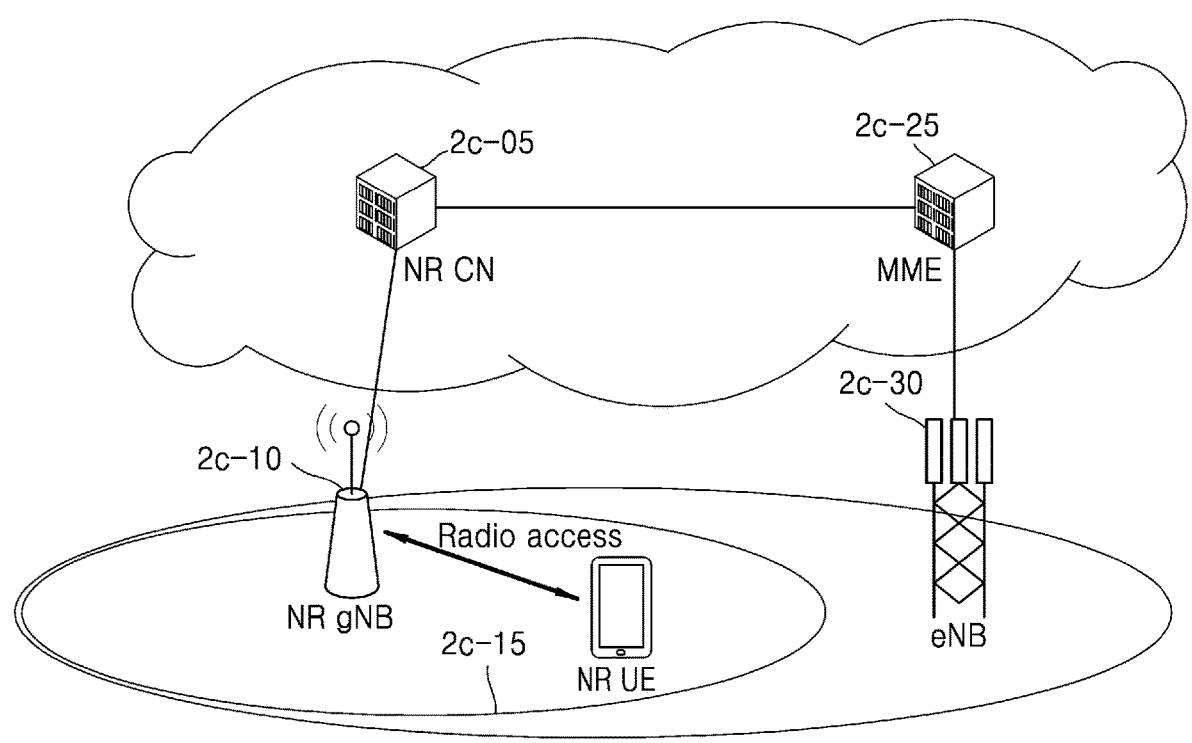
FIG. 2C is a diagram illustrating an architecture of a mobile communication system according to an embodiment of the disclosure.

FIG. 2C is a diagram illustrating an architecture of a next-generation mobile communication system according to an embodiment of the disclosure.

Referring to FIG. 2C, as illustrated, a radio access network of a next-generation mobile communication system (hereinafter, also referred to as the NR or 5G communication system) includes a new radio node B (NR gNB or NR BS) 2c-10 and a NR CN 2c-05. A NR UE (or terminal) 2c-15 accesses an external network via the NR gNB 2c-10 and the NR CN 2c-05.

In FIG. 2C, the NR gNB 2c-10 corresponds to an eNB of the legacy LTE system. The NR gNB 2c-10 may be connected to the NR UE 2c-15 through radio channels and may provide superior services compared to a legacy node B. All user traffic may be serviced through shared channels in the NR or 5G mobile communication system, and thus, an entity for collating buffer status information of UEs, available transmit power status information, and channel state information, and performing scheduling may be required and the NR gNB 2c-10 may operate as such an entity. One NR gNB generally controls a plurality of cells. In the next-generation mobile communication system (the NR or 5G communication system), a bandwidth greater than the maximum bandwidth of the legacy LTE system may be used to achieve an ultra-high data rate, compared to the legacy LTE system, and OFDM may be used as a radio access technology by having a beamforming technology additionally applied thereto. Furthermore, AMC may be applied to determine a modulation scheme and a channel coding rate in accordance with a channel state of the UE. The NR CN 2c-05 performs functions such as mobility support, bearer configuration, QoS configuration, and the like. The NR CN 2c-05 is an entity for performing a mobility management function and various control functions on the NR UE 2c-15 and is connected to a plurality of BSs. Also, the next-generation mobile communication system may cooperate with the legacy LTE system, and the NR CN 2c-05 may be connected to an MME 2c-25 via a network interface. The MME 2c-25 is connected to an eNB 2c-30 that is a legacy BS.

Figure 2D:
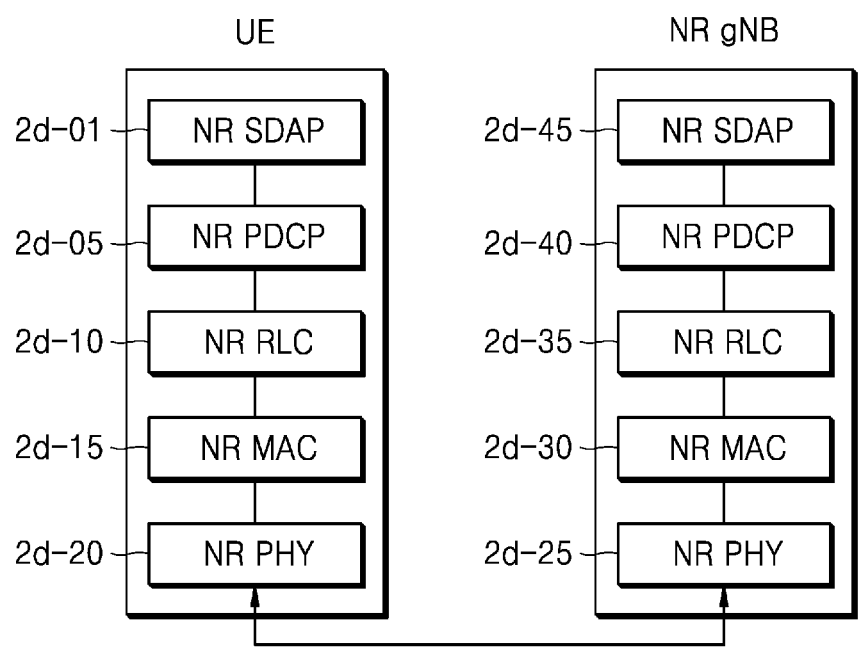
FIG. 2D is a diagram illustrating a radio protocol architecture of a mobile communication system according to an embodiment of the disclosure.

FIG. 2D is a diagram illustrating a radio protocol architecture of a next-generation mobile communication system according to an embodiment of the disclosure.

Referring to FIG. 2D, the radio protocol architecture of a next-generation mobile communication system may include NR SDAP layers 2d-01 and 2d-45, NR PDCP layers 2d-05 and 2d-40, NR RLC layers 2d-10 and 2d-35, and NR MAC layers 2d-15 and 2d-30 respectively for a UE and an NR gNB.

Main functions of the NR SDAP layer 2d-01 or 2d-45 may include some of the following functions.
  Transfer of user plane data
  Mapping between a QoS flow and a DRB for both DL and UL
  Marking QoS flow ID in both DL and UL packets
  Reflective QoS flow to DRB mapping for the UL SDAP PDUs.

With regard to the NR SDAP layer 2d-01 or 2d-45, the UE may be configured with information about whether to use a header of the NR SDAP layer 2d-01 or 2d-45 or to use functions of the NR SDAP layer 2d-01 or 2d-45, through an RRC message per PDCP layer, per bearer, or per logical channel. Also, when the SDAP header of the NR SDAP layer 2d-01 or 2d-45 is configured, a 1-bit NAS reflective QoS indicator and a 1-bit AS reflective QoS indicator of the SDAP header may indicate the UE to update or reconfigure UL and DL QoS flow and data bearer mapping information. The SDAP header may include QoS flow ID information indicating QoS. The QoS information may be used as data processing priority information or scheduling information for seamlessly supporting a service.

Main functions of the NR PDCP layer 2d-05 or 2d-40 may include some of the following functions.
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink.

In the above descriptions, the reordering function of the NR PDCP layer 2d-05 or 2d-40 may include a function of reordering PDCP PDUs received from a lower layer, on a PDCP SN basis, and a function of delivering the reordered data to an upper layer in order. Alternatively, the reordering function of the NR PDCP layer 2d-05 or 2d-40 may include a function of delivering the reordered data to an upper layer out of order, a function of recording missing PDCP PDUs by reordering the received PDCP PDUs, a function of reporting status information of the missing PDCP PDUs to a transmitter, and a function of requesting to retransmit the missing PDCP PDUs.

Main functions of the NR RLC layer 2d-10 or 2d-35 may include some of the following functions.
  Transfer of upper layer PDUs
  In-sequence delivery of upper layer PDUs
  Out-of-sequence delivery of upper layer PDUs
  Error correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment In the above description, the in-sequence delivery function of the NR RLC layer 2d-10 or 2d-35 may indicate a function of delivering RLC SDUs received from a lower layer to an upper layer in order, and may include a function of reassembling the RLC SDUs and delivering the reassembled RLC SDU when a plurality of RLC SDUs segmented from one RLC SDU are received, and include a function of reordering received RLC PDUs on an RLC SN or PDCP SN basis. Also, the in-sequence delivery function of the NR RLC layer 2d-10 or 2d-35 may include a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, a function of delivering all RLC SDUs received before a timer starts, to an upper layer in order although a missing RLC SDU exists when a certain timer expires, or a function of delivering all RLC SDUs received so far, to an upper layer in order although a missing RLC SDU exists when a certain timer expires. Furthermore, in the above description, the NR RLC layer 2d-10 or 2d-35 may process the RLC PDUs in order of reception (regardless of SNs, and in order of arrival) and may deliver the RLC PDUs to the NR PDCP layer 2d-05 or 2d-40 in a manner of out-of-sequence delivery, and when it is a segment, the NR RLC layer 2d-10 or 2d-35 may reassemble the segment with other segments stored in a buffer or subsequently received, into a whole RLC PDU and may transmit the RLC PDU to the NR PDCP layer 2d-05 or 2d-40. The NR RLC layer 2d-10 or 2d-35 may not have a concatenation function, and the concatenation function may be performed by the NR MAC layer 2d-15 or 2d-30 or be replaced with a multiplexing function of the NR MAC layer 2d-15 or 2d-30.

The out-of-sequence delivery function of the NR RLC layer 2d-10 or 2d-35 may include a function of directly delivering RLC SDUs received from a lower layer to an upper layer out of order, a function of reassembling a plurality of RLC SDUs segmented from one RLC SDU and delivering the reassembled RLC SDU when the segmented RLC SDUs are received, and a function of recording missing RLC PDUs by storing RLC SNs or PDCP SNs of received RLC PDUs and reordering the received RLC PDUs.

The NR MAC layer 2*d*-15 or 2*d*-30 may be connected to a plurality of NR RLC layers configured for one UE, and main functions of the NR MAC layer 2*d*-15 or 2*d*-30 may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 2*d*-20 or 2*d*-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer.

Figure 2E:
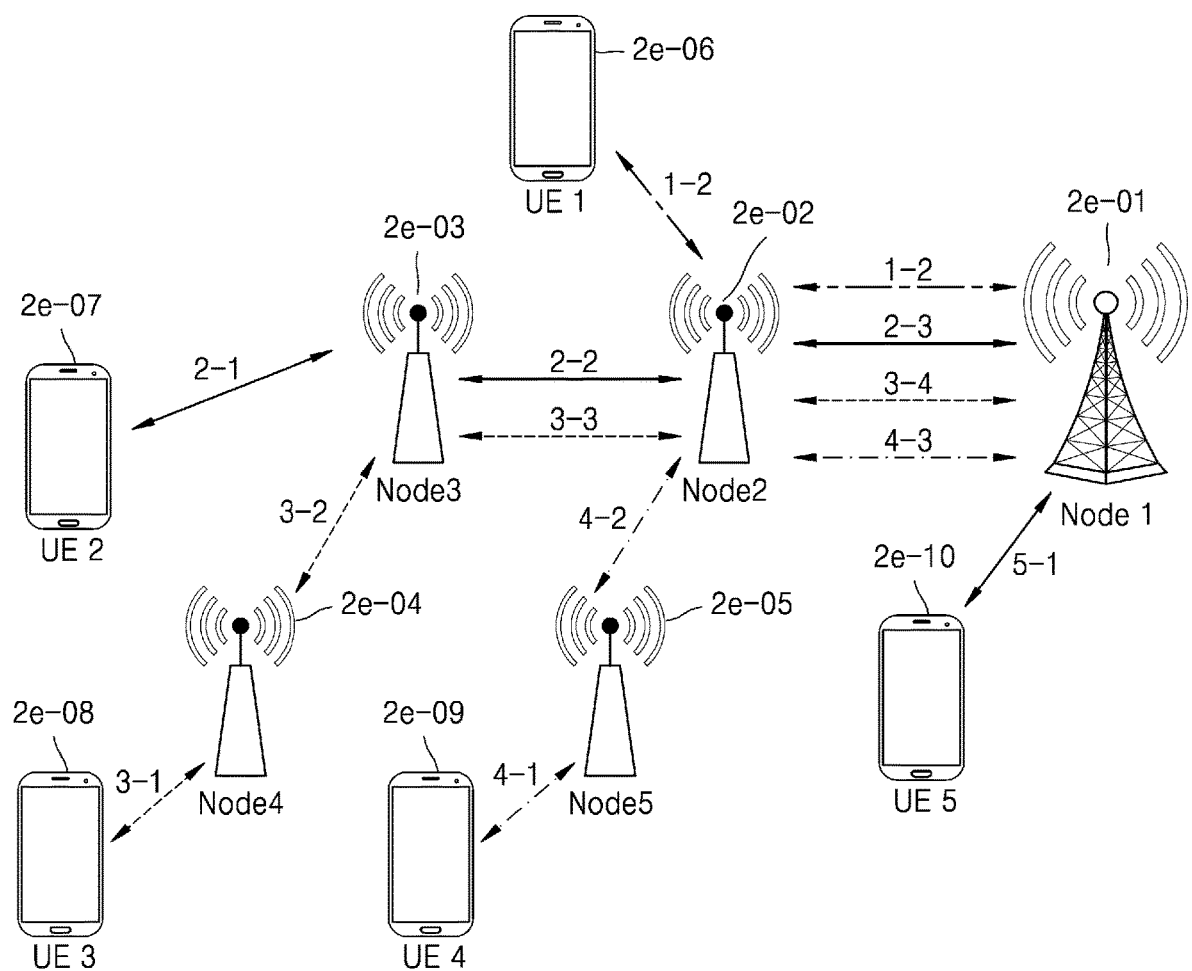
FIG. 2E is a diagram illustrating network architecture supporting wireless backhauls, the network architecture being considered in a mobile communication system according to an embodiment of the disclosure.

FIG. 2E is a diagram illustrating network architecture supporting wireless backhauls, the network architecture being considered in a mobile communication system according to an embodiment of the disclosure.

Referring to FIG. 2E, a wireless backhaul network (also referred to as an IAB network) may consist of a plurality of radio nodes (e.g., IAB nodes or IAB donors), and a UE in the IAB network may establish RRC connection by accessing a random radio node, and may transmit and receive data. Each radio node, as a child IAB node, may consider another radio node as a parent IAB node, may establish RRC connection with the parent IAB node, and may transmit and receive data. That is, the child IAB node may indicate the UE or an IAB node, may receive, from the parent IAB node or the IAB donor, wireless connection access configuration, RRC configuration information, bearer configuration information, and configuration information of a PDCP layer or a RLC layer or a MAC layer or a PHY layer, and may indicate a radio node to which the configuration information is to be applied.

The parent IAB node may indicate an IAB node or the IAB donor, and may indicate a radio node for configuring the wireless connection access configuration, the RRC configuration information, the bearer configuration information, and the configuration information of a PDCP layer or a RLC layer or a MAC layer or a PHY layer to the child IAB node.

In FIG. 2E, the IAB donor may indicate a radio node (e.g., a Node1 2*e*-01) that is connected to a core network so as to transfer data to an upper layer, and an IAB node may indicate each of radio nodes 2, 3, 4, and 5 (e.g., a Node 2 2*e*-02, a Node 3 2*e*-03, a Node 4 2*e*-04, and a Node 5 2*e*-05) that each perform as an entity for relaying data so as to support data transmission and reception between the UE and an end of the IAB donor. Also, UEs 2*e*-06, 2*e*-07, 2*e*-08, 2*e*-09, and 2*e*-10 may establish RRC connection by accessing radio nodes (e.g. the IAB nodes or the IAB donor), and may transmit and receive data. For example, the UE 2 2*e*-07 may establish RRC connection by accessing the Node 3 2*e*-03 and may transmit and receive data. The Node 3 2*e*-03 may receive data from the UE 2 2*e*-07 and may transmit the data to the Node 2 2*e*-02 that is a parent IAB node, or may receive, from the Node 2 2*e*-02, data to be transmitted to the UE 2 2*e*-07, and may transmit the data to the UE 2 2*e*-07. Alternatively, the Node 2 2*e*-02 may receive data from the Node 3 2*e*-03 and may transmit the data to the Node1 2*e*-01 that is a parent IAB node (the IAB donor), or may receive, from the Node1 2*e*-01, data to be transmitted to the Node 3 2*e*-03, and may transmit the data to the Node 3 2*e*-03. As another example, the UE 1 2*e*-06 may establish RRC connection by connecting to the Node 2 2*e*-02, and may transmit and receive data. The Node 2 2*e*-02 may receive data from the UE 1 2*e*-06 and may transmit the data to the Node 1 2*e*-01 that is a parent IAB node, or may receive, from the Node 1 2*e*-01, data to be transmitted to the UE 1 2*e*-06, and may transmit the data to the UE 1 2*e*-06).

As described above, a UE may establish RRC connection by accessing a radio node having strongest signal intensity and may transmit and receive data, and as proposed above, the IAB network according to the disclosure may support multi-hop data transmission through intermediate radio nodes so as to allow the UE to transmit data to a radio node connected to a core network and to receive data from the radio node connected to the core network.

Each radio node may receive configuration information of a bandwidth allocation protocol (BAP) layer (bap-config) by an RRC message (e.g., RRCReconfiguration message) from an uppermost radio node (IAB donor). The configuration information of the BAP layer may include configuration of a BAP layer address (bap-address) of the radio node or a default radio node UL routing identifier (defaultUL(Uplink)-BAP-RoutingID) or a default UL backhaul RLC channel identifier (defaultUL(Uplink)-BH-RLC channel) or a congestion control feedback type (flow Control feedback type). In the above descriptions, the BAP layer address may be allocated to each radio node, may indicate a unique address of a BAP layer of each radio node, and may be considered as, along with a link identifier, an address considered by a BAP layer to route (or transfer) BAP layer data (BAP PDU) to another radio node via UL or DL. In the above descriptions, the default radio node UL routing identifier or the default UL backhaul RLC channel identifier may be used as a default link via which UL data is to be transmitted as a default or is transmittable as a default, in a case where the UL data occurs in the radio node but a routing identifier or a backhaul RLC channel identifier for transmission of the UL data is not configured for the radio node. In the above descriptions, when BAP layer control data (BAP control PDU) including an indicator requesting a congestion state is received, a BAP layer may indicate whether to report the congestion state per backhaul RLC channel or per routing identifier.

The RRC message (e.g., RRCReconfiguration message) may include configuration of RLC backhaul channel configuration information, and the RLC backhaul channel configuration information may include configuration of backhaul logical channel identifier (bh-LogicalchannelIdentity) or backhaul RLC channel identifier (bh-RLC-Channel ID) or RLC reestablishment indicator or logical channel identifier priority information (e.g., priority order or priority bit rate or configuration information for logical channel selection) required for an LCP procedure. The backhaul logical channel identifier may be configured as a logical channel identity value or an extended logical channel identity value.

Each radio node may be configured with, by F1 Application Protocol (F1AP) message from the uppermost radio node (IAB donor), a BAP layer address of DU of the uppermost radio node (IAB donor DU's BAP address) or mapping information of a BAP layer address of a next hop (next hop BAP address) and a DL datastream transmission link (downstream egress link) or mapping information of a BAP layer address of a next hop (next hop BAP address) and a UL datastream transmit link (upstream egress link) or mapping information of data traffic of an upper layer (next hop BAP address) and a BAP routing identifier included in a header of a BAP layer or BAP routing Table or BAP routing entries. In the above descriptions, a transmission link and a reception link may indicate link information for transmission or reception when data is routed between radio nodes.

Figure 2F:
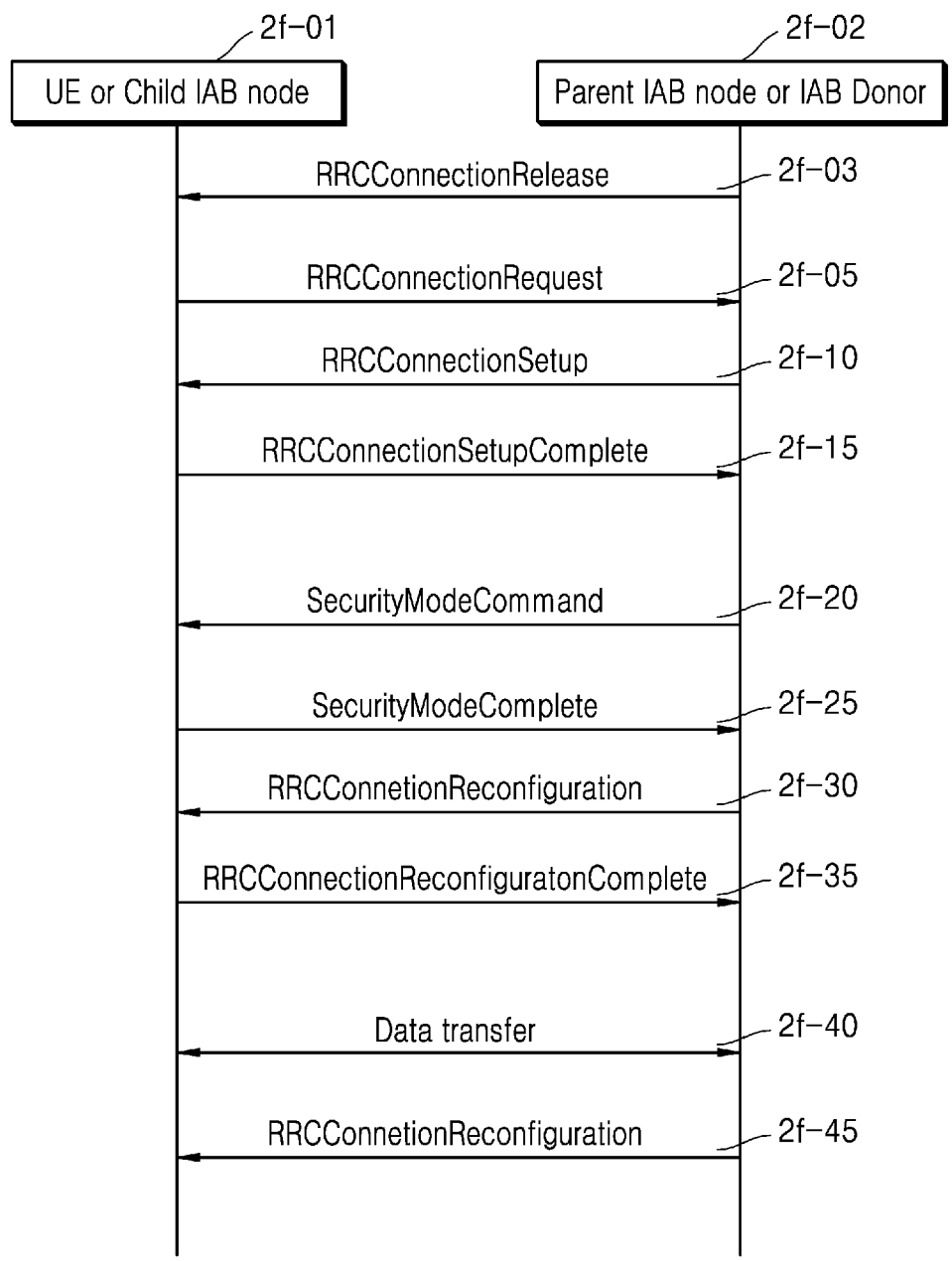
FIG. 2F illustrates a procedure in which RRC connection configuration is performed when a UE establishes connection with a radio node (an integrated access backhaul (IAB) node or an IAB donor) or a child IAB node establishes connection with a parent IAB node (an IAB node or the IAB donor, in the IAB network in the mobile communication system, according to an embodiment of the disclosure.

FIG. 2F illustrates a procedure in which RRC connection configuration is performed when a UE establishes connection with a radio node (an IAB node or an IAB donor) or a child IAB node establishes connection with a parent IAB node (an IAB node or the IAB donor, in the IAB network in the mobile communication system, according to an embodiment of the disclosure.

Referring to FIG. 2F, when the UE or the child IAB node (2f-01) which transmits and receives data in a RRC connected mode does not transmit nor receive data due to a predefined cause or for a predefined time, the parent IAB node (2f-02) may transmit an RRC message or an RRCConnectionRelease message to the UE or the child IAB node so as to control the UE or the child IAB node to transit to a RRC idle mode or a RRC inactive mode (2f-03). Afterward, when the UE or the child IAB node which is not currently configured for connection (hereinafter, also referred to as the idle-mode UE) has data to be transmitted, the UE or the child IAB node may perform a RRC connection establishment process on the parent IAB node, and in a case of the RRC inactive mode, the UE or the child IAB node may perform a RRC connection resume process on the parent IAB node.

The UE or the child IAB node establishes inverse direction transmission synchronization with the parent IAB node via a random access process, and transmits a newly-defined RRC message or RRC Connection Request message (or a RRC Resume Request) to the parent IAB node (2f-05). The newly-defined RRC message or RRC Connection Request message (or the RRC Resume Request) may include an identifier of the UE or the child IAB node, and an establishment cause, or the like.

The parent IAB node transmits a newly-defined RRC message or RRCConnectionSetup message (or an RRCResume message) to allow the UE or the child IAB node to establish RRC connection (2f-10). The newly-defined RRC message or RRCConnectionSetup message (or the RRCResume message) may include at least one of configuration information of each logical channel, configuration information of each bearer, configuration information of a PDCP layer, configuration information of a RLC layer, or configuration information of a MAC layer.

The newly-defined RRC message or RRCConnectionSetup message (or the RRCResume message) may include an indicator indicating whether to retransmit pre-configured RRC messages to a target parent IAB node or a target cell, when the UE or the child IAB node performs handover. For example, the parent IAB node may indicate the UE or the child IAB node to retransmit RRC messages transmitted few seconds ago, before the UE or the child IAB node receives a handover indication message, performs handover, or receives an RRC message. The indicator may indicate retransmission with respect to each of the pre-configured RRC messages. That is, a plurality of indicators may indicate whether to retransmit respective RRC messages. Alternatively, indication of retransmission may be performed in the form of a bitmap indicating each RRC message.

The newly-defined RRC message or RRCConnectionSetup message (or the RRCResume message) may include PDCP configuration information including an indicator indicating to perform a PDCP data recovery procedure. Also, the message may include bearer configuration information including an indicator indicating whether to perform a PDCP data recovery procedure on a SRB or a DRB. Also, the message may include bearer configuration information including an indicator indicating, with respect to the SRB or the DRB, whether to discard residual data in the PDCP layer.

The newly-defined RRC message or RRCConnectionSetup message (or the RRCResume message) may include bearer configuration information including an indicator indicating whether to perform accumulated retransmission or selective retransmission on an AM DRB when a PDCP re-establishment procedure is performed.

The newly-defined RRC message or RRCConnectionSetup message (or the RRCResume message) may include an indicator indicating which ARQ function is to be used in the child IAB node. The newly-defined RRC message or RRCConnectionSetup message (or the RRCResume message) may indicate, by using the indicator, whether to use a hop-by-hop ARQ function or an end-to-end ARQ function. When the end-to-end ARQ function is configured, the newly-defined RRC message or RRCConnectionSetup message (or the RRCResume message) may indicate whether to perform a function of segmenting or changelessly transferring received RLC layer data or whether the child IAB node, as an end, is to perform an ARQ function. The newly-defined RRC message or RRCConnectionSetup message (or the RRCResume message) may indicate which ARC function is to be used as a default function, and, when an ARQ function is not configured in the message, it may be predefined that the hop-by-hop ARQ function or the end-to-end ARQ function is to be used as the default function. Also, the message may indicate whether the child IAB node is to use a data segmentation function, and may indicate whether respective functions of RLC layers are to be activated (or to be used), the functions being described with reference to FIG. 2B or 2D.

The newly-defined RRC message or RRCConnectionSetup message (or the RRCResume message) may include an indicator indicating whether a BAP layer is to use a data concatenation function. Also, the message may include an indicator indicating whether a header of the BAP layer is to be configured, and the indicator indicating whether the header of the BAP layer is to be configured may indicate a type of the header. For example, the newly-defined RRC message or RRCConnectionSetup message (or the RRCResume message) may include information configuring which information from among a UE identifier or a UE bearer identifier or a QoS identifier or a radio node identifier or a radio node address, or QoS information is to be included in the header. The newly-defined RRC message or RRCConnectionSetup message (or the RRCResume message) may configure to omit the header so as to decrease overhead.

The newly-defined RRC message or RRCConnectionSetup message (or the RRCResume message) may include information configuring a backhaul RLC channel to be used between a BAP layer of a transmitter and a BAP layer of a receiver, between the child IAB node and the parent IAB node, or between the UE and an IAB node. In detail, the message may include an available number of backhaul RLC channels, identifiers of the available backhaul RLC channels, or mapping information (e.g., a UE identifier or a UE bearer identifier or QoS information or QoS identifier mapping information) about a plurality of items of data mapped to the backhaul RLC channels. The backhaul RLC channel may be defined as a channel for delivering data according to QoS by grouping, based on QoS information, a plurality of items of data of several UEs, or may be defined as a channel for delivering data by grouping data of each UE.

The newly-defined RRC message or RRCConnectionSetup message (or the RRCResume message) may define an indicator indicating whether configuration information (pdcp-config) of a PDCP layer is to perform PDCP status report-based retransmission, and configures and indicates to perform the PDCP status report-based retransmission. For example, when a value of the indicator is configured as 0, the PDCP layer that received a PDCP status report may check data corresponding to NACK information of the PDCP status report and may discard only data corresponding to ACK information. However, when the value of the indicator is configured as 1, the PDCP layer that received the PDCP status report may discard data corresponding to ACK information of the PDCP status report and may retransmit data corresponding to NACK information. Alternatively, the indicator may indicate whether the BAP layer is to define a BAP status report and to perform BAP status report-based retransmission. In the above descriptions, the BAP status report may indicate a COUNT value that is first lost, as in the PDCP status report, and may indicate a COUNT value thereafter as a bitmap. Alternatively, the BAP status report may indicate a highest COUNT value with respect to a plurality of items of data that are sequentially and successfully received.

In order to indicate to perform the PDCP status report-based retransmission, the newly-defined RRC message or RRCConnectionSetup message (or the RRCResume message) may trigger a PDCP data recovery processing procedure by configuring, in the configuration information (pdcp-config) of the PDCP layer, a PDCP data recovery indicator (recoverPDCP), and may transmit the PDCP status report. When retransmission is performed during the PDCP data recovery procedure, the PDCP layer may perform selective retransmission based on the PDCP status report, not based on whether transmission is successful from a lower layer (e.g., a RLC layer). That is, the PDCP layer may retransmit only data indicated, in the PDCP status report, as NACK data for which successful transmission is not acknowledged. Alternatively, the message may indicate whether the BAP layer is to define the BAP status report and a BAP data recovery processing procedure and to perform the BAP status report-based retransmission. In the above descriptions, the BAP status report may indicate a COUNT value that is first lost, as in the PDCP status report, and may indicate a COUNT value thereafter as a bitmap. Alternatively, the BAP status report may indicate a highest COUNT value with respect to a plurality of items of data that are sequentially and successfully received.

The newly-defined RRC message or RRCConnectionSetup message may include an indicator and a period or a timer value, the indicator indicating periodic transmission of the PDCP status report so as to allow the configuration information (pdcp-config) of the PDCP layer to periodically transmit the PDCP status report. When the configuration is received, the PDCP layer may transmit the PDCP status report by triggering the PDCP status report according to the period or whenever the timer value expires. Alternatively, the message may indicate that the BAP layer is to define the BAP status report and to periodically perform the BAP status report. In the above descriptions, the BAP status report may indicate a COUNT value that is first lost, as in the PDCP status report, and may indicate a COUNT value thereafter as a bitmap. Alternatively, the BAP status report may indicate a highest COUNT value with respect to a plurality of items of data that are sequentially and successfully received.

The newly-defined RRC message or RRCConnectionSetup message may configure an indicator and a timer value, the indicator indicating transmission of the PDCP status report so as to allow the configuration information (pdcp-config) of the PDCP layer to trigger and transmit the PDCP status report. When the PDCP layer receives configuration of the UE, the PDCP layer may trigger a timer having the timer value whenever a gap of a PDCP SN occurs, and when, until the timer expires, the gap of the PDCP SN is not filled nor data corresponding to the PDCP SN assumed to be lost is not received, the PDCP layer may trigger, configure, and transmit the PDCP status report when the timer expires. If, before the timer expires, the gap of the PDCP SN is filled or the data corresponding to the PDCP SN assumed to be lost is received, the timer may stop and reset. In the above descriptions, a PDCP reordering timer may be used as the timer, and a new timer having a smaller or greater value than the PDCP reordering timer may be defined. The aforementioned timer may be defined and configured in the BAP layer.

The newly-defined RRC message or RRCConnectionSetup message may include configuration about a PDCP status report prohibit timer to prevent the configuration information (pdcp-config) of the PDCP layer from frequently triggering the PDCP status report. When the PDCP status report prohibit timer is configured, the PDCP layer may trigger or configure and transmit the PDCP status report, and may trigger the PDCP status report prohibit timer. The PDCP layer may prevent an additional PDCP status report from being transmitted while the PDCP status report prohibit timer is running, and after the PDCP status report prohibit timer expires, the PDCP layer may allow transmission of a PDCP status report. The aforementioned timer may also be defined and configured in the BAP layer.

The newly-defined RRC message or RRCConnectionSetup message (or a newly defined separate RRC message) may include information about the parent IAB node or the child IAB node, the information being useful for an IAB node and including a congestion level, a queuing delay, a one-hop air latency, or the like, and information about each hop. Also, the message may indicate a radio hop number from an IAB node receiving the RRC message to an uppermost IAB node (the IAB donor). A radio node having received the hop number via the RRC message may notify a hop number that is increased by 1 to a next child IAB node.

The newly-defined RRC message or RRCConnectionSetup message (or the newly defined separate RRC message) may include an indicator indicating to perform an in-sequence delivery function, instead of an out-of-order delivery function of an NR RLC layer. That is, the NR RLC layer performs the out-of-order delivery function as a default, and may perform the in-sequence delivery function according to the indicator of the RRC message. The in-sequence delivery function indicates that RLC SNs of RLC PDUs or RLC SDUs received by the RLC layer are sequentially ordered and data is transferred to the PDCP layer in ascending order of the RLC SNs. When a RLC SN gap occurs such that a RLC SN is lost, the RLC layer configures and transmits a RLC status report about the lost RLC SN so as to request retransmission, and even when a RLC SDU or a RLC PDU whose SN is greater than the lost RLC SN is received, the RLC SDU or the RLC PDU is not transferred to the PDCP layer but is stored in a buffer, and when the lost RLC SN is received, data is transferred to the PDCP layer in ascending order of the RLC SNs.

In order to enhance security of a radio link between an IAB node (or an IAB node connected with a UE or a UE) and an uppermost IAB node (or an IAB node), the newly-defined RRC message or RRCConnectionSetup message (or the newly defined separate RRC message) may configure that the IAB node (or the IAB node connected with the UE or the UE) and the uppermost IAB node (or the IAB node) are to configure a separate PDCP layer for the IAB link per bearer or per backhaul RLC channel and to configure and use a ciphering and deciphering procedure or an integrity protection and verification procedure. In the above descriptions, it is assumed that, as a default, the separate PDCP layer for the IAB link between the IAB node (or the IAB node connected with the UE or the UE) and the uppermost IAB node (or the IAB node) is not configured per bearer or per backhaul RLC channel. That is, only when configured per bearer or per backhaul RLC channel, the separate PDCP layer may be used for security enhancement. In another method, as data ciphering is already performed by a PDCP layer, the separate PDCP layer may be configured to perform only integrity protection and verification, and a limit in a data rate with respect to integrity protection and verification may not be set in an interface between wireless backhaul nodes and may be set when required.

The UE or the child IAB node which established the RRC connection transmits an RRCConnetionSetupComplete message (or an RRCResumeComplete message) to the parent IAB node (2f-15). The RRCConnetionSetupComplete message may include a control message of SERVICE REQUEST by which the UE or the child IAB node requests an AMF or an MME for bearer configuration. The parent IAB node transmits the SERVICE REQUEST message included in the RRCConnetionSetupComplete message to the AMF or the MME. The AMF or the MME may determine whether to provide a service requested by the UE or the child IAB node.

As a result of the determination, when the AMF or the MME determines to provide the service requested by the UE or the child IAB node, the AMF or the MME transmits an INITIAL CONTEXT SETUP REQUEST message to the parent IAB node. The INITIAL CONTEXT SETUP REQUEST message may include information such as QoS information to be applied to DRB configuration, security-related information (e.g., a security key, a security algorithm, etc.) to be applied to a DRB, or the like.

The parent IAB node and the UE or the child IAB node exchange a SecurityModeCommand message (2f-20) and a SecurityModeComplete message (2f-25) so as to configure security. When the configuration of security is completed, the parent IAB node transmits a RRCConnectionReconfiguration message to the UE or the child IAB node (2f-30).

The newly-defined RRC message or RRCConnectionReconfiguration message may include an indicator indicating whether to retransmit pre-configured RRC messages to a target parent IAB node or a target cell, when the UE or the child IAB node performs handover. For example, the parent IAB node may indicate the UE or the child IAB node to retransmit RRC messages transmitted few seconds ago, before the UE or the child IAB node receives a handover indication message, performs handover, or receives a RRC message. The indicator may indicate retransmission with respect to each of the pre-configured RRC messages. That is, a plurality of indicators may indicate whether to retransmit respective RRC messages. Alternatively, the indication of retransmission may be performed in the form of a bitmap indicating each RRC message.

The newly-defined RRC message or RRCConnectionReconfiguration message may include PDCP configuration information including an indicator indicating to perform a PDCP data recovery procedure. Also, the message may include bearer configuration information including an indicator indicating whether to perform a PDCP data recovery procedure on a SRB or a DRB. Also, the message may include bearer configuration information including an indicator indicating, with respect to the SRB or the DRB, whether to discard a plurality of items of residual data in the PDCP layer.

The newly-defined RRC message or RRCConnectionReconfiguration message may include bearer configuration information including an indicator indicating whether to perform accumulated retransmission or selective retransmission on an AM DRB when a PDCP re-establishment process is performed.

The newly-defined RRC message or RRCConnectionReconfiguration message may include an indicator indicating which ARQ function is to be used in the child IAB node, and may indicate, by using the indicator, whether the parent IAB node is to use a hop-by-hop ARQ function or an end-to-end ARQ function. When the end-to-end ARQ function is configured, the message may indicate whether the parent IAB node is to perform a function of segmenting or changelessly transferring received RLC layer data or whether the child IAB node, as an end, is to perform an ARQ function. The message may indicate which ARQ function is to be used as a default function, and when the message does not configure an ARQ function, it may be predefined that the hop-by-hop ARQ function or the end-to-end ARQ function is to be used as the default function. Also, the message may indicate whether the child IAB node is to use a data segmentation function, and may indicate whether respective functions of RLC layers are to be activated (or to be used), the functions being described with reference to FIG. 1D or 2B.

The newly-defined RRC message or RRCConnectionReconfiguration message may include an indicator indicating whether the BAP layer is to use a data concatenation function. The message may include an indicator indicating whether a header of the BAP layer is to be configured, and may indicate a type of the header. For example, the message may configure which information from among a UE identifier or a UE bearer identifier or a QoS identifier or a radio node identifier or a radio node address or QoS information is to be included in the header. Omission of the header may be configured to decrease overhead.

The newly-defined RRC message or RRCConnectionReconfiguration message may include information configuring a backhaul RLC channel to be used between a BAP layer of a transmitter and a BAP layer of a receiver, between the child IAB node and the parent IAB node, or between the UE and an IAB node. In detail, the message may include an available number of backhaul RLC channels, identifiers of the available backhaul RLC channels, or mapping information (e.g., a UE identifier or a UE bearer identifier or QoS information or QoS identifier mapping information) about a plurality of items of data mapped to the backhaul RLC channels. The backhaul RLC channel may be defined as a channel for delivering data according to QoS by grouping, based on QoS information, a plurality of items of data of several UEs, or may be defined as a channel for delivering data by grouping data of each UE.

The newly-defined RRC message or RRCConnectionReconfiguration message may define an indicator indicating whether configuration information (pdcp-config) of a PDCP layer is to perform PDCP status report-based retransmission, and configures and indicates to perform the PDCP status report-based retransmission. For example, when a value of the indicator is configured as 0, the PDCP layer that received a PDCP status report may check data corresponding to NACK information of the PDCP status report and may discard only data corresponding to ACK information. However, when the value of the indicator is configured as 1, the PDCP layer that received the PDCP status report may discard data corresponding to ACK information of the PDCP status report and may retransmit data corresponding to NACK information. Alternatively, the indicator may indicate whether the BAP layer is to define a BAP status report and to perform BAP status report-based retransmission. In the above descriptions, the BAP status report may indicate a COUNT value that is first lost, as in the PDCP status report, and may indicate a COUNT value thereafter as a bitmap. Alternatively, the BAP status report may indicate a highest COUNT value with respect to a plurality of items of data that are sequentially and successfully received.

In order to indicate to perform the PDCP status report-based retransmission, the newly-defined RRC message or RRCConnectionReconfiguration message may trigger a PDCP data recovery processing procedure by configuring, in the configuration information (pdcp-config) of the PDCP layer, a PDCP data recovery indicator (recoverPDCP), and may transmit the PDCP status report. When retransmission is performed during the PDCP data recovery procedure, the PDCP layer may perform selective retransmission based on the PDCP status report, not based on whether transmission is successful from a lower layer (e.g., a RLC layer). That is, the PDCP layer may retransmit only data indicated, in the PDCP status report, as NACK data for which successful transmission is not acknowledged. Alternatively, the message may indicate whether the BAP layer is to define the BAP status report and a BAP data recovery processing procedure and to perform the BAP status report-based retransmission. In the above descriptions, the BAP status report may indicate a COUNT value that is first lost, as in the PDCP status report, and may indicate a COUNT value thereafter as a bitmap. Alternatively, the BAP status report may indicate a highest COUNT value with respect to a plurality of items of data that are sequentially and successfully received.

The newly-defined RRC message or RRCConnectionReconfiguration message may include an indicator and a period or a timer value, the indicator indicating periodic transmission of the PDCP status report so as to allow the configuration information (pdcp-config) of the PDCP layer to periodically transmit the PDCP status report. When the configuration is received, the PDCP layer may transmit the PDCP status report by triggering the PDCP status report according to the period or whenever the timer value expires. Alternatively, the message may indicate that the BAP layer is to define the BAP status report and to periodically perform the BAP status report. In the above descriptions, the BAP status report may indicate a COUNT value that is first lost, as in the PDCP status report, and may indicate a COUNT value thereafter as a bitmap. Alternatively, the BAP status report may indicate a highest COUNT value with respect to a plurality of items of data that are sequentially and successfully received.

The newly-defined RRC message or RRCConnectionReconfiguration message may configure an indicator and a timer value, the indicator indicating transmission of the PDCP status report so as to allow the configuration information (pdcp-config) of the PDCP layer to trigger and transmit the PDCP status report. When the configuration is received, the PDCP layer may trigger a timer having the timer value whenever a gap of a PDCP SN occurs, and when the timer expires, the PDCP layer may trigger, configure, and transmit a PDCP status report. In the above descriptions, a PDCP reordering timer may be used as the timer, and a new timer having a smaller or greater value than the PDCP reordering timer may be defined. The aforementioned timer may be defined and configured in the BAP layer.

The newly-defined RRC message or RRCConnectionReconfiguration message may include configuration about a PDCP status report prohibit timer to prevent the configuration information (pdcp-config) of the PDCP layer from frequently triggering the PDCP status report. When the PDCP status report prohibit timer is configured, the PDCP layer may trigger or configure and transmit the PDCP status report, and may trigger the PDCP status report prohibit timer. The PDCP layer may prevent an additional PDCP status report from being transmitted while the PDCP status report prohibit timer is running, and after the PDCP status report prohibit timer expires, the PDCP layer may allow transmission of a PDCP status report. The aforementioned timer may also be defined and configured in the BAP layer.

The newly-defined RRC message or RRCConnectionReconfiguration message (or a newly defined separate RRC message) may include information about the parent IAB node or the child IAB node, the information being useful for an IAB node and including a congestion level, a queuing delay, a one-hop air latency, or the like, and information about each hop. Also, the message may indicate a radio hop number from an IAB node receiving the RRC message to an uppermost IAB node (the IAB donor). A radio node having received the hop number via the RRC message may notify a hop number that is increased by 1 to a next child IAB node.

The newly-defined RRC message or RRCConnectionReconfiguration message (or the newly defined separate RRC message) may include an indicator indicating to perform an in-sequence delivery function, instead of an out-of-order delivery function of an NR RLC layer. That is, the NR RLC layer performs the out-of-order delivery function as a default, and may perform the in-sequence delivery function according to the indicator of the RRC message. The in-sequence delivery function indicates that RLC SNs of RLC PDUs or RLC SDUs received by the RLC layer are sequentially ordered and data is transferred to the PDCP layer in ascending order of the RLC SNs. When a RLC SN gap occurs such that a RLC SN is lost, the RLC layer configures and transmits a RLC status report about the lost RLC SN so as to request retransmission, and even when a RLC SDU or a RLC PDU whose SN is greater than the lost RLC SN is received, the RLC SDU or the RLC PDU is not transferred to the PDCP layer but is stored in a buffer, and when the lost RLC SN is received, data is transferred to the PDCP layer in ascending order of the RLC SNs.

In order to enhance security of a radio link between an IAB node (or an IAB node connected with a UE or a UE) and an uppermost IAB node (or an IAB node), the newly-defined RRC message or RRCConnectionReconfiguration message (or the newly defined separate RRC message) may configure that the IAB node (or the IAB node connected with the UE or the UE) and the uppermost IAB node (or the IAB node) are to configure a separate PDCP layer for the IAB link per bearer or per backhaul RLC channel and to configure and use a ciphering and deciphering procedure or an integrity protection and verification procedure. In the above descriptions, it is assumed that, as a default, the separate PDCP layer for the IAB link between the IAB node (or the IAB node connected with the UE or the UE) and the uppermost IAB node (or the IAB node) is not configured per bearer or per backhaul RLC channel. That is, only when configured per bearer or per backhaul RLC channel, the separate PDCP layer may be used for security enhancement. In another method, as data ciphering is already performed by a PDCP layer, the separate PDCP layer may be configured to perform only integrity protection and verification, and a limit in a data rate with respect to integrity protection and verification may not be set in an interface between wireless backhaul nodes and may be set when required.

Each radio node may receive configuration information of a BAP layer (bap-config) by an RRC message (e.g., RRCReconfiguration message) from an uppermost radio node (IAB donor). The configuration information of the BAP layer may include configuration of a BAP layer address (bap-address) of the radio node or a default radio node UL routing identifier (defaultUL(Uplink)-BAP-RoutingID) or a default UL backhaul RLC channel identifier (defaultUL (Uplink)-BH-RLC channel) or a congestion control feedback type (flow Control feedback type). In the above descriptions, the BAP layer address may be allocated to each radio node, may indicate a unique address of a BAP layer of each radio node, and may be considered as, along with a link identifier, an address considered by a BAP layer to route (or transfer) BAP layer data (BAP PDU) to another radio node via UL or DL. In the above descriptions, the default radio node UL routing identifier or the default UL backhaul RLC channel identifier may be used as a default link via which UL data is to be transmitted as a default or is transmittable as a default, in a case where the UL data occurs in the radio node but a routing identifier or a backhaul RLC channel identifier for transmission of the UL data is not configured for the radio node. In the above descriptions, when BAP layer control data (BAP control PDU) including an indicator requesting a congestion state is received, a BAP layer may indicate whether to report the congestion state per backhaul RLC channel or per routing identifier.

The RRC message (e.g., RRCReconfiguration message) may include configuration of RLC backhaul channel configuration information, and the RLC backhaul channel configuration information may include configuration of backhaul logical channel identifier (bh-LogicalchannelIdentity) or backhaul RLC channel identifier (bh-RLC-Channel ID) or RLC reestablishment indicator or logical channel identifier priority information (e.g., priority order or priority bit rate or configuration information for logical channel selection) required for an LCP procedure. The backhaul logical channel identifier may be configured as a logical channel identity value or an extended logical channel identity value.

Also, the RRCConnectionReconfiguration message may include configuration information of a DRB via which user data is to be processed, and the UE or the child IAB node configures the DRB by using the configuration information and transmits an RRCConnectionReconfigurationComplete message to the parent IAB node (2f-35). After the parent IAB node completes DRB configuration with respect to the UE or the child IAB node, the parent IAB node may transmit an INITIAL CONTEXT SETUP COMPLETE message to the AMF or the MME and may complete connection.

When the aforementioned procedure is completed, the UE or the child IAB node transmits and receives data to and from the parent IAB node through the core network (2f-40). According to some embodiments of the disclosure, a data transmission procedure broadly consists of 3 steps that are RRC connection configuration, security configuration, and DRB configuration. Also, the parent IAB node may transmit an RRCConnectionReconfiguration message to newly allocate, add, or change configuration with respect to the UE or the child IAB node (2f-45).

In the disclosure, a bearer may include a SRB and a DRB, wherein the SRB indicates a Signaling Radio Bearer and the DRB indicates a Data Radio Bearer. A UM DRB indicates a DRB configured to use a RLC layer operating in an Unacknowledged Mode, and an AM DRB indicates a DRB configured to use a RLC layer operating in an Acknowledged Mode.

Figure 2G:
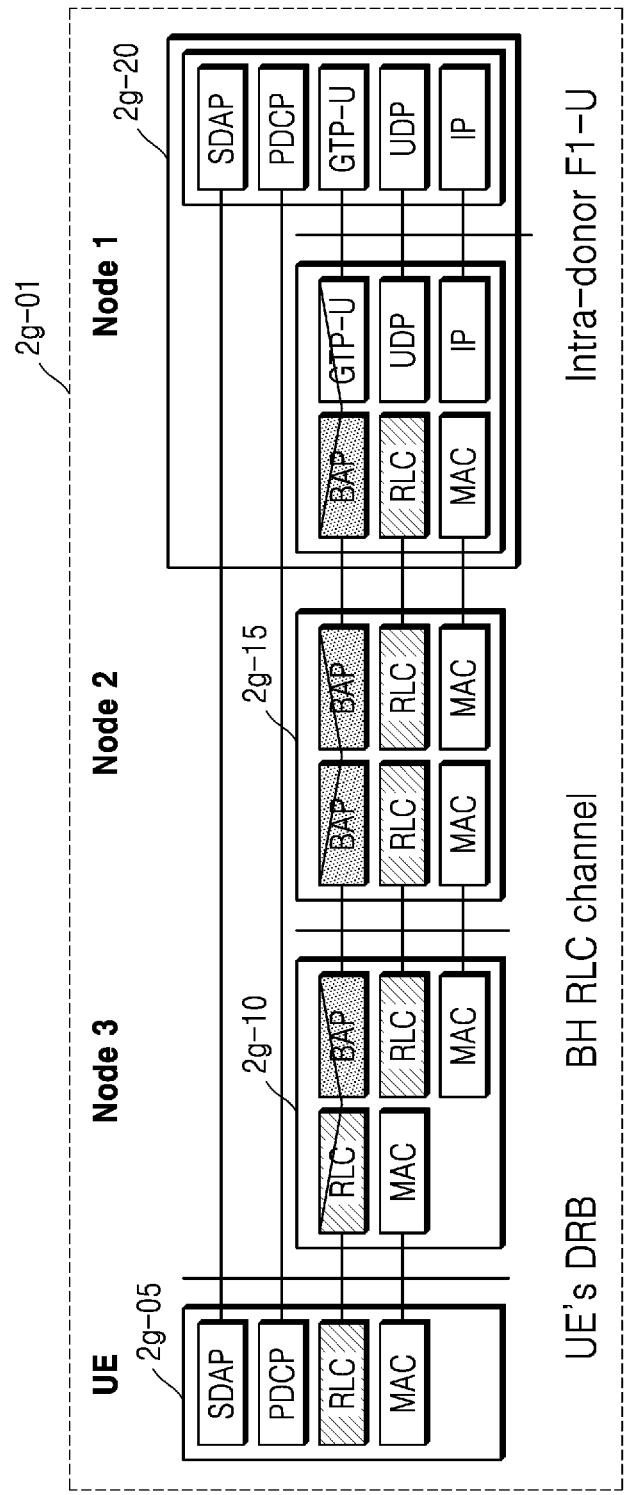
FIG. 2G is a diagram illustrating a protocol layer that each radio node may have in the mobile communication system supporting wireless backhaul, according to an embodiment of the disclosure.

FIG. 2G is a diagram illustrating a protocol layer that each radio node may have in the next-generation mobile communication system supporting wireless backhaul, according to an embodiment of the disclosure.

Referring to FIG. 2G, protocol layer configurations of radio nodes supporting wireless backhaul may be broadly divided to two types. The two types may be based on positions of a BAP layer. The radio nodes may have a protocol layer configuration 2g-01 in which the BAP layer operates above a RLC layer and a protocol layer configuration in which the BAP layer operates below the RLC layer.

Referring to FIG. 2G, a UE 2g-05 may operate, as the protocol layer, all of a PHY layer, a MAC layer, a RLC layer, a PDCP layer, and a SDAP layer, the radio nodes (e.g., Node3 2g-10 and Node2 2g-15 that perform a wireless backhaul function by receiving and transferring data between the UE 2g-05 and an IAB donor) may each operate a PHY layer, a MAC layer, a RLC layer, and a BAP layer, and an uppermost radio node (e.g., an uppermost node that is the IAB donor (Node1 2g-20)) that is connected to a core network and thus supports wireless backhaul transferring data) may operate all of a PHY layer, a MAC layer, a RLC layer, a PDCP layer, and a SDAP layer and may be configured of a central unit (CU) and a distributed unit (DU) that are connected in a wired manner. The CU may operate the SDAP layer and the PDCP layer, and the DU may operate the RLC layer, the MAC layer, and the PHY layer.

The BAP layer may identify a plurality of bearers of a plurality of UEs and may map the bearers to backhaul RLC channels. Also, when the BAP layer identifies the plurality of bearers of the plurality of UEs, the BAP layer may group a plurality of items of data according to a UE or a QoS, may map the grouped data to one backhaul RLC channel so as to allow the grouped data to be processed, and may use a data concatenation function when grouping the plurality of items of data to be mapped to one backhaul RLC channel, thereby decreasing overhead. The data concatenation function may involve configuring one header or a small number of headers for the plurality of items of data, making each data identified by indicating a header field indicating concatenated data, and preventing a header from being unnecessarily configured in each data, thereby decreasing overhead. Also, the BAP layer may read PDCP SNs of a plurality of items of received data and may calculate COUNT values. Therefore, the BAP layer may request retransmission based on a COUNT value of lost data, and may report a highest COUNT value with respect to a plurality of items of data that are sequentially and successfully received so far. For example, the BAP layer may indicate the retransmission request or the successfully received COUNT value by a BAP status report or a BAP control PDU or an RRC message.

In the protocol layer configuration 2g-01 as shown in FIG. 2G, the Node3 2g-10 may operate first RLC layers equal to first RLC layers corresponding to data bearers of the UE 2g-05 so as to process data received from the UE 2g-05, and a BAP layer of the Node3 2g-10 may process a plurality of items of data received from a plurality of RLC layers and map the plurality of items of data to a new backhaul RLC channel and second RLC layers corresponding thereto. Then, the BAP layer may identify a plurality of bearers of a plurality of UEs and may map the bearers to backhaul RLC channels. When the BAP layer identifies the plurality of bearers of the plurality of UEs, the BAP layer may group a plurality of items of data according to a UE or a QoS, and may map the grouped data to one backhaul RLC channel so as to allow the second RLC layers to process the grouped data. The backhaul RLC channel may be defined as a channel to transfer data grouped based on QoS information, or may be defined as a channel to transfer data grouped based on each UE. The Node3 2g-10 may perform a process of distributing a UL transmission resource received from a parent IAB node, according to QoS information, a priority order, or a transmittable data amount (e.g., a data mount or tokens, which is allowed for the UL transmission resource) of the backhaul RLC channel (or the second RLC layer), or an amount of data with respect to the backhaul RLC channel (or the second RLC layer), the data being stored in a buffer. Then, the Node3 2g-10 may perform data transmission on the parent IAB node by using a segmentation function or a concatenation function, the data transmission being with respect to data of each backhaul RLC channel.

The first RLC layer indicates a RLC layer that processes a plurality of items of data corresponding to bearers, equally to a RLC layer corresponding to each bearer of the UE 2g-05, and the second RLC layer indicates a RLC layer processing a plurality of items of data that are mapped, by the BAP layer, based on the UE 2g-05, QoS, or mapping information configured by the parent IAB node.

In the protocol layer configuration 2g-01 as shown in FIG. 2G, the Node2 2g-15 may operate second RLC layers corresponding to second RLC layers of a child IAB node (the Node3 2g-10), and may process data according to a backhaul RLC channel.

In the protocol layer configuration 2g-01 as shown in FIG. 2G, the Node1 2g-20 that is the uppermost radio node may operate second RLC layers corresponding to the second RLC layers of a child IAB node (the Node2 2g-15), and may process data according to a backhaul RLC channel. The BAP layer may map a plurality of items of data, which are processed with respect to each backhaul RLC channel, to PDCP layers matched with respective bearers of each UE. Then, a PDCP layer of an uppermost radio node corresponding to each bearer of each UE may process a plurality of items of received data, and may transfer the processed data to a SDAP layer, and the SDAP layer may process and transmit the data to the core network.

In the protocol layer configuration 2g-01 as shown in FIG. 2G, the Node1 2g-20 that is the uppermost radio node may process data according to a backhaul RLC channel, the data being received with respect to the backhaul RLC channel of the child IAB node 2 (the Node2 2g-15). The BAP layer may map a plurality of items of data, which are received with respect to each backhaul RLC channel, to first RLC layers respectively corresponding to bearers of each UE. The uppermost radio node may operate first RLC layers respectively corresponding to bearers of each UE, may process a plurality of items of received data, and may transfer the data to PDCP layers respectively corresponding to bearers of each UE, and a PDCP layer of an uppermost radio node corresponding to each bearer of each UE may process a plurality of items of received data, and may transfer the processed data to a SDAP layer, and the SDAP layer may process and transmit the data to the core network.

Figure 2H:
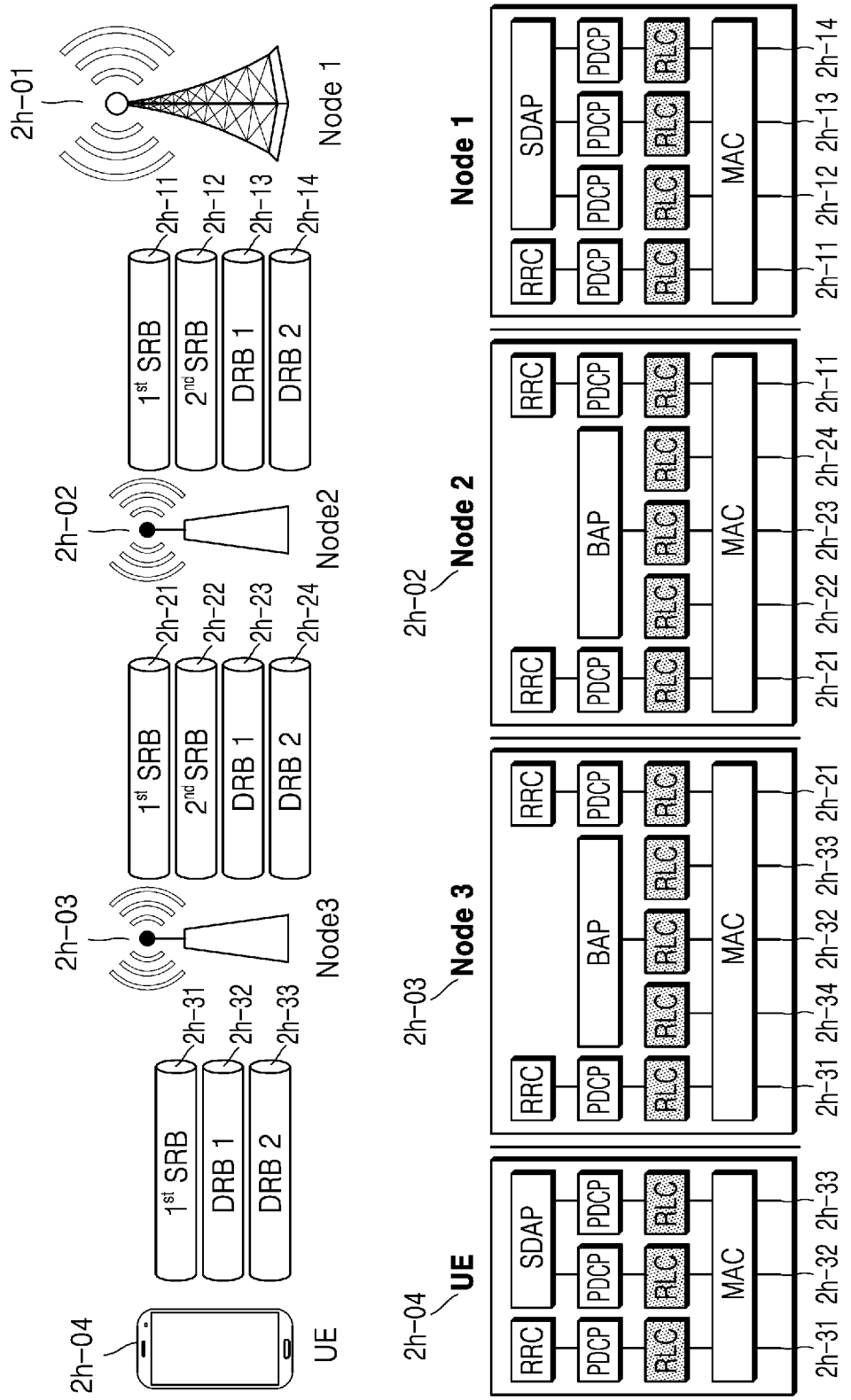
FIG. 2HA is a diagram illustrating a method of managing and processing bearers of radio nodes, the method being performed in the next-generation mobile communication system supporting wireless backhaul, according to an embodiment of the disclosure.
Figure 2H:
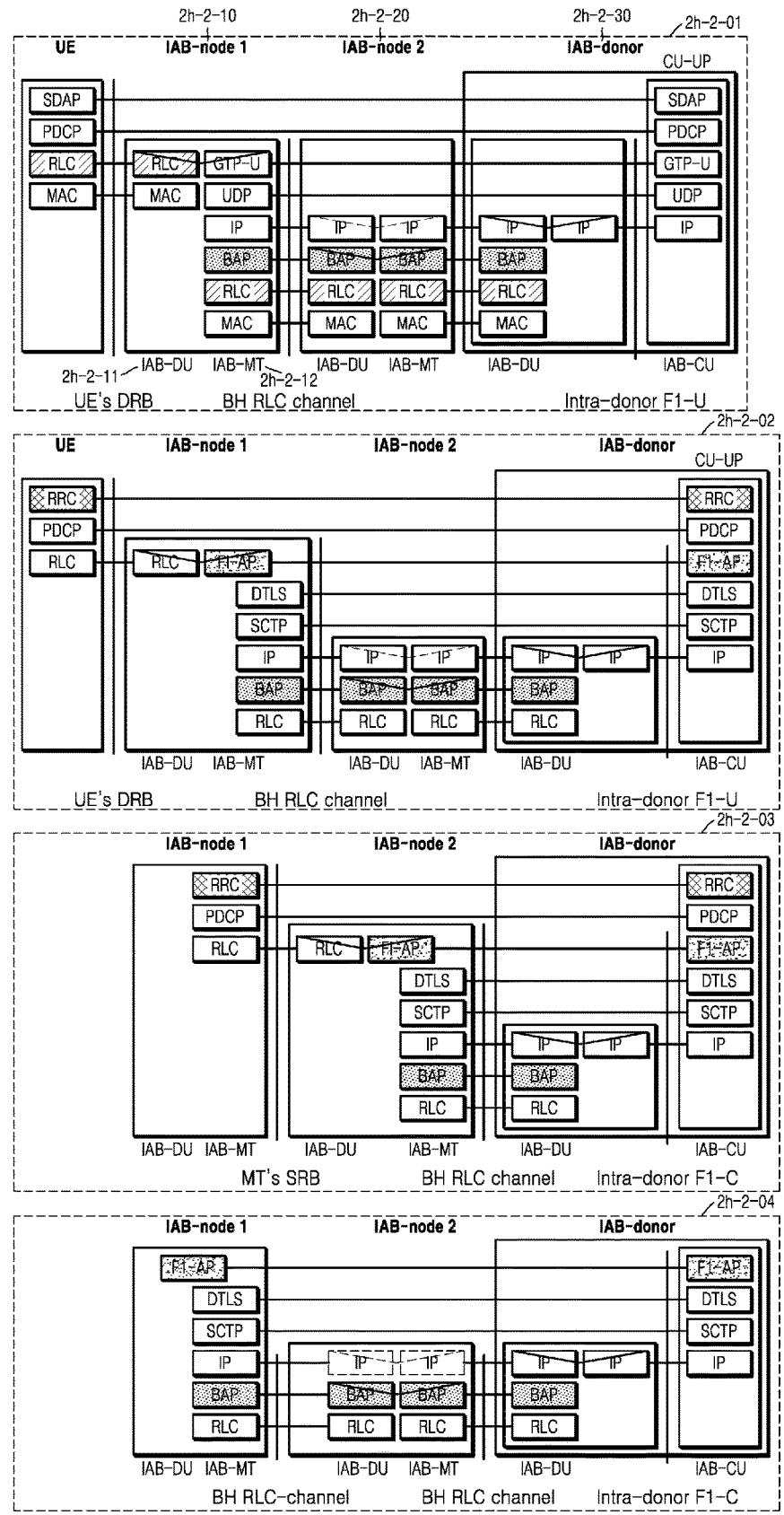

FIG. 2HA is a diagram illustrating a method of managing and processing bearers of radio nodes, the method being performed in the next-generation mobile communication system supporting wireless backhaul, according to an embodiment of the disclosure.

Referring to FIG. 2HA, a radio node (e.g., a UE 2h-04) may transmit and receive data to and from an uppermost radio node (e.g., an IAB donor 2h-01) through a Node3 (e.g., an intermediate radio node or an IAB node 2h-03) and a Node2 (e.g., a radio node or an IAB node 2h-02), the IAB donor 2h-01 being connected to a core network.

In the wireless backhaul network of the disclosure, each IAB node configures a first SRB (an SRB 2h-11, 2h-21, or 2h-31) for establishing RRC connection with its parent IAB node, and the first SRB is connected with a PHY layer, a MAC layer, and an RLC layer in an intermediate radio node and is directly connected with a PDCP layer without being connected with a BAP layer. The first SRB may be used in exchanging a RRC message between two radio nodes connected to one radio link, and the connected PDCP layer may separately perform ciphering and deciphering or integrity protection and integrity verification.

In the wireless backhaul network of the disclosure, the Node3 (e.g., a UE accessed IAB node, the Node 3, or the IAB node 2h-03) to which the UE 2h-04 accesses configures a second SRB (an SRB 2h-12, 2h-22, or 2h-32) to transmit and receive a NAS message via the uppermost radio node (e.g., the Node1 2h-01), the NAS message being for network configuration with respect to the UE 2h-04. The Node3 2h-03 to which the UE 2h-04 accesses may identify an RRC message received via the first SRB, and data may be transmitted to the Node2 2h-02 via the second SRB, the data being requested to be transmitted as the NAS message to the core network, and the Node2 2h-02 may transmit the data to the uppermost radio node (e.g., the Node1 2h-01) via the second SRB. The uppermost radio node (e.g., the Node1 2h-01) that received the data transmits the data to the core network, and when the uppermost radio node (e.g., the Node1 2h-01) receives response data from the core network, the uppermost radio node (e.g., the Node1 2h-01) transmits the response data to the Node3 2h-03, and the Node3 2h-03 may transmit the response data to the UE 2h-04 via the first SRB. In intermediate radio nodes (e.g., the Node2 2h-02 or the Node3 2h-03), the second SRB may be connected with the PHY layer, the MAC layer, the RLC layer, and the BAP layer. That is, unlike the first SRB, the second SRB may be mapped to a new RLC layer via the BAP layer and thus may be transferred to a next radio node.

In the wireless backhaul network of the disclosure, the Node3 (e.g., the UE accessed IAB node, the Node 3, or the IAB node 2h-03) to which the UE 2h-04 accesses may generate and manage DRBs to process data received from the UE 2h-04, and DRBs 2h-13, 2h-14, 2h-23, 2h-24, 2h-32, and 2h-33 may be connected with the PHY layer, the MAC layer, the RLC layer, and the BAP layer. Therefore, the Node3 2h-03 to which the UE 2h-04 accesses may map a plurality of items of data corresponding to the DRB to a new RLC layer via the BAP layer, and may transmit the data to a next radio node. In the above descriptions, in order to process a plurality of items of data received via a backhaul RLC channel from a child IAB node, an intermediate radio node may be connected with the PHY layer, the MAC layer, the RLC layer, and the BAP layer, thereby transmitting and receiving data.

According to the method of managing and processing bearers of radio nodes of the disclosure, each radio node may perform, by the BAP layer, a data concatenation function on a plurality of items of data corresponding to DRBs for a UE, and because first SRBs are not connected with the BAP layer, each radio node may not perform the data concatenation function on data corresponding to the first SRBs.

According to the method of managing and processing bearers of radio nodes of the disclosure, a security key used in performing a ciphering and integrity protection procedure on data with respect to the first SRBs may be determined by a parent IAB node of each radio link. That is, the SRBs 2h-11, 2h-21, and 2h-31 may share a same security key, but to enhance security, parent IAB nodes may respectively configure security keys (e.g., the Node3 2h-03 may determine a security key for the SRB 2h-31, and the Node2 2h-02 may determine a security key for the SRB 2h-21). Also, each intermediate radio node may not separately perform ciphering and integrity protection on the second SRB, except for ciphering and integrity protection applied to a NAS message. Also, each intermediate radio node may perform ciphering and integrity protection on the first SRB, as described above, but may not separately perform ciphering and integrity protection on DRBs other than the first SRB.

According to the disclosure, the method of managing and processing bearers of radio nodes may define and use a third SRB. The third SRB may be used as a control bearer for transmission and reception of a control message between each radio node and an uppermost radio node. That is, the bearer for transmission and reception of a message (e.g., an RRC message or an interface message of an upper layer) may be defined and used, the message being used by the uppermost radio node to directly control each radio node. For example, the uppermost radio node (e.g., the Node1 2h-01) and the Node2 2h-02 may configure a third SRB and thus may exchange a control message, and the uppermost radio node (e.g., the Node1 2h-01) and the Node3 2h-03 may configure a third SRB and thus may exchange a control message, wherein the Node2 2h-02 may relay data between the uppermost radio node (e.g., the Node1 2h-01) and the Node3 2h-03, the data corresponding to the third SRB.

FIG. 2HB is a diagram illustrating protocol layers of a UE or an IAB node which process and receive data or process and transmit data or route data or configure BAP configuration information by an RRC message or configure BAP configuration information by a F1AP message according to an embodiment of the disclosure.

Referring to FIG. 2HB, in 2h-2-01, a UE or a radio node (IAB-mobile terminal (MT)a) may transmit or receive data via protocol layers of a radio node 1 (IAB-DU) or a radio node 2 (IAB-DU), and in 2h-2-02, the UE may perform, by transmitting or receiving an RRC message, configuration based on RRC connection configuration information or BAP layer configuration information on an uppermost radio node (IAB donor) via the radio node 1 (IAB-DU) or the radio node 2 (IAB-DU).

In 2h-2-03, a radio node 1 (IAB-MT) may perform, by transmitting or receiving an RRC message, RRC connection configuration based on RRC connection configuration information on an uppermost radio node (IAB donor) via a radio node 2.

In 2h-2-04, a radio node 1 (IAB-MT or IAB-DU) may perform, by transmitting or receiving an F1AP message, configuration based on BAP layer configuration information on an uppermost radio node (IAB donor) via a radio node 2.

FIG. 2I illustrates Table showing mapping information of a logical channel identifier for each data (e.g., data (MAC SDU or RLC PDU) of uplink shared channel (UL-SCH) or MAC CE) when a first logical channel Identity (LCID) or a second extended logical channel identity (eLCID) of a MAC subheader which is available for application of a data transmission method of a MAC layer is used, according to an embodiment of the disclosure.

Figure 2J:
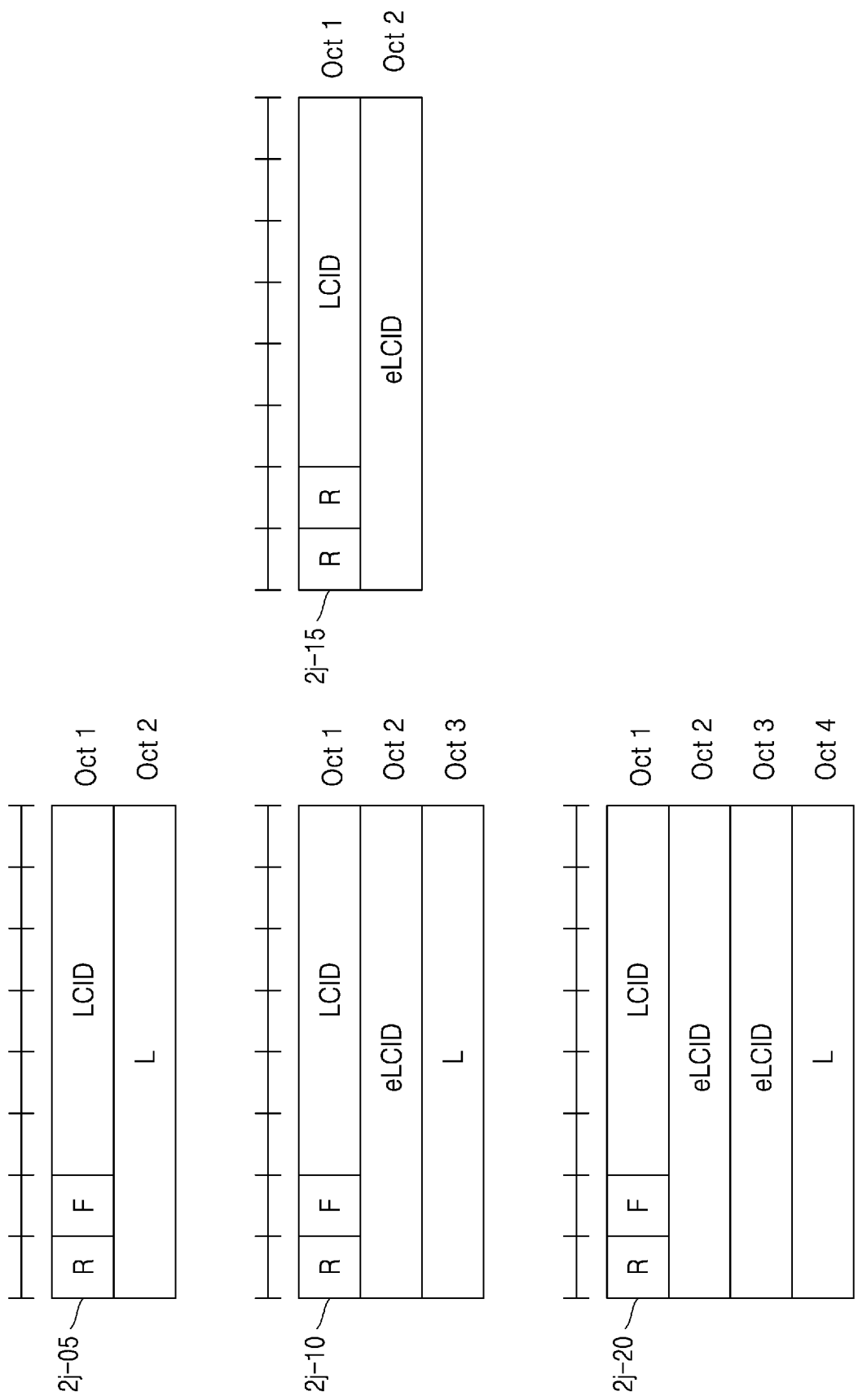
FIG. 2J is a diagram illustrating a size or structure of a MAC subheader which is available when a data transmission method of a MAC layer is applied according to an embodiment of the disclosure.

FIG. 2J is a diagram illustrating a size or structure of a MAC subheader which is available when a data transmission method of a MAC layer is applied according to an embodiment of the disclosure.

An object to which the data transmission method of a MAC layer of the disclosure is applied is data, and the data may refer to upper layer data (user traffic data) or a PDCP SDU or a PDCP PDU or a PDCP data PDU or a PDCP control PDU or a RLC SDU or a RLC SDU segment or a RLC PDU or a RLC data PDU or a RLC control PDU or a MAC PDU or a MAC SDU or a MAC subPDU (MAC subheader) or padding or a MAC SDU or a MAC subheader or MAC control information (MAC CE and MAC subheader) or MAC control information. In the above descriptions, a SDU may indicate data received from an upper layer to each protocol layer (PDCP or RLC or MAC layer) or data to be transferred from a lower layer to an upper layer, and a PDU may indicate data in which a header of each protocol layer is added to the front of the SDU after each protocol layer process data. Also, in the disclosure, MAC subPDU may indicate only a MAC subheader (e.g., when padding is indicated) or may indicate MAC subheader and MAC SDU or may indicate MAC subheader and MAC CE or may indicate MAC subheader and padding.

The disclosure provides a method by which an IAB node transmits or receives data (e.g., MAC SDU or MAC CE) by applying, in a MAC layer, a first LCID (LCID) or a second LCID (eLCID).

Referring to FIG. 2F of the disclosure, an RRC message (e.g., RRCSetup message or RRCResume message or RRCReconfiguration message 2f-10 or 2f-30) may indicate whether or not to use a second LCID (eLCID) or to use a first LCID or to use both a first LCID and a second LCID.

For example, cell group configuration information (CellGroupConfig) of the RRC message may add or release or configure backhaul RLC channel configuration information (BH-RLC-ChannelConfig), and the backhaul RLC channel configuration information may be configured to include RLC layer configuration information (rlc-config) or backhaul RLC channel identity (BH-RLC-Channel-ID) or backhaul logical channel identity (bh-LogicalChannelIdentity) or MAC layer logical channel configuration information (mac-LogicalChannelConfig). In the above descriptions, when a backhaul logical channel identity is configured per backhaul RLC channel or per backhaul RLC channel identity, a first LCID or a second LCID (eLCID) may be indicated and thus configured. If a first LCID is indicated (or configured) for a certain backhaul RLC channel, a MAC layer may demultiplex a plurality of pieces of data based on the first LCID, the data being received with respect to the backhaul RLC channel (e.g., the first LCID may be allocated to a MAC header and data may be transferred to a backhaul RLC layer corresponding to the first LCID), and may multiplex a plurality of pieces of data based on the first LCID, the data being transmitted with respect to the backhaul RLC channel (e.g., the first LCID may be included in a MAC header). If a second LCID is indicated (or configured) for a certain backhaul RLC channel, a MAC layer may demultiplex a plurality of pieces of data based on the second LCID, the data being received with respect to the backhaul RLC channel (e.g., the second LCID may be allocated to a MAC header and data may be transferred to a backhaul RLC layer corresponding to the second LCID), and may multiplex a plurality of pieces of data based on the second LCID, the data being transmitted with respect to the backhaul RLC channel (e.g., the second LCID may be included in a MAC header).

In the above description, an eLCID may be configured as a logical channel identity to be configured, by an RRC message described with FIG. 2F, for a radio access node (IAB node or IAB MT or IAB DU or IAB CU or IAB donor) configured with a wireless network.

In the disclosure, a first LCID may indicate a LCID value corresponding to a MAC SDU or a MAC CE or padding with respect to a Downlink Shared Channel (DL-SCH) or UL-SCH. A size of the first LCID is 6 bits. If a value of the first LCID is 34, additional 1 byte including a second LCID in a MAC subheader may be used (additional 1 byte may be present) and may be added to the rear of the first LCID. If a value of the first LCID is 33, additional 2 bytes including a second LCID in a MAC subheader may be used (additional 1 byte may be present) and may be added to the rear of the first LCID.

In the disclosure, a second LCID (eLCID) may indicate a LCID value corresponding to a MAC SDU or a MAC CE with respect to a DL-SCH or UL-SCH. A size of the second LCID is 8 bits (or 1 byte) or 16 bits (or 2 bytes). In the above descriptions, the second LCID having 2 bytes (or 16 bits) or a MAC subheader format corresponding thereto may be used only when it is configured between IAB nodes or between an IAB node and an IAB donor (uppermost IAB node) in an NR backhaul link.

Information about a plurality of items of data (MAC SDU or RLC PDU or MAC CE) to be mapped to the first LCID or the second LCID may be defined as shown in Table 2*i*-05 or 2*i*-10 or 2*i*-15 and used.

Referring to FIG. 2J, a UE or an IAB node may use a first LCID, and when a size of data corresponding to the first LCID is indicatable by a 1-byte length field (L field), MAC subPDU may be configured using a MAC subheader format 2*j*-05, and when a size of the data to be transmitted is not indicatable by a 1-byte length field, MAC subPDU may be configured using a MAC subheader format including a 2-byte length field.

If, as proposed above, the UE or the IAB node is configured, by an RRC message, to use a second eLCID (e.g., a second LCID with a 2-byte length), when a size of data corresponding to the second LCID is indicatable by a 1-byte length field (L field), MAC subPDU may be configured using a MAC subheader format 2*j*-20, and when a size of the data to be transmitted is not indicatable by a 1-byte length field, MAC subPDU may be configured using a MAC subheader format including a 2-byte length field.

When MAC CE is generated according to Table 2*i*-15 of FIG. 2I, MAC subPDU may be configured using MAC subheader format 2*j*-10 or 2*j*-15 by using a second LCID (e.g., a second LCID with 1-byte length) according to information of Table above.

Figure 2K:
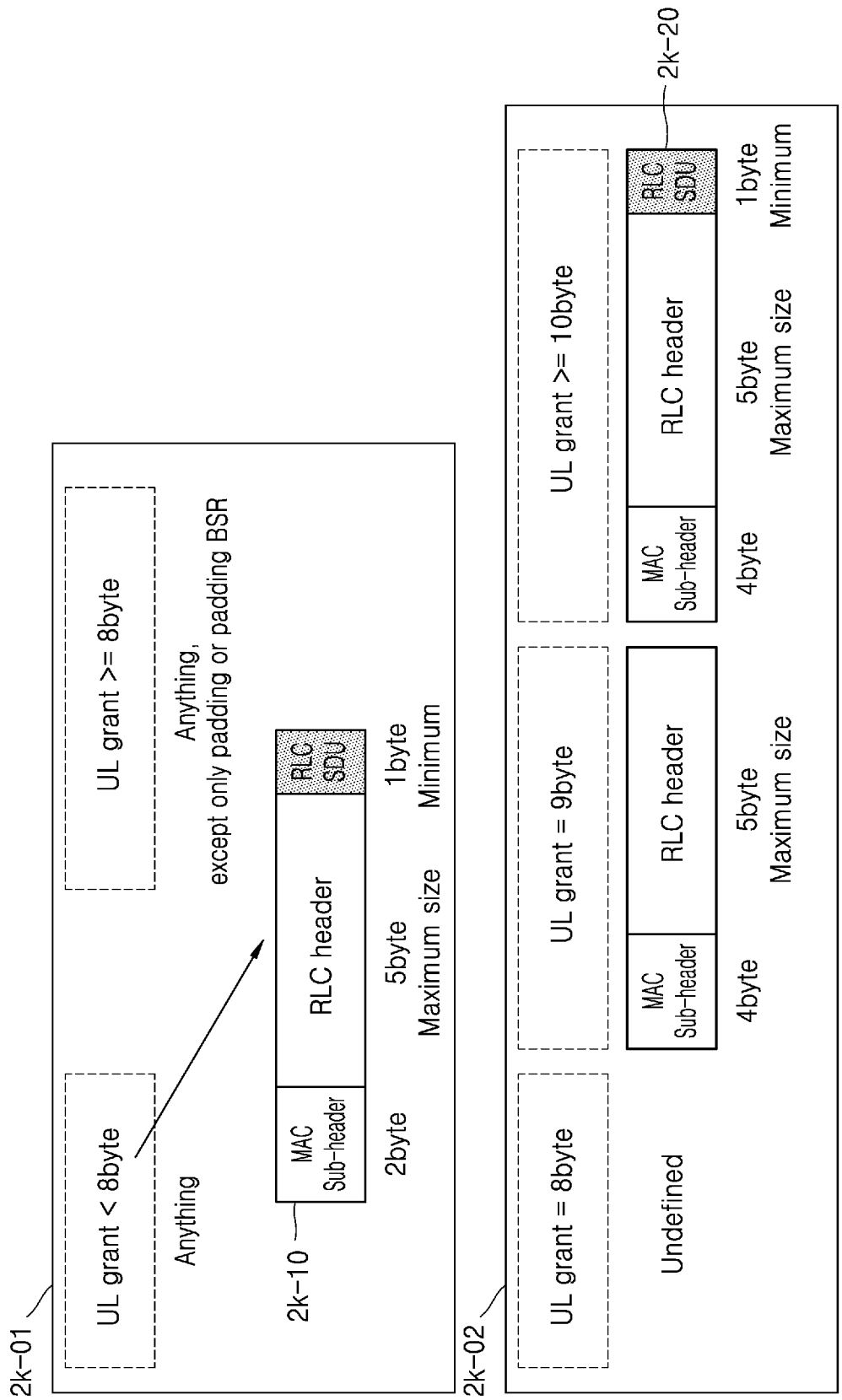
FIG. 2K is a diagram illustrating a method to be conformed (or to be kept) in a scheduling procedure (or a logical channel prioritization (LCP) procedure) or a data (MAC subPDU or MAC PDU) configuration procedure in a MAC layer of a UE or an IAB node (e.g., IAB-mobile terminal (MT)) according to an embodiment of the disclosure.

FIG. 2K is a diagram illustrating a method to be conformed (or to be kept) in a scheduling procedure (or a LCP procedure) or a data (MAC subPDU or MAC PDU) configuration procedure in a MAC layer of a UE or an IAB node (e.g., IAB-MT) according to an embodiment of the disclosure.

Referring to FIG. 2K, when a first LCID is used as in 2*k*-10, a header required in transmitting smallest data (e.g., 1-byte data) requires an RLC header with a maximum size of 5 bytes and an MAC header with a size of 2 bytes. Therefore, a size obtained by adding the smallest data, the RLC header, and the MAC header is 8 bytes. Therefore, when a transmission resource equal to or larger than 8 bytes is allocated, if the UE or the IAB node has data to transmit, the UE or the IAB node may always transmit the data. Accordingly, in this case, in order to efficiently use a transmission resource, the UE or the IAB node should not transmit only padding or/and padding buffer state report.

Therefore, Embodiment 1 of the method to be conformed (or to be kept) in a scheduling procedure (or a LCP procedure) or a data (MAC subPDU or MAC PDU) configuration procedure in a MAC layer of the UE or the IAB node (e.g., IAB-MT) is provided below.

In the disclosure, when a UL transmission resource given to the MAC layer is equal to or larger than a first size (e.g., 8 bytes) and there is data to be transmitted, the UE or the IAB node should not transmit only padding or/and padding buffer state report. That is, as in 2*k*-01, only when a UL transmission resource given to the MAC layer is smaller than a first size (e.g., 8 bytes), even if there is data to be transmitted, the UE or the IAB node may transmit only padding or/and padding buffer state report.

Another embodiment of Embodiment 1 of the method to be conformed (or to be kept) in a scheduling procedure (or a LCP procedure) or a data (MAC subPDU or MAC PDU) configuration procedure in a MAC layer of the UE or the IAB node (e.g., IAB-MT) is provided below.

if the MAC entity is given a UL grant size that is equal to or larger than 8 bytes while having data available and allowed (according to clause 5.4.3.1) for transmission, the MAC entity shall not transmit only padding BSR and/or padding.

In FIG. 2K, when a second LCID (e.g., a 2-byte eLCID) is used as in 2*k*-20, a header required in transmitting smallest data (e.g., 1-byte data) requires an RLC header with a maximum size of 5 bytes and an MAC header with a size of 4 bytes. Therefore, a size obtained by adding the smallest data, the RLC header, and the MAC header is 10 bytes. Therefore, when a transmission resource equal to or larger than 10 bytes is allocated, if the UE or the IAB node has data to transmit, the UE or the IAB node may always transmit the data. Accordingly, in this case, in order to efficiently use a transmission resource, the UE or the IAB node should not transmit only including padding or/and padding buffer state report. As in 2*k*-02, if a UL transmission resource is 8 bytes, data cannot be transmitted when a second LCID (e.g., a 2-byte eLCID) is used, and if a UL transmission resource is 9 bytes, only a header of data can be transmitted when a second LCID (e.g., a 2-byte eLCID) is used, and thus, an error may occur in implementation of the UE or the IAB node.

Therefore, Embodiment 2 of the method to be conformed (or to be kept) in a scheduling procedure (or a LCP procedure) or a data (MAC subPDU or MAC PDU) configuration procedure in a MAC layer of the UE or the IAB node (e.g., IAB-MT) is provided below.

1> For transmission at the MAC layer, in a case where the UE or the IAB node uses a first LCID (e.g., 6-bit LCID) or uses (or includes) a first LCID (e.g., 6-bit LCID) in a MAC subheader or includes only 6-bit LCID (or reserve field or F field (indicator indicating L field length)) in the MAC subheader or uses a MAC subheader with a size of 2 bytes (e.g., 2*j*-05)) or does not include (or does not use) a second LCID (e.g., eLCID or 2-byte eLCID) in the MAC subheader or is not configured with a second LCID (eLCID) by the RRC message (or a configured eLCID is not used in transmission)

2> when a UL transmission resource given to the MAC layer is equal to or larger than a first size (e.g., 8 bytes) and there is data to be transmitted, the UE or the IAB node should not transmit only padding or/and padding buffer state report. That is, only when a UL transmission resource given to the MAC layer is smaller than the first size (e.g., 8 bytes), even if there is data to be transmitted, the UE or the IAB node may transmit only padding or/and padding buffer state report.

1> For transmission at the MAC layer, in a case where the UE or the IAB node uses (or includes) a second LCID (e.g., eLCID or 2-byte eLCID) or a second LCID (e.g., eLCID or 2-byte eLCID) in a MAC subheader or includes 6-bit first LCID or 2-byte second eLCID (or reserve field or F field (indicator indicating L field length)) in the MAC subheader or uses a MAC subheader with a size of 4 bytes (e.g., 2*j*-20)) or does not include (or does not use) a second LCID (e.g., eLCID or 2-byte eLCID) in the MAC subheader or is configured with a second LCID (eLCID) by the RRC message (or a configured eLCID is used in transmission)

2> when a UL transmission resource given to the MAC layer is equal to or larger than a second size (e.g., 10 bytes) and there is data to be transmitted, the UE or the IAB node should not transmit only padding or/and padding buffer state report. That is, only when a UL transmission resource given to the MAC layer is smaller than a second size (e.g., 10 bytes), even if there is data to be transmitted, the UE or the IAB node may transmit only padding or/and padding buffer state report.

Another embodiment of Embodiment 2 of the method to be conformed (or to be kept) in a scheduling procedure (or a LCP procedure) or a data (MAC subPDU or MAC PDU) configuration procedure in a MAC layer of the UE or the IAB node (e.g., IAB-MT) is provided below.

if the MAC entity is given a UL grant size that is equal to or larger than 8 bytes while having data available and allowed (according to clause 5.4.3.1) for transmission, the MAC entity shall not transmit only padding BSR and/or padding when MAC subheader format is used for this transmission which does not include eLCID or if eLCID is not configured.

if the MAC entity is given a UL grant size that is equal to or larger than 10 bytes while having data available and allowed (according to clause 5.4.3.1) for transmission, the MAC entity shall not transmit only padding BSR and/or padding when MAC subheader format is used for this transmission which includes eLCID or if eLCID is configured.

Another embodiment of Embodiment 2 of the method to be conformed (or to be kept) in a scheduling procedure (or a LCP procedure) or a data (MAC subPDU or MAC PDU) configuration procedure in a MAC layer of the UE or the IAB node (e.g., IAB-MT) is provided below.

if the MAC entity is given a UL grant size that is equal to or larger than 8 bytes while having data available and allowed (according to clause 5.4.3.1) for transmission, the MAC entity shall not transmit only padding BSR and/or padding when MAC subheader format is used for this transmission which includes LCID.

if the MAC entity is given a UL grant size that is equal to or larger than 10 bytes while having data available and allowed (according to clause 5.4.3.1) for transmission, the MAC entity shall not transmit only padding BSR and/or padding when MAC subheader format is used for this transmission which includes eLCID or if eLCID is configured.

Another embodiment of Embodiment 2 of the method to be conformed (or to be kept) in a scheduling procedure (or a LCP procedure) or a data (MAC subPDU or MAC PDU) configuration procedure in a MAC layer of the UE or the IAB node (e.g., IAB-MT) is provided below.

if the MAC entity is given a UL grant size that is equal to or larger than 8 bytes while having data available and allowed (according to clause 5.4.3.1) for transmission, the MAC entity shall not transmit only padding BSR and/or padding when MAC subheader format is used for this transmission which includes only LCID or R or F fields.

if the MAC entity is given a UL grant size that is equal to or larger than 10 bytes while having data available and allowed (according to clause 5.4.3.1) for transmission, the MAC entity shall not transmit only padding BSR and/or padding when MAC subheader format is used for this transmission which includes LCID or eLCID or R or F fields or if eLCID is configured.

Another embodiment of Embodiment 2 of the method to be conformed (or to be kept) in a scheduling procedure (or a LCP procedure) or a data (MAC subPDU or MAC PDU) configuration procedure in a MAC layer of the UE or the IAB node (e.g., IAB-MT) is provided below.

if the MAC entity is given a UL grant size that is equal to or larger than 8 bytes while having data available and allowed (according to clause 5.4.3.1) for transmission, the MAC entity shall not transmit only padding BSR and/or padding when 2 byte MAC subheader format is used for this transmission.

if the MAC entity is given a UL grant size that is equal to or larger than 10 bytes while having data available and allowed (according to clause 5.4.3.1) for transmission, the MAC entity shall not transmit only padding BSR and/or padding when 4 byte MAC subheader format is used for this transmission or if eLCID is configured.

Figure 2L:
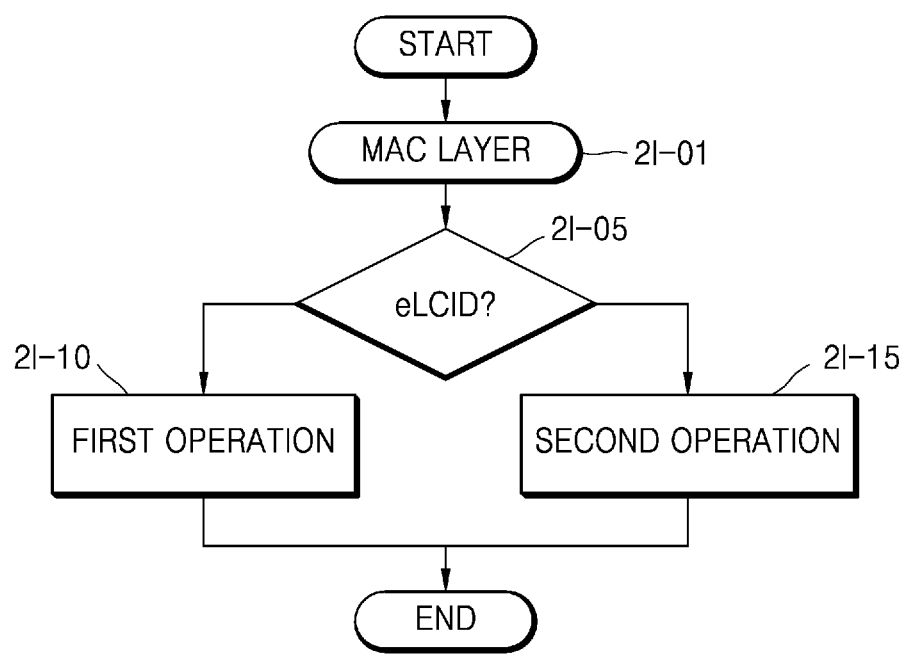
FIG. 2L is a diagram illustrating an operation of a MAC layer of a UE or an IAB node according to an embodiment of the disclosure.

FIG. 2L is a diagram illustrating an operation of an MAC layer 2*l*-01 of a UE or an IAB node according to an embodiment of the disclosure.

For transmission at the MAC layer 2*l*-01, in a case where the UE or the IAB node uses a first LCID (e.g., 6-bit LCID) or uses (or includes) a first LCID (e.g., 6-bit LCID) in a MAC subheader or includes only 6-bit LCID (or reserve field or F field (indicator indicating L field length)) in the MAC subheader or uses a MAC subheader with a size of 2 bytes (e.g., 2*j*-05)) or does not include (or does not use) a second LCID (e.g., eLCID or 2-byte eLCID) in the MAC subheader or is not configured with a second LCID (eLCID) by the RRC message (or a configured eLCID is not used in transmission) (2*l*-05), when a UL transmission resource given to the MAC layer 2*l*-01 is equal to or larger than a first size (e.g., 8 bytes) and there is data to be transmitted, the UE or the IAB node should not transmit only padding or/and padding buffer state report. That is, only when a UL transmission resource given to the MAC layer 2*l*-01 is smaller than the first size (e.g., 8 bytes), even if there is data to be transmitted, the UE or the IAB node may transmit only padding or/and padding buffer state report (2*l*-10).

For transmission at the MAC layer 2*l*-01, in a case where the UE or the IAB node uses (or includes) a second LCID (e.g., eLCID or 2-byte eLCID) or a second LCID (e.g., eLCID or 2-byte eLCID) in a MAC subheader or includes 6-bit first LCID or 2-byte second eLCID (or reserve field or F field (indicator indicating L field length)) in the MAC subheader or uses a MAC subheader with a size of 4 bytes (e.g., 2*j*-20)) or does not include (or does not use) a second LCID (e.g., eLCID or 2-byte eLCID) in the MAC subheader or is configured with a second LCID (eLCID) by the RRC message (or a configured eLCID is used in transmission) (2*l*-05), when a UL transmission resource given to the MAC layer 2*l*-01 is equal to or larger than a second size (e.g., 10 bytes) and there is data to be transmitted, the UE or the IAB node should not transmit only padding or/and padding buffer state report. That is, only when a UL transmission resource given to the MAC layer 2*l*-01 is smaller than a second size (e.g., 10 bytes), even if there is data to be transmitted, the UE or the IAB node may transmit only padding or/and padding buffer state report (2*l*-15).

Figure 2M:
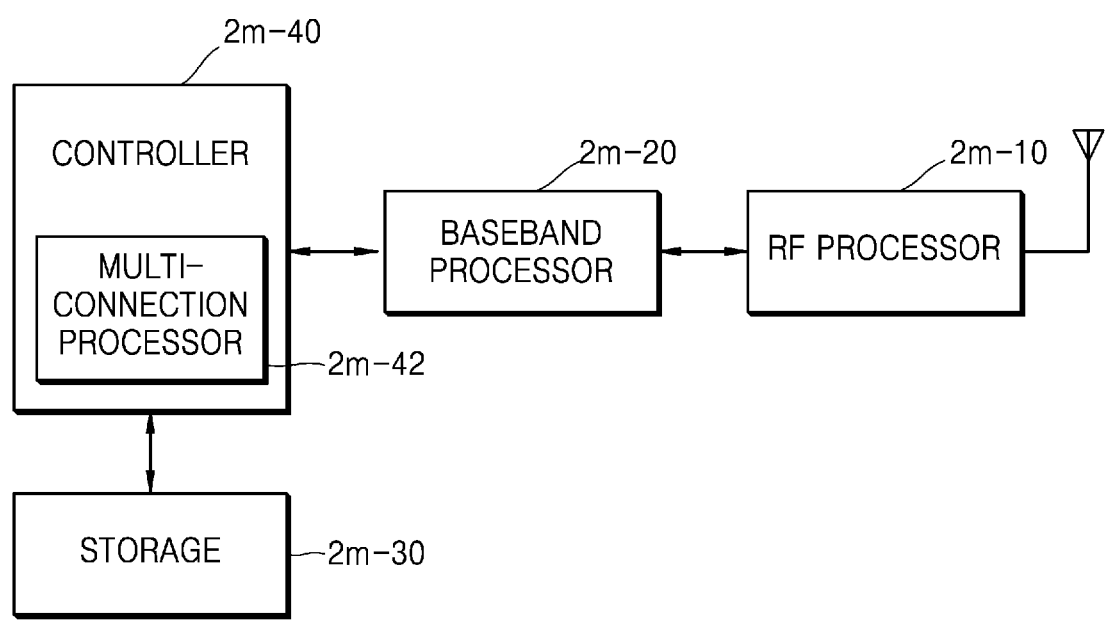
FIG. 2M illustrates a structure of a UE or a radio node according to an embodiment of the disclosure.

FIG. 2M illustrates a structure of a UE or a radio node according to an embodiment of the disclosure.

Referring to FIG. 2M, the UE may include a RF processor 2*m*-10, a baseband processor 2*m*-20, a storage 2*m*-30, and a controller 2*m*-40. However, the disclosure is not limited to the example of FIG. 2M, and the UE may include fewer or more configurations than those shown in FIG. 2M.

The RF processor 2*m*-10 performs functions of transmitting and receiving signals via radio channels, such as band conversion and amplification of the signals. That is, the RF processor 2*m*-10 up-converts a baseband signal provided from the baseband processor 2*m*-20, into an RF band signal and then transmits the RF band signal via an antenna, and down-converts an RF band signal received via the antenna, into a baseband signal. For example, the RF processor 2*m*-10 includes a transmission filter, a reception filter, an amplifier, a mixer, an oscillator, a DAC, an ADC, or the like. Although only one antenna is illustrated in FIG. 2M, the UE may include a plurality of antennas. Also, the RF processor 2*m*-10 may include a plurality of RF chains. In addition, the RF processor 2*m*-10 may perform beamforming. For the beamforming, the RF processor 2*m*-10 may respectively adjust phases and intensities of signals to be transmitted or received via a plurality of antennas or antenna elements. Also, the RF processor 2*m*-10 may perform a MIMO operation and may receive a plurality of layers in the MIMO operation. Under the control of the controller 2*m*-40, the RF processor 2*m*-10 may perform received beam sweeping by appropriately configuring a plurality of antennas or antenna elements, or may adjust a direction and a beam width of a received beam to coordinate with a transmit beam.

The baseband processor 2*m*-20 performs conversion between a baseband signal and a bitstream based on physical entity specifications of a system. For example, for data transmission, the baseband processor 2*m*-20 generates complex symbols by encoding and modulating a transmission bitstream. For data reception, the baseband processor 2*m*-20 reconstructs a received bit string by demodulating and decoding a baseband signal provided from the RF processor 2*m*-10. For example, according to an OFDM scheme, for data transmission, the baseband processor 2*m*-20 generates complex symbols by encoding and modulating a transmit bit string, maps the complex symbols to subcarriers, and then configures OFDM symbols by performing an IFFT computation and CP insertion. For data reception, the baseband processor 2*m*-20 segments a baseband signal provided from the RF processor 2*m*-10, into OFDM symbol units, reconstructs signals mapped to subcarriers by performing a FFT computation, and then reconstructs a received bit string by demodulating and decoding the signals.

The baseband processor 2*m*-20 and the RF processor 2*m*-10 transmit and receive signals as described above. Accordingly, the baseband processor 2*m*-20 and the RF processor 2*m*-10 may also be called a transmitter, a receiver, a transceiver, or a communicator. In addition, at least one of the baseband processor 2*m*-20 or the RF processor 2*m*-10 may include a plurality of communication modules to support a plurality of different radio access technologies. Also, at least one of the baseband processor 2*m*-20 or the RF processor 2*m*-10 may include different communication modules to process signals of different frequency bands. For example, the different radio access technologies may include an LTE network, an NR network, or the like. Also, the different frequency bands may include a SHF (e.g., 2.2 GHz, 2 GHz) band and an mmWave (e.g., 60 GHz) band.

The UE may transmit or receive signals to or from the BS by using the baseband processor 2*m*-20 and the RF processor 2*m*-10, and the signals may include control information and data.

The storage 2*m*-30 stores basic programs, application programs, and data, e.g., configuration information, for operations of the UE. The storage 2*m*-30 provides the stored data, in response to a request by the controller 2*m*-40.

The controller 2*m*-40 controls overall operations of the UE. For example, the controller 2*m*-40 transmits and receives signals via the baseband processor 2*m*-20 and the RF processor 2*m*-10. Also, the controller 2*m*-40 records and reads data on or from the storage 2*m*-30. To this end, the controller 2*m*-40 may include at least one processor. For example, the controller 2*m*-40 may include a CP for controlling communications and an AP for controlling an upper layer such as an application program.

Also, according to an embodiment of the disclosure, the controller 2*m*-40 may include a multi-connection processor 2*m*-42 configured to process a process running in a multi-connection mode. Also, at least one configuration in the UE may be implemented as one chip.

Figure 2N:
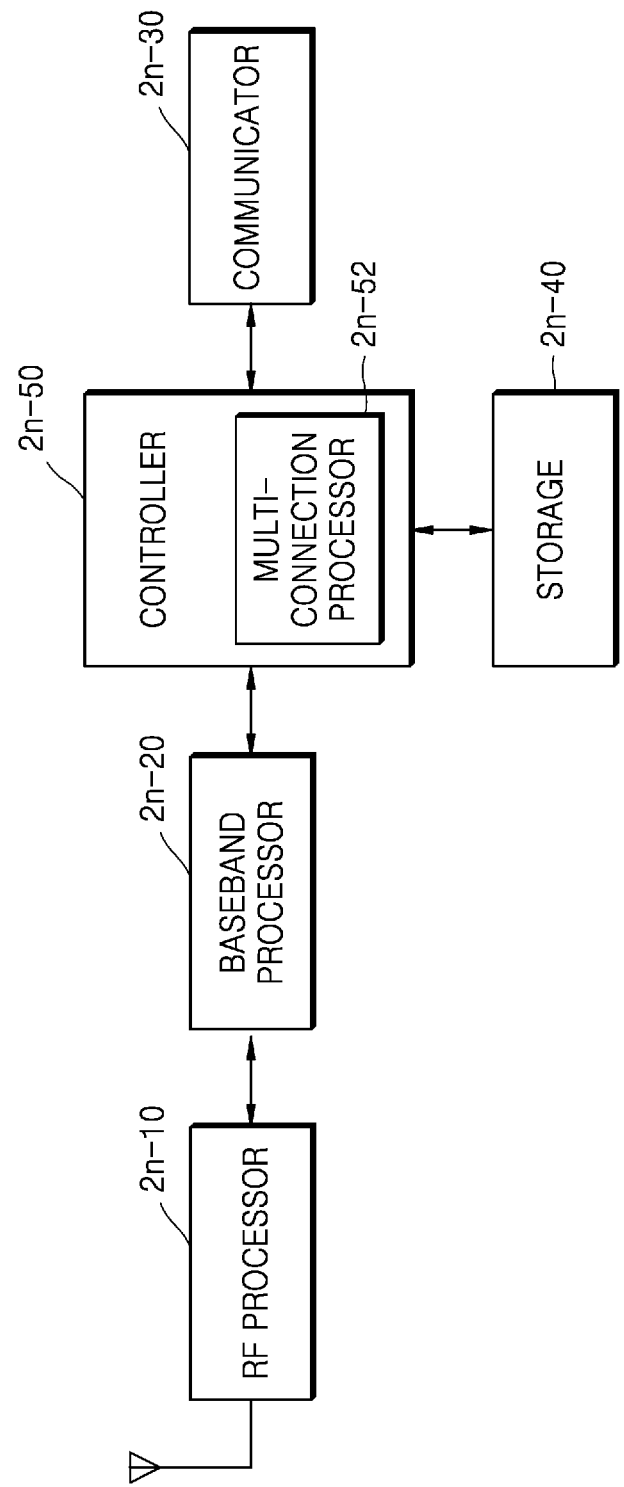
FIG. 2N is a block diagram of a configuration of a TRP or a radio node in a wireless communication system according to an embodiment of the disclosure.

FIG. 2N is a block diagram of a configuration of a TRP or a radio node in a wireless communication system according to an embodiment of the disclosure.

Referring to FIG. 2N, the TRP (also referred to as the BS) may include a RF processor 2*n*-10, a baseband processor 2*n*-20, a communicator 2*n*-30 including a backhaul communicator, a storage 2*n*-40, and a controller 2*n*-50. However, the disclosure is not limited to the example of FIG. 2N, and the TRP may include fewer or more configurations than those shown in FIG. 2N.

The RF processor 2*n*-10 performs functions of transmitting and receiving signals via radio channels, e.g., band conversion and amplification of the signals. That is, the RF processor 2*n*-10 up-converts a baseband signal provided from the baseband processor 2*n*-20, into an RF band signal and then transmits the RF band signal via an antenna, and down-converts an RF band signal received via an antenna, into a baseband signal. For example, the RF processor 2*n*-10 may include a transmission filter, a reception filter, an amplifier, a mixer, an oscillator, a DAC, an ADC, or the like. Although only one antenna is illustrated in FIG. 2N, the RF processor 2*n*-10 may include a plurality of antennas. Also, the RF processor 2*n*-10 may include a plurality of RF chains. In addition, the RF processor 2*n*-10 may perform beamforming. For the beamforming, the RF processor 2*n*-10 may respectively adjust phases and intensities of signals to be transmitted or received via a plurality of antennas or antenna elements. The RF processor 2*n*-10 may perform a DL MIMO operation by transmitting one or more layers.

The baseband processor 2*n*-20 performs conversion between a baseband signal and a bit string based on physical entity specifications. For example, for data transmission, the baseband processor 2*n*-20 generates complex symbols by encoding and modulating a transmission bit string. For data reception, the baseband processor 2*n*-20 reconstructs a received bit string by demodulating and decoding a baseband signal provided from the RF processor 2*n*-10. For example, according to an OFDM scheme, for data transmission, the baseband processor 2*n*-20 generates complex symbols by encoding and modulating a transmission bit string, maps the complex symbols to subcarriers, and then configures OFDM symbols by performing an IFFT computation and CP insertion. For data reception, the baseband processor 2n-20 segments a baseband signal provided from the RF processor 2n-10, into OFDM symbol units, reconstructs signals mapped to subcarriers by performing a FFT computation, and then reconstructs a received bit string by demodulating and decoding the signals. The baseband processor 2n-20 and the RF processor 2n-10 transmit and receive signals as described above. As such, the baseband processor 2n-20 and the RF processor 2n-10 may also be called a transmitter, a receiver, a transceiver, a communicator, or a wireless communicator.

The communicator 2n-30 provides an interface for communicating with other nodes in a network.

The storage 2n-40 stores basic programs, application programs, and data, e.g., configuration information, for operations of a primary BS. In particular, the storage 2n-40 may store, for example, information about bearers allocated for a connected UE and measurement results reported from the connected UE. Also, the storage 2n-40 may store criteria information used to determine whether to provide or release dual connectivity to or from the UE. The storage 2n-40 may provide the stored data, in response to a request by the controller 2n-50.

The controller 2n-50 may control overall operations of the primary BS. For example, the controller 2n-50 transmits and receives signals via the baseband processor 2n-20 and the RF processor 2n-10, or the communicator 2n-30. Also, the controller 2n-50 records and reads data on or from the storage 2n-40. To this end, the controller 2n-50 may include at least one processor.

Also, according to an embodiment of the disclosure, the controller 2n-50 may include a multi-connection processor 2n-52 configured to process a process running in a multi-connection mode.

The methods according to the embodiments of the disclosure as described herein or in the following claims may be implemented as hardware, software, or a combination of hardware and software.

When implemented as software, a computer-readable storage medium or a computer program product, which stores one or more programs (e.g., software modules), may be provided. The one or more programs stored in the computer-readable storage medium or the computer program product are configured for execution by one or more processors in an electronic device. The one or more programs include instructions directing the electronic device to execute the methods according to the embodiments of the disclosure as described in the claims or the specification.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments of the disclosure.

In the afore-described embodiments of the disclosure, configuration elements included in the disclosure are expressed in a singular or plural form according to the embodiments of the disclosure. However, the singular or plural form is appropriately selected for convenience of descriptions and the disclosure is not limited thereto. As such, a configuration element expressed in a plural form may also be configured as a single element, and a configuration element expressed in a singular form may also be configured as plural elements.

The embodiments of the disclosure described with reference to the present specification and the drawings are merely illustrative of specific examples to easily facilitate description and understanding of the disclosure, and are not intended to limit the scope of the disclosure. That is, it will be understood by one of ordinary skill in the art that other modifications based on the technical ideas of the disclosure are feasible. Also, the embodiments of the disclosure may be combined to be implemented, when required. For example, portions of an embodiment of the disclosure may be combined with portions of another embodiment of the disclosure. Also, modifications based on the technical scope of the embodiments of the disclosure may be applied to other systems such as an LTE system, a 5G or NR system, or the like.

The embodiments of the disclosure provide a method and apparatus for effectively providing a service in a wireless communication system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an integrated access backhaul (IAB) node in a wireless communication system, the method comprising:
   receiving, from a base station, configuration information associated with a backhaul (BH) radio link control (RLC) channel via a higher layer signaling; and
   identifying, based on the configuration information associated with the BH RLC channel, whether an extended logical channel identifier (eLCID) is configured,
   wherein in case that the eLCID is not used and an uplink (UL) grant size is equal to or larger than a first size, while data for transmission is available, only a padding buffer status report (BSR) and/or a padding is not transmitted,
   wherein in case that the eLCID is used and the UL grant size is equal to or larger than a second size, while the data for transmission is available, only a padding BSR and/or a padding is not transmitted, and
   wherein the second size is greater than the first size.

2. The method of claim 1, further comprising:
   in case that the eLCID is not used and the UL grant size is less than the first size, while the data for transmission is available, transmitting only a padding BSR and/or a padding.

3. The method of claim 1, further comprising:
in case that the eLCID is used and the UL grant size is less than the second size, while the data for transmission is available, transmitting only a padding BSR and/or a padding.

4. The method of claim 1, wherein the first size is 8 bytes and the second size is 10 bytes.

5. An integrated access backhaul (IAB) node in a wireless communication system, the IAB node comprising:
a transceiver; and
at least one processor coupled to the transceiver and configured to:
receive, from a base station, configuration information associated with a backhaul (BH) radio link control (RLC) channel via a higher layer signaling; and
identify, based on the configuration information associated with the BH RLC channel, whether an extended logical channel identifier (eLCID) is configured,
wherein in case that the eLCID is not used and an uplink (UL) grant size is equal to or larger than a first size, while data for transmission is available, only a padding buffer status report (BSR) and/or a padding is not transmitted,
wherein in case that the eLCID is used and the UL grant size is equal to or larger than a second size, while the data for transmission is available, only a padding BSR and/or a padding is not transmitted, and
wherein the second size is greater than the first size.

6. The IAB node of claim 5, wherein the at least one processor is further configured to:
in case that the eLCID is not used and the UL grant size is less than the first size, while the data for transmission is available, transmit only a padding BSR and/or a padding.

7. The IAB node of claim 5, wherein the at least one processor is further configured to:
in case that the eLCID is used and the UL grant size is less than the second size, while the data for transmission is available, transmit only a padding BSR and/or a padding.

8. The IAB node of claim 5, wherein the first size is 8 bytes and the second size is 10 bytes.

9. A method performed by a base station in a wireless communication system, the method comprising:
transmitting, to an integrated access backhaul (IAB) node, configuration information associated with a backhaul (BH) radio link control (RLC) channel via a higher layer signaling, the configuration information associated with the BH RLC channel including information associated with a logical channel identifier (LCID) or information associated with an extended LCID (eLCID),
wherein, in case that the eLCID is not used and an uplink (UL) grant size is equal to or larger than a first size, while data for reception is available, only a padding buffer status report (BSR) and/or a padding is not received,
wherein, in case that the eLCID is used and the UL grant size is equal to or larger than a second size, while the data for reception is available, only a padding BSR and/or a padding is not received, and
wherein the second size is greater than the first size.

10. The method of claim 9, further comprising:
in case that the eLCID is not used and the UL grant size is less than the first size, while the data for reception is available, receiving only a padding BSR and/or a padding.

11. The method of claim 9, further comprising:
in case that the eLCID is used and the UL grant size is less than the second size, while the data for reception is available, receiving only a padding BSR and/or a padding.

12. The method of claim 9, wherein the first size is 8 bytes and the second size is 10 bytes.

13. A base station in a wireless communication system, the base station comprising:
a transceiver; and
at least one processor coupled to the transceiver and configured to:
transmit, to an integrated access backhaul (IAB) node, configuration information associated with a backhaul (BH) radio link control (RLC) channel via a higher layer signaling, the configuration information associated with the BH RLC channel including information associated with a logical channel identifier (LCID) or information associated with an extended LCID (eLCID),
wherein, in case that the eLCID is not used and an uplink (UL) grant size is equal to or larger than a first size, while data for reception is available, only a padding buffer status report (BSR) and/or a padding is not received,
wherein, in case that the eLCID is used and the UL grant size is equal to or larger than a second size, while the data for reception is available, only a padding BSR and/or a padding is not received, and
wherein the second size is greater than the first size.

14. The base station of claim 13, wherein the at least one processor is further configured to:
in case that the eLCID is not used and the UL grant size is less than the first size, while the data for reception is available, receive only a padding BSR and/or a padding.

15. The base station of claim 13, wherein the at least one processor is further configured to:
in case that the eLCID is used and the UL grant size is less than the second size, while the data for reception is available, receive only a padding BSR and/or a padding.

16. The base station of claim 13, wherein the first size is 8 bytes and the second size is 10 bytes.

17. The method of claim 1, further comprising:
receiving configuration information associated with a UL grant.

* * * * *